(12) United States Patent
Pannatoni

(10) Patent No.: US 6,876,598 B1
(45) Date of Patent: Apr. 5, 2005

(54) METHOD FOR PREDICTING PROPAGATION OF SOUND IN AN OCEAN

(76) Inventor: Ronald Francis Pannatoni, 540 Mark Dowdle Rd., Franklin, NC (US) 28734

( * ) Notice: Subject to any disclaimer, the term of this patent is extended or adjusted under 35 U.S.C. 154(b) by 38 days.

(21) Appl. No.: 10/860,905

(22) Filed: Jun. 4, 2004

Related U.S. Application Data

(60) Provisional application No. 60/478,573, filed on Jun. 12, 2003.

(51) Int. Cl.[7] .............................. H04B 11/00; G01V 1/28
(52) U.S. Cl. ........................... 367/13; 367/131; 702/14; 703/5
(58) Field of Search ................... 367/13, 131; 702/127, 702/181, 14; 455/423; 703/5

(56) References Cited

U.S. PATENT DOCUMENTS 5,126,978 A * 6/1992 Chaum ........................ 367/135
5,642,445 A * 6/1997 Bucaro et al. ................. 367/13
6,640,089 B1 * 10/2003 Kanaan et al. ............... 702/127

OTHER PUBLICATIONS

Ahmad T. Abawi, William A. Kuperman, Michael D. Collins "The Coupled Mode Parabolic Equation", Journal of the Acoustical Society of America, Jul. 1997, pp. 233–238, vol. 102, No. 1, Acoustical Society of America, USA.

Michael D. Collins, "The Adiabatic Coupled Mode Equation", Journal of the Acoustical Society of America, Oct. 1993, pp. 2269–2278, vol. 94, No. 4, Acoustical Society of America, USA.

* cited by examiner

*Primary Examiner*—Ian J. Lobo

(57) ABSTRACT

Propagation of sound in an ocean is accurately predicted at all ranges from a source by a computational method that uses a newly created Decomposition Method to make the predictions at long range from the source. The predictions are done in a limited region of the ocean without the need to predict propagation of sound outside the region. The vertical boundaries of the region are parallel to a given direction of propagation of sound from the source. These boundaries are transparent, and sound penetrates them without reflection. The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region. The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sum. The actual sound field in the region is found from this sum. A modification of the Decomposition Method incorporates an extrapolation procedure to ensure accuracy of the predictions at long range from the source.

5 Claims, 4 Drawing Sheets

METHOD FOR PREDICTING PROPAGATION OF SOUND IN AN OCEAN

CROSS-REFERENCE TO RELATED APPLICATIONS

This application claims the benefit of PPA Ser. No. 60/478,573, filed 2003 Jun. 12 by the present inventor.

FEDERALLY SPONSORED RESEARCH

Not applicable

SEQUENCE LISTING OR PROGRAM

Not applicable

BACKGROUND OF THE INVENTION

1. Field of the Invention

The invention pertains to a method for predicting propagation of sound in an ocean.

2. Description of the Related Art

For the purpose of predicting propagation of sound in an ocean, the ocean can be modelled as a three-dimensional acoustic waveguide that is spatially irregular. A partial differential wave equation governs propagation of sound in the waveguide. A complex-valued distribution of pressure represents the sound field in this equation. However, the sound field also can be represented in terms of the local modes of the waveguide. This representation is useful because it reduces the dimensionality of the model. The equations that govern this representation are obtained by taking moments of the wave equation with respect to the local modes. These moments produce a system of coupled mode equations in two horizontal dimensions. The solution of these coupled mode equations can be used to reconstruct the sound field at any depth in the waveguide from the local mode representation.

In FIG. 1 there is shown a circular region 10 in the horizontal plane with a source of sound at the center 12. An article by A. T. Abawi, W. A. Kuperman and M. D. Collins ("The coupled mode parabolic equation", Journal of the Acoustical Society of America, Vol. 102, No. 1, pp. 233–238, July 1997) discusses a numerical method for solving coupled mode equations to predict propagation of sound over region 10. This method is an elaboration of an earlier numerical method that was developed by M. D. Collins ignoring coupling among the modes. Propagation of sound is predicted over all of region 10. The preferred direction of propagation is the radially outward direction from the center 12.

An article by M. D. Collins ("The adiabatic mode parabolic equation", Journal of the Acoustical Society of America, Vol. 94, No. 4, pp. 2269–2278, October 1993) points out that it would be very efficient to make predictions just over an angular sector 14 of small angular width. The article notes that transparent boundary conditions would have to be imposed along the radial edges of sector 14 for this purpose, but it does not indicate how to formulate these conditions or how to adopt them in a solution method. The article by A. T. Abawi, W. A. Kuperman and M. D. Collins does not address these issues at all.

SUMMARY OF THE INVENTION

The invention permits propagation of sound in an ocean to be accurately predicted at all ranges from a source. At long ranges this prediction is done by a newly created Decomposition Method. The predictions are done for fully three-dimensional ocean environments.

The invention permits the predictions to be done in a limited region of the ocean without the need to predict propagation of sound outside the region. The vertical boundaries of the region are parallel to a given direction of propagation of sound from the source. These boundaries are transparent, and sound penetrates them without reflection.

The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region.

The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sun. The actual sound field in the region is found from this sum.

A modification of the Decomposition Method incorporates an extrapolation procedure to ensure that the predictions are accurate at long range from the source.

It is an object of the invention to provide an accurate method for predicting propagation of sound in an ocean.

Another object of the invention is to provide an accurate method for predicting propagation of sound from a source in a limited region of an ocean without the need to predict propagation of sound outside the region.

Yet another object of the invention is to provide an accurate method for predicting propagation of sound from a source in a limited region of an ocean without the need to predict propagation of sound outside the region when the length of the region is much greater than the width of the region.

Other objects, advantages and new features of the invention will be apparent from the following detailed description of the invention when considered in conjuction with the accompanying drawings.

DRAWINGS

DETAILED DESCRIPTION OF THE PREFERRED EMBODIMENT

1. Coupled mode equations in slab geometry and in spherical geometry.

The propagation of sound in an irregular three-dimensional waveguide can be described mathematically by a partial differential equation subject to certain conditions at the boundaries of the waveguide. (By "irregular" we mean that the medium in the waveguide is spatially inhomogeneous. We also assume that this medium can be modelled as a lossless fluid.) Let the variables x, y and z denote range, cross-range and depth in the waveguide, respectively. Let the variables ω, c and ρ denote source frequency, local sound speed and local fluid density in the waveguide, respectively. We let the variable p denote the complex acoustic pressure. This quantity is defined by the property that the physical acoustic pressure is the real part of the product p exp(−iωt), where t denotes time. The partial differential equation in three dimensions that governs p is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \frac{\partial}{\partial z}\left(\frac{1}{\rho}\frac{\partial p}{\partial z}\right) + \frac{1}{\rho}\frac{\omega^2}{c^2}p = 0. \quad (1.1)$$

Figure 2:
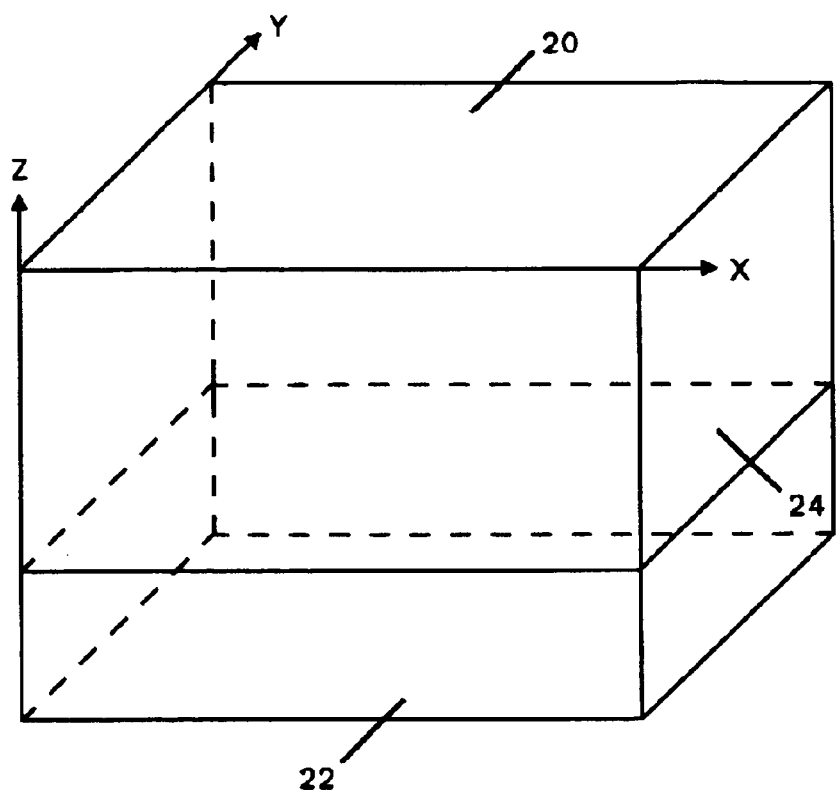
FIG. 2 shows a section of a waveguide that models the ocean environment.

Referring now to FIG. 2, we assume that the pressure vanishes at a reflective top surface 20 of the waveguide, where z=0, and at a reflective bottom surface 22 of the waveguide, where z=−L:

$$p=0 \text{ at } z=0 \text{ and at } z=-L. \quad (1.2)$$

We also assume that there is a single interface 24 between the surface and the bottom where the local sound speed and the local fluid density can be discontinuous. The depth of this interface can vary with range and with cross-range. We describe the interface by the equation $$S(x,y,z)=H(x,y)+z=0, \quad (1.3)$$

where 0<H(x, y)<L. The acoustic pressure must be continuous across this interface. The component of acoustic fluid velocity that is normal to the interface must also be continuous across the interface. We can express these continuity conditions as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \frac{\partial p}{\partial z}\right)$$

are continuous across z=−H(x, y). (1.4)

It is possible to convert the acoustic equation (1.1) and the conditions (1.2) and (1.4) on it to an equivalent infinite system of coupled partial differential equations in two dimensions. This system is based on the local modes of the waveguide, which are characterized by the eigenfunctions $f_n(x, y, z)$ and by the squared wavenumbers $\xi_n^2(X, y)$ that satisfy the differential equation $$\frac{\partial}{\partial z}\left(\frac{1}{\rho}\frac{\partial f_n}{\partial z}\right) + \frac{1}{\rho}\left(\frac{\omega^2}{c^2} - \xi_n^2\right)f_n = 0$$

if −L<z<0 and z≠−H(x,y), (1.5)

subject to the conditions that $$f_n=0 \text{ at } z=-L \text{ and at } z=0, \quad (1.6)$$

$$f_n \text{ and } \frac{1}{\rho}\frac{\partial f_n}{\partial z}$$

are continuous across z=−H(x, y). (1.7)

At each position (x,y) these equations describe a nonsingular selfadjoint characteristic value problem. The squared wavenumbers $\xi_n^2(x, y)$ are real and countably infinite in number. They can be indexed to decrease monotonically to −∞ as the index n increases through the positive integers. The local modes can be computed with numerical methods that are well-known in the art.

At each position (x, y), $\sigma f_n(x, y\ 0)/\sigma z=0$ if and only if $f_n(x, y, z)$ vanishes identically for −L≦z≦0. Therefore, we can assume that $\sigma f_n(x, z, y, 0)/\sigma z \neq 0$ and that $f_n(x, y, z)$ does not vanish identically. Furthermore, we can assume that $f_n(x, y, z)$ is real-valued. Since the density ρ is positive, the eigenfunctions are orthogonal in the following sense:

$$\int_{-L}^{0}\frac{1}{\rho}f_m f_n dz = \begin{cases} d_n(x, y) > 0 \text{ if } m = n, \\ 0 \text{ if } m \neq n. \end{cases} \quad (1.8)$$

We also assume that the eigenfunctions are normalized so that the signs of the partial derivatives $\sigma f_n(x, y, 0)/\theta z$ and the values of the integrals $d_n(x, y)$ are independent of the position (x, y).

The functions p, σp/σx and σp/σy have the following eigenfunction expansions:

$$p = \sum_{n=1}^{\infty} a_n f_n / d_n \text{ where } a_n = \int_{-L}^{0}\frac{1}{\rho}p f_n dz, \quad (1.9)$$

$$\frac{\partial p}{\partial x} = \sum_{n=1}^{\infty} b_n f_n / d_n \text{ where } b_n = \int_{-L}^{0}\frac{1}{\rho}\frac{\partial p}{\partial x}f_n dz, \quad (1.10)$$

$$\frac{\partial p}{\partial y} = \sum_{n=1}^{\infty} c_n f_n / d_n \text{ where } c_n = \int_{-L}^{0}\frac{1}{\rho}\frac{\partial p}{\partial y}f_n dz. \quad (1.11)$$

The coefficients $a_n$, $b_n$ and $c_n$ in these expansions are functions of the position (x,y). They are governed by the following system of coupled partial differential equations.

$$\frac{\partial b_n}{\partial x} + \frac{\partial c_n}{\partial y} + \xi_n^2 a_n = \sum_{m=1}^{\infty}(b_m B_{mn} + c_m C_{mn})\frac{1}{d_m}, \quad (1.12)$$

$$b_n = \frac{\partial a_n}{\partial x} + \sum_{m=1}^{\infty} a_m B_{nm}\frac{1}{d_m}, \quad (1.13)$$

$$c_n = \frac{\partial a_n}{\partial y} + \sum_{m=1}^{\infty} a_m C_{nm}\frac{1}{d_m}. \quad (1.14)$$

These equations constitute the fundamental first-order formulation of coupled mode theory for an irregular three-dimensional waveguide.

The coupling coefficients $B_{mn}$ and $C_{mn}$ can be computed as follows. Let $$g_n = \frac{1}{\rho}\frac{\partial f_n}{\partial z} \quad (1.15)$$

and define the following matrix elements:

$$D_{mn} = \int_{-L}^{0}\left[\frac{\partial}{\partial x}\left(\frac{1}{\rho}\frac{\omega^2}{c^2}\right)f_m f_n + \frac{\partial \rho}{\partial x}g_m g_n\right]dz, \quad (1.16)$$

$$E_{mn} = \int_{-L}^{0}\frac{\partial}{\partial x}\left(\frac{1}{\rho}\right)f_m f_n dz, \quad (1.17)$$

-continued $$F_{mn} = \int_{-L}^{0} \left[ \frac{\partial}{\partial y}\left(\frac{1}{\rho}\frac{\omega^2}{c^2}\right) f_m f_n + \frac{\partial \rho}{\partial y} g_m g_n \right] dz, \qquad (1.18)$$

$$G_{mn} = \int_{-L}^{0} \frac{\partial}{\partial y}\left(\frac{1}{\rho}\right) f_m f_n dz, \qquad (1.19)$$

$$J_{mn} = \left[\frac{1}{\rho}\frac{\omega^2}{c^2}\right]_{-H-0}^{-H+0} f_m(-H)f_n(-H) + [\rho]_{-H-0}^{-H+0} g_m(-H)g_n(-H), \qquad (1.20)$$

$$K_{mn} = \left[\frac{1}{\rho}\right]_{-H-0}^{-H+0} f_m(-H)f_n(-H). \qquad (1.21)$$

If $m \neq n$ then $$B_{mn} = -(\xi_m^2 - \xi_n^2)^{-1}\left[D_{mn} - E_{mn}\xi_n^2 + \frac{\partial H}{\partial x}(J_{mn} - K_{mn}\xi_n^2)\right], \qquad (1.22)$$

$$C_{mn} = -(\xi_m^2 - \xi_n^2)^{-1}\left[F_{mn} - G_{mn}\xi_n^2 + \frac{\partial H}{\partial y}(J_{mn} - K_{mn}\xi_n^2)\right], \qquad (1.23)$$

and $$B_{nn} = -\frac{1}{2}\left(E_{nn} + \frac{\partial H}{\partial x}K_{nn}\right), \qquad (1.24)$$

$$C_{nn} = -\frac{1}{2}\left(G_{nn} + \frac{\partial H}{\partial y}K_{nn}\right). \qquad (1.25)$$

In practice, it is necessary to work with a finite number of coupled mode equations. For this reason, we truncate the coupled mode equations (1.12–1.14) as follows. Fixing a positive integer M, we assume that the expansion coefficients $a_n$, $b_n$ and $c_n$ vanish if $n > M$. Thus, if $n=1, \ldots, M$ then $$\frac{\partial b_n}{\partial x} + \frac{\partial c_n}{\partial y} + \xi_n^2 a_n = \sum_{m=1}^{M}(b_m B_{mn} + c_m C_{mn})\frac{1}{d_m}, \qquad (1.26)$$

$$b_n = \frac{\partial a_n}{\partial x} + \sum_{m=1}^{M} a_m B_{nm}\frac{1}{d_m}, \qquad (1.27)$$

$$c_n = \frac{\partial a_n}{\partial y} + \sum_{m=1}^{M} a_m C_{nm}\frac{1}{d_m}. \qquad (1.28)$$

We can reduce this system of equations to an equivalent system of second-order partial differential equations for just the coefficients $a_n$. If $n=1, \ldots, M$ then $$\frac{\partial^2 a_n}{\partial x^2} + \frac{\partial^2 a_n}{\partial y^2} + \xi_n^2 a_n = \sum_{m=1}^{M}\left(\alpha_{nm} a_m + \beta_{nm}\frac{\partial a_m}{\partial x} + \gamma_{nm}\frac{\partial a_m}{\partial y}\right)\frac{1}{d_m}, \qquad (1.29)$$

where $$\alpha_{nm} = \sum_{l=1}^{M}(B_{lm}B_{ln} + C_{lm}C_{ln})\frac{1}{d_l} - \frac{\partial B_{nm}}{\partial x} - \frac{\partial C_{nm}}{\partial y}, \qquad (1.30)$$

The waveguide considered in the preceding discussion is a slab between two parallel planes. Now let us consider a waveguide that is a shell between two concentric spheres. Let the radius of the outer sphere be $R_0$, and let the radius of the inner sphere be $R_0 - L$. We pick a spherical coordinate system for this problem anticipating that our analysis of sound propagating in the shell will be restricted to a neighborhood of a great circle E on the outer sphere. We identify E as the equator of this sphere. Let M denote another great circle on the outer sphere that intersects E at right angles and near the source of sound in the waveguide. We identify M as the prime meridian of the outer sphere.

Let P denote a point in the shell. We let $\tau$ be the radial distance of P from the common center of the spheres. We let $\psi$ be the angle of latitude of P relative to the equator E. We let $\phi$ be the angle of longitude of P relative to the prime meridian M. For definiteness let $\phi=0$ where E intersects M near the source.

It is convenient to introduce a new system of coordinates $(x, y, z)$.

$$x = R_0\phi, \; y = R_0\ln(\sec\psi + \tan\psi), \; z = r - R_0. \qquad (1.32)$$

Note that $y \approx R_0\psi$ if $|\psi| \ll 1$. In the new coordinate system the partial differential equation that governs the acoustic pressure p in the waveguide is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \cos^2\psi\frac{\partial}{\partial z}\left(\frac{1}{\rho}\frac{r^2}{R_0^2}\frac{\partial p}{\partial x}\right) + \cos^2\psi\frac{1}{\rho}\frac{\omega^2}{c^2}\frac{r^2}{R_0^2}p = 0. \qquad (1.33)$$

We assume that the pressure vanishes on the outer sphere, where $z=0$, and on the inner sphere, where $z=-L$:

$$p=0 \text{ at } z=0 \text{ and at } z=-L. \qquad (1.34)$$

We also assume that there is a single interface between these spheres where the local sound speed and the local fluid density in the shell can be discontinuous. The radial coordinate of this interface can vary with latitude and with longitude. We describe the interface in the new coordinate system by the equation $$S(x,y,z) = H(x,y) + z = 0, \qquad (1.35)$$

where $0 < H(x, y) < L$. We can express the continuity conditions at the interface as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \cos^2\psi\frac{r^2}{R_0^2}\frac{\partial p}{\partial z}\right) \qquad (1.36)$$

are continuous across $z = -H(x, y)$.

The local modes of the spherical shell waveguide are characterized by the eigenfunctions $f_n(x, y, z)$ and by the squared wavenumbers $\xi_n^2(x, y)$ that satisfy the differential equation $$\frac{\partial}{\partial z}\left(\frac{1}{\rho}\frac{r^2}{R_0^2}\frac{\partial f_n}{\partial z}\right) + \frac{1}{\rho}\left(\frac{\omega^2}{c^2}\frac{r^2}{R_0^2} - \xi_n^2\right)f_n = 0 \qquad (1.37)$$

if $-L < z < 0$ and $z \neq -H(x, y)$, subject to the conditions that $$f_n = 0 \text{ at } z=-L \text{ and at } z=0, \qquad (1.38)$$

$f_n$ and $\frac{1}{\rho}\frac{\partial f_n}{\partial z}$ are continuous across $z = -H(x, y)$. (1.39)

At each position (x, y) these equations describe a nonsingular selfadjoint characteristic value problem. The squared wavenumbers $\xi_n^2(x, y)$ are real and countably infinite in number. We can assume that they are indexed to decrease monotonically to $-\infty$ as the index n increases through the positive integers. We can also assume that $\partial f_n(x, y, 0)/\partial z \neq 0$ and that $f_n(x, y, z)$ does not vanish identically. Furthermore, we can assume that $f_n(x, y, z)$ is real-valued. Since the density $\rho$ is positive, the eigenfunctions are orthogonal in the following sense:

$$\int_{-L}^{0} \frac{1}{\rho} f_m f_n dz = \begin{cases} d_n(x, y) > 0 & \text{if } m = n, \\ 0 & \text{if } m \neq n. \end{cases} \quad (1.40)$$

We assume that the eigenfunctions are normalized so that the signs of the partial derivatives $\partial f_n(x, y, 0)/\partial z$ and the values of the integrals $d_n(x, y)$ are independent of the position (x, y).

The functions p, $\partial p/\partial x$ and $\partial p/\partial y$ have the following eigenfunction expansions:

$$p = \sum_{n=1}^{\infty} a_n f_n / d_n \text{ where } a_n = \int_{-L}^{0} \frac{1}{\rho} p f_n dz, \quad (1.41)$$

$$\frac{\partial p}{\partial x} = \sum_{n=1}^{\infty} b_n f_n / d_n \text{ where } b_n = \int_{-L}^{0} \frac{1}{\rho} \frac{\partial p}{\partial x} f_n dz, \quad (1.42)$$

$$\frac{\partial p}{\partial y} = \sum_{n=1}^{\infty} c_n f_n / d_n \text{ where } c_n = \int_{-L}^{0} \frac{1}{\rho} \frac{\partial p}{\partial y} f_n dz. \quad (1.43)$$

The coefficients $a_n$, $b_n$ and $c_n$ in these expansions are functions of the position (x,y). They are governed by the following system of partial differential equations.

$$\frac{\partial b_n}{\partial x} + \frac{\partial c_n}{\partial y} + \xi_n^2 \cos^2\psi a_n = \sum_{m=1}^{\infty} (b_m B_{mn} + c_m C_{mn}) \frac{1}{d_m}, \quad (1.44)$$

$$b_n = \frac{\partial a_n}{\partial x} + \sum_{m=1}^{\infty} a_m B_{mn} \frac{1}{d_m}, \quad (1.45)$$

$$c_n = \frac{\partial a_n}{\partial y} + \sum_{m=1}^{\infty} a_m C_{nm} \frac{1}{d_m}. \quad (1.46)$$

These equations constitute the fundamental order formulation of coupled mode theory for an irregular three-dimensional waveguide in spherical geometry.

The coupling coefficients $B_{mn}$ and $C_{mn}$ can be computed as follows. Let $$g_n = \frac{1}{\rho} \frac{\partial f_n}{\partial z} \quad (1.47)$$

and define the following matrix elements:

$$D_{mn} = \int_{-L}^{0} \left[ \frac{\partial}{\partial x}\left(\frac{1}{\rho}\frac{w^2}{c^2}\right) f_m f_n + \frac{\partial \rho}{\partial x} g_m g_n \right] \frac{r^2}{R_0^2} dz, \quad (1.48)$$

-continued $$E_{mn} = \int_{-L}^{0} \frac{\partial}{\partial x}\left(\frac{1}{\rho}\right) f_m f_n dz, \quad (1.49)$$

$$F_{mn} = \int_{-L}^{0} \left[\frac{\partial}{\partial x}\left(\frac{1}{\rho}\frac{\omega^2}{c^2}\right) f_m f_n + \frac{\partial \rho}{\partial y} g_m g_n\right] \frac{r^2}{R_0^2} dz, \quad (1.50)$$

$$G_{mn} = \int_{-L}^{0} \frac{\partial}{\partial y}\left(\frac{1}{\rho}\right) f_m f_n dz, \quad (1.51)$$

$$J_{mn} = \left\{ \left[\frac{1}{\rho}\frac{\omega^2}{c^2}\right]_{-H-0}^{-H+0} f_m(-H) f_n(-H) + [\rho]_{-H-0}^{-H+0} g_m(-H) g_n(-H) \right\} (1 - H/R_0)^2, \quad (1.52)$$

$$K_{mn} = \left[\frac{1}{\rho}\right]_{-H-0}^{-H+0} f_m(-H) f_n(-H). \quad (1.53)$$

These definitions differ in form from the corresponding definitions for the slab waveguide only by the radial factors in the formulas for the matrix elements $D_{mn}$, $F_{mn}$ and $J_{mn}$.

If $m \neq n$ then $$B_{mn} = -(\xi_m^2 - \xi_n^2)^{-1}\left[D_{mn} - E_{mn}\xi_n^2 + \frac{\partial H}{\partial x}(J_{mn} - K_{mn}\xi_n^2)\right], \quad (1.54)$$

$$C_{mn} = -(\xi_m^2 - \xi_n^2)^{-1}\left[F_{mn} - G_{mn}\xi_n^2 + \frac{\partial H}{\partial y}(J_{mn} - K_{mn}\xi_n^2)\right], \quad (1.55)$$

and $$B_{nn} = -\frac{1}{2}\left(E_{nn} + \frac{\partial H}{\partial x} K_{nn}\right), \quad (1.56)$$

$$C_{nn} = -\frac{1}{2}\left(G_{nn} + \frac{\partial H}{\partial y} K_{nn}\right). \quad (1.57)$$

These equations are formally identical to the corresponding equations for the slab waveguide.

Let us truncate eqs.(1.44–1.46) by fixing a positive integer M and assuming that the expansion coefficients $a_n$, $b_n$ and $c_n$ vanish if n>M. Thus, if n=1, . . . , M then $$\frac{\partial b_n}{\partial x} + \frac{\partial c_n}{\partial y} + \xi_n^2 \cos^2\psi a_n = \sum_{m=1}^{M} (b_m B_{mn} + c_m C_{mn}) \frac{1}{d_m}, \quad (1.58)$$

$$b_n = \frac{\partial a_n}{\partial x} + \sum_{m=1}^{M} a_m B_{nm} \frac{1}{d_m}, \quad (1.59)$$

$$c_n = \frac{\partial a_n}{\partial y} + \sum_{m=1}^{M} a_m C_{nm} \frac{1}{d_m}. \quad (1.60)$$

We can reduce this system of equations to an equivalent system of second-order partial differential equations for just the coefficients $a_n$. If n=1, . . . , M then $$\frac{\partial^2 a_n}{\partial x^2} + \frac{\partial^2 a_n}{\partial y^2} + \xi_n^2 \cos^2\psi a_n = \quad (1.61)$$

$$\sum_{m=1}^{M} \left(\alpha_{nm} a_m + \beta_{nm} \frac{\partial a_m}{\partial x} + \gamma_{nm} \frac{\partial a_m}{\partial y}\right) \frac{1}{d_m},$$

where $$\alpha_{nm} = \sum_{l=1}^{M} (B_{lm}B_{ln} + C_{lm}C_{ln})\frac{1}{d_l} - \frac{\partial B_{nm}}{\partial x} - \frac{\partial C_{nm}}{\partial y}, \quad (1.62)$$

2. Paraxial approximations for coupled mode equations.

Since the coupled mode equations (1.29,1.61) are elliptic partial differential equations, they can model propagation in all directions at the same time. In many problems of practical interest, however, it is sufficient to consider a single direction of propagation at a time. In slab geometry we can take this direction to be the direction of increasing range, and in spherical geometry we can take it to be the direction of increasing longitude along the equator. In each case, we can formulate parabolic equations from the coupled mode equations to model propagation of sound in the given direction. We shall describe how to formulate these parabolic equations from the coupled mode equations in slab geometry. The approach is identical for the coupled mode equations in spherical geometry.

We let the normalization integral $d_m=1$ for every index m. Hence, the coupled mode equations take the form $$\frac{\partial^2 a_m}{\partial x^2} + \frac{\partial^2 a_m}{\partial y^2} + \xi_m^2 a_m = \sum_{n=1}^{M}\left(\alpha_{nm}a_n + \beta_{mn}\frac{\partial a_n}{\partial x} + \gamma_{mn}\frac{\partial a_n}{\partial y}\right) \quad (2.1)$$

$$(m = 1, \ldots, M).$$

We introduce a positive reference wavenumber $k_m(x)$ for each index m at every range x. We define the corresponding reference phase $\sigma_m(x)$ by $$\vartheta_m(x) = \int_0^x k_m(u)du. \quad (2.2)$$

We define the complex amplitude $\phi_m(x, y)$ of the expansion coefficient $a_m(x, y)$ as follows.

$$\phi_m(x,y) = a_m(x,y)\exp\{-i\sigma_m(x)\}. \quad (2.3)$$

Noting that $d\sigma_m(x)/dx = k_m(x)$ and letting $k_m'(x) = dk_m(x)/dx$, we see that $$\frac{\partial a_m}{\partial x} = \left(\frac{\partial \varphi_m}{\partial x} + ik_m\varphi_m\right)e^{i\vartheta_m}, \quad (2.4)$$

$$\frac{\partial^2 a_m}{\partial x^2} = \left(\frac{\partial^2 \varphi_m}{\partial x^2} + 2ik_m\frac{\partial \varphi_m}{\partial x} + ik_m'\varphi_m - k_m^2\varphi_m\right)e^{i\vartheta_m}. \quad (2.5)$$

Now we assume that the following paraxial approximations are valid:

$$\left|\frac{\partial^2 \varphi_m}{\partial x^2}\right| \ll 2k_m\left|\frac{\partial \varphi_m}{\partial x}\right| \quad (m = 1, \ldots, M). \quad (2.6)$$

These assumptions allow us to approximate eq.(2.5) by deleting the first term on its right-hand side (RHS).

$$\frac{\partial^2 a_m}{\partial x^2} = \left(2ik_m\frac{\partial \varphi_m}{\partial x} + ik_m'\varphi_m - k_m^2\varphi_m\right)e^{i\vartheta_m}, \quad (2.7)$$

Combining eqs.(2.3,2.4,2.7) with eq.(2.1), we get the following coupled parabolic equations.

$$2ik_m\frac{\partial \varphi_m}{\partial x} + ik_m'\varphi_m + \frac{\partial^2 \varphi_m}{\partial y^2} = (k_m^2 - \xi_m^2)\varphi_m + \quad (2.8)$$

$$\sum_{n=1}^{M}\left[(\alpha_{mn} + i\beta_{mn}k_n)\varphi_n + \beta_{mn}\frac{\partial \varphi_n}{\partial x} + \gamma_{mn}\frac{\partial \varphi_n}{\partial y}\right]e^{i(\vartheta_m - \vartheta_n)}$$

for $m=1, \ldots, M$.

Note the appearance of the partial derivatives $\partial\phi_n/\partial x$ on the RHS of eq.(2.8). Let us rewrite the coupled parabolic equations as follows.

$$2i\left[k_m\frac{\partial \varphi_m}{\partial x} + \frac{i}{2}\sum_{n=1}^{M}\beta_{mn}e^{-i(\vartheta_m-\vartheta_n)}\frac{\partial \varphi_n}{\partial x}\right] = -ik_m'\varphi_m - \frac{\partial^2 \varphi_m}{\partial y^2} + \quad (2.9)$$

$$(k_m^2 - \xi_m^2)\varphi_m + \sum_{n=1}^{M}\left[(\alpha_{mn} + i\beta_{mn}k_n)\varphi_n + \gamma_{mn}\frac{\partial \varphi_n}{\partial y}\right]e^{-i(\vartheta_m - \vartheta_n)}$$

for $m=1, \ldots, M$. This system of equations can be solved uniquely for the partial derivatives $\partial\phi_n/\partial x$ if and only if the matrix $$M = \quad (2.10)$$

$$\begin{bmatrix} k_1 & (i/2)\beta_{12}e^{-i(\vartheta_1-\vartheta_2)} & \ldots & (i/2)\beta_{1M}e^{-i(\vartheta_1-\vartheta_M)} \\ (i/2)\beta_{21}e^{-i(\vartheta_2-\vartheta_1)} & k_2 & \ldots & (i/2)\beta_{2M}e^{-i(\vartheta_2-\vartheta_M)} \\ \vdots & \vdots & \ddots & \vdots \\ (i/2)\beta_{M1}e^{-i(\vartheta_M-\vartheta_1)} & (i/2)\beta_{M2}e^{-i(\vartheta_M-\vartheta_2)} & \ldots & k_M \end{bmatrix}$$

is nonsingular. (Note that $B_{mm}=0$ for every m.)

We call M the reference matrix. Since the coupling coefficients $B_{mn}$ are real-valued and skew-symmetric (that is, $B_{nm}=-B_{mn}$ for every m and n), this matrix is Hermitian. Note that M is a function of position (x, y). We shall assume that M is positive definite at every position (x, y). A sufficient condition for M to be positive definite is that this matrix be strictly diagonally dominant.

$$k_n > (1/2)\sum_{m\neq n}|\beta_{mn}| \text{ for } n = 1, \ldots, M. \quad (2.11)$$

There is a useful alternative formulation of the coupled parabolic equations. First, define $$\psi_m = k_m\varphi_m + (i/2)\sum_{n=1}^{M}\beta_{mn}\varphi_n e^{-i(\vartheta_m-\vartheta_n)}, \quad (2.12)$$

$$q_m = (k_m^2 - \xi_m^2)\varphi_m + \quad (2.13)$$

$$\sum_{n=1}^{M}\left[\left(\alpha_{mn} + \frac{k_m'}{2k_m}\beta_{mn} + ik_m\beta_{mn} - \frac{\partial \beta_{mn}}{\partial x}\right)\varphi_n + \gamma_{mn}\frac{\partial \varphi_n}{\partial y} + \frac{i}{2k_m}\frac{\partial^2}{\partial y^2}(\beta_{mn}\varphi_n)\right]e^{-i(\vartheta_m-\vartheta_n)}.$$

Now the following equation is equivalent to eq.(2.8).

$$2ik_m\frac{\partial \psi_m}{\partial x} - ik_m'\psi_m + \frac{\partial^2 \psi_m}{\partial y^2} = k_m q_m. \quad (2.14)$$

Although eqs.(2.8,2.14) are similar, they differ in one important way: no partial derivative with respect to x of any dependent variable appears on the RHS of eq.(2.14).

Note that we can solve the system of equations (2.12) (m=1, ..., M) for the complex amplitudes $\phi_m$ because the reference matrix M is nonsingular. Define the complex column vectors $$\phi = [\phi_1, \phi_2, \ldots, \phi_M]^T, \quad (2.15)$$

$$\psi = [\psi_1, \psi_2, \ldots, \psi_M]^T, \quad (2.16)$$

where the superscript T indicates transpose. Then, $\psi = M\phi$, so $\phi = M^{-1}\psi$.

Solutions of the coupled parabolic equations (2.8) obey a conservation law involving two quantities that are closely related to power flow in the waveguide. These quantities are $$J_P = \sum_{m=1}^{M} k_m |\varphi_m|^2 + (i/2) \sum_{m,n=1}^{M} \beta_{mn} \bar{\varphi}_m \varphi_n e^{-i(\vartheta_m - \vartheta_n)}, \quad (2.17)$$

$$K_P = \frac{i}{2} \left[ \sum_{m=1}^{M} \left( \varphi_m \frac{\partial \bar{\varphi}_m}{\partial y} - \frac{\partial \varphi_m}{\partial y} \bar{\varphi}_m \right) + \sum_{m,n=1}^{M} \gamma_{mn} \bar{\varphi}_m \varphi_n e^{-i(\vartheta_m - \vartheta_n)} \right], \quad (2.18)$$

where $\bar{\phi}$ is the complex conjugate of $\phi$. The conservation law states that $$\frac{\partial J_P}{\partial x} + \frac{\partial K_P}{\partial y} = 0. \quad (2.19)$$

Note that $J_p = \phi^H M \phi$, where $\phi^H 32 |\bar{\phi}_1, \bar{\phi}_2, \ldots, \bar{\phi}_M|$ is the Hermitian transpose of $\phi$. If $\phi \neq 0$, then $J_p > 0$ because M is positive definite.

Now let us discuss power flow in the waveguide and show how the quantities $J_p$ and $K_p$ are related to it. First, consider a vertical strip of infinitesimal width $\Delta y$ that extends from the bottom of the waveguide at $z=-L$ to the surface of the waveguide at $z=0$ and that is perpendicular to the x direction. The time-averaged power through the strip is $(2\omega)^{-1} J \Delta y$, where $$J = \frac{1}{2i} \int_{-L}^{0} \frac{1}{\rho} \left( \bar{p} \frac{\partial p}{\partial x} - p \frac{\partial \bar{p}}{\partial x} \right) dz. \quad (2.20)$$

Second, consider a vertical strip of infinitesimal width $\Delta x$ that extends from the bottom of the waveguide to the surface of the waveguide and that is perpendicular to the y direction. The time-averaged power through this strip is $(2w)^{-1} K \Delta x$, where $$K = \frac{1}{2i} \int_{-L}^{0} \frac{1}{\rho} \left( \bar{p} \frac{\partial p}{\partial y} - p \frac{\partial \bar{p}}{\partial y} \right) dz. \quad (2.21)$$

Finally, consider a vertical cylinder that extends from the bottom of the waveguide to the surface of the waveguide and that has a simply-connected cross-section A. Using Green's theorem, we find that the time-averaged power out of this cylinder is $$\frac{1}{2\omega} \oint_{\partial A} (Jdy - Kdx) = \frac{1}{2\omega} \int\int_A \left( \frac{\partial J}{\partial x} + \frac{\partial K}{\partial y} \right) dxdy, \quad (2.22)$$

where the boundary curve $\sigma A$ has the usual counter-clockwise orientation. Note that the partial derivatives $\sigma J/\sigma x$ and $\sigma K/\sigma y$ have the physical dimensions of power flux, that is, power/area×time. For this reason, we call J and K power flux integrals.

Suppose that we evaluate these power flux integrals for a solution of the acoustic equation (1.1) that satisfies eq.(1.2) at the boundaries and eq.(1.4) at the interface. We can use these equations and the divergence theorem to show that the integral on the left-hand side (LHS) of eq.(2.22) vanishes. Clearly, the integral on the RHS of this equation vanishes as well. Since the cross-section A is arbitrary, it follows that the integrand of this integral must vanish. Thus, $$\frac{\partial J}{\partial x} + \frac{\partial K}{\partial y} = 0 \quad (2.23)$$

for exact solutions of eqs.(1.1,1.2,1.4).

If, however, we evaluate the power flux integrals J and K for an approximate solution of these equations that is constructed from complex amplitude solutions $\phi_m$ of the coupled parabolic equations (2.8), then we find that $$J = \frac{1}{2i} \sum_{m=1}^{M} \left( \bar{\varphi}_m \frac{\partial \varphi_m}{\partial x} - \varphi_m \frac{\partial \bar{\varphi}_m}{\partial x} \right) + J_P, \quad (2.24)$$

$$K = K_P. \quad (2.25)$$

In this case, eq.(2.19) implies that eq.(2.23) is not valid. Instead, we find that $$\frac{\partial J}{\partial x} + \frac{\partial K}{\partial y} = \frac{1}{2i} \sum_{m=1}^{M} \left( \bar{\varphi}_m \frac{\partial^2 \varphi_m}{\partial x^2} - \varphi_m \frac{\partial^2 \bar{\varphi}_m}{\partial x^2} \right). \quad (2.26)$$

This equation agrees with eq.(2.23) only to the extent that the paraxial approximations (2.6) are satisfied.

3. Adaptive selection of reference wavenumbers to conserve power.

There may be a cross-range W such that we can neglect the acoustic pressure in sections of the waveguide where $|y| > W$. For example, this can happen if the source produces a bean. In this case, we can assume that a pair of hard vertical walls in the planes through $y = \pm W$ transversely bound the waveguide. This assumption makes the waveguide a duct, and it imposes the following Neumann boundary conditions on the complex amplitudes $\phi_m$.

$$\frac{\partial}{\partial y} \varphi_m(x \pm W) = 0 \text{ for } m = 1, \ldots, M. \quad (3.1)$$

In this case we also can assume that the coupling coefficients $\gamma_{mn}$ vanish at the walls.

$$\gamma_{mn}(x, \pm W) = 0 \text{ for } m,n=1, \ldots, M. \quad (3.2)$$

Under these assumptions, eqs.(2.18,2.25) imply that the power flux integrals $K = K_p$ vanish at the walls.

$$K(x, \pm W) = K_p(x, \pm W) = 0. \quad (3.3)$$

Thus, if we integrate the conservation law (2.19) from $y=-W$ to $y=W$, then we find that $$\frac{\partial}{\partial x} \int_{-W}^{W} J_P dy = 0. \quad (3.4)$$

This equation implies that the integral $\int_{-W}^{W} J_P dy$ is independent of the range.

If eq.(2.23) were valid, then the longitudinal power $(2w)^{-1} \int_{-W}^{W} J \, dy$ through the duct would be independent of the range as well. Although eq.(2.23) is not valid for the coupled parabolic equations, we can adaptively select the reference wavenumbers to make the longitudinal power through the duct be independent of the range. If we integrate eq. (2.24) from y=−W to y=W, then we get $$\int_{-W}^{W} J dy = \sum_{m=1}^{M} \frac{1}{2i} \int_{-W}^{W} \left( \overline{\varphi}_m \frac{\partial \varphi_m}{\partial x} - \varphi_m \frac{\partial \overline{\varphi}_m}{\partial x} \right) dy + \int_{-W}^{W} J_p dy. \quad (3.5)$$

Since the integral $\int_{-W}^{W} J_p dy$ is independent of the range, this equation implies that the longitudinal power through the duct also will be independent of the range if the sum on the RHS is constant. The best way to accomplish this is to require that each summand vanish, which yields the integral constraints $$\int_{-W}^{W} \left( \overline{\varphi}_m \frac{\partial \varphi_m}{\partial x} - \varphi_m \frac{\partial \overline{\varphi}_m}{\partial x} \right) dy = 0 \text{ for } m = 1, \ldots, M. \quad (3.6)$$

These constraints are equivalent to a system of coupled quadratic equations in the reference wavenumbers $k_m$. Let $k=[k_1, k_2, \ldots, k_M]^T$. For m=1, ..., M define the following functions $g_m(k)$.

$$g_m(k) = k_m^2 \int_{-W}^{W} |\varphi_m|^2 dy + \sum_{n=1}^{M} k_n \text{Re} \int_{-W}^{W} \varphi_m i \beta_{mn} \varphi_n e^{-i(\vartheta_m - \vartheta_n)} dy + \quad (3.7)$$

$$\int_{-W}^{W} \left( \left| \frac{\partial \varphi_m}{\partial y} \right|^2 - \xi_m^2 |\varphi_m|^2 \right) dy +$$

$$\sum_{n=1}^{M} \text{Re} \int_{-W}^{W} \varphi_m \left( \alpha_{mn} \varphi_n + \beta_{mn} \frac{\partial \varphi_n}{\partial x} + \gamma_{mn} \frac{\partial \varphi_n}{\partial y} \right) e^{-i(\vartheta_m - \vartheta_n)} dy.$$

Then the constraints (3.6) are satisfied if and only if $$g_m(k)=0 \text{ for } m=1, \ldots, M. \quad (3.8)$$

It is convenient to write this equation in vector form. Let $g(k)=[g_1(k), \ldots, g_M(k)]^T$. Then eq.(3.8) is equivalent to the equation $g(k)=0$. In practice we can use Newton's method to solve this equation iteratively. The Jacobian matrix $\partial g/\partial k$ that is associated with $g(k)$ has the elements $$\frac{\partial g_m}{\partial k_n} = \begin{cases} 2k_m \int_{-W}^{W} |\varphi_m|^2 dy & \text{if } m = n, \text{ (since } \beta_{mm} = 0) \\ \text{Re} \int_{-W}^{W} \varphi_m i \beta_{mn} \varphi_n e^{-i(\vartheta_m - \vartheta_n)} dy & \text{if } m \neq n. \end{cases} \quad (3.9)$$

Given an estimate $k_0$ of the solution vector k, we can compute a correction $\Delta k$ to it as the solution of the linear equation $$\left. \frac{\partial g}{\partial k} \right|_{k_0} \cdot \Delta k = -g(k_0). \quad (3.10)$$

Then we replace $k_0$ with $k_0+\Delta k$. This completes one iteration of Newton's method. The Jacobian matrix $\partial g/\partial k$ is real symmetric. If no amplitude $\phi_m$ vanishes identically and if the reference matrix M is positive definite at every position, then the Jacobian matrix $\partial g/\partial k$ also is positive definite.

The solutions of eq.(3.8) are optimal, but they are expensive to compute. There are suboptimal ways to estimate these reference wavenumbers cheaply that can be useful. For example, if we neglect the coupling coefficients in eq.(3.7), then we get the following approximate solution of eq.(3.8).

$$k_m^2 = \int_{-W}^{W} \left( \xi_m^2 |\varphi_m|^2 - \left| \frac{\partial \varphi_m}{\partial y} \right|^2 \right) dy \Big/ \int_{-W}^{W} |\varphi_m|^2 dy \quad (3.11)$$

for $m = 1, \ldots, M$.

4. Exact integrals of the coupled parabolic equations.

We can use Fourier cosine expansions to integrate the alternative coupled parabolic equations (2.14) subject to Neumann boundary conditions at the boundaries y=±W, $$\frac{\partial}{\partial y} \varphi_m(x, \pm W) = 0 \text{ for } m = 1, \ldots, M. \quad (4.1)$$

It is convenient to introduce the following operator notation. Let g(y) be a continuously differentiable function over the interval −W≤y≤W such that dg(±W)/dy=0. The Fourier cosine coefficients $\hat{g}$ of g are defined by the integrals $$\hat{g}_n = \hat{\epsilon}_n \int_0^{2W} g(s - W) \cos\{(n\pi/2W)s\} ds/W \quad (4.2)$$

for $n = 0, 1, 2, \ldots$, where $\hat{\epsilon}_0=\frac{1}{2}$ and $\hat{\epsilon}_n=1$ for n=1, 2, . . . . Then the Fourier cosine expansion $$g(s - W) = \sum_{n=0}^{\infty} \hat{g}_n \cos\{(n\pi/2W)s\} \quad (0 \leq s \leq 2W) \quad (4.3)$$

is uniformly convergent. Let $\hat{g}$ denote the sequence $\{\hat{g}_0, \hat{g}_1, \ldots, \hat{g}_n \ldots\}$. The function g and the sequence $\hat{g}$ uniquely determine each other. We define the operators $\Im$ and $\Im^{-1}$ by the relations $$\Im g=\hat{g}, \quad \Im^{-1}\hat{g}=g. \quad (4.4)$$

Next, we introduce the spectral parameter η. This parameter takes on the discrete values $$\eta=n\pi/2W \text{ for } n=0,1,2, \ldots \quad (4.5)$$

Given a function h(η) and a sequence $\Im g$, we define the new sequence $h(\eta)\Im g$ as follows.

$$h(\eta)\Im g=\{h(0)\hat{g}_0, h(\pi/2W)\hat{g}_1, \ldots, h(n\pi/2W)\hat{g}_n, \ldots\}. \quad (4.6)$$

The integral form of eq.(2.14) is $$\psi_m(x_{j+1}) = \quad (4.7)$$

$$\left( \frac{k_m(x_{j+1})}{k_m(x_j)} \right)^{\frac{1}{2}} \Im^{-1} \left( \exp\left\{ -(i\eta^2/2) \int_{x_j}^{x_{j+1}} \frac{du}{k_m(u)} \right\} \Im \psi_m(x_j) \right) -$$

$$(i/2) \int_{x_j}^{x_{j+1}} \left( \frac{k_m(x_{j+1})}{k_m(x)} \right)^{\frac{1}{2}} \Im^{-1}$$

$$\left( \exp\left\{ -(i\eta^2/2) \int_{x_j}^{x_{j+1}} \frac{du}{k_m(u)} \right\} \Im q_m(x) \right) dx.$$

This equation, which holds for m=1, . . . , M, is the basis of our method for integrating the coupled parabolic equations numerically.

5. Discrete approximation of the exact integrals.

We shall introduce three numerical approximations in eq.(4.7) that lead to a system of linear equations for the values of the complex amplitudes (m at discrete mesh points in the x, y plane. First, we use the trapezoidal rule to approximate the integral from $x=x_j$ to $x=x_{j+1}$ on the RHS of this equation. Letting $\Delta x=x_{j+1}-x_j$ and neglecting terms of $o((\Delta x)^3)$, we get $$\psi_m(x_{j+1}) + (i\Delta x/4)q_m(x_{j+1}) = \left(\frac{k_m(x_{j+1})}{k_m(x_j)}\right)^{\frac{1}{2}} \times \quad (5.1)$$

$$\mathfrak{F}^{-1}\left(\exp\left\{-(i\eta^2/2)\int_{x_j}^{x_{j+1}}\frac{du}{k_m(u)}\right\}\mathfrak{F}\left[\psi_m(x_j) + (i\Delta x/4)q_m(x_j)\right]\right).$$

We also can use the trapezoidal rule to approximate the argument of the exponential function in eq.(5.1). Neglecting terms of $o((\Delta x)^3)$, we get $$\int_{x_j}^{x_{j+1}} \frac{du}{k_m(u)} = (k_m^{-1}(x_j) + k_m^{-1}(x_{j+1}))\Delta x/2. \quad (5.2)$$

We can approximate the phases $\sigma_m(x_{j+1})$ the same way. Neglecting terms of $o((\Delta x)^3)$, we get $$\vartheta_m(x_{j+1}) = \vartheta_m(x_j) + \int_{x_j}^{x_{j+1}} k_m(u)du \quad (5.3)$$

$$= \vartheta_m(x_j) + (k_m(x_j) + k_m(x_{j+1}))\Delta x/2.$$

The second numerical approximation that we introduce is to discretize the operators $\mathfrak{F}$ and $\mathfrak{F}^{-1}$ using discrete cosine transforms. Fix a positive integer N, and let $g=\{g_0, g_1, \ldots, g_N\}$ be a sequence of N+1 complex numbers. Define the discrete Fourier cosine coefficients $\bar{g}_n$ as follows.

$$\bar{g}_n = \bar{\epsilon}_n(2/N)\sum_{k=0}^{N} \bar{\epsilon}_k g_k \cos(\pi kn/N) \text{ for } n = 0, 1, \ldots, N, \quad (5.4)$$

where $\bar{\epsilon}_0 = \bar{\epsilon}_N = \frac{1}{2}$ and $\bar{\epsilon}_n = 1$ for $n = 1, \ldots, N-1$. Now for n=0, 1, . . . , N, (5.4)

where $\bar{\epsilon}_0=\bar{\epsilon}_N=½$ and $\bar{\epsilon}_n=1$ for n=1, . . . , N−1. Now $$g_k = \sum_{n=0}^{N} \bar{g}_n \cos(\pi kn/N) \text{ for } k = 0, 1, \ldots, N \quad (5.5)$$

for k=0, 1, . . . , N (5.5)

if and only if the coefficients $\bar{g}_n$ are given by eq.(5.4). Let $\bar{g}=\{\bar{g}_0, \bar{g}_1, \ldots, \bar{g}_N\}$ denote the sequence of these coefficients. We define the operators $\mathfrak{F}_N$ and $\mathfrak{F}_N^{-1}$ by the relations $$\mathfrak{F}_N g = \bar{g}, \quad \mathfrak{F}_N^{-1} \bar{g} = g \quad (5.6)$$

We replace the operators $\mathfrak{F}$ and $\mathfrak{F}^{-1}$ in eq.(5.1) by the operators $\mathfrak{F}_N$ and $\mathfrak{F}_n^{-1}$. Since these operators transform sequences to sequences, however, we must also replace the functions $\psi_m \pm (i\Delta x/4)q_m$ in this equation with the sequences of their values at the points $y_k$, which we write as $\{\psi_m(y_k) \pm (i\Delta x/4)q_m(y_k)\}_{k=0}^{N}$. Under these approximations, eq.(5.1) becomes $$\{\psi_m(x_{j+1}, y_k) + (i\Delta x/4)q_m(x_{j+1}, y_k)\}_{k=0}^{N} = \quad (5.7)$$

$$\left(\frac{k_m(x_{j+1})}{k_m(x_j)}\right)^{\frac{1}{2}} \times \mathfrak{F}_N^{-1}\left(\exp\left\{-(i\eta^2/2)\int_{x_j}^{x_{j+1}} \frac{du}{k_m(u)}\right\}\right.$$

$$\left. \mathfrak{F}_N\{\psi_m(x_j, y_l) - (i\Delta x/4)q_m(x_j, y_l)\}_{l=0}^{N}\right).$$

Note that the spectral parameter $\eta$ in this equation is bounded because $\eta = n\pi/2W$ for n=0, 1, . . . , N. Hence, $0 \leq \eta \leq \pi/\Delta y$.

We must approximate the partial derivatives $\sigma\phi_n/\sigma y$ and $\sigma^2(\beta_{mn}\phi_n)/\sigma y^2$ that appear in eq.(2.13) for $q_m$ before we can evaluate the sequences in eq.(5.7). Since the variable y in this equation is restricted to the uniformly spaced points $y_k$, our third approximation is to replace the partial derivatives at these points with central differences. At the lowest order of approximation, we use the three-point formulas $$\frac{\partial}{\partial y}\varphi_n(y_k) = \frac{1}{2\Delta y}[\varphi_n(y_{k+1}) - \varphi_n(y_{k-1})] + O((\Delta y)^2), \quad (5.8)$$

$$\frac{\partial^2}{\partial y^2}(\beta_{mn}\varphi_n)(y_k) = \quad (5.9)$$

$$\frac{1}{(\Delta y)^2}[(\beta_{mn}\varphi_n)(y_{k+1}) - 2(\beta_{mn}\varphi_n)(y_k) + (\beta_{mn}\varphi_n)(y_{k-1})] +$$

$$O((\Delta y)^2).$$

Now we combine eqs.(5.8,5.9) with eq.(2.13). Rearranging terms in the result, we find that $$q_m(y_k) = (k_m^2 - \xi_m^2(y_k))\varphi_m(y_k) + \quad (5.10)$$

$$\sum_{n=1}^{M}\left[\alpha_{mn}(y_k) + \left(\frac{\dot{k}_m}{2k_m} + ik_m - \frac{i}{k_m(\Delta y)^2}\right)\beta_{mn}(y_k) - \frac{\partial}{\partial x}\beta_{mn}(y_k)\right]$$

$$e^{-i(\theta_m - \theta_n)}\varphi_n(y_k) +$$

$$\sum_{n=1}^{M}\left(\frac{1}{2\Delta y}\gamma_{mn}(y_k) + \frac{i}{2k_m(\Delta y)^2}\beta_{mn}(y_{k+1})\right)e^{-i(\theta_m - \theta_n)}\varphi_n(y_{k+1}) +$$

$$\sum_{n=1}^{M}\left(-\frac{1}{2\Delta y}\gamma_{mn}(y_k) + \frac{i}{2k_m(\Delta y)^2}\beta_{mn}(y_{k-1})\right)e^{-i(\theta_m - \theta_n)}\varphi_n(y_{k-1}) +$$

$$O((\Delta y)^2).$$

Therefore, neglecting terms of $o(\Delta x(\Delta y)^2)$, we find that $$\psi_m(x_{j+1}, y_k) + (i\Delta x/4)q_m(x_{j+1}, y_k) = \quad (5.11)$$

$$[k_m + (i\Delta x/4)(k_m^2 - \xi_m^2(x_{j+1}, y_k))]\varphi_m(x_{j+1}, y_k) +$$

$$\left(\frac{i}{2} + \frac{i\dot{k}_m \Delta x}{8k_m} - \frac{k_m \Delta x}{4} + \frac{\Delta x}{4k_m(\Delta y)^2}\right)$$

$$\sum_{n=1}^{M} \beta_{mn}(x_{j+1}, y_k)e^{-i(\theta_m - \theta_n)}\varphi_n(x_{j+1}, y_k) +$$

$$(i\Delta x/4)\sum_{n=1}^{M}\left(\alpha_{mn}(x_{j+1}, y_k) - \frac{\partial}{\partial x}\beta_{mn}(x_{j+1}, y_k)\right)$$

$$e^{-i(\theta_m - \theta_n)}\varphi_n(x_{j+1}, y_k) +$$

-continued $$\sum_{n=1}^{M} \left( \frac{i\Delta x}{8\Delta y} \gamma_{mn}(x_{j+1}, y_k) - \frac{\Delta x}{8k_m(\Delta y)^2} \beta_{mn}(x_{j+1}, y_{k+1}) \right)$$

$$e^{-i(\theta_m - \theta_n)} \varphi_n(x_{j+1}, y_{k+1}) +$$

$$\sum_{n=1}^{M} \left( -\frac{i\Delta x}{8\Delta y} \gamma_{mn}(x_{j+1}, y_k) - \frac{\Delta x}{8k_m(\Delta y)^2} \beta_{mn}(x_{j+1}, y_{k-1}) \right)$$

$$e^{-i(\theta_m - \theta_n)} \varphi_n(x_{j+1}, y_{k-1}),$$

where $k_n = k_n(x_{j+1})$ and $\sigma_n = \sigma_n(x_{j+1})$ for $n = 1, \ldots, M$.

Similarly, neglecting terms of $o(\Delta x(\Delta y)^2)$, we find that $$\psi_m(x_j, y_l) - \tag{5.12}$$

$$(i\Delta x/4)q_m(x_j, y_l) = [k_m - (i\Delta x/4)(k_m^2 - \xi_m^2(x_j, y_l))]\varphi_m(x_j, y_l) +$$

$$\left( \frac{i}{2} - \frac{ik_m\Delta x}{8k_m} + \frac{k_m\Delta x}{4} - \right.$$

$$\left. \frac{\Delta x}{4k_m(\Delta y)^2} \right) \sum_{n=1}^{M} \beta_{mn}(x_j, y_l) e^{-i(\theta_m - \theta_n)} \varphi_n(x_j, y_l) -$$

$$(i\Delta x/4) \sum_{n=1}^{M} \left( \alpha_{mn}(x_j, y_l) - \frac{\partial}{\partial x} \beta_{mn}(x_j, y_l) \right) e^{-i(\theta_m - \theta_n)} \varphi_n(x_j, y_l) +$$

$$\sum_{n=1}^{M} \left( -\frac{i\Delta x}{8\Delta y} \gamma_{mn}(x_j, y_l) + \frac{\Delta x}{8k_m(\Delta y)^2} \beta_{mn}(x_j, y_{l+1}) \right) e^{-i(\theta_m - \theta_n)} \varphi_n(x_j,$$

$$y_{l+1}) + \sum_{n=1}^{M} \left( -\frac{i\Delta x}{8\Delta y} \gamma_{mn}(x_j, y_l) + \right.$$

$$\left. \frac{\Delta x}{8k_m(\Delta y)^2} \beta_{mn}(x_j, y_{l-1}) \right) e^{-i(\theta_m - \theta_n)} \varphi_n(x_j, y_{l-1}),$$

where $k_n = k_n(x_j)$ and $\sigma_n = \sigma_n(x_j)$ for $n = 1, \ldots, M$.

We need additional information to interpret these equations at the boundaries $y = \pm W$. Let us require that eq.(4.1) be consistent with eq (3.1). It follows that for $k = 0, N$ and for all $x_j$, $$\phi_n(x_j, y_{k-1}) + \phi_n(x_j, y_{k+1}) \text{ for } n = 1, \ldots, M, \tag{5.13}$$

$$\beta_{mn}(x_j, y_{k-1}) = \beta_{mn}(x_j, y_{k+1}) \text{ for } m, n = 1, \ldots, M. \tag{5.14}$$

Equations (5.7,5.11), subject to eqs (5.13,5.14), determine a system of linear equations for the values $\phi_m(x_{j+1}, y_k)$ at a range step $x_{j+1}$, which in turn depend linearly on the values $\phi_m(x_j, y_l)$ at the previous range step $x_j$ through eq.(5.12). In order to solve these equations numerically, it is helpful to put them in matrix form. First, we write eq.(5.7) as follows.

$$\{\Psi_m(x_{j+1} - 0, y_k)\}_{k=0}^{N} = \left( \frac{k_m(x_{j+1})}{k_m(x_j)} \right)^{\frac{1}{2}} \times \tag{5.15}$$

$$\mathcal{F}_N^{-1} \left\{ \exp\left\{ -(i\eta^2/2) \int_{x_j}^{x_{j+1}} \frac{du}{k_m(u)} \right\} \mathcal{F}_N \{\Psi_m(x_j + 0, y_l)\}_{l=0}^{N} \right\},$$

where $$\Psi_m(x_{j+1}-0, y_k) = \psi_m(x_{j+1}, y_k) + (i\Delta x/4)q_m(x_{j+1}, y_k), \tag{5.16}$$

$$\Psi_m(x_j+0, y_l) = \psi_m(x_j, y_l) - (i\Delta x/4)q_m(x_j, y_l). \tag{5.17}$$

Second, for $k = 0, 1, \ldots, N$ we define the column vectors $$\phi_k = [\phi_1(x_{j+1}, y_k), \ldots, \phi_M(x_{j+1}, y_k)]^T, \tag{5.18}$$

$$\Psi_k^- = [\Psi_1(x_{j+1}-0, y_k), \ldots, \Psi_M(x_{j+1}-0, y_k)]^T. \tag{5.19}$$

Third, for $k = 0, 1, \ldots, N$ we define the M×M matrices $A_{kk}$, $A_{kk+1}$ and $A_{kk-1}$ as follows. If $k_n = k_n(x_{j+1})$ and $\sigma_n = \sigma_n(x_{j+1})$ for $n = 1, \ldots, M$, then $$(A_{kk})_{mn} = \tag{5.20}$$

$$\begin{cases} k_n + (i\Delta x/4)(k_n^2 - \xi_n^2(x_{j+1}, y_k) + \alpha_{nn}(x_{j+1}, y_k)), & \text{(if } m = n\text{)} \\ \left[ \left( \frac{i}{2} + \frac{ik_m\Delta x}{8k_m} - \frac{k_m\Delta x}{4} + \frac{\Delta x}{4k_m(\Delta y)^2} \right) \beta_{mn}(x_{j+1}, y_k) \right. \\ \left. + (i\Delta x/4) \left( \alpha_{mn}(x_{j+1}, y_k) - \frac{\partial}{\partial x} \beta_{mn}(x_{j+1}, y_k) \right) \right] e^{-i(\theta_m - \theta_n)}, & \text{(if } m \neq n\text{)} \end{cases}$$

$$(A_{kk\pm 1})_{mn} = \tag{5.21}$$

$$\left( \pm \frac{i\Delta x}{8\Delta y} \gamma_{mn}(x_{j+1}, y_k) - \frac{\Delta x}{8k_m(\Delta y)^2} \beta_{mn}(x_{j+1}, y_{k\pm 1}) \right) e^{-i(\theta_m - \theta_n)}.$$

Finally, we define the M×M matrices $B_1$ and $B_{N-1}$ as follows. For $k = 1, N-1$, $$(B_k)_{mn} = -\frac{\Delta x}{4k_m(\Delta y)^2} \beta_{mn}(x_{j+1}, y_k) e^{-i(\theta_m - \theta_n)}. \tag{5.22}$$

Note that $B_1 = A_{o-1} + A_{o1}$ and $B_{N-1} = A_{NN-1} + A_{NN+1}$. Now eqs. (5.11,5.16), subject to eqs.(5.13,5.14), are equivalent to the following matrix equation.

$$\begin{bmatrix} A_{00} & B_1 & & & \\ A_{10} & A_{11} & A_{12} & & \\ & \ddots & \ddots & \ddots & \\ & & A_{N-1N-2} & A_{N-1N-1} & A_{N-1N} \\ & & & B_{N-1} & A_{NN} \end{bmatrix} \cdot \begin{bmatrix} \varphi_0 \\ \varphi_1 \\ \vdots \\ \varphi_{N-1} \\ \varphi_N \end{bmatrix} = \begin{bmatrix} \Psi_0^- \\ \Psi_1^- \\ \vdots \\ \Psi_{N-1}^- \\ \Psi_N^- \end{bmatrix}. \tag{5.23}$$

We recommend solving this equation numerically by Gaussian elimination with partial pivoting (GEPP) followed by one round of iterative refinement. The block tri-diagonal system matrix on the LHS of eq.(5.23) is also a band matrix of order M(N+1) that has 2M−1 lower diagonals and 2M−1 upper diagonals. Since M<<N in practice, it is most efficient to do the GEPP computations with subroutines that take advantage of band, storage.

Let us write eq.(5.23) as $A \cdot \Phi = \Psi_-$, and let $\Phi_0$ be the numerical solution of this equation computed in finite precision arithmetic by GEPP. Iterative refinement is a technique to improve the accuracy of this solution. One round of this technique has three steps.

(1) Compute the residual $\tau_0 = \Psi^- - A \cdot \Phi_0$.

(2) Using the LU decomposition of A from the original solution of eq. (5.23) by GEPP, solve the equation $A \cdot \delta_0 = \tau_0$ for the correction $\delta_0$.

(3) Refine the solution: $\Phi_r = \Phi_0 + \delta_0$.

The computations in these steps are done at the same arithmetic precision as the original solution.

The system matrix on the LHS of eq.(5.23) is nonsingular if it is strictly diagonally dominant by columns. We see from eqs.(5.20,5.21) that this condition requires the following strict inequalities to be satisfied for the block indices $k = 2, \ldots, N-2$:

$$|k_n + (i\Delta x/4)(k_n^2 - \xi_n^2(x_{j+1}, y_k) + a_{nn}(x_{j+1}, y_k))| > \tag{5.24}$$

$$\sum_{\substack{m=1 \\ (m \neq n)}}^{M} \left| \left( \frac{i}{2} + \frac{ik_m\Delta x}{8k_m} - \frac{k_m\Delta x}{4} + \frac{\Delta x}{4k_m(\Delta y)^2} \right) \beta_{mn}(x_{j+1}, y_k) + \right.$$

-continued $$(i\Delta x/4)\left(a_{mn}(x_{j+1}, y_k) - \frac{\partial}{\partial x}\beta_{mn}(x_{j+1}, y_k)\right) +$$

$$\sum_{m=1}^{M}\left|\frac{i\Delta x}{8\Delta y}\gamma_{mn}(x_{j+1}, y_{k-1}) - \frac{\Delta x}{8k_m(\Delta y)^2}\beta_{mn}(x_{j+1}, y_k)\right| +$$

$$\sum_{m=1}^{M}\left|\frac{i\Delta x}{8\Delta y}\gamma_{mn}(x_{j+1}, y_{k+1}) - \frac{\Delta x}{8k_m(\Delta y)^2}\beta_{mn}(x_{j+1}, y_k)\right| \text{ for } n = 1, \ldots, M.$$

These inequalities are modified slightly for the remaining indices k=0, 1, N−1, N. This condition is more restrictive than the similar condition (2.11) for the reference matrix M to be positive definite at the points $y_k$. If this condition is satisfied, then Gaussian elimination requires no pivoting and is stable.

Note the factors $k_m\Delta x$, $\Delta x/\Delta y$ and $\Delta x/k_m(\Delta y)^2$ that appear in this equation. We recommend choosing the increments $\Delta x$ and $\Delta y$ so that $k_m\Delta x \leq o(1)$ and $k_m\Delta y \geq o(1)$. These restrictions imply that the ratios $\Delta x/\Delta y$ and $\Delta r/k_m(\Delta y)^2$ are at most o(1). These restrictions also limit the errors that we make by applying the trapezoidal rule to eq.(4.7) to obtain eq.(5.1).

Finally, we note that higher order central difference formulas can be used in place of eqs.(5.8,5.9). For example, at the next order of approximation, we would use five-point formulas. They lead to a matrix formulation like eq.(5.23) in which the system matrix is block penta-diagonal.

6. Discrete transparent boundary conditions.

The most simple standard parabolic equation is $$2ik_0\frac{\partial \varphi}{\partial x} + \frac{\partial^2 \varphi}{\partial y^2} = 0, \tag{6.1}$$

where the wavenumber $k_0$ is a positive constant. Let us assume (1) the solution $\phi(x, y)$ is defined in a region of the x, y plane that includes the upper right quadrant where $x \geq 0$ and $y \geq 0$, (2) the solution $\phi(x, y)$ and its partial derivatives are bounded in this quadrant, (3) $\phi(0, y)=0$ for $y \geq 0$.

We can translate these assumptions into a transparent boundary condition that the solution $\phi(z, y)$ satisfies on the right-half x-axis (x>0, y=0). This condition makes the half-axis transparent in the sense that the wavefield described by the solution $\phi(x, y)$ propagates across this half-axis into the upper right quadrant without reflection.

$$\varphi(x, 0) = -e^{i\pi/4}(2\pi k_0)^{-1/2}\int_0^x \frac{\partial}{\partial y}\varphi(u, 0)(x-u)^{-1/2}du. \tag{6.2}$$

If we change the sign of the partial derivative $\sigma/\sigma y$ in this equation, then we get a new condition that makes the right-half x-axis transparent in the opposite sense. Now the wavefield described by the solution $\phi(x, y)$ propagates across this half-axis into the lower right quadrant without reflection.

$$\varphi(x, 0) = e^{i\pi/4}(2\pi k_0)^{-1/2}\int_0^x \frac{\partial}{\partial y}\varphi(u, 0)(x-u)^{-1/2}du. \tag{6.3}$$

Let us replace the reference wavenumber $k_0$ in eq.(6.1) with a function k(x)>0, $$2ik(x)\frac{\partial \varphi}{\partial x} + \frac{\partial^2 \varphi}{\partial y^2} = 0. \tag{6.4}$$

The change of variable $$\tau(x) = \int_0^x \frac{du}{k(u)} \tag{6.5}$$

transforms this equation into a standard parabolic equation, $$2i\frac{\partial \varphi}{\partial \tau} + \frac{\partial^2 \varphi}{\partial y^2} = 0. \tag{6.6}$$

Let $\{x_0, x_1, \ldots, x_j, \ldots\}$ be an increasing sequence of discrete range steps, with $x_0=0$. Define $\psi_j(y)=\phi(x, y)$ and $\tau_j=\tau(x_j)$ for $j=0,1,\ldots$. Using the trapezoidal rule to integrate eq.(6.6) from $\tau_j$ to $\tau_{j+1}$ and neglecting the $o((\tau_{j+1}-\tau_j)^3)$ remainder, we find that $$2i[\psi_{j+1}(y) - \psi_j(y)] + \frac{1}{2}(\tau_{j+1} - \tau_j)\left[\frac{\partial^2}{\partial y^2}\psi_j(y) + \frac{\partial^2}{\partial y^2}\psi_{j+1}(y)\right] = 0. \tag{6.7}$$

Similarly, $$\tau_{j+1} - \tau_j = \int_{x_j}^{x_{j+1}} \frac{du}{k(u)} = \frac{1}{2}(x_{j+1} - x_j)[k^{-1}(x_j) + k^{-1}(x_{j+1})]. \tag{6.8}$$

where we evaluated the integral by the trapezoidal rule and dropped the $o((x_{j+1}-x_j)^3)$ remainder. We get a semi-discrete parabolic equation from eqs.(6.7,6.8).

$$\frac{\partial^2}{\partial y^2}\psi_j(y) + \frac{\partial^2}{\partial y^2}\psi_{j+1}(y) + i\frac{8}{(x_{j+1}-x_j)[k^{-1}(x_j)+k^{-1}(x_{j+1})]}[\psi_{j+1}(y) - \psi_j(y)] = 0. \tag{6.9}$$

Let us assume (1) the functions $\psi_j(y)$ and their derivatives are uniformly bounded for $y \geq 0$, (2) $\psi_0(y)=0$ for $y \geq 0$.

We can translate these assumptions into discrete transparent boundary conditions that the functions $\psi_{j+1}(y)$ (j=0,1, . . . ) satisfy at y=0. A newly created algorithm computes these conditions recursively. First, define $$p_{j+1} = e^{-i\pi/4}\left(\frac{8}{(x_{j+1}-x_j)[k^{-1}(x_j)+k^{-1}(x_{j+1})]}\right)^{\frac{1}{2}} \text{ for } j = 0, 1, \ldots \tag{6.10}$$

Second, define $$g_k^j = \frac{p_k - p_j}{p_k + p_j} \text{ for } j, k = 1, 2, \ldots \tag{6.11}$$

Note that $g_k^j$ is real and $|g_k^j|<1$ for all j, k.

If j=1, then we let $$a_1^1 = \frac{1}{2} p_1^{-2} \frac{\partial}{\partial y} \psi_1(0) \text{ and } a_2^1 = -\frac{1}{2} p_1^{-2} \frac{\partial}{\partial y} \psi_1(0).\tag{6.12}$$

If j>1, then we compute the coefficients $a_1^j, \ldots, a_{j+1}^j$ from the coefficients $a_1^{j-1}, \ldots, a_j^{j-1}$ and from the derivatives $\sigma\psi_{j-1}(o)/\sigma y$ and $\sigma\psi_j(o)/\sigma y$ in two steps.

(1) Compute $\bar{a}_1^{j-1}, \ldots, \bar{a}_j^{j-1}$ and $\bar{b}_1^{j-1}, \ldots, \bar{b}_j^{j-1}$ from the following recurrence formulas.

$$\bar{a}_1^{j-1} = a_1^{j-1},\tag{6.13}$$

$$\bar{a}_k^{j-1} = \bar{a}_k^{j-1} - g_{k-1} \bar{a}_{k-1}^{j-1} \text{ for } k=2, \ldots, j,\tag{6.14}$$

$$\bar{b}_1^{j-1} = g_1 \bar{a}_1^{j-1},\tag{6.15}$$

$$\bar{b}_k^{j-1} = g_k \bar{a}_k^{j-1} + \bar{a}_{k-1}^{j-1} - g_{k-1} \bar{b}_{k-1}^{j-1} \text{ for } k=2, \ldots, j.\tag{6.16}$$

(2). Compute the coefficients $a_1^j, \ldots, a_{j+1}^j$ as follows.

$$a_1^j = -\frac{1}{2} a_1^{j-1} - \frac{1}{2} g_1^j \bar{b}_1^{j-1},\tag{6.17}$$

$$a_k^j = -\frac{1}{2} a_k^{j-1} - \frac{1}{2} g_k^j \bar{b}_k^{j-1} - \frac{1}{2} \bar{b}_{k-1}^{j-1} \text{ for } k = 2, \ldots, j-1,\tag{6.18}$$

(Note: omit the preceding equation if j=2.)

$$a_j^j = \frac{1}{2} p_j^{-2} \left[ \frac{\partial}{\partial y} \psi_{j-1}(0) + \frac{\partial}{\partial y} \psi_j(0) \right] - \frac{1}{2} a_j^{j-1} - \frac{1}{2} a_j^{j-1} - \frac{1}{2} \bar{b}_{j-1}^{j-1},\tag{6.19}$$

$$a_{j+1}^j = \frac{1}{2} p_j^{-2} \left[ \frac{\partial}{\partial y} \psi_{j-1}(0) + \frac{\partial}{\partial y} \psi_j(0) \right] - \frac{1}{2} \bar{b}_j^{j-1}.\tag{6.20}$$

The coefficients $\bar{a}_{j+1}^j$ are used to compute the discrete transparent boundary conditions as follows.

$$\frac{\partial}{\partial y} \psi_j(0) + p_{j+1} \psi_j(0) = 0,\tag{6.21}$$

$$\frac{\partial}{\partial y} \psi_{j+1}(0) + p_{j+1} \psi_{j+1}(0) =\tag{6.22}$$
$$-\frac{\partial}{\partial y} \psi_j(0) - p_{j+1} \psi_j(0) + 2p_{j+1}^2 \bar{a}_{j+1}^j \text{ for } j = 1, 2, \ldots$$

This algorithm can be greatly simplified if the quantities $p_j$ are independent of the index j. This happens when the range increments $x_{j+1} - x_j$ and the reference wavenumber values $k(x_j)$ are independent of the index j. Let us assume that $x_j = j\Delta x$ and $k(x_j) = k_0$ for $j=0,1,\ldots$, where the increment $\Delta x$ and the wavenumber $k_0$ are fixed. Then it follows from eq. (6.10) that $p_j = p_0$ for every j, where $$p_0 = e^{i\pi/4} 2(k_0/\Delta x)^{1/2}.\tag{6.23}$$

In addition, eq.(6.11) implies that $g_k^j = 0$ for all j,k. Thus, eqs.(6.13,6.14) become $$\bar{a}_k^{j-1} = a_k^{j-1} \text{ for } k=1, \ldots, j,\tag{6.24}$$

eq.(6.15) becomes $\bar{b}_1^{j-1} = 0$ and eq.(6.16) becomes $$\bar{b}_k^{j-1} = \bar{a}_{k-1}^{j-1} \text{ for } k=2, \ldots, j.\tag{6.25}$$

We can use these equations to eliminate the coefficients $\bar{a}_k^{j-1}$ and $\bar{b}_k^{j-1}$ from eqs.(6.17–6.20) if we extend the definition of the coefficients $a_k^j$ as follows. Let $$a_{-1}^j = 0 \text{ for } j=0,1,\ldots,\tag{6.26}$$

$$a_0^j = 0 \text{ for } j=0,1\ldots\tag{6.27}$$

Using these extensions, we get the following simplified forms of eqs.(6.17–6.20). For j>1, $$a_k^j = -\frac{1}{2} a_k^{j-1} - \frac{1}{2} a_k^{j-1} - \frac{1}{2} a_{k-2}^{j-1}, \text{ for } k = 1, \ldots, j-1,\tag{6.28}$$

$$a_j^j = \frac{1}{2} p_0^{-2} \left[ \frac{\partial}{\partial y} \psi_{j-1}(0) + \frac{\partial}{\partial y} \psi_j(0) \right] - a_j^{j-1} - \frac{1}{2} a_{j-2}^{j-1},\tag{6.29}$$

$$a_{j+1}^j = -\frac{1}{2} p_0^{-2} \left[ \frac{\partial}{\partial y} \psi_{j-1}(0) + \frac{\partial}{\partial y} \psi_j(0) \right] - \frac{1}{2} a_{j-1}^{j-1}.\tag{6.30}$$

We also define $a_1^0 = 0$. This extension has the following useful consequences.

(1) We can let j=1 in eqs.(6.29,6.30), which become eq.(6.12) because $\sigma\psi_0(0)/\sigma y = 0$.

(2) Because of eq.(6.24), we can get eq.(6.21) from eq.(6.22) by letting j=0. Therefore, we can write these discrete transparent boundary conditions as follows.

$$\frac{\partial}{\partial y} \psi_{j+1}(0) + p_0 \psi_{j+1}(0) = -\frac{\partial}{\partial y} \psi_j(0) - p_0 \psi_j(0) + 2p_0^2 a_{j+1}^j\tag{6.31}$$

for $j = 0, 1, \ldots$ (3) An alternative form of these conditions is obtained by iterating eq.(6.31) backwards. The initial conditions $\psi_0(0) = 0$ and $\sigma\psi_0(0)/\sigma y = 0$ are used to stop the iteration.

$$\frac{\partial}{\partial y} \psi_{j+1}(0) + p_0 \psi_{j+1}(0) = 2p_0^2 \sum_{k=0}^{j} (-1)^{j-k} a_{k+1}^k\tag{6.32}$$

for $j = 0, 1, \ldots$

When eqs. (6.28.6.30) are evaluated in finite-precision computer arithmetic, roundoff errors in the additions tend to accumulate. However, we can use compensated summation to identify these errors and to cancel them to working precision. Let us describe how this is done in a simple case.

Consider the following sequence of differential boundary values $\sigma\psi_j(0)/\sigma y$.

$$\frac{\partial}{\partial y} \psi_j(0) = \begin{cases} 2p_0^2 & \text{if } j = 1, \\ 0 & \text{if } j \neq 1. \end{cases}\tag{6.33}$$

Since $a_1^0 = 0$, it follows from eq. (6.32) that $\psi_1(0) = -2p_0$ and $$\psi_{j+1}(0) = 2p_0 \sum_{k=1}^{j} (-1)^{j-k} a_{k+1}^k \text{ for } j = 1, 2, \ldots\tag{6.34}$$

Thus, $\psi_{j+1}(0) = -2p_0 \sigma_j$ where $$\sigma_j = -\sum_{k=1}^{j} (-1)^{j-k} a_{k+1}^k \text{ for } j = 1, 2, \ldots,\tag{6.36}$$

which can be calculated recursively as follows.

$$\sigma_j = -a_{j+1}^j - \sigma_{j-1} \text{ for } j=2,3,\ldots\tag{6.36}$$

We can compute the coefficients $a_k^j$ for j=1, 2, 3 exactly from eqs.(6.28–6.30). Using the input values (6.33), we find that $$\left.\begin{array}{l} a_1^1 = 1 \quad a_2^1 = -1, \\ a_1^2 = -\frac{1}{2} \quad a_2^2 = 2 \quad a_3^2 = -\frac{3}{2}, \\ a_1^3 = \frac{1}{4} \quad a_2^3 = -1 \quad a_3^3 = \frac{7}{4} \quad a_4^3 = -1. \end{array}\right\} \quad (6.37)$$

Next, using the input values (6.33), we write eqs.(6.28–6.30) for $j \geq 4$ as follows.

$$a_1^j = -\frac{1}{2} a_1^{j-1}, \quad (6.38)$$

$$a_2^j = -\frac{1}{2} a_2^{j-1}, \quad (6.39)$$

$$a_k^j = -\frac{1}{2} a_k^{j-1} - \frac{1}{2} a_{k-2}^{j-1} \text{ for } k = 3, \ldots, j-1, \quad (6.40)$$

$$a_j^j = -a_j^{j-1} - \frac{1}{2} a_{j-2}^{j-1}, \quad (6.41)$$

$$a_{j+1}^j = -\frac{1}{2} a_{j-1}^{j-1}. \quad (6.42)$$

We use the values of $a_1^3$, $a_2^3$, $a_3^3$, $a_4^3$ from eq.(6.37) to start these equations when $j=4$. We use eq.(6.36) to compute $\sigma_j$. We start this equation with $\sigma_3 = \frac{1}{2}$, which follows from eqs.(6.35, 6.37).

Compensated summation is based on the following principle. Let $\hat{u}$ and $\hat{v}$ denote real floating-point numbers, and let $fl(\hat{u} \pm \hat{v})$ denote the floating-point sum and difference of $\hat{u}$ and $\hat{v}$. Define the following floating-point numbers:

$$\hat{s} = fl(\hat{u}+\hat{v}), \quad (6.43)$$

$$\hat{u}' = fl(\hat{s}-\hat{v}), \quad (6.44)$$

$$\hat{v}'' = fl(\hat{s}-\hat{u}'), \quad (6.45)$$

$$\delta u'(\hat{u}) = fl(\hat{u}-\hat{u}'), \quad (6.46)$$

$$\delta''(\hat{v}) = fl(\hat{v}-\hat{v}''), \quad (6.47)$$

$$\Delta(\hat{u},\hat{v}) = fl(\delta'(\hat{u})+\delta''(\hat{v})). \quad (6.48)$$

The quantity $\Delta(\hat{u},\hat{v})$ is a very good estimate of the roundoff error $(\hat{u}+\hat{v})-\hat{s}$. Note that the arithmetic operations in eqs. (6.43–6.48) carry over directly to complex floating-point arithmetic because the operations on the real parts of the complex numbers and the operations on the imaginary parts of these numbers are identical but independent.

First, let us apply compensated summation to eq.(6.40). We want to compute $$a_k^j = -\left(\frac{1}{2} a_k^{j-1} + \frac{1}{2} a_{k-2}^{j-1}\right) \text{ for } k = 3, \ldots, j-1, \quad (6.49)$$

but we actually compute $$a_k^j = -fl\left(\frac{1}{2} a_k^{j-1} + \frac{1}{2} a_{k-2}^{j-1}\right) \text{ for } k = 3, \ldots, j-1. \quad (6.50)$$

Let $$\delta_k^j = \left(\frac{1}{2} \hat{a}_k^{j-1} + \frac{1}{2} \hat{a}_{k-2}^{j-1}\right) - fl\left(\frac{1}{2} \hat{a}_k^{j-1} + \frac{1}{2} \hat{a}_{k-2}^{j-1}\right) \quad (6.51)$$

for $k = 3, \ldots, j-1$, and $$\epsilon_k^j = a_k^j - \hat{a}_k^j \text{ for } k=1, \ldots, j+1. \quad (6.52)$$

Now, eqs.(6.49–6.52) imply that $$a_k^j = -\left(\frac{1}{2} a_k^{j-1} + \frac{1}{2} a_{k-2}^{j-1}\right) + \delta_k^j \quad (6.53)$$

$$= -\left(\frac{1}{2} \hat{a}_k^{j-1} - \frac{1}{2} \epsilon_k^{j-1} + \frac{1}{2} \hat{a}_{k-2}^{j-1} - \frac{1}{2} \epsilon_{k-2}^{j-1}\right) + \delta_k^j$$

$$= -\left(\frac{1}{2} \hat{a}_k^{j-1} + \frac{1}{2} \hat{a}_{k-2}^{j-1}\right) + \frac{1}{2} \epsilon_k^{j-1} + \frac{1}{2} \epsilon_{k-2}^{j-1} + \delta_k^j$$

$$= \hat{a}_k^j + \frac{1}{2} \epsilon_k^{j-1} + \frac{1}{2} \epsilon_{k-2}^{j-1} + \delta_k^j \text{ for } k = 3, \ldots, j-1.$$

Hence, $$\epsilon_k^j = \left(\frac{1}{2} \epsilon_k^{j-1} + \frac{1}{2} \epsilon_{k-2}^{j-1} + \delta_k^j\right) \text{ for } k = 3, \ldots, j-1. \quad (6.54)$$

In practice we compute an approximation to $\epsilon_k^j$ that we call $\hat{\epsilon}_k^j$:

$$\hat{\epsilon}_k^j = -fl\left(\frac{1}{2} \hat{\epsilon}_k^{j-1} + \frac{1}{2} \hat{\epsilon}_{k-2}^{j-1} + \Delta_k^j\right) \text{ for } k = 3, \ldots, j-1, \quad (6.55)$$

where $\hat{\Delta}_k^j$ is the estimate for $\delta_k^j$ that we get with $$\hat{u} = \frac{1}{2} \hat{a}_k^{j-1}$$

and $$\hat{v} = \frac{1}{2} \hat{a}_{k-2}^{j-1}$$

in eq. (6.48). Note that the RHS of eq.(6.55) is ambiguous because the associative law does not hold for floating-point addition. However, we shall ignore the small influence that the order of these additions may have on the numerical value of the total sum.

Next, we apply compensated summation to eq.(6.41). We want to compute $$a_j^j = -\left(a_j^{j-1} + \frac{1}{2} a_{j-2}^{j-1}\right), \quad (6.56)$$

but we actually compute $$\hat{a}_j^j = -fl\left(\hat{a}_j^{j-1} + \frac{1}{2} \hat{a}_{j-2}^{j-1}\right). \quad (6.57)$$

Let $$\delta_j^j = \left(\hat{a}_j^{j-1} + \frac{1}{2}\hat{a}_{j-2}^{j-1}\right) - fl\left(\hat{a}_j^{j-1} + \frac{1}{2}\hat{a}_{j-2}^{j-1}\right). \quad (6.58)$$

Now, eqs.(6.52,6.56–6.58) imply that $$\begin{aligned}
\hat{a}_j^j &= \left(\hat{a}_j^{j-1} + \frac{1}{2}\hat{a}_{j-2}^{j-1}\right) + \delta_j^j \\
&= -\left(a_j^{j-1} - \epsilon_j^{j-1} + \frac{1}{2}a_{j-2}^{j-1} - \frac{1}{2}\epsilon_{j-2}^{j-1}\right) + \delta_j^j \\
&= -\left(a_j^{j-1} + \frac{1}{2}a_{j-2}^{j-1}\right) + \epsilon_j^{j-1} + \frac{1}{2}\epsilon_{j-2}^{j-1} + \delta_j^j \\
&= a_j^j + \epsilon_j^{j-1} + \frac{1}{2}\epsilon_{j-2}^{j-1} + \delta_j^j.
\end{aligned} \quad (6.59)$$

Hence, $$\epsilon_j^j = -\left(\epsilon_j^{j-1} + \frac{1}{2}\epsilon_{j-2}^{j-1} + \delta_j^j\right). \quad (6.60)$$

In practice we compute an approximation to $\epsilon_j^j$ that we call $\hat{\epsilon}_j^j$:

$$\hat{\epsilon}_j^j = -fl\left(\hat{\epsilon}_j^{j-1} + \frac{1}{2}\hat{\epsilon}_{j-2}^{j-1} + \hat{\Delta}_j^j\right), \quad (6.61)$$

where $\hat{\Delta}_j^j$ is the estimate for $\delta_j^j$ that we get with $\hat{u}=\hat{a}_j^{j-1}$ and $$\hat{v} = \frac{1}{2}\hat{a}_{j-2}^{j-1}$$

in eq.(6.48). The remarks that follow eq.(6.55) apply to eq. (6.61) as well.

The treatment of eqs.(6.38,6.39,6.42) is simple because they involve no summations. Since we want to compute $$a_1^j = -\frac{1}{2}a_1^{j-1}, \quad a_2^j = -\frac{1}{2}a_2^{j-1}, \quad a_{j+1}^j = -\frac{1}{2}a_{j-1}^{j-1},$$

the computed values of these coefficients satisfy the same equations:

$$\hat{a}_1^j = -\frac{1}{2}\hat{a}_1^{j-1}, \quad \hat{a}_2^j = -\frac{1}{2}\hat{a}_2^{j-1}, \quad \hat{a}_{j+1}^j = -\frac{1}{2}\hat{a}_{j-1}^{j-1}. \quad (6.62)$$

Now the errors $\epsilon_1^j$, $\epsilon_2^j$, $\epsilon_{j+1}^j$ also satisfy these equations:

$$\epsilon_1^j = -\frac{1}{2}\epsilon_1^{j-1}, \quad \epsilon_2^j = -\frac{1}{2}\epsilon_2^{j-1}, \quad \epsilon_{j+1}^j = -\frac{1}{2}\epsilon_{j-1}^{j-1}. \quad (6.63)$$

Hence, we use the same equations to compute the approximations $\hat{\epsilon}_1^j$, $\hat{\epsilon}_2^j$, $\hat{\epsilon}_{j+1}^j$ to these errors:

$$\hat{\epsilon}_1^j = -\frac{1}{2}\hat{\epsilon}_1^{j-1}, \quad \hat{\epsilon}_2^j = -\frac{1}{2}\hat{\epsilon}_2^{j-1}, \quad \hat{\epsilon}_{j+1}^j = -\frac{1}{2}\hat{\epsilon}_{j-1}^{j-1}. \quad (6.64)$$

The approximate corrections $\hat{\epsilon}_k^3$ vanish because the computed coefficients $\hat{a}_k^3$ are exact. We use the values $\hat{\epsilon}_1^3=0$, $\hat{\epsilon}_2^3=0$, $\hat{\epsilon}_3^3=0$, $\hat{\epsilon}_4^3=0$ to start eqs.(6.55,6.61,6.64) when j=4. Since $\hat{\epsilon}_1^3=0$ and $\hat{\epsilon}_2^3=0$, the first two parts of eq.(6.64) imply that $\hat{\epsilon}_1^j=0$ and $\hat{\epsilon}_2^j=0$ for all $j \geq 4$. Therefore, we need only the last part of eq.(6.64).

Finally, we consider $\hat{\sigma}_j$ and develop an approximate correction to it. We want to compute $$\sigma_j = -(a_{j+1}^j + \sigma_{j-1}) \text{ for } j \geq 4, \quad (6.65)$$

with $\sigma_3 = \frac{1}{2}$. In practice, we compute $$\hat{\sigma}_j = -fl(\hat{a}_{j+1}^j + \hat{\sigma}_{j-1}) \text{ for } j \geq 4, \quad (6.66)$$

with $\hat{\sigma}_3 = \frac{1}{2}$. Define $$e_j = \sigma_j - \hat{\sigma}_j \text{ for } j \geq 3. \quad (6.67)$$

By the same approach that lead to eqs.(6.54,6.60) we find that $$e_j = -(\epsilon_{j+1}^j + e_{j-1} + \delta_j) \text{ for } j \geq 4, \quad (6.68)$$

where $$\delta_j = \hat{a}_{j+1}^j + \hat{\sigma}_{j-1} - fl(\hat{a}_{j+1}^j + \hat{\sigma}_{j-1}). \quad (6.69)$$

Although we could use eq.(6.48) to estimate $\delta_j$ we shall neglect it against $\epsilon_{j+1}^j$. Therefore, we compute an approximate correction $\hat{e}_j$ to $\hat{\sigma}_j$ by the following recurrence formula.

$$\hat{e}_j = -fl(\hat{\epsilon}_{j+1}^j + \hat{e}_{j-1}) \text{ for } j \geq 4, \quad (6.70)$$

where $\hat{e}_3 = 0$.

Let us summarize the computational forms of eqs.(6.36, 6.38–6.42) for $j \geq 4$ that use compensated summation to identify roundoff errors and to cancel them to working precision.

$$\left.\begin{aligned}
&\hat{a}_1^j = -\frac{1}{2}\hat{a}_1^{j-1}, \\
&\hat{a}_2^j = -\frac{1}{2}\hat{a}_1^{j-1}, \\
&\text{for } k = 3, \ldots, j-1: \\
&\hat{a}_k^j = -fl\left(\frac{1}{2}\hat{a}_k^{j-1} + \frac{1}{2}\hat{a}_{k-2}^{j-1}\right) \text{ and } \hat{\epsilon}_k^{-j} = -fl\left(\frac{1}{2}\hat{\epsilon}_k^{j-1} + \frac{1}{2}\hat{\epsilon}_{k-2}^{j-1} + \hat{\Delta}_k^j\right), \\
&\hat{a}_j^j = -fl\left(\hat{a}_j^{j-1} + \frac{1}{2}\hat{a}_{j-2}^{j-1}\right) \text{ and } \hat{\epsilon}_j^{-j} = -fl\left(\hat{\epsilon}_j^{j-1} + \frac{1}{2}\hat{\epsilon}_{j-2}^{j-1} + \hat{\Delta}_j^j\right), \\
&\hat{a}_{j+1}^j = \frac{1}{2}\hat{a}_{j-1}^{j-1} \text{ and } \hat{\epsilon}_{j+1}^{-j} = -\frac{1}{2}\hat{\epsilon}_{j-1}^{j-1}, \\
&\hat{\sigma}_j = -fl(\hat{a}_{j+1}^j + \hat{\sigma}_{j-1}) \text{ and } \hat{e}_j = -fl(\hat{\epsilon}_{j+1}^{-j} + \hat{e}_{j-1}).
\end{aligned}\right\} \quad (6.71)$$

We approximate $\sigma_j$ by the sum $\hat{\sigma}_j + \hat{e}_j$.

The number of arithmetic operations in eq. (6.28) of the simple algorithm is proportional to j−1, which increases with range. We can limit the size of this operation count by truncating the algorithm. First, we choose an integer L≥3, which will be called the length of the truncated algorithm. If j≥L, then we discard all the coefficients $a_k^{j-1}$ such that k≤j−L. We effectively equate these coefficients to 0, which lets us start the recursion in eq.(6.28) for the truncated algorithm at k=j−L+1. Since the coefficient $a_{j-L+1}^j$ is not used in subsequent steps, however, there is no need to evaluate it. For this reason, if j≥L, then we can start the recursion in eq.(6.28) for the truncated algorithm at k=j−L+2. Now the operation count is proportional to L−2, which is fixed.

We shall state the truncated algorithm in terms of new coefficients $a_l^{j-1}$ that are defined for j=1,2, . . . and l=1, . . . ,L as follows.

(1) Let $$a_l^0 = 0 \text{ for } l=1, \ldots, L. \quad (6.72)$$

(2) Let $$a_0^j = 0 \text{ for } j=0,1,\ldots \quad (6.73)$$

(3) For $j=1,2,\ldots,$ $$\alpha_l^j = -\frac{1}{2}\alpha_{l+1}^{j-1} - \frac{1}{2}\alpha_{l-1}^{j-1}, \text{ for } l=1,\ldots,L-2, \quad (6.74)$$

$$\alpha_{L-1}^j = \frac{1}{2}p_0^{-2}\left[\frac{\partial}{\partial y}\psi_{j-1}(0) + \frac{\partial}{\partial y}\psi_j(0)\right] - \alpha_L^{j-1} - \frac{1}{2}\alpha_{L-2}^{j-1}, \quad (6.75)$$

$$\alpha_L^j = \frac{1}{2}p_0^{-2}\left[\frac{\partial}{\partial y}\psi_{j-1}(0) + \frac{\partial}{\partial y}\psi_j(0)\right] - \frac{1}{2}\alpha_{L-1}^{j-1}. \quad (6.76)$$

The transparent boundary conditions associated with this algorithm are $$\frac{\partial}{\partial y}\psi_{j+1}(0) + p_0\psi_{j+1}^{(L)}(0) = \quad (6.77)$$

$$-\frac{\partial}{\partial y}\psi_j(0) - p_0\psi_j^{(L)}(0) + 2p_0^2\alpha_L^j \text{ for } j=0,1,\ldots$$

The superscript "L" indicates that the sequence of boundary values $\{\psi_j^{(L)}(0)\}_{j=0}^\infty$ is produced from the sequence of boundary derivatives $\{\partial\psi_j(0)/\partial y\}_{j=0}^\infty$ by the truncated algorithm of length L. These boundary values are only approximate.

An alternative form of these conditions is obtained by iterating eq.(6.77) backwards. The initial conditions $\psi_0^{(L)}(0)=0$ and $\partial\psi_0(0)/\partial y=0$ are used to stop the iteration. The result is like eq.(6.32).

$$\frac{\partial}{\partial y}\psi_{j+1}(0) + p_0\psi_{j+1}^{(L)}(0) = 2p_0^2\sum_{k=0}^j (-1)^{j-k}\alpha_L^k \text{ for } j=0,1,\ldots \quad (6.78)$$

Suppose the sequence of differential boundary values $\partial\psi_j(0)/\partial y$ in eq.(6.33) is used as input to the truncated algorithm. The errors in the approximate boundary values $\psi_j^{(L)}(0)$ relative to the exact boundary values $\psi_j(0)$ can be characterized as follows. Fix $\xi>0$, and let $\{j_1,j_2,\ldots,j_l,\ldots\}$ be a sequence of integers such that $j_l\sim\xi l^2$ as $l\to\infty$. Then the relative error in $\psi_{j_L}^{(L)}(0)$ converges to a finite limit as $L\to\infty$ that is exponentially small if $\xi$ is small.

$$0 < \lim_{L\to\infty}(1-\psi_{jL}^{(L)}(0)/\psi_{jL}(0)) < 2e^{-2/\xi}. \quad (6.79)$$

Suppose the index j and the length L are given, and let $\xi=jL^{-2}$. A practical way to interpret eq.(6.79) is that $1-\psi_j^{(L)}(0)/\psi_j(0)\approx 2\exp(-2/\xi)$ if $L\gg 1$.

Let u denote the unit roundoff in a finite-precision floating-point computer arithmetic. Two real numbers a and b are represented by the same floating-point number if $|1-a/b|<u$. These numbers are equivalent in this computer arithmetic. If $L>[\ln(2/u)j/2]^{1/2}$, then $2\exp(-2/\xi)<u$. Hence, $\psi_j^{(L)}(0)$ and $\psi_j(0)$ are equivalent in the computer arithmetic if $L\gg 1$.

Now let J be an integer, and let $L_J$ be the smallest integer greater than $[\ln(2/u)J/2]^{1/2}$.

$$L_J = \lceil [\ln(2/u)J/2]^{1/2}\rceil = o(J^{1/2}). \quad (6.80)$$

If $L_J\gg 1$, then $\psi_j^{(L_J)}(0)$ and $\psi_j(0)$ are equivalent in the computer arithmetic for all $j\leq J$. The number of arithmetic operations to compute each $\psi_j^{(L_J)}(0)$ is proportional to $L_J$, but the number of arithmetic operations to compute each $\psi^j(0)$ is proportional to j. The ratio $\rho(J)$ of the total operation count for computing the subsequence $\{\psi_j^{(L_J)}(0)\}_{j=1}^J$ to the total operation count for computing the subsequence $\{\psi_j(0)\}_{j=1}^J$ is approximately $$\rho(J) \approx JL_J\bigg/\frac{1}{2}J^2 = 2L_J/J = O(J^{-1/2}). \quad (6.81)$$

Therefore, if $L_J\gg 1$, then the truncated algorithm of length $L_J$ is more efficient for computing the first J boundary values to working precision than the complete algorithm. As an example of practical importance, consider IEEE double-precision floating-point arithmetic. Since $u=2^{-53}$ in this arithmetic, $$L_J\approx 4.326J^{1/2} \text{ for IEEE double-precision floating-point arithmetic.} \quad (6.82)$$

These criteria are valid for all sequences of differential boundary values $\partial\psi_j(0)/\partial y$. However, let us continue to use the sequence in eq.(6.33) to explain how to program the truncated algorithm with compensated summation.

Assume that $L>4$. We can calculate the coefficients $a_l^j$ for $j=1,2,3$ exactly.

$$\left.\begin{array}{l}\alpha_l^1=0 \text{ for } l\leq L-2 \quad \alpha_{L-1}^1=1 \quad \alpha_L^1=-1,\\[4pt] \alpha_l^2=0 \text{ for } l\leq L-3 \quad \alpha_{L-2}^2=-\frac{1}{2} \quad \alpha_{L-1}^2=2 \quad \alpha_L^2=-\frac{3}{2},\\[4pt] \alpha_l^3=0 \text{ for } l\leq L-4 \quad \alpha_{L-3}^3=\frac{1}{4} \quad \alpha_{L-2}^3=-1 \quad \alpha_{L-1}^3=\frac{7}{4} \quad \alpha_L^3=-1.\end{array}\right\} \quad (6.83)$$

Next, we use eqs.(6.33,6.73) to write eqs.(6.74–6.76) for $j\geq 4$ as follows.

$$\alpha_1^j = -\frac{1}{2}\alpha_2^{j-1}, \quad (6.84)$$

$$\alpha_l^j = -\frac{1}{2}\alpha_{l+1}^{j-1} - \frac{1}{2}\alpha_{l-1}^{j-1} \text{ for } l=2,\ldots,L-2, \quad (6.85)$$

$$\alpha_{L-1}^j = -\alpha_L^{j-1} - \frac{1}{2}\alpha_{L-2}^{j-1}, \quad (6.86)$$

$$\alpha_L^j = -\frac{1}{2}\alpha_{L-1}^{j-1}. \quad (6.87)$$

Since $a_L^0=0$, it follows from eq.(6.78) that $\psi_1^{(L)}(0)=-2p_0$ and $$\psi_{j+1}^{(L)}(0) = 2p_0\sum_{k=1}^j(-1)^{j-k}\alpha_L^k \text{ for } j=1,2,\ldots. \quad (6.88)$$

Thus, $\psi_{j+1}^{(L)}(0)=-2p_0\sigma_j^{(L)}$ where $$\sigma_j^{(L)} = -\sum_{k=1}^j(-1)^{j-k}\alpha_L^k \text{ for } j=1,2,\ldots, \quad (6.89)$$

which can be calculated recursively as follows.

$$\sigma_j^{(L)} = a_L^j - \sigma_{j-1}^{(L)} \text{ for } j=2,3,\ldots \quad (6.90)$$

We use the values of $a_l^3$ for $l=1,\ldots,L$ from eq.(6.83) to start eqs.(6.84–6.87) when $j=4$. We compute $\sigma_j^{(L)}$ from eq.(6.90). We start this equation with $\sigma_3^{(L)}=\frac{1}{2}$, which follows from eqs.(6.83,6.89).

If eqs.(6.84–6.87,6.90) are programmed directly, then roundoff errors tend to accumulate. We can use compensated summation to counteract these roundoff errors in the same way that we use it to counteract roundoff errors for the complete algorithm. Let us denote the computed values of $a_k^j$ and $\sigma_j^{(L)}$ by $\hat{a}_k^j$ and $\hat{\sigma}_j^{(L)}$, respectively. We list the corrected computational forms of eqs.(6.84–6.87,6.90) next. If $j \geq 4$, then $$\hat{\alpha}_1^j = -\frac{1}{2}\hat{\alpha}_2^{j-1} \text{ and } \hat{\epsilon}_1^j = -\frac{1}{2}\hat{\epsilon}_2^{j-1}, \quad (6.91)$$

for $l = 2, \ldots, L-2$:

$$\hat{\alpha}_l^j = -fl\left(\frac{1}{2}\hat{\alpha}_{l+1}^{j-1} + \frac{1}{2}\hat{\alpha}_{l-1}^{j-1}\right) \text{ and } \hat{\epsilon}_l^j = -fl\left(\frac{1}{2}\hat{\epsilon}_{l+1}^{j-1} + \frac{1}{2}\hat{\epsilon}_{l-1}^{j-1} + \hat{\Delta}_l^j\right),$$

$$\hat{\alpha}_{L-1}^j = -fl\left(\hat{\alpha}_L^{j-1} + \frac{1}{2}\hat{\alpha}_{L-2}^{j-1}\right) \text{ and } \hat{\epsilon}_{L-1}^j = -fl\left(\hat{\epsilon}_L^{j-1} + \frac{1}{2}\hat{\epsilon}_{L-2}^{j-1} + \hat{\Delta}_{L-1}^j\right),$$

$$\hat{\alpha}_L^j = -\frac{1}{2}\hat{\alpha}_{L-1}^{j-1} \text{ and } \hat{\epsilon}_L^j = -\frac{1}{2}\hat{\epsilon}_{L-1}^{j-1},$$

$$\hat{\sigma}_j^{(L)} = -fl(\hat{\alpha}_L^j + \hat{\sigma}_{j-1}^{(L)}) \text{ and } \hat{\epsilon}_j^{(L)} = -fl(\hat{\epsilon}_L^j + \hat{\epsilon}_{j-1}^{(L)}).$$

Using eqs.(6.43–6.48), we compute $\hat{\Delta}_l^j$ for $l=2,\ldots,L-2$ as $\hat{\Delta}(\hat{u},\hat{v})$ with $$\hat{u} = \frac{1}{2}\hat{\alpha}_{l+1}^{j-1}$$

and $$\hat{v} = \frac{1}{2}\hat{\alpha}_{l-1}^{j-1},$$

and we compute $\hat{\Delta}_{L-1}^j$ as $\hat{\Delta}(\hat{u},\hat{v})$ with $\hat{u}=\hat{a}_L^{j-1}$ and $$\hat{v} = \frac{1}{2}\hat{\alpha}_{L-2}^{j-1}.$$

These equations are developed like the ones that are collected as eq.(6.71). We start them when j=4 with the following initial values:

$$\hat{\alpha}_l^3 = 0 \text{ for } l \leq L-4 \quad (6.92)$$

$$\hat{\alpha}_{L-3}^3 = \frac{1}{4}$$

$$\hat{\alpha}_{L-2}^3 = -1$$

$$\hat{\alpha}_{L-1}^3 = \frac{7}{4}$$

$$\hat{\alpha}_L^3 = -1$$

$$\hat{\sigma}_3^{(L)} = \frac{1}{2},$$

$$\hat{\epsilon}_l^3 = 0 \text{ for } l \leq L$$

$$\hat{\epsilon}_3^{(L)} = 0.$$

We approximate $\sigma_j^{(L)}$ by the sum $\hat{\sigma}_j^{(L)}$, which we denote by $\hat{\sigma}_j^{(L)}$.

7. A Chebyshev tau method for semi-discrete parabolic equations.

If $x_j = j\Delta x$ and $k(x_j) = k_0$ for $j=0,1,\ldots$, where the increment $\Delta x$ and the wavenumber $k_0$ are fixed, then eq.(6.9) takes the following simple form.

$$\psi_{j+1}(y) - \psi_j(y) = \quad (7.1)$$

$$(i\Delta x/4k_0)\left[\frac{\partial^2}{\partial y^2}\psi_j(y) + \frac{\partial^2}{\partial y^2}\psi_{j+1}(y)\right] \text{ for } j = 0, 1, \ldots$$

We can use Chebyshev interpolation polynomials to integrate this equation numerically over an interval $-W \leq y \leq W$. Let $T_k(\xi)$ denote the k-th Chebyshev polynomial (of the first kind). For $k=0,1,\ldots$ these polynomials are defined by the identity $$T_k(\xi) = \cos(k\theta), \text{ where } \xi = \cos\theta. \quad (7.2)$$

Let N be a positive integer. A Chebyshev interpolation polynomial of degree N over the interval $-W \leq y \leq W$ is a sum of the form $$f(y) = \sum_{k=0}^{N} f_k T_k(y/W). \quad (7.3)$$

We shall approximate each function $\psi_j(y)$ by a polynomial $f_j(y)$ of degree N, which we represent uniquely as a Chebyshev interpolation polynomial.

$$f_j(y) = \sum_{k=0}^{N} f_{j,k} T_k(y/W) \text{ for } -W \leq y \leq W. \quad (7.4)$$

The first and second derivatives of $f_j(y)$ with respect to y are polynomials of degrees N−1 and N−2. We also represent these polynomials uniquely as Chebyshev interpolation polynomials.

$$\frac{\partial}{\partial y} f_j(y) = \frac{1}{W}\sum_{k=0}^{N-1} f_{j,k}^{(1)} T_k(y/W) \text{ for } -W \leq y \leq W, \quad (7.5)$$

$$\frac{\partial^2}{\partial y^2} f_j(y) = \frac{1}{W^2}\sum_{k=0}^{N-2} f_{j,k}^{(2)} T_k(y/W) \text{ for } -W \leq y \leq W. \quad (7.6)$$

Assume that the coefficients in these equations satisfy the following Chebyshev tau equations.

$$f_{j+1,k} - f_{j,k} = (i\Delta x/4k_0 W^2)(f_{j+1,k}^{(2)} + f_{j,k}^{(2)}) \text{ for } \begin{cases} j = 0, 1, \ldots \text{ and} \\ k = 0, 1, \ldots, N-2. \end{cases} \quad (7.7)$$

Under this assumption, the polynomials $f_j(y)$ satisfy equations that are similar to eq.(7.1). For $j=0,1,\ldots$ and $-W \leq y \leq W$, $$f_{j+1}(y) - f_j(y) = (i\Delta x/4k_0)\left[\frac{\partial^2}{\partial y^2} f_{j+1}(y) + \frac{\partial^2}{\partial y^2} f_j(y)\right] + \quad (7.8)$$

$$e_{j+1,N-1}T_{N-1}(y/W) + e_{j+1,N}T_N(y/W),$$

where $$e_{j+1,N-1} = f_{j+1,N-1} \text{ and } e_{j+1,N} = f_{j+1,N} - f_{j,N}. \quad (7.9)$$

We also define the following dimensionless and real-valued parameter.

$$q = 4k_0 W^2/\Delta z. \tag{7.10}$$

Now the Chebyshev tau equations can be written in the following equivalent form.

$$f_{j+1,k}^{(2)} + iq f_{j+1,k} = g_{j,k} \text{ for } \begin{cases} j = 0, 1, \ldots \text{ and} \\ k = 0, 1, \ldots, N-2, \end{cases} \tag{7.11}$$

where $$g_{j,k} = -f_{j,k}^{(2)} + iq f_{j,k}. \tag{7.12}$$

The quantities $g_{j,k}$ can be computed recursively without the coefficients $f_{j+1,k}^{(2)}$.

$$\begin{aligned} g_{j+1,k} &= -f_{j+1,k}^{(2)} + iq f_{j+1,k} \\ &= -(f_{j+1,k}^{(2)} + iq f_{j+1,k}) + 2iq f_{j+1,k} \\ &= -g_{j,k} + 2iq f_{j+1,k}. \end{aligned} \tag{7.13}$$

It is possible also to eliminate the coefficients $f_{j+1,k}^{(2)}$ from the Chebyshev tau equations. This leads to an alternative formulation of these equations in terms of the coefficients $f_{j+1,k}$ alone. The coefficients $f_{j+1,k}$ and $f_{j+1,k}^{(2)}$ in eqs.(7.4,7.6) satisfy eq.(7.7) if and only if.

$$f_{j+1,N} + \frac{1}{4} \frac{1}{N(N-1)} iq f_{j+1,N-2} = h_{j,N}, \tag{7.14}$$

$$f_{j+1,N-1} + \frac{1}{4} \frac{1}{(N-1)(N-2)} iq f_{j+1,N-3} = h_{j,N-1}, \tag{7.15}$$

$$\left(1 - \frac{1}{2} \frac{1}{(N-1)(N-3)} iq\right) f_{j+1,N-2} + \tag{7.16}$$
$$\frac{1}{4} \frac{1}{(N-2)(N-3)} iq f_{j+1,N-4} = h_{j,N-2},$$

$$\left(1 - \frac{1}{2} \frac{1}{(N-2)(N-4)} iq\right) f_{j+1,N-3} + \tag{7.17}$$
$$\frac{1}{4} \frac{1}{(N-3)(N-4)} iq f_{j+1,N-5} = h_{j,N-3},$$

$$\frac{1}{4} \frac{1}{(k+1)k} iq f_{j+1,k+2} + \left(1 - \frac{1}{2} \frac{1}{k^2-1} iq\right) f_{j+1,k} + \tag{7.18}$$
$$\frac{1}{4} \frac{1}{k(k-1)} iq f_{j+1,k-2} = h_{j,k} \text{ for } k = N-4, \ldots, 3,$$

for $k = N-4, \ldots, 3$, \hfill (7.18)

$$\frac{1}{24} iq f_{j+1,4} + \left(1 - \frac{1}{6} iq\right) f_{j+1,2} + \frac{1}{4} iq f_{j+1,0} = h_{j,2}, \tag{7.19}$$

for $j = 0, 1, \ldots$, where $$h_{j,N} = \frac{1}{4} \frac{1}{N(N-1)} g_{j,N-2}, \tag{7.20}$$

$$h_{j,N-1} = \frac{1}{4} \frac{1}{(N-1)(N-2)} g_{j,N-3}, \tag{7.21}$$

$$h_{j,N-2} = -\frac{1}{2} \frac{1}{(N-1)(N-3)} g_{j,N-2} + \frac{1}{4} \frac{1}{(N-2)(N-3)} g_{j,N-4}, \tag{7.22}$$

$$h_{j,N-3} = -\frac{1}{2} \frac{1}{(N-2)(N-4)} g_{j,N-3} + \frac{1}{4} \frac{1}{(N-3)(N-4)} g_{j,N-5}, \tag{7.23}$$

$$h_{j,k} = \frac{1}{4} \frac{1}{(k+1)k} g_{j,k+2} - \frac{1}{2} \frac{1}{k^2-1} g_{j,k} + \frac{1}{4} \frac{1}{k(k-1)} g_{j,k-2} \text{ for } k = \tag{7.24}$$
$$N-4, \ldots, 3,$$

$$h_{j,2} = \frac{1}{24} g_{j,4} - \frac{1}{6} g_{j,2} + \frac{1}{4} g_{j,0}. \tag{7.25}$$

From this point on we assume that N is even. Note that (1) there are N–1 equations in eqs.(7.14–7.19);

(2) the even-indexed coefficients $f_{j+1,N}, f_{j+1,N-2}, \ldots f_{j+1}, f_{j+1,0}$ are uncoupled from the odd-indexed coefficients $f_{j+1,N-1}, f_{j+1,N-3}, \ldots, f_{j+1,1}$ in eqs.(7.14–7.19);

(3) the coefficient $f_{j+1,N}$ appears only in eq.(7.14), and the coefficient $f_{j+1,N-1}$ appears only in eq.(7.15).

We adopt conditions at the boundaries $y = \pm W$ that combine the discrete transparent boundary conditions (6.32) with source terms $-f_{j+1}^{(S)}(\pm W)$ that are independent of the solutions $f_k(y)$ for $k \leq j+1$. Thus, $$f_{j+1}(\pm W) \pm \frac{1}{p_0} \frac{\partial}{\partial y} f_{j+1}(\pm W) = g_j(\pm W) \text{ for } j = 0, 1, \ldots, \tag{7.26}$$

$$j = 0, 1, \ldots, \tag{7,26}$$

where $$g_j(\pm W) = -f_{j+1}^{(S)}(\pm W) + 2p_0 \sum_{k=0}^{j} (-1)^{j-k} a_{k+1}^k(\pm W). \tag{7.27}$$

The coefficients $a_{k+1}^k(\pm W)$ in this equation are computed recursively. First, $a_1^0(\pm W) = 0$. Second, for $j = 1, 2, \ldots$, $$a_k^j(\pm W) = -\frac{1}{2} a_k^{j-1}(\pm W) - \frac{1}{2} a_{k-2}^{j-1}(\pm W), \text{ for } \underline{k = 1, \ldots, j-1}, \tag{7.28}$$
$$\text{Skip this when } j=1.$$

$$a_j^j(\pm W) = \tag{7.29}$$
$$\pm \frac{1}{2} p_0^2 \left[\frac{\partial}{\partial y} f_{j-1}(\pm W) + \frac{\partial}{\partial y} f_j(\pm W)\right] - a_j^{j-1}(\pm W) - \frac{1}{2} a_{j-2}^{j-1}(\pm W),$$

$$a_{j+1}^j(\pm W) = \mp \frac{1}{2} p_0^2 \left[\frac{\partial}{\partial y} f_{j-1}(\pm W) + \frac{\partial}{\partial y} f_j(\pm W)\right] - \frac{1}{2} a_{j-1}^{j-1}(\pm W), \tag{7.30}$$

where $$a_{-1}^j(\pm W) = 0 \text{ for } j = 0, 1, \ldots, \tag{7.31}$$

$$a_0^j(\pm W) = 0 \text{ for } j = 0, 1, \ldots \tag{7.32}$$

If $f_0(y)$ is specified, then the N+1 equations in eqs. (7.14–7.19, 7.26)) determine the polynomials $f_{j+1}(y)$ for $j = 0, 1, \ldots$ uniquely.

It is easy to evaluate $f_{j+1}(\pm W)$ from eq.(7.4) because $T_k(\pm 1) = (\pm 1)^k$.

$$f_{j+1}(\pm W) = \sum_{k=0}^{N} (\pm 1)^k f_{j+1,k}. \tag{7.33}$$

It is more convenient to evaluate $\partial f_{j+1}(\pm W)/\partial y$ by differentiating eq.(7.4) directly than by using eq.(7.5) because $T_k'(\pm 1) = (\pm 1)^{k+1} k^2$. Thus, $$\pm \frac{\partial}{\partial y} f_{j+1} \pm (W) = \frac{1}{W} \sum_{k=0}^{N} (\pm 1)^k k^2 f_{j+1,k}. \qquad (7.34)$$

Now $$p_0 W = e^{-i\pi/4} 2W(k_0 \Delta x)^{1/2} = e^{-i\pi/4} q^{1/2}. \qquad (7.35)$$

Therefore, it follows from eqs.(7.26,7.33–7.35) that $$\sum_{k=0}^{N} f_{j+1,k} + e^{i\pi/4} q^{-1/2} \sum_{k=0}^{N} k^2 f_{j+1,k} = g_j(W), \qquad (7.36)$$

$$\sum_{k=0}^{N} (-1)^k f_{j+1,k} + e^{i\pi/4} q^{-1/2} \sum_{k=0}^{N} (-1)^k k^2 f_{j+1,k} = g_j(-W). \qquad (7.37)$$

It is easy to decouple the even-indexed Chebyshev coefficients from the odd-indexed Chebyshev coefficients in these equations. If we add eqs.(7.36,7.37), then we get an equation that involves only the even-indexed Chebyshev coefficients.

$$\sum_{l=0}^{N/2} [1 + e^{i\pi/4} q^{-1/2} (2l)^2] f_{j+1,2l} = \frac{1}{2} [g_j(W) + g_j(W)]. \qquad (7.38)$$

If we subtract eq.(7.37) from eq.(7.36), then we get an equation that involves only the odd-indexed Chebyshev coefficients.

$$\sum_{l=1}^{N/2} [1 + e^{i\pi/4} q^{-1/2} (2l-1)^2] f_{j+1,2l-1} = \frac{1}{2} [g_j(W) - g_j(-W)]. \qquad (7.39)$$

It is useful to express eqs.(7.14–7.19) and eqs.(7.38,7.39) as a pair of independent matrix equations of the form $$\begin{bmatrix} A & u \\ v^T & \gamma \end{bmatrix} \begin{bmatrix} x \\ \alpha \end{bmatrix} = \begin{bmatrix} y \\ \beta \end{bmatrix}. \qquad (7.40)$$

First, define $$\tau_k = \begin{cases} 0 & \text{for } k = N-2, N-3, \\ \frac{1}{4} \frac{1}{(k+1)k} iq & \text{for } k = N-4, \ldots, 2. \end{cases} \qquad (7.41)$$

$$s_k = \begin{cases} 1 & \text{for } k = N, N-1, \\ 1 - \frac{1}{2} \frac{1}{k_2 - 1} iq & \text{for } k = N-2, \ldots, 2. \end{cases} \qquad (7.42)$$

$$t_k = \begin{cases} \frac{1}{4} \frac{1}{k(k-1)} iq & \text{for } k = N, \ldots, 3, \\ \frac{1}{4} iq & \text{for } k = 2. \end{cases} \qquad (7.43)$$

$$b_k = 1 + e_{i\pi/4} q^{-1/2} k^2 \text{ for } k=N, \ldots, 0. \qquad (7.44)$$

The even-indexed Chebyshev coefficients $f_{j+1,2l}$ are determined by the matrix equation $$\begin{bmatrix} A_0 & u_0 \\ v_0^T & \gamma_0 \end{bmatrix} \begin{bmatrix} x_0 \\ \alpha_0 \end{bmatrix} = \begin{bmatrix} y_0 \\ \beta_0 \end{bmatrix}, \qquad (7.45)$$

where $$A_0 = \begin{bmatrix} s_N & t_N & & & & \\ T_{N-2} & s_{N-2} & t_{N-2} & & & \\ & T_{N-4} & s_{N-4} & t_{N-4} & & \\ & & \ddots & \ddots & \ddots & \\ & & & \ddots & \ddots & \ddots \\ & & & & r_4 & s_4 & t_4 \\ & & & & & r_2 & s_2 \end{bmatrix}, u_0 = \begin{bmatrix} 0 \\ 0 \\ 0 \\ \vdots \\ \vdots \\ 0 \\ t_2 \end{bmatrix}, \qquad (7.46)$$

$$v_0 = \begin{bmatrix} b_N \\ b_{N-2} \\ b_{N-4} \\ \vdots \\ \vdots \\ b_4 \\ b_2 \end{bmatrix}, x_0 = \begin{bmatrix} f_{j+1,N} \\ f_{j+1,N-2} \\ f_{j+1,N-4} \\ \vdots \\ \vdots \\ f_{j+1,4} \\ f_{j+1,2} \end{bmatrix}, y_0 = \begin{bmatrix} h_{j,N} \\ h_{j,N-2} \\ h_{j,N-4} \\ \vdots \\ \vdots \\ h_{j,4} \\ h_{j,2} \end{bmatrix}, \qquad (7.47)$$

The rows of eq.(7.45) are eqs.(7.14,7.16), eq.(7.18) for k=2l (l=N/2−2, . . . ,2), eq.(7.19) and eq.(7.38).

The odd-indexed Chebyshev coefficients $f_{j+1,2l-1}$ are determined by the matrix equation $$\begin{bmatrix} A_1 & u_1 \\ v_1^T & \gamma_1 \end{bmatrix} \begin{bmatrix} x_1 \\ \alpha_1 \end{bmatrix} = \begin{bmatrix} y_1 \\ \beta_1 \end{bmatrix}, \qquad (7.49)$$

where $$A_1 = \begin{bmatrix} s_{N-1} & t_{N-1} & & & & \\ \tau_{N-3} & s_{N-3} & t_{N-3} & & & \\ & \tau_{N-5} & s_{N-5} & t_{N-5} & & \\ & & \ddots & \ddots & \ddots & \\ & & & \ddots & \ddots & \ddots \\ & & & & \tau_5 & s_5 & t_5 \\ & & & & & \tau_3 & s_3 \end{bmatrix}, u_1 = \begin{bmatrix} 0 \\ 0 \\ 0 \\ \vdots \\ \vdots \\ 0 \\ t_3 \end{bmatrix}, \qquad (7.50)$$

$$v_1 = \begin{bmatrix} b_{N-1} \\ b_{N-3} \\ b_{N-5} \\ \vdots \\ \vdots \\ b_5 \\ b_3 \end{bmatrix}, x_1 = \begin{bmatrix} f_{j+1,N-1} \\ f_{j+1,N-3} \\ f_{j+1,N-5} \\ \vdots \\ \vdots \\ f_{j+1,5} \\ f_{j+1,3} \end{bmatrix}, y_1 = \begin{bmatrix} h_{j,N-1} \\ h_{j,N-3} \\ h_{j,N-5} \\ \vdots \\ \vdots \\ h_{j,5} \\ h_{j,3} \end{bmatrix}, \qquad (7.51)$$

$\gamma_1 = b_1$, $\alpha_1 = f_{j+1,1}$, $\beta_1 = \frac{1}{2}|g_j(W) - g_j(-W)|$. $\qquad (7.52)$ The rows of eq.(7.49) are eqs.(7.15,7.17), eq. (7.18) for k=2l−1(l=N/2−2, . . . ,2) and eq.(7.39).

We can solve eqs.(7.45,7.49) numerically by the Crout form of the block elimination method. The BEC algorithm to carry out this method has five steps. We outline them for eq.(7.40), which includes eqs.(7.45,7.49) as particular cases. Given y and β, we want to solve that equation for x and α.

(1) Solve the equation $$A\xi = u. \qquad (7.53)$$

(2) Use the solution vector $\xi$ to compute the divisor $$\delta = \gamma - v^T \cdot \xi. \tag{7.54}$$

(3) Solve the equation $$A\eta = y. \tag{7.55}$$

(4) Use the solution vector $\eta$ to compute the scalar $$a = (\beta - v^T \cdot \eta)/\delta. \tag{7.56}$$

(5) Compute the vector $$x = \eta - a\xi. \tag{7.57}$$

We can solve eqs.(7.53,7.55) with a method that uses an LU factorization of the matrix A. If $A = A_0$ or $A = A_1$, then the Crout LU factorization can be done numerically without pivoting and is stable.

Since $s_N = 1$, we find that $$A_0 = L_0 U_0, \tag{7.58}$$

where $$L_0 = \begin{bmatrix} 1 & & & & & \\ & \sigma_{N-2} & & & & \\ & \tau_{N-4} & \sigma_{N-4} & & & \\ & & & \ddots & \ddots & \\ & & & & \tau_4 & \sigma_4 \\ & & & & & \tau_2 & \sigma_2 \end{bmatrix}, \tag{7.59}$$

$$U_0 = \begin{bmatrix} 1 & t_N & & & & \\ & 1 & \tau_{N-2} & & & \\ & & 1 & \tau_{N-4} & & \\ & & & \ddots & \ddots & \\ & & & & 1 & \tau_4 \\ & & & & & 1 \end{bmatrix},$$

and $$\left.\begin{array}{l}\sigma_{N-2} = s_{N-2},\ \tau_{N-2} = t_{N-2}/\sigma_{N-2},\\ \sigma_k = s_k - \tau_k \tau_{k+2},\ \tau_k = t_k/\sigma_k\ \text{for}\ k = 2l(l=N/2-2,\ldots,2),\\ \sigma_2 = s_2 - \tau_2 \tau_4.\end{array}\right\} \tag{7.60}$$

Since $s_{N-1} = 1$, we find that $$A_1 = L_1 U_1, \tag{7.61}$$

where $$L_1 = \begin{bmatrix} 1 & & & & & \\ & \sigma_{N-3} & & & & \\ & \tau_{N-5} & \sigma_{N-5} & & & \\ & & & \ddots & \ddots & \\ & & & & \tau_5 & \sigma_5 \\ & & & & & \tau_3 & \sigma_3 \end{bmatrix}, \tag{7.62}$$

$$U_1 = \begin{bmatrix} 1 & t_{N-1} & & & & \\ & 1 & \tau_{N-3} & & & \\ & & 1 & \tau_{N-5} & & \\ & & & \ddots & \ddots & \\ & & & & 1 & \tau_5 \\ & & & & & 1 \end{bmatrix},$$

and $$\left.\begin{array}{l}\sigma_{N-3} = s_{N-3},\ \tau_{N-3} = t_{N-3}/\sigma_{N-3},\\ \sigma_k = s_k - \tau_k \tau_{k+2},\ \tau_k = t_k/\sigma_k\ \text{for}\\ k = 2l-1(l=N/2-2,\ldots,3),\\ \sigma_3 = s_3 - \tau_3 \tau_5.\end{array}\right\} \tag{7.63}$$

If $A = A_0$, then eqs.(7.53,7.55) are of the form $A_0 z_0 = w_0$. To solve this equation we introduce a vector $p_0$ and solve the first intermediate equation $L_0 p_0 = w_0$ for $p_0$ by forward substitution. Then we solve the second intermediate equation $U_0 z_0 = p_0$ for $z_0$ by backward substitution.

If $A = A_1$, then eqs.(7.53,7.55) are of the form $A_1 z_1 = w_1$. This equation is solved the same way. We introduce a vector $p_1$ and solve the intermediate equation $L_1 p_1 = w_1$ for $p_1$ by forward substitution. Then we solve the intermediate equation $U_1 z_1 = p_1$ for $z_1$ by backward substitution.

Since the LU solution method for eqs.(7.53,7.55) is stable if $A = A_0$ or $A = A_1$, the BEC algorithm can be numerically unstable in finite-precision arithmetic only if the divisor $\delta$ is too small. However, if $q = o(N^{1/2})$, then $\delta = o(N^{1/2})$ in each case.

$$\delta_0 \sim (2\pi)^{1/2} e^{-i\pi/8} q^{1/4}, \tag{7.64}$$

$$\delta_1 \sim (\pi/2)^{1/2} e^{-i\pi/8} q^{1/4}. \tag{7.65}$$

Hence, if $q = o(N_2)$, then the BEC algorithm is stable. Each computer solution with the BEC algorithm should be followed by one round of iterative refinement. Solutions of eqs.(7.45,7.49) that are computed this way are accurate to machine precision.

8. Efficient evaluation of Chebyshev Interpolation polynomials.

Clenshaw's algorithm is a stable and accurate method to evaluate the Chebyshev interpolation polynomial $$u(\xi) = \sum_{k=0}^{N} u_k T_k(\xi) \tag{8.1}$$

at a single argument $\xi$: $u(\xi) = \upsilon_0$ where
 (1) Start: $\upsilon_N = u_N$ and $\upsilon_{N-1} = u_{N-1} + 2\xi \upsilon_N$.
 (2) For k=N-2, . . . , 1: $\upsilon_k = u_k + 2\xi \upsilon_{k+1} - \upsilon_{k+2}$.
 (3) End: $\upsilon_0 = u_0 + \xi \upsilon_1 - \upsilon_2$.

The arithmetic operation count for Clenshaw's algorithm is about 3N per evaluation. If we use this algorithm to evaluate $u(\xi)$ at the N+1 points $$\xi_n = 1 - 2n/N \text{ for } n=0,\ldots,N, \tag{8.2}$$

then the total operation count for these evaluations is $o(3N^2)$. There are several alternative algorithms that also perform these evaluations but have total operation counts like $o(AN \log N)$, where A is a constant. We shall describe an alternative algorithm that is based on Lagrange polynomial interpolation. If N is moderately large, say N>100, then it is more efficient to evaluate u(ξ) at all N+1 points $\xi_n$ with this algorithm than with Clenshaw's algorithm.

If $\upsilon(\theta) = u(\cos\theta)$, then N $$v(\theta) = \sum_{k=0}^{N} u_k \cos(k\theta) \text{ for } 0 \leq \theta \leq \pi. \quad (8.3)$$

Since $\xi_n = \cos\phi_n$ where $$\phi_n = 2\arcsin\{(n/N)^{1/2}\} \text{ for } n=0,\ldots,N, \quad (8.4)$$

evaluating the polynomial u(ξ) at the regularly spaced points $\xi_n$ is equivalent to evaluating $\upsilon(\theta)$ at the irregularly spaced points $\phi_n$, which is what the alternative algorithm really does.

The first step of this algorithm is to compute the values of $\upsilon(\theta)$ at the regularly spaced points $\theta_j = j\pi/3N$ for $j=0,\ldots,3N$. A very efficient way to do these computations is to pad the spectral coefficients $u_n$ in eq.(8.3) with 2N trailing zeros and then to take a cosine FFT of length 3N. The total operation count in this approach is o(15N log N).

Next, let K be a positive integer. We shall discuss some choices for K after the algorithm has been described. The second step of the algorithm is to compute the forward differences of orders up to 2K that are associated with the points $\theta_j$. Let $$\Delta^0 \upsilon(\theta_j) = \upsilon(\theta_j) \text{ for } j=0,\ldots,3N. \quad (8.5)$$

For k=1,...,2K the forward differences of order k are defined as follows.

$$\Delta^k \upsilon(\theta_j) = \Delta^{k-1}\upsilon(\theta_{j+1}) - \Delta^{k-1}\upsilon(\theta_j) \text{ for } j=0,\ldots,3N-k. \quad (8.6)$$

The operation count for computing all of these differences is o(6KN). Note, however, that the subtractions in eq.(8.6) can be done in parallel for each k. Therefore, this step could be expedited on an array processor or on a computer that has a hardware implementation of vector arithmetic.

The third step of the algorithm is based on the Gaussian (forward) form of the Lagrange interpolation polynomials of even order. Let $h=\pi/3N$, and let $Q_{2K}(\theta_j+th)$ be the following polynomial in t of degree 2K.

$$Q_{2K}(\theta_j + th) = \quad (8.7)$$

$$v(\theta_j) + t\Delta v(\theta_j) + \frac{1}{2}t(t-1)\Delta^2 v(\theta_{j-1}) + \frac{1}{6}t(t^2-1)\Delta^3 v(\theta_{j-1}) +$$

$$\sum_{k=2}^{K-1}\prod_{l=1}^{k-1}(t^2-l^2)\left[\frac{t(t-k)}{(2k)!}\Delta^{2k}v(\theta_{j-k}) + \frac{t(t^2-k^2)}{(2k+1)!}\Delta^{2k+1}v(\theta_{j-k})\right] +$$

$$\prod_{l=1}^{K-1}(t^2-l^2)\frac{t(t-K)}{(2K)!}\Delta^{2K}v(\theta_{j-K}).$$

Then $$\upsilon(\theta_j+th) = Q_{2K}(\theta_j+th) + R_{2K}(\theta_j+th), \quad (8.8)$$

where the remainder $R_{2K}(\theta_j+th)$ can written in the form $$R_{2K}(\theta_j + th) = t\prod_{l=1}^{K}(t^2-l^2)\frac{h^{2K+1}}{(2K+1)!}\frac{\partial^{2K+1}}{\partial\theta^{2K+1}}v(\vartheta) \quad (8.9)$$

for some σ depending on t such that $\theta_{j-K} < \sigma < \theta_{j+K}$. The polynomial $Q_{2K}(\theta_j+th)$ can be evaluated with about 4K operations as follows.

(1) Start: $q_K = \frac{t-K}{2K}\Delta^{2K}v(\theta_{j-K})$.

(2) For $k=K-1,\ldots$, $$1:q_k = \frac{t-k}{2k}\left[\Delta^{2k}v(\theta_{j-k}) + \frac{t+k}{2k+1}(\Delta^{2k+1}v(\theta_{j-k}) + q_{k+1})\right].$$

(3) End: $Q_{2K}(\theta_j+th) = \upsilon(\theta_j) + t(\Delta\upsilon(\theta_j) + q_1)$.

Now for n=0,...,N let $j_n$ be the index j for which the absolute difference $|\phi_n - \theta_j|$ is smallest, and let $t_n = (\phi_n - \theta_{j_n})/h$. Clearly $$|t_n| \leq \frac{1}{2}.$$

Since $\phi_0 = 0 = \theta_0$ and $\phi_n = \pi = \theta_{3N}$, $\upsilon(\phi_0) = \upsilon(\theta_0)$ and $\upsilon(\phi_n) = \upsilon(\theta_{3N})$. If 0<n<N, then we use eq.(8.8) to approximate $\upsilon(\phi_n)$ as follows.

$$\upsilon(\phi_n) = \upsilon(\theta_{j_n}+t_n h) \approx Q_{2K}(\theta_{j_n}+t_n h) \text{ for } n=1,\ldots,N-1. \quad (8.10)$$

The total operation count for computing these approximations is about 4KN. Note that in order for thereto be enough sample points $\theta_j$, the increment $h=\pi/3N$ must be small enough that $\phi_1/h > K$. A sufficient condition for there to be enough of these sample points is that $N > (\pi^2/36)K^2$.

Let us estimate the interpolation errors $$R_{2K}(\theta_{j_n} t_n h) = \upsilon(\phi_n) - Q_{2K}(\theta_{j_n} + t_n h) \quad (8.11)$$

in the approximations (8.10). First, we consider the simple cases in which there is just one non-vanishing term in eq.(8.3). Let $0 \leq k \leq N$ and assume that $\upsilon(\theta) = \cos(k\theta)$. It can be shown that $$|R_{2K}(\theta_{j_n} + t_n h)| \leq \frac{1}{2}\left(\frac{\pi}{K}\right)^{\frac{1}{2}}\left(\frac{k}{N}\frac{\pi}{6}\right)^{2K+1}[1 + O(K^{-1})] \text{ if } \quad (8.12)$$

$$v(\theta) = \cos(k\theta).$$

For fixed k this bound is an exponentially decreasing function of increasing K because $0 \leq k/N \leq 1$. For fixed K this bound is a rapidly decreasing function of decreasing k. Thus, the bound on the interpolation error is greatest if k=N. If K=25, however, eq.(8.12) implies double-precision accuracy even in this case because $\frac{1}{2}(\pi/25)^{1/2}(\pi/6)^{51} = 0.8\times 10^{-15}$.

In the general case we find that $$|R_{2K}(\theta_{j_n} + t_n h)| \leq \frac{1}{2}\left(\frac{\pi}{K}\right)^{\frac{1}{2}}\sum_{k=1}^{N}|u_k|\left(\frac{k}{N}\frac{\pi}{6}\right)^{2K+1}[1 + O(K^{-1})]. \quad (8.13)$$

In practice, the Chebyshev coefficients $u_k$ eventually decrease exponentially in magnitude as the index k increases. Therefore, eq.(8.13) implies that the approximations in eq.(8.10) may have double-precision accuracy if the integer K is slightly less than 25, e.g., K≈20.

The total operation count for computing all the values $u(\xi_n)=\upsilon(\phi_n)$ with the alternative algorithm is $o(15N \log N+10KN)$. This should be compared with the total operation count $o(3N^2)$ for computing these values directly with Clenshaw's algorithm.

9. The decomposition method for transversely unbounded waveguides.

Figure 3:
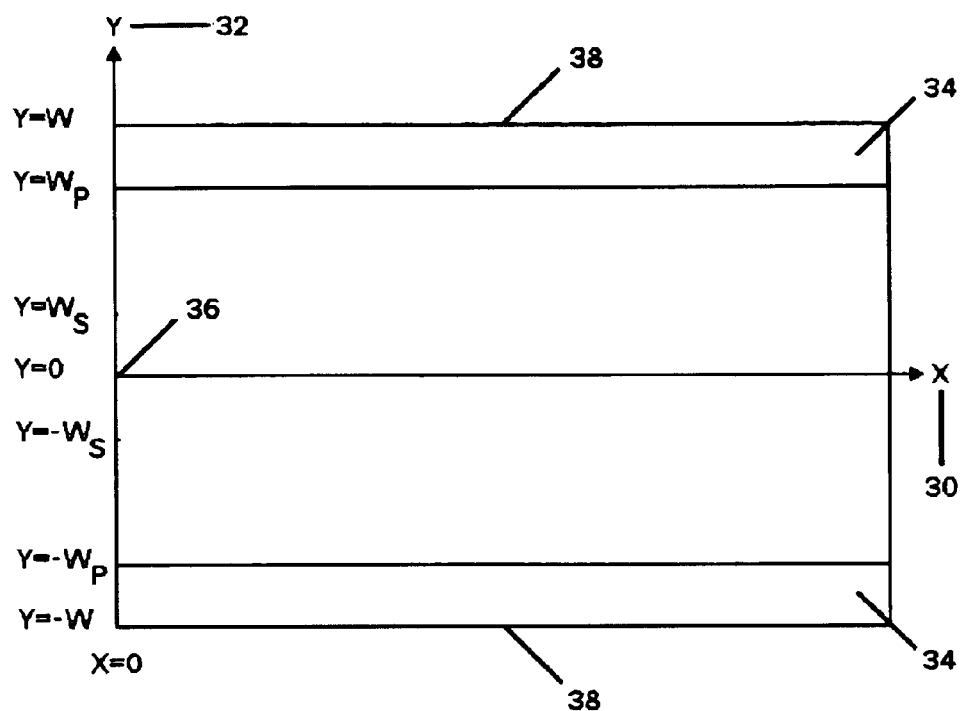
FIG. 3 shows initial and boundary conditions in the horizontal plane of range and cross-range.

We describe a newly created numerical method for integrating a system of coupled parabolic equations that models one-way propagation of sound in a transversely unbounded waveguide. Referring now to FIG. 3, we assume that sound in the waveguide propagates mainly in the direction of increasing range 30, which is assigned the coordinate x. The waveguide is unbounded in the direction of cross range 32, which is assigned the coordinate y. This discussion is for slab geometry, but the development for spherical geometry is almost identical.

The horizontal variations in the properties of the fluid in this waveguide are confined between vertical planes at $y=\pm W_p$, which are parallel to the direction of propagation. We assume that the fluid in the waveguide was originally in a horizontally stratified state but has been perturbed between these planes. The unperturbed fluid can have an internal horizontal interface that also has been perturbed between the planes. The perturbations are smooth and vanish at the planes. The waveguide remains horizontally stratified in the two semi-infinite sections where $|y|>W_p$.

To make the transverse extent of our problem finite, we put transparent boundaries in the vertical planes at $y=\pm W$, where $W>W_p$. These boundaries have no physical reality. Sound in the waveguide must penetrate the transparent boundaries without reflection because they are in the semi-infinite horizontally stratified sections of the waveguide.

For simplicity we assume that the reference wavenumbers $k_m$ are positive constants. Thus, the acoustic pressure field is represented by modal amplitudes $\phi_m$ for $m=1,\ldots,M$ that satisfy the following system of coupled parabolic equations for $x>0$.

$$2ik_m \frac{\partial \varphi_m}{\partial x} + \frac{\partial^2 \varphi_m}{\partial y^2} = (k_m^2 - \xi_m^2)\varphi_m + \sum_{n=1}^{M}\left[(\alpha_{mn} + i\beta_{mn}k_n)\varphi_n + \beta_{mn}\frac{\partial \varphi_n}{\partial x} + \gamma_{mn}\frac{\partial \varphi_n}{\partial y}\right]e^{-i(k_m-k_n)x}, \qquad (9.1)$$

for $m=1,\ldots,M$. These equations are obtained from eq.(2.8) with $\sigma_m=k_m x$ for each m.

Each modal wavenumber $\xi_m(x,y)$ is constant in the half-planes 34 where $|y|>W_p$, which correspond to the unperturbed horizontally stratified sections of the waveguide. We denote this constant by $\xi_m^{(0)}$. Note that it is the same for $y<-W_p$ as for $y>W_p$. We expect the reference wavenumber $k_m$ to be close to $\xi_m^{(0)}$. In addition, the coupling coefficients $a_{mn}(x,y), \beta_{mn}(x,y)$ and $\gamma_{mn}(x,y)$ vanish for $|y|>W_p$.

Sound enters the waveguide through an aperture 36 in the vertical plane at $x=0$. The aperture is confined between the lines at $y=\pm W_a$ in this plane, where $W_a<W_p$. The acoustic pressure field in this plane is represented by initial conditions on the modal amplitudes of the following form.

$$\varphi_m(0,y) = \begin{cases} S_m(y) & \text{if } |y| < W_s, \\ 0 & \text{if } |y| > W_s. \end{cases} \qquad (9.2)$$

Now let us formulate transparent boundary conditions for the modal amplitudes $\phi_m$ at the transparent boundaries 38 where $y=\pm W$. First, the coupled parabolic equations (9.1) decouple in the half-planes $|y|>W_p$ as follows. For $m=1,\ldots,M$, $$2ik_m \frac{\partial \varphi_m}{\partial x} + \frac{\partial^2 \varphi_m}{\partial y^2} = (k_m^2 - \{\xi_m^{(0)}\}^2)\varphi_m \text{ if } |y| > W_p. \qquad (9.3)$$

We bring each of these equations into the form of a standard parabolic equation by defining the following phase-shifted modal amplitudes.

$$\bar{\varphi}_m = \phi_m e^{-i\kappa_m x} \text{ for } m=1,\ldots,M, \qquad (9.4)$$

where each $\kappa_m$ is a constant. If we let $$\kappa_m = (\{\xi_m^{(0)}\}^2 - k_m^2)/2k_m, \qquad (9.5)$$

then $\bar{\phi}_m$ satisfies the standard parabolic equation $$2ik_m \frac{\partial \tilde{\varphi}_m}{\partial x} + \frac{\partial^2 \tilde{\varphi}_m}{\partial y^2} = 0 \text{ if } |y| > W_p. \qquad (9.6)$$

Since $W>W_p$, outgoing transparent boundary conditions can be imposed on the phase-shifted modal amplitudes at the transparent boundaries $y=\pm W$. For example, we get the following form of these conditions from eqs.(6.2,6.3). For $m=1,\ldots,M$, $$\tilde{\varphi}_m(x,\pm W) = \qquad (9.7)$$
$$\mp e^{i\pi/4}(2\pi k_m)^{-1/2}\int_0^x \frac{\partial}{\partial y}\tilde{\varphi}_m(u,\pm W)(x-u)^{-1/2}du \text{ for } x>0.$$

Let us reformulate eq.(9.1) in terms of the phase-shifted modal amplitudes.

$$2ik_m \frac{\partial \tilde{\varphi}_m}{\partial x} + \frac{\partial^2 \tilde{\varphi}_m}{\partial y^2} = (\{\xi_m^{(0)}\}^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\bar{k}_m-\bar{k}_n)x}, \qquad (9.8)$$

where the shifted reference wavenumbers $\bar{k}_m$ are defined as $$\bar{k}_m = k_m + \kappa_m = \xi_m^{(0)} + (k_m - \xi_m^{(0)})^2/2k_m \text{ for } m=1,\ldots,M. \qquad (9.9)$$

Note that $\bar{k}_m$ is stationary at $k_m=\xi_m^{(0)}$, where it equals $\xi_m^{(0)}$ as well.

A sufficient condition that the system of coupled parabolic equations (9.1) have a unique solution for a given set of initial conditions (9.2) is that the reference matrix be positive definite and that the transparent boundary conditions (9.7) be satisfied.

Each $\bar{\phi}_m$ is the sum of a primary component $\bar{\phi}_m^{(1)}$ and a secondary component $\bar{\phi}_m^{(2)}$ that are the solutions of the following two problems.

I. Primary component. Let $\bar{\phi}_m^{(1)}$ be a solution of the inhomogeneous parabolic equation $$2ik_m \frac{\partial \tilde{\varphi}_m^{(1)}}{\partial x} + \frac{\partial^2 \tilde{\varphi}_m^{(1)}}{\partial y^2} = (\{\xi_m^{(0)}\}^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\bar{k}_m-\bar{k}_n)x} \qquad (9.10)$$

for $x>0$ and $|y|\leq W$ that satisfies the same initial conditions that $\bar{\phi}_m$ satisfies, $$\tilde{\varphi}_m^{(1)}(0, y) = \tilde{\varphi}_m(0, y) = \begin{cases} S_m(y) & \text{if } |y| < W_3, \\ 0 & \text{if } |y| > W_3, \end{cases} \quad (9.11)$$

and that is subject to the following Neumann boundary conditions.

$$\frac{\partial}{\partial y}\tilde{\varphi}_m^{(1)}(x, \pm W) = 0 \text{ for } x > 0. \quad (9.12)$$

Conditions (9.11,9.12) are compatible, and the solution $\bar{\phi}_m^{(1)}$ of this problem is unique.

II. Secondary component. Let $\bar{k}_m^{(2)}$ be a solution of the standard parabolic equation $$2ik_m \frac{\partial \tilde{\varphi}_m^{(2)}}{\partial x} + \frac{\partial^2 \tilde{\varphi}_m^{(2)}}{\partial y^2} = 0 \text{ for } x > 0 \text{ and } |y| \le W \quad (9.13)$$

that satisfies the homogeneous initial condition $$\bar{\phi}_m^{(2)}(0,y) = 0 \text{ for } |y| \le W, \quad (9.14)$$

and that is subject to the following inhomogeneous Neumann boundary conditions.

$$\frac{\partial}{\partial y}\tilde{\varphi}_m^{(2)}(x, \pm W) = \frac{\partial}{\partial y}\tilde{\varphi}_m(x, \pm W) \text{ for } x > 0. \quad (9.15)$$

Conditions (9.14,9.15) are compatible, and the solution $\bar{\phi}_m^{(2)}$ of this problem is unique.

It can be shown that $$\bar{\phi}_m = \bar{\phi}_m^{(1)} + \bar{\phi}_m^{(2)} \text{ for } m=1, \ldots, M. \quad (9.16)$$

This identity suggests the following basic decomposition method for finding the phase-shifted modal amplitudes $\bar{\phi}_m$. We regard each $\bar{\phi}_m$ as an unknown in problems I and II and solve these problems simultaneously for the triples $\{\bar{\phi}_m, \bar{\phi}_m^{(1)}, \bar{\phi}_m^{(2)}\}$ subject to the constraints that $\bar{\phi}_m = \bar{\phi}_m^{(1)} + \bar{\phi}_m^{(2)}$ and that $\bar{\phi}_m$ satisfy the transparent boundary conditions (9.7) for $m=1, \ldots, M$. This approach gives us the freedom to use different techniques for solving problems I and II numerically.

In practice, we solve discrete forms of problems I and II numerically. First, we develop a discrete form of problem I from an exact integral of eq.(9.10). Fix a range increment $\Delta x$ and let $x_j = j\Delta x$ for $j=0,1,\ldots$. Define $$\tilde{\psi}_m^{(1)} = k_m \tilde{\psi}_m^{(1)} + (i/2) \sum_{n=1}^{M} \theta_{mn} \tilde{\psi}_n e^{-i(k_m - k_n)x}, \quad (9.17)$$

and $$\bar{q}_m = \quad (9.18)$$

$$\left\{ (\{\xi_m^{(0)}\}^2 - \xi_m^2)\tilde{\varphi}_m + \sum_{n=1}^{M}\left[\left(\alpha_{mn} + i\bar{k}_m\beta_{mn} - \frac{\partial \beta_{mn}}{\partial x}\right)\tilde{\varphi}_n + \gamma_{mn}\frac{\partial \tilde{\varphi}_n}{\partial y} + \frac{i}{2k_m}\frac{\partial^2}{\partial y^2}(\beta_{mn}\tilde{\varphi}_n)\right]e^{-i(\bar{k}_m - \bar{k}_n)x} \right\}.$$

We can verify that eq.(9.10) is equivalent to the following equation.

$$2ik_m \frac{\partial \tilde{\psi}_m^{(1)}}{\partial x} + \frac{\partial^2 \tilde{\psi}_m^{(1)}}{\partial y^2} = k_m \tilde{q}_m. \quad (9.19)$$

Note that $$\bar{\psi}_m^{(1)}(x,y) = k_m \bar{\phi}_m^{(1)}(x,y) \text{ and } \bar{q}_m(x,y) = 0 \text{ if } |y| > W_p \quad (9.20)$$

because $\xi_m = \xi_m^{(0)}$ and the coupling coefficients vanish for $|y| > W_p$. Therefore, $\bar{\psi}_m^{(1)}(x, y)$ satisfies Neumann boundary conditions like eq.(9.12) at $y = \pm W$, and we can use the Fourier cosine transform $\mathfrak{F}$ to integrate eq.(9.19) from $y = -W$ to $y = W$. Next, we use the integrating factor $\exp(i\eta^2 x / 2k_m)$, where $\eta$ is the spectral parameter, to integrate the transformed equation from $x = x_j$ to $x = x_{j+1}$. Applying $\mathfrak{F}^{-1}$ to the result, we get $$\tilde{\psi}_m^{(1)}(x_{j+1}) = \mathfrak{F}^{-1}\{\exp\{-i\eta^2 \Delta x/2/k_m\}\mathfrak{F}\tilde{\psi}_m^{(1)}(x_j)\} - \quad (9.21)$$

$$(i/2)\int_{x_j}^{x_{j+1}} \mathfrak{F}^{-1}(-\exp\{i\eta^2(x_{j+1} - x)/2k_m\}\mathfrak{F}\bar{q}_m(x))dx.$$

Now we introduce three numerical approximations in eq.(9.21) that lead to a system of linear equations for the values of $\bar{\phi}_m$ at discrete mesh points in the x, y plane. First, we use the trapezoidal rule to approximate the integral on the RHS of this equation. Dropping the $o((\Delta x)^3)$ remainder in this approximation, we get $$\bar{\psi}_m^{(1)}(x_{j+1}) + (i\Delta x/4)\bar{q}_m(x_{j+1}) = \mathfrak{F}^{-1}(\exp\{-i\eta^2\Delta x/2k_m\}\mathfrak{F}[\bar{\psi}_m^{(1)}(x_j) - (i\Delta x/4\bar{q}_m(x_j)]). \quad (9.22)$$

This equation is inconsistent with eq.(9.19). However, it is consistent with a useful approximation to eq. (9.19), which is to regard $\bar{\psi}_m^{(1)}$ as a solution of the standard parabolic equation $$2ik_m \frac{\partial \tilde{\psi}_m^{(1)}}{\partial x} + \frac{\partial^2 \tilde{\psi}_m^{(1)}}{\partial y^2} = 0 \text{ for } |y| \le W \quad (9.23)$$

for $|y| \le W$ (9.23)

over the disjoint open intervals $x_j < x < x_{j+1}$ for $j = 0, 1, \ldots$ that is subject to the following limit conditions at the range steps $x_j$.

$$\bar{\psi}_m^{(1)}(x_j \pm 0, y) = \bar{\psi}_m^{(1)}(x_j, y) \mp (i\Delta x/4)\bar{q}_m(x_j, y) \text{ for } |y| < W. \quad (9.24)$$

We can use these conditions to write eq.(9.22) as $$\bar{\psi}_m^{(1)}(x_{j+1} - 0) = \mathfrak{F}^{-1}(\exp\{-i\eta^2 \Delta x/2k_m\}\mathfrak{F}[\bar{\psi}_m^{(1)}(x_j + 0)]), \quad (9.25)$$

and we can combine them to get the following identities.

$$\tilde{\psi}_m^{(1)}(x_j, y) = \frac{1}{2}[\tilde{\psi}_m^{(1)}(x_j + 0, y) + \tilde{\psi}_m^{(1)}(x_j - 0, y)], \quad (9.26)$$

$$\tilde{\psi}_m^{(1)}(x_j + 0, y) - \tilde{\psi}_m^{(1)}(x_j - 0, y) = (-i\Delta x/2)\bar{q}_m(x_j, y). \quad (9.27)$$

Next, we fix a positive integer N, let $\Delta y = 2W/N$ and define the points $y_k = k\Delta y - W$ for $k = 0, 1, \ldots, N$. Our second approximation is to replace the operators $\mathfrak{F}$ and $\mathfrak{F}^{-1}$ in eq. (9.22) by the operators $\mathfrak{F}_N$ and $\mathfrak{F}_N^{-1}$. Since these operators transform sequences to sequences, we must replace the functions $\bar{\psi}_m^{(1)} \pm (i\Delta x/4)\bar{q}_m$ in this equation with the sequences of their values at the points $y_k$. Let us write these sequences as $\{\overline{\psi}_m^{(1)}(y_k) \pm (i\Delta x/4)\overline{q}_m(y_k)\}_{k=0}^N$. Under these approximations, eq.(9.22) becomes $$\begin{aligned}\{\overline{\psi}_m^{(1)}(x_{j+1},y_k)+(i\Delta x/4)\overline{q}_m(x_{j+1},y_k)\}_{k=0}^N &= \mathfrak{I}^{-1}(\exp\{-i\eta^2\Delta x/2k_m\}\mathfrak{I}_N \\ \overline{\psi}_m^{(1)}(x_j,y_l)-(i\Delta x/4)\overline{q}_m(x_j,y_l)\}_{l=0}^N\end{aligned} \quad (9.28)$$

The spectral parameter $\eta$ in this equation is bounded because $\eta = n\pi/2W$ for $n=0,1,\ldots,N$. Hence, $0 \le \eta \le \pi/\Delta y$.

We must approximate the partial derivatives $\partial\overline{\phi}_n/\partial y$ and $\partial^2(\beta_{mn}\overline{\phi}_n)/\partial^2 y$ that appear in eq. (9.18) for $\overline{\phi}_m$ before we can evaluate the sequences in eq.(9.28). Since the variable $y$ in this equation is restricted to the uniformly spaced points $y_k$, our third approximation is to replace the partial derivatives at these points with central differences. At the lowest order of approximation, we use the three-point formulas $$\frac{\partial}{\partial y}\tilde{\varphi}_n(y_k) = \frac{1}{2\Delta y}[\tilde{\varphi}_n(y_{k+1}) - \tilde{\varphi}_n(y_{k-1})] + O((\Delta y)^2), \quad (9.29)$$

$$\frac{\partial^2}{\partial y^2}(\beta_{mn}\tilde{\varphi}_n)(y_k) = \quad (9.30)$$

$$\frac{1}{(\Delta y)^2}[(\beta_{mn}\tilde{\varphi}_n)(y_{k+1}) - 2(\beta_{mn}\tilde{\varphi}_n)(y_k) + (\beta_{mn}\tilde{\varphi}_n)(y_{k-1})] + O((\Delta y)^2).$$

Now we combine these approximations with eq.(9.18). Rearranging terms in the result, we find that $$\overline{q}_m(y_k) = (\{\xi_m^{(0)}\}^2 - \xi_m^2(y_k))\tilde{\varphi}_m(y_k) + \quad (9.31)$$

$$\sum_{n=1}^M \left[\alpha_{mn}(y_k) + \left(i\overline{k}_m - \frac{i}{k_m(\Delta y)^2}\right)\beta_{mn}(y_k) - \frac{\partial}{\partial x}\beta_{mn}(y_k)\right]$$

$$e^{-i(\overline{k}_m - \overline{k}_n)x}\tilde{\varphi}_n(y_k) +$$

$$\sum_{n=1}^M \left(\frac{1}{2\Delta y}\gamma_{mn}(y_k) + \frac{i}{2k_m(\Delta y)^2}\beta_{mn}(y_{k+1})\right)e^{-i(\overline{k}_m-\overline{k}_n)x}\tilde{\varphi}_n(y_{k+1}) +$$

$$\sum_{n=1}^M \left(-\frac{1}{2\Delta y}\gamma_{mn}(y_k) + \frac{i}{2k_m(\Delta y)^2}\beta_{mn}(y_{k-1})\right)e^{-i(\overline{k}_m-\overline{k}_n)x}\tilde{\varphi}_n(y_{k-1}) +$$

$$O((\Delta y)^2).$$

Therefore, neglecting terms of $o(\Delta x(\Delta y)^2)$, we find that $$\tilde{\psi}_m^{(1)}(x_{j+1}, y_k) + (i\Delta x/4)\overline{q}_m(x_{j+1}, y_k) = \quad (9.32)$$

$$\overline{k}_m\tilde{\varphi}_m(x_{j+1}, y_k) + (i\Delta x/4)(\{\xi_m^{(0)}\}^2 - \xi_m^2(x_{j+1}, y_k))\tilde{\varphi}_m(x_{j+1}, y_k) +$$

$$\left(\frac{i}{2} - \frac{\overline{k}_m\Delta x}{4} + \frac{\Delta x}{4k_m(\Delta y)^2}\right)$$

$$\sum_{n=1}^M \beta_{mn}(x_{j+1}, y_k)e^{-i(\overline{k}_m-\overline{k}_n)x_{j+1}}\tilde{\varphi}_n(x_{j+1}, y_k) +$$

$$(i\Delta x/4)\sum_{n=1}^M \left(\alpha_{mn}(x_{j+1}, y_k) - \frac{\partial}{\partial x}\beta_{mn}(x_{j+1}, y_k)\right)$$

$$e^{-i(\overline{k}_m-\overline{k}_n)x_{j+1}}\tilde{\varphi}_n(x_{j+1}, y_k) +$$

$$\sum_{n=1}^M \left(\frac{i\Delta x}{8\Delta y}\gamma_{mn}(x_{j+1}, y_k) - \frac{\Delta x}{8k_m(\Delta y)^2}\beta_{mn}(x_{j+1}, y_{k+1})\right)$$

$$e^{-i(\overline{k}_m-\overline{k}_n)x_{j+1}}\tilde{\varphi}_n(x_{j+1}, y_{k+1}) +$$

$$\sum_{n=1}^M \left(-\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1})\right)$$

$$e^{-i(\overline{k}_m-\overline{k}_n)x_{j+1}}\tilde{\varphi}_n(x_{j+1}, y_{k-1}).$$

Next, we use the constraint that $\overline{\phi}_m = \overline{\phi}_m^{(1)} + \overline{\phi}_m^{(2)}$ to replace the term $k_m\overline{\phi}_m^{(1)}(x_{+1}, y_k)$ on the RHS of eq.(9.32) with $k_m\overline{\phi}_m(x_{+1}, y_k)$ by adding $k_m\overline{\phi}_m^{(2)}(x_{+1}, y_k)$ to each side of this equation. Thus, $$\overline{\psi}_m^{(1)}(x_{j+1},y_k)+(i\Delta x/4)\overline{q}_m(x_{j+1},y_k)=\overline{\psi}_m(x_{j+1}-0,y_k)-k_m\overline{\psi}_m^{(2)}(x_{j+1},y_k) \quad (9.33)$$

where $$\overline{\Psi}_m(x_{j+1}-0, y_k) = [k_m + (i\Delta x/4)(\{\xi_m^{(0)}\}^2 - \xi_m^2(x_{j+1}, y_k))] \quad (9.34)$$

$$\tilde{\varphi}_m(x_{j+1}, y_k) + \left(\frac{i}{2} - \frac{\overline{k}_m\Delta x}{4} + \frac{\Delta x}{4k_m(\Delta y)^2}\right)$$

$$\sum_{n=1}^M \beta_{mn}(x_{j+1}, y_k)e^{-i(\overline{k}_m-\overline{k}_n)x_{j+1}}\tilde{\varphi}_n(x_{j+1}, y_k) +$$

$$(i\Delta x/4)\sum_{n=1}^M \left(\alpha_{mn}(x_{j+1}, y_k) - \frac{\partial}{\partial x}\beta_{mn}(x_{j+1}, y_k)\right)$$

$$e^{-i(\overline{k}_m-\overline{k}_n)x_{j+1}}\tilde{\varphi}_n(x_{j+1}, y_k) +$$

$$\sum_{n=1}^M \left(\frac{i\Delta x}{8\Delta y}\gamma_{mn}(x_{j+1}, y_k) - \frac{\Delta x}{8k_m(\Delta y)^2}\beta_{mn}(x_{j+1}, y_{k+1})\right)$$

$$e^{-i(\overline{k}_m-\overline{k}_n)x_{j+1}}\tilde{\varphi}_n(x_{j+1}, y_{k+1}) +$$

$$\sum_{n=1}^M \left(-\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1})\right)$$

$$e^{-i(\overline{k}_m-\overline{k}_n)x_{j+1}}\tilde{\varphi}_n(x_{j+1}, y_{k-1}).$$

Similarly, and to the same order of approximation, $$\overline{\psi}_m^{(1)}(x_j,y_l)-(i\Delta x/4)\overline{q}_m(x_j,y_l)=\overline{\psi}_m(x_j+0,y_l)-k_m\overline{\psi}_m^{(2)}(x_j,y_l) \quad (9.35)$$

where $$\overline{\Psi}_m(x_j-0, y_l) = [k_m - (i\Delta x/4)(\{\xi_m^{(0)}\}^2 - \xi_m^2(x_j, y_l))]\tilde{\varphi}_m(x_j, y_l) + \quad (9.36)$$

$$\left(\frac{i}{2} + \frac{\overline{k}_m\Delta x}{4} - \frac{\Delta x}{4k_m(\Delta y)^2}\right)$$

$$\sum_{n=1}^M \beta_{mn}(x_j, y_l)e^{-i(\overline{k}_m-\overline{k}_n)x_j}\tilde{\varphi}_n(x_j, y_l) + (i\Delta x/4)$$

$$\sum_{n=1}^M \left(\alpha_{mn}(x_j, y_l) - \frac{\partial}{\partial x}\beta_{mn}(x, y_l)\right)e^{-i(\overline{k}_m-\overline{k}_n)x_{j+1}}\tilde{\varphi}_n(x_j, y_l) +$$

$$\sum_{n=1}^M \left(-\frac{i\Delta x}{8\Delta y}\gamma_{mn}(x_j, y_l) + \frac{\Delta x}{8k_m(\Delta y)^2}\beta_{mn}(x_j, y_{l+1})\right)$$

$$e^{-i(\overline{k}_m-\overline{k}_n)x_j}\tilde{\varphi}_n(x_j, y_{l+1}) +$$

$$\sum_{n=1}^M \left(\frac{i\Delta x}{8\Delta y}\gamma_{mn}(x_j, y_l) - \frac{\Delta x}{8k_m(\Delta y)^2}\beta_{mn}(x_j, y_{l-1})\right)$$

$$e^{-i(\overline{k}_m-\overline{k}_n)x_j}\tilde{\varphi}_n(x_j, y_{l-1}).$$

We shall assume that $\Delta y < W - W_p$. Under this assumption the coupling coefficients $a_{mn}(x,y_k)$, $\beta_{mn}(x,y_k)$ and $\gamma_{mn}(x,y_k)$ vanish for $x > 0$ and $k = 1, N-1$. This eliminates the boundary values $\bar{\sigma}_m(x_{j+1},\pm W)$ from the RHS of eq.(9.34), which makes it possible for us to find the internal values $\bar{\sigma}_m(x_{j+1},y_k)$ (k=1, . . . ,N−1) from this equation. Let us combine eqs.(9.28,9.33,9.35) as follows.

$$\{\bar{\Psi}_m(x_{j+1}-0,y_k)-k_m\bar{\psi}_m^{(2)}(x_{j+1},y_k)\}_{k=0}^N$$
$$=\mathfrak{S}_N^{-1}(\exp\{-i\eta^2\Delta x/2k_m\}\mathfrak{S}_N\{\bar{\Psi}_m(x_j+0,y_l)-k_m\bar{\psi}_m^{(2)}(x_j,y_l)\}_{l=0}^N)$$ (9.37)

If the values $\bar{\psi}_m^{(2)}(x_{j+1},y_k)$(k=1, . . . ,N−1) at the range step $x_{j+1}$ are known, then eqs.(9.34,9.37) determine a system of linear equations for the values $\bar{\psi}_m(x_{j+1},y_k)$(k=1, . . . ,N−1) at the range step $x_{j+1}$. Let us put these equations in matrix form. First, define the column vectors $$\bar{\psi}_k=[\bar{\psi}_1(x_{j+1},y_k), \ldots ,\bar{\psi}_M(x_{j+1},y_k)]^T$$ (9.38)

$$\bar{\Psi}_k^-=[\bar{\Psi}_1(x_{j+1}-0,y_k), \ldots ,\bar{\Psi}_M(x_{j+1}-0,y_k)]^T,$$ (9.39)

for k=1, . . . ,N−1. Next, define the M×M matrices $A_{kk}$ and $A_{kk+1}$ as follows.

$$(A_{kk})_{mn} = \begin{cases} k_n + (i\Delta x/4)(\{\xi_n^{(0)}\}^2 - \xi_n^2(x_{j+1}, y_k) + \alpha_{nn}(x_{j+1}, y_k)), & \text{(if } m = n) \\ \left[\left(\frac{i}{2} - \frac{\bar{k}_m\Delta x}{4} + \frac{\Delta x}{4k_m(\Delta y)^2}\right)\beta_{mn}(x_{j+1}, y_k) + \right. \\ \left.(i\Delta x/4)\left(\alpha_{mn}(x_{j+1}, y_k) - \frac{\partial}{\partial x}\beta_{mn}(x_{j+1}, y_k)\right)\right]e^{-i(\bar{k}_m-\bar{k}_n)x_{j+1}}, & \text{(if } m \neq n) \end{cases}$$ (9.40)

$$(A_{kk\pm1})_{mn} = \left(\pm\frac{i\Delta x}{8\Delta y}\gamma_{mn}(x_{j+1}, y_k) - \frac{\Delta x}{8k_m(\Delta y)^2}\beta_{mn}(x_{j+1}, y_{k\pm1})\right)e^{-i(\bar{k}_m-\bar{k}_n)x_{j+1}}.$$ (9.41)

The assumption that $\Delta y < W-W_p$ eliminates the boundary values $\bar{\psi}_m(x_{j+1}, \pm W)$ from the RHS of eq.(9.34). Thus, it follows from this equation that $$\begin{bmatrix} A_{11} & A_{12} \\ A_{21} & A_{22} & A_{23} \\ & \ddots & \ddots & \ddots \\ & & A_{N-2N-3} & A_{N-2N-2} & A_{N-2N-1} \\ & & & A_{N-1N-2} & A_{N-1N-1} \end{bmatrix} \cdot \begin{bmatrix} \bar{\varphi}_1 \\ \bar{\varphi}_2 \\ \vdots \\ \bar{\varphi}_{N-2} \\ \bar{\varphi}_{N-1} \end{bmatrix} = \begin{bmatrix} \Psi_1^- \\ \Psi_2^- \\ \vdots \\ \Psi_{N-2}^- \\ \Psi_{N-1}^- \end{bmatrix}.$$ (9.42)

If we use eq.(9.37) and the values $\bar{\psi}_m^{(2)}(x_{j+1},y_k)$(k=1, . . . , N−1) to evaluate the vectors $\bar{\Psi}_k^-$ on the RHS of this equation, then we can solve it for the internal solution vectors $\bar{\psi}_k$.

We can solve eq.(9.42) numerically by Gaussian elimination with partial pivoting (GEPP) followed by one round of iterative refinement. The block tri-diagonal system matrix on the LHS of eq.(9.42) is also a band matrix of order M(N−1) that has 2M−1 lower diagonals and 2M−1 upper diagonals. Since M<<N in practice, it is most efficient to do the GEPP computations with subroutines that take advantage of band storage.

The system matrix on the LHS of eq. (9.42) is nonsingular if it is strictly diagonally dominant by columns. We see from eqs.(9.40,9.41) that this condition requires the following strict inequalities to be satisfied for the block indices k=1, . . . ,N−1:

$$|k_n+(i\Delta x/4)(\{\xi_n^{(0)}\}^2-\xi_n^2(x_{j+1}y_k)+a_{nn}(x_{j+1},y_k))|$$

$$|k_n + (i\Delta x/4)(\{\xi_n^{(0)}\}^2 - \xi_n^2(x_{j+1}, y_k) + \alpha_{nn}(x_{j+1}, y_k))| >$$ (9.43)

$$\sum_{\substack{m=1 \\ (m\neq n)}}^M \left|\left(\frac{i}{2} - \frac{\bar{k}_m\Delta x}{4} + \frac{\Delta x}{4k_m(\Delta y)^2}\right)\beta_{mn}(x_{j+1}, y_k) + \right.$$
$$\left.(i\Delta x/4)\left(\alpha_{mn}(x_{j+1}, y_k) - \frac{\partial}{\partial x}\beta_{mn}(x_{j+1}, y_k)\right)\right| +$$

$$\sum_{m=1}^M \left|\frac{i\Delta x}{8\Delta y}\gamma_{mn}(x_{j+1}, y_{k-1}) - \frac{\Delta x}{8k_m(\Delta y)^2}\beta_{mn}(x_{j+1}, y_k)\right| +$$

$$\sum_{m=1}^M \left|-\frac{i\Delta x}{8\Delta y}\gamma_{mn}(x_{j+1}, y_{k+1}) - \frac{\Delta x}{8k_m(\Delta y)^2}\beta_{mn}(x_{j+1}, y_k)\right|$$

for n = 1, . . . , M.

for n=1, . . . ,M. (9.43)

If this condition is satisfied, then Gaussian elimination requires no pivoting and is stable.

Note the factors $\bar{k}_m\Delta x$, $\Delta x/\Delta y$ and $\Delta x/k_m(\Delta y)^2$ that appear in this equation. We recommend choosing the increments $\Delta x$ and $\Delta y$ so that $k_m\Delta x \leq o(1)$ and $k_m\Delta y \geq o(1)$. These restrictions imply that the ratios $\Delta x/\Delta y$ and $\Delta x/k_m(\Delta y)^2$ are at most $o(1)$.

If $\Delta y < W-W_p$, then we can find the boundary values $\bar{\psi}_m^{(1)}(x_{j+1},\pm W)$ of the primary component from eq.(9.37) without the values $\bar{\psi}_m^{(2)}(x_{j+1},y_k)$. In this case, it follows from eq.(9.32) that $\bar{\psi}_m^{(1)}(x_{j+1},\pm W)+(i\Delta x/4)\bar{q}_m(x_{j+1},\pm W)=k_m\bar{\psi}_m^{(1)}(x_{j+1},\pm W)$. Thus, eqs.(9.33,9.37) imply that $$k_m\bar{\psi}_m^{(1)}(x_{j+1}, \pm W) =$$ (9.44)
$$\mathfrak{F}_N^{-1}\left(\exp\{-i\eta^2\Delta x/2k_m\}\mathfrak{F}_N\{\Psi_m(x_j+0, y_l) - k_m\tilde{\psi}_m^{(2)}(x_j, y_l)\}_{l=0}^N\right).$$
$$\substack{(y_l=\pm w)}$$

Note that it is not necessary to compute the whole inverse DFT to evaluate the RHS of this equation because we need only the values from the inverse DFT at the endpoints $y_k=\pm W$.

This completes our development of the discrete form of problem I and the method for solving it. Next, we develop a discrete form of problem II. We begin by integrating eq.(9.13) from $x=x_j$ to $x=x_{j+1}$ with the trapezoidal rule. Dropping the $o((\Delta x)^3)$ remainder in this approximation, we get the semi-discrete parabolic equation $$\tilde{\varphi}_m^{(2)}(x_{j+1}, y) - \tilde{\varphi}_m^{(2)}(x_j, y) =$$ (9.45)
$$(i\Delta x/4k_m)\left[\frac{\partial^2}{\partial y^2}\tilde{\varphi}_m^{(2)}(x_j, y) + \frac{\partial^2}{\partial y^2}\tilde{\varphi}_m^{(2)}(x_{j+1}, y)\right] \text{ for } |y| \leq W.$$

We adopt conditions (9.14,9.15) without change. In particular, we require that the inhomogeneous Neumann boundary conditions (9.15) be satisfied at each range step.

$$\frac{\partial}{\partial y}\tilde{\varphi}_m^{(2)}(x_{j+1}, \pm W) = \frac{\partial}{\partial y}\tilde{\varphi}_m(x_{j+1}, \pm W). \qquad (9.46)$$

In order to formulate transparent boundary conditions for the discretized amplitude $\overline{\psi}_m$, we assume that it satisfies the semi-discrete parabolic equation that corresponds to eq. (9.6).

$$\tilde{\varphi}_m(x_{j+1}, y) - \tilde{\varphi}_m(x_j, y) = \qquad (9.47)$$

$$(i\Delta x/4k_m)\left[\frac{\partial}{\partial y^2}\tilde{\varphi}_m(x_j, y) + \frac{\partial^2}{\partial y^2}\tilde{\varphi}_m(x_{j+1}, y)\right] \text{ for } |y| > W_p.$$

Under this assumption, the discretized amplitude $\overline{\psi}_m$ satisfies discrete transparent boundary conditions like eq.(6.31). We can adapt the algorithm described by eqs.(6.26–6.30) to formulate these conditions as follows.

$$\tilde{\varphi}_m(x_{j+1}, \pm W) \pm \frac{1}{p_m}\frac{\partial}{\partial y}\tilde{\varphi}_m(x_{j+1}, \pm W) = \qquad (9.48)$$

$$2p_m \sum_{k=0}^{j}(-1)^{j-k}a_{k+1,m}^k(\pm W) \text{ for } j = 0, 1\ldots ,$$

where $$p_m = e^{-i\pi/4} 2(k_m/\Delta x)^{1/2} \qquad (9.49)$$

and the coefficients $a_{k+1,m}^k(\pm W)$ are computed recursively. First, $a_{1,m}^0(\pm W)=0$. Second, for $j=1,2,\ldots$, $$a_{k,m}^j(\pm W) = -\frac{1}{2}a_{k,m}^{j-1}(\pm W) - \frac{1}{2}a_{k-2,m}^{j-1}(\pm W), \text{ for } \underline{(k=1,\ldots,j-1)}, \qquad (9.50)$$
$$\phantom{xxxxxxxxxxxxxxxxxxxxxxxxxxxxxxxxxx}\text{Skip this when } j=1.$$

$$a_{j,m}^j(\pm W) = \pm\frac{1}{2}p_m^{-2}\left[\frac{\partial}{\partial y}\tilde{\varphi}_m(x_{j-1}, \pm W) + \frac{\partial}{\partial y}\tilde{\varphi}_m(x_j, \pm W)\right] - \qquad (9.51)$$

$$a_{j,m}^{j-1}(\pm W) - \frac{1}{2}a_{j-2,m}^{j-1}(\pm W),$$

$$a_{j+1,m}^j(\pm W) = \qquad (9.52)$$

$$\mp\frac{1}{2}p_m^{-2}\left[\frac{\partial}{\partial y}\tilde{\varphi}_m(x_{j-1}, \pm W) + \frac{\partial}{\partial y}\tilde{\varphi}_m(x_j, \pm W)\right] - \frac{1}{2}a_{j-1,m}^{j-1}(\pm W),$$

where $$a_{-1,m}^j(\pm W)=0, a_{0,m}^j(\pm W)=0 \text{ for } j=0,1,\ldots \qquad (9.53)$$

Now we combine the constraints $\overline{\psi}_m(x_{j+1},\pm W)=\overline{\psi}_m^{(1)}(x_{j+1},\pm W)+\overline{\psi}_m^{(2)}(x_{j+1},\pm W)$ and eq.(9.49) with eq.(9.48) to develop new boundary conditions for $\overline{\psi}_m^{(2)}$. Note that the boundary values of the primary component $\overline{\psi}_m^{(1)}$ appear as source terms in these conditions.

$$\tilde{\varphi}_m^{(2)}(x_{j+1}, \pm W) \pm \frac{1}{p_m}\frac{\partial}{\partial y}\tilde{\varphi}_m^{(2)}(x_{j+1}, \pm W) = \qquad (9.54)$$

$$-\tilde{\varphi}_m^{(1)}(x_{j+1}, \pm W) + 2p_m\sum_{k=0}^{j}(-1)^{j-k}a_{k+1,m}^k(\pm W) \text{ for } j = 0, 1, \ldots .$$

We also combine condition (9.46) with recursion formulas (9.51,9.52) to reformulate them in terms of $\overline{104}_m^{(2)}$.

$$a_{j,m}^j(\pm W) = \pm\frac{1}{2}p_m^{-2}\left[\frac{\partial}{\partial y}\tilde{\varphi}_m^{(2)}(x_{j-1}, \pm W) + \frac{\partial}{\partial y}\tilde{\varphi}_m^{(2)}(x_j, \pm W)\right] - \qquad (9.55)$$

$$a_{j,m}^{j-1}(\pm W) - \frac{1}{2}a_{j-2,m}^{j-1}(\pm W),$$

$$a_{j+1,m}^j(\pm W) = \qquad (9.56)$$

$$\mp\frac{1}{2}p_m^{-2}\left[\frac{\partial}{\partial y}\tilde{\varphi}_m^{(2)}(x_{j-1}, \pm W) + \frac{\partial}{\partial y}\tilde{\varphi}_m^{(2)}(x_j, \pm W)\right] - \frac{1}{2}a_{j-1,m}^{j-1}(\pm W).$$

Therefore, in principle the discrete form of problem II consists of
  (1) the semi-discrete parabolic equation (9.45), subject to
  (2) the initial condition (9.14), and
  (3) the boundary conditions (9.54), with
  (4) the recursion formulas (9.50,9.53,9.55,9.56).

However, in practice we would use the fixed-length truncated algorithm described by eqs.(6.72–6.76) to evaluate the boundary conditions for this problem. Let $L_J$ denote the length of the algorithm, which could be chosen according to criterion. (6.82) for calculations in double-precision arithmetic. First, we use eq.(6.78) to modify the boundary conditions (9.54) as follows.

$$\tilde{\varphi}_m^{(2)}(x_{j+1}, \pm W) \pm \frac{1}{p_m}\frac{\partial}{\partial y}\tilde{\varphi}_m^{(2)}(x_{j+1}, \pm W) = \qquad (9.57)$$

$$-\tilde{\varphi}_m^{(1)}(x_{j+1}, \pm W) + 2p_m\sum_{k=0}^{j}(-1)^{j-k}a_{L_J,m}^k(\pm W) \text{ for } j = 0, 1, \ldots .$$

Second, we use eqs.(6.72–6.76) to replace eqs.(9.50,9.53, 9.55,9.56) with the following recursion equations for the coefficients $a_{L_J,m}^k(\pm W)$.

$$a_{l,m}^j(\pm W) = -\frac{1}{2}a_{l+1,m}^{j-1}(\pm W) - \frac{1}{2}a_{l-1,m}^{j-1}(\pm W) \qquad (9.58)$$

for $l = 1, \ldots, L_J - 2$, $$a_{L_J-1,m}^j(\pm W) = \qquad (9.59)$$

$$\pm\frac{1}{2}p_m^{-2}\left[\frac{\partial}{\partial y}\tilde{\varphi}_m^{(2)}(x_{j-1}, \pm W) + \frac{\partial}{\partial y}\tilde{\varphi}_m^{(2)}(x_j, \pm W)\right] -$$

$$a_{L_J,m}^{-1}(\pm W) - \frac{1}{2}a_{L_J-2,m}^{j-1}(\pm W),$$

$$a_{L_J,m}^j(\pm W) = \qquad (9.60)$$

$$\mp\frac{1}{2}p_m^{-2}\left[\frac{\partial}{\partial y}\tilde{\varphi}_m^{(2)}(x_{j-1}, \pm W) + \frac{\partial}{\partial y}\tilde{\varphi}_m^{(2)}(x_j, \pm W)\right] -$$

$$\frac{1}{2}a_{L_J-1,m}^{j-1}(\pm W),$$

where $$a_{l,m}^0(\pm W)=0 \text{ for } l=1, \ldots, L_J, a_{0,m}^j(\pm W)=0 \text{ for } j=0,1, \ldots \qquad (9.61)$$

This completes the development of the discrete form of problem II. A sufficient condition for it to be stable is that $$\frac{\Delta x}{k_0(\Delta y)^2} < \frac{2}{\pi}, \qquad (9.62)$$

where $k_0 = \min k_m(m=1, \ldots, M)$. Numerical integration of eq.(9.45) can introduce numerical artifacts in the solutions of the discrete form of problem II. However, these artifacts will be suppressed if the spatial frequency limit of the integration method does not exceed the following bound.

$$\lambda_c = 3^{-1/4} 2(k_0/\Delta x)^{1/2}. \qquad (9.63)$$

This criterion imposes a simple constraint on the N-th order Chebyshev tau integration method. Since the spatial frequency limit of the N-th order Chebyshev tau integration method is $2/\Delta y$, this limit is less than $\lambda_c$ if $$\frac{\Delta x}{k_0(\Delta y)^2} < 3^{-1/2}. \tag{9.64}$$

This condition is only slightly more restrictive than condition (9.62).

Figure 4:
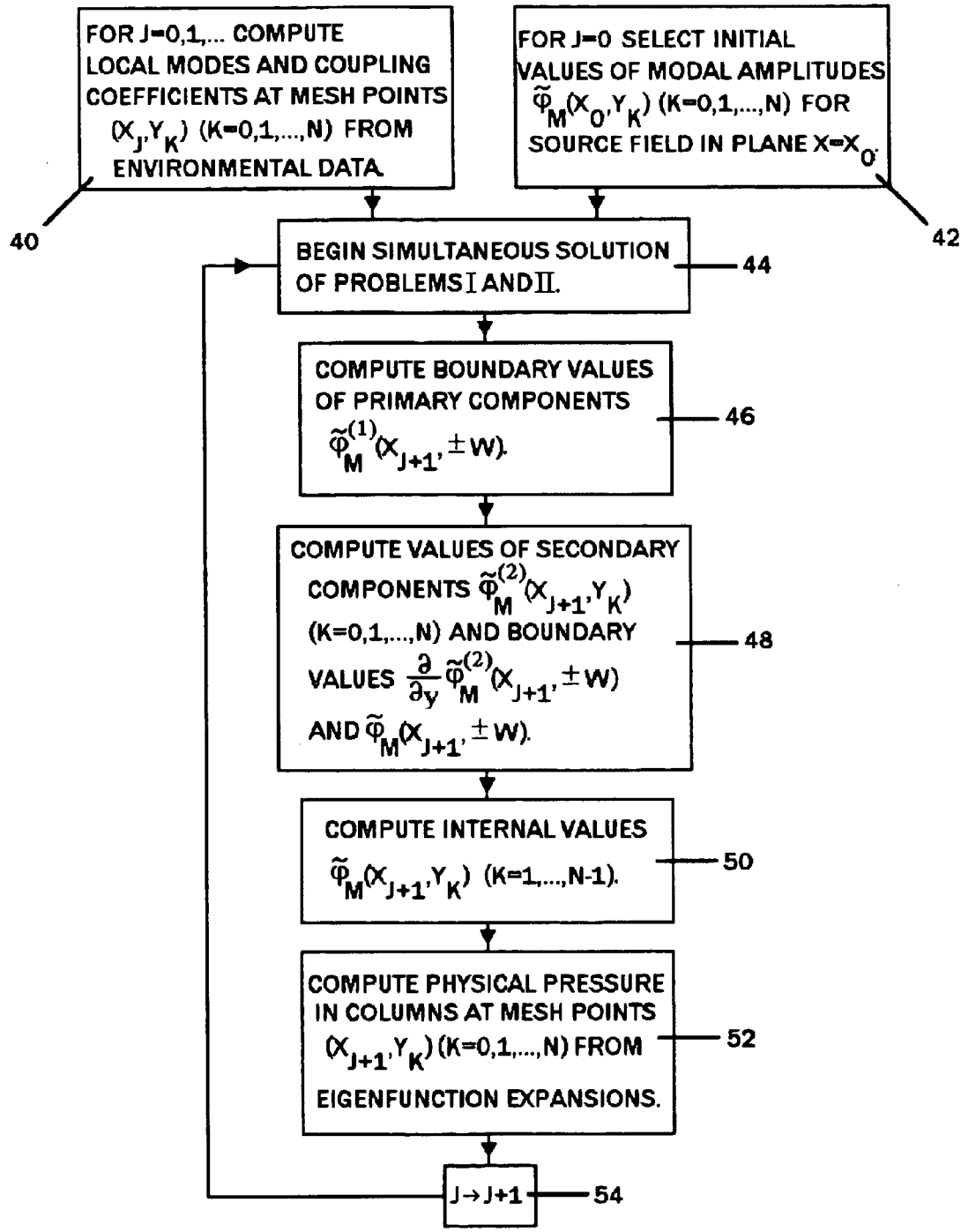
FIG. 4 shows a flowchart for the preferred embodiment of the method of the invention.
Figure 1:
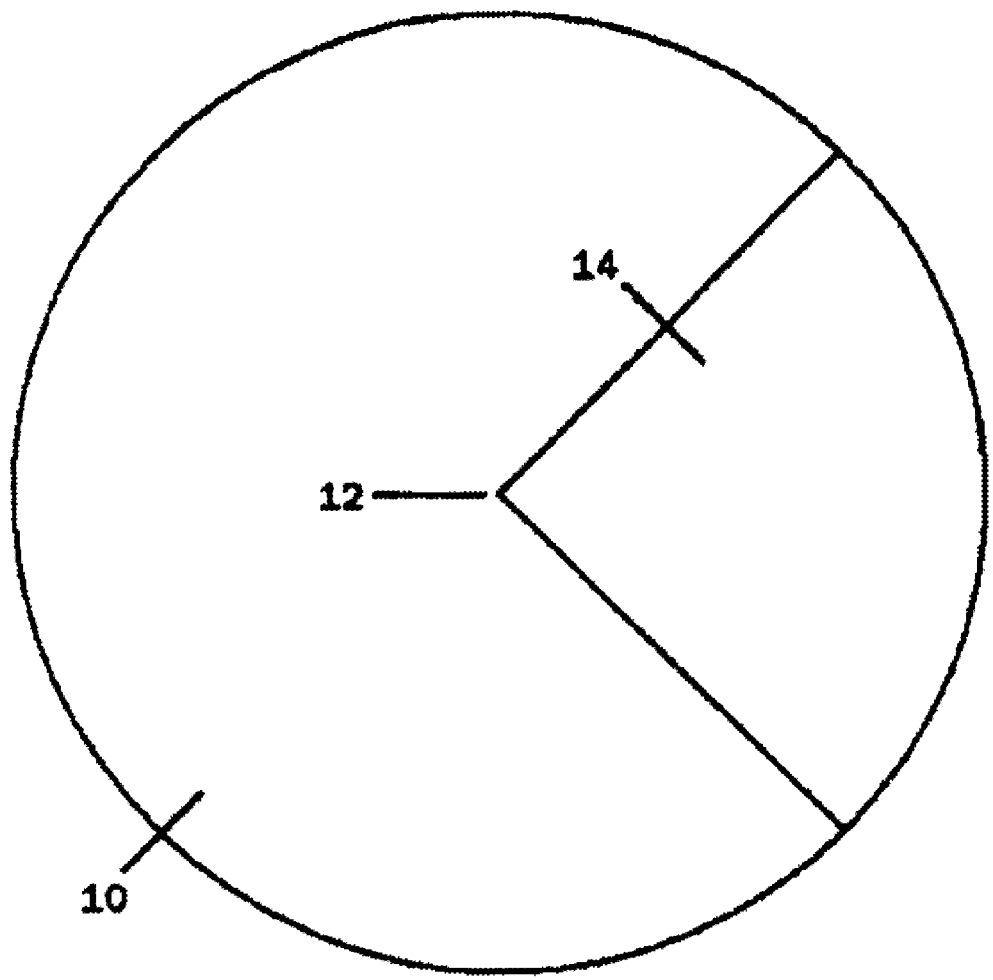
Figure 2:
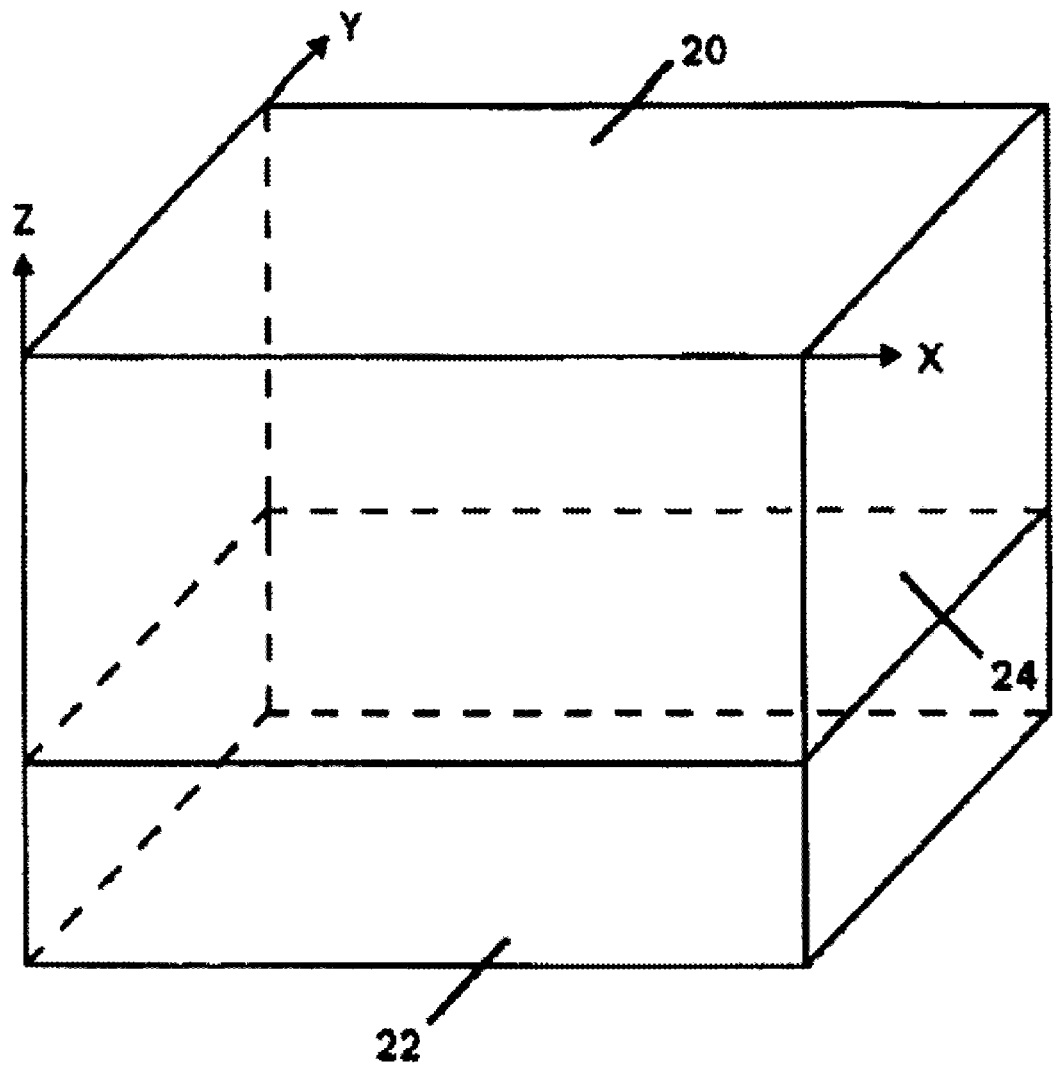
Figure 3:
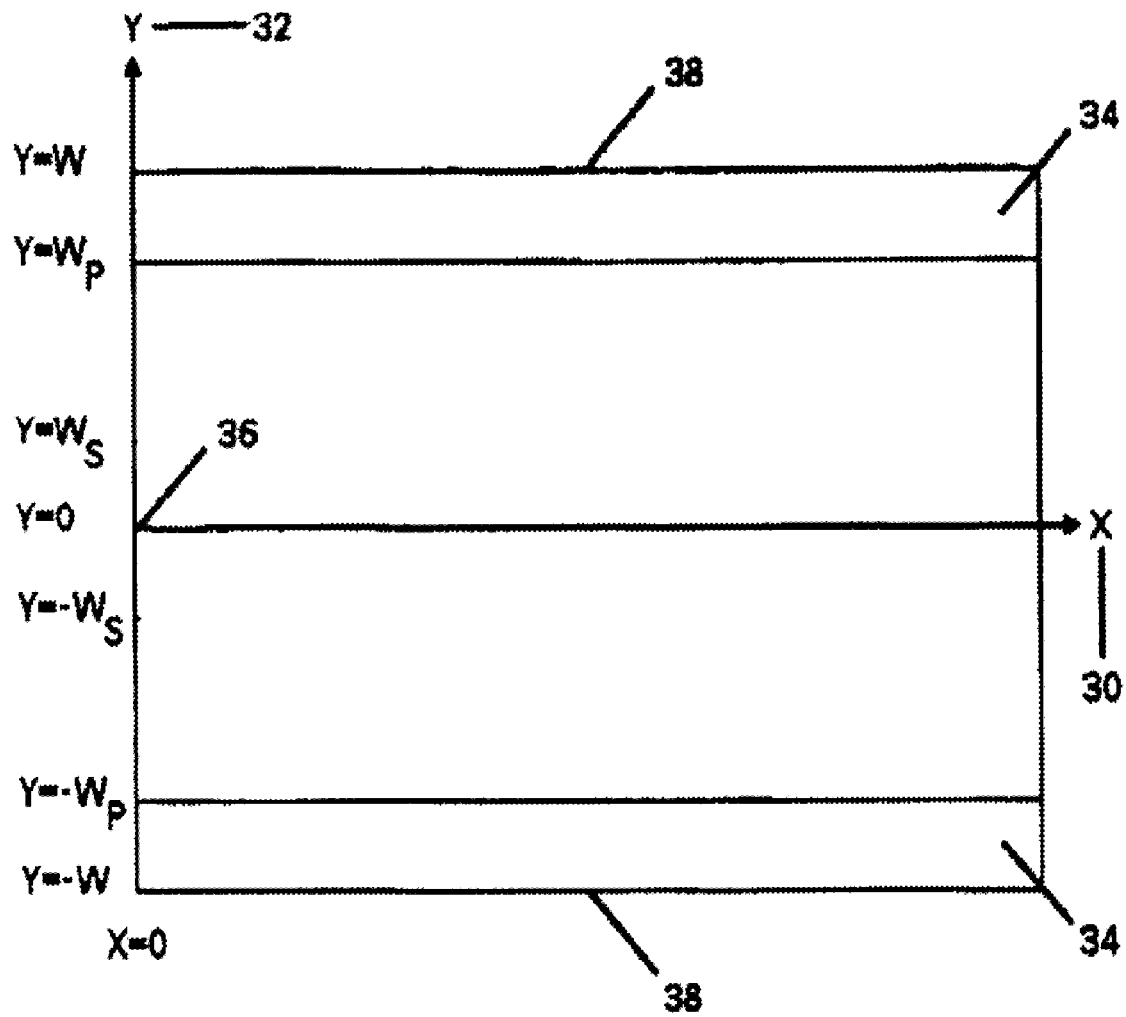
Figure 4:
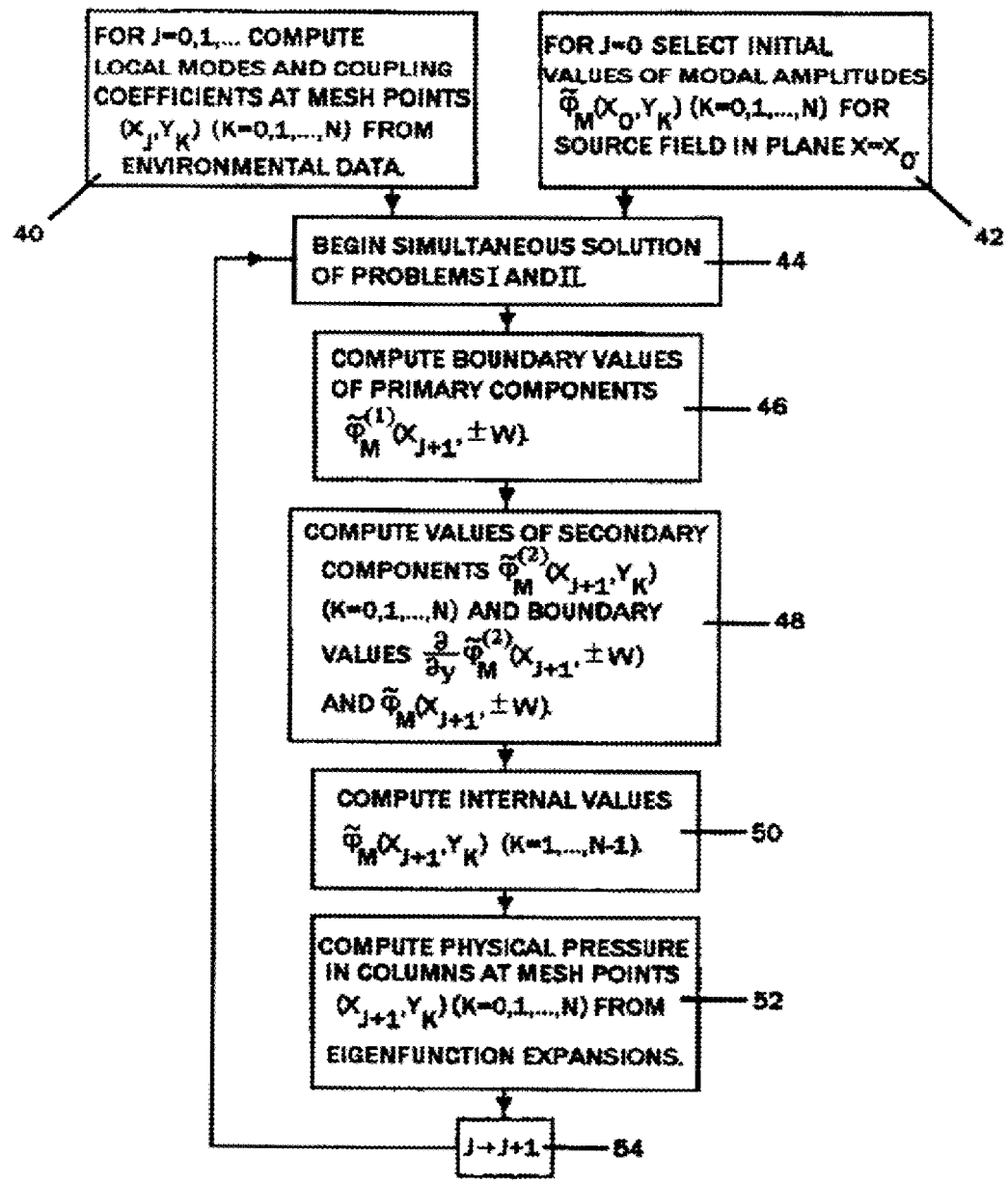
Figure 1:
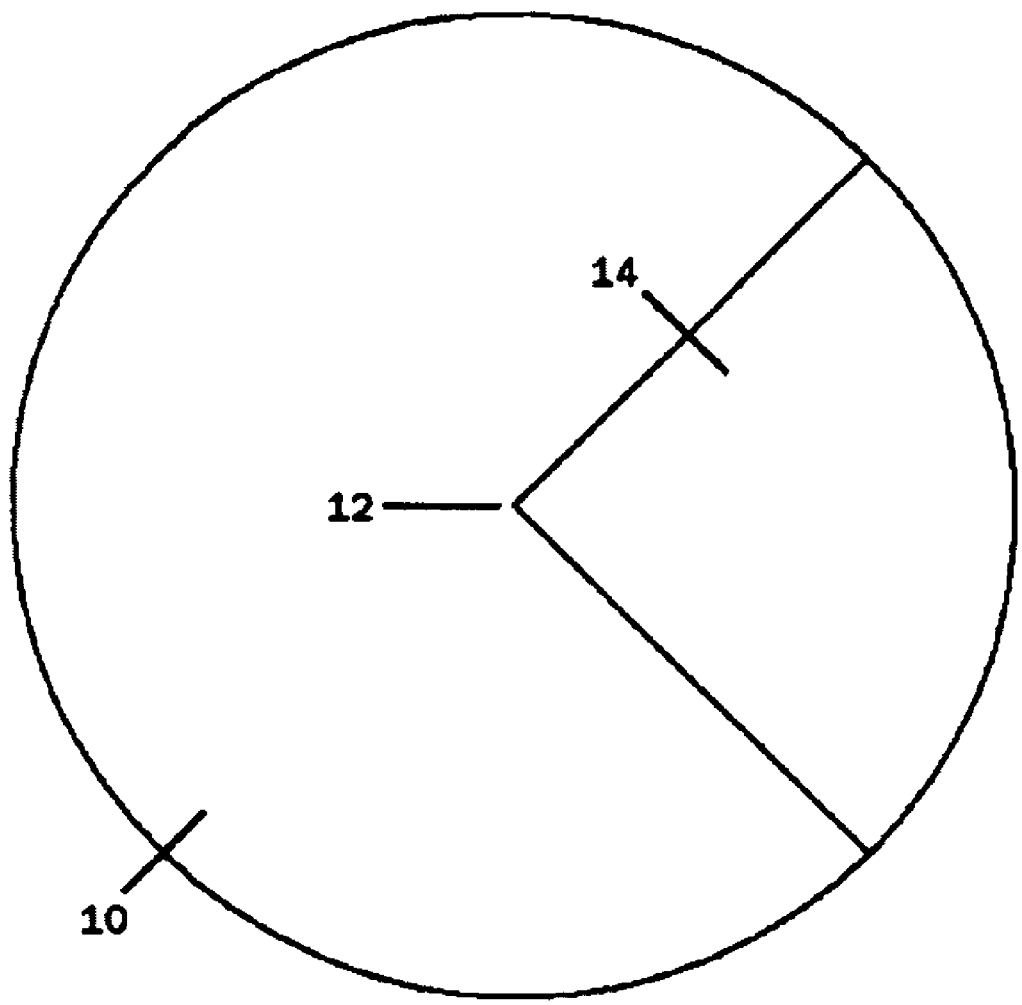
Figure 2:
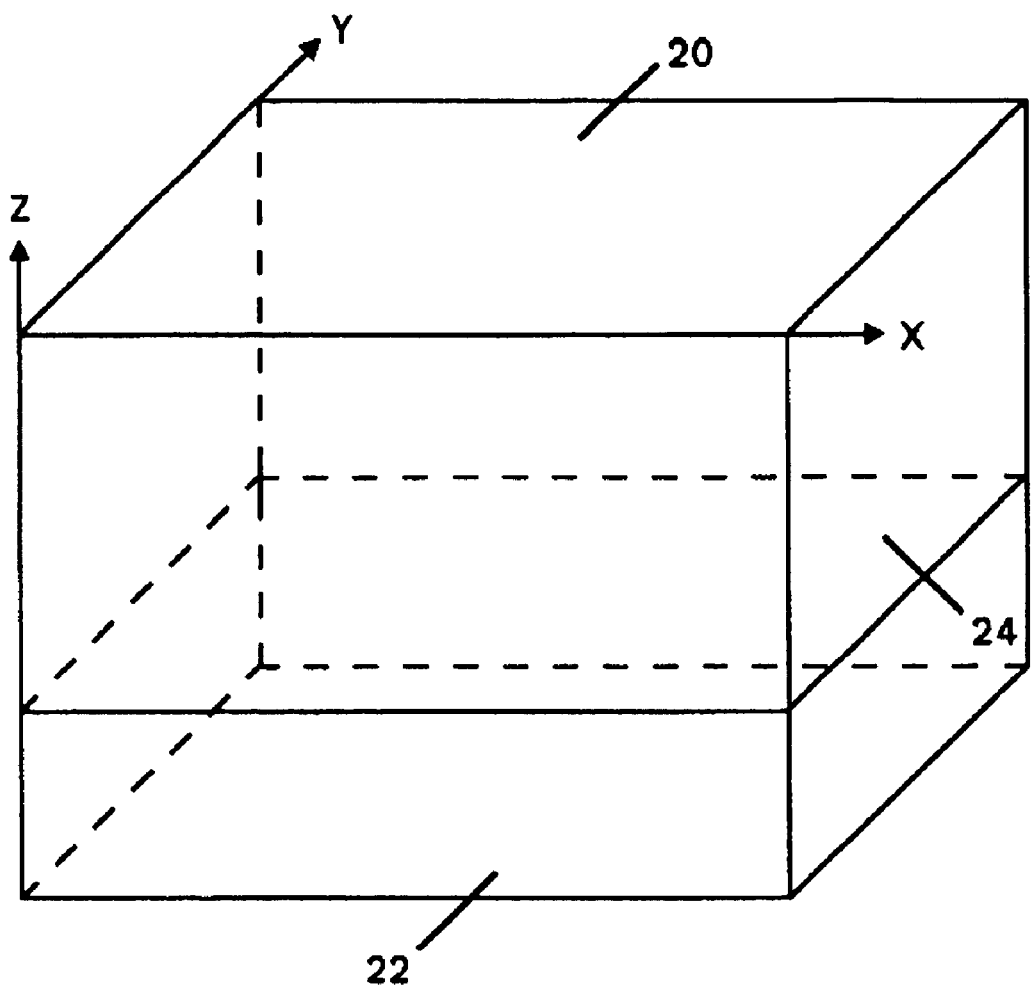
Figure 3:
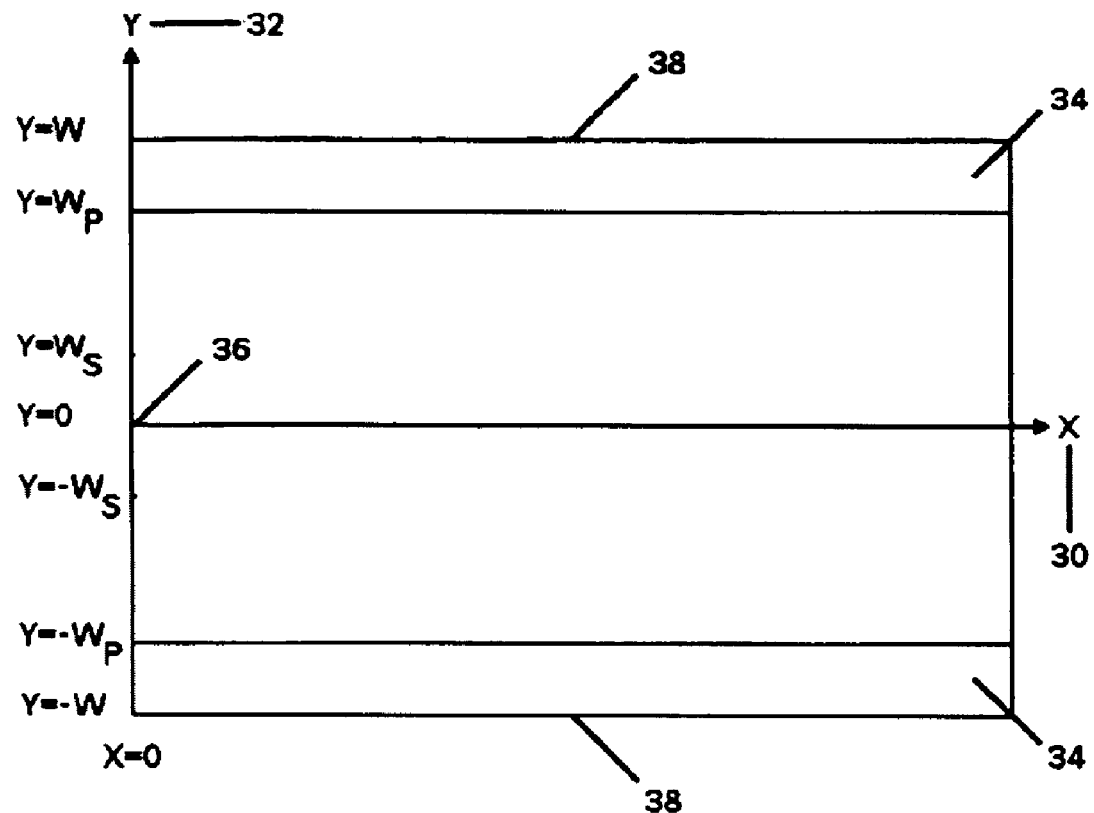
Figure 4:
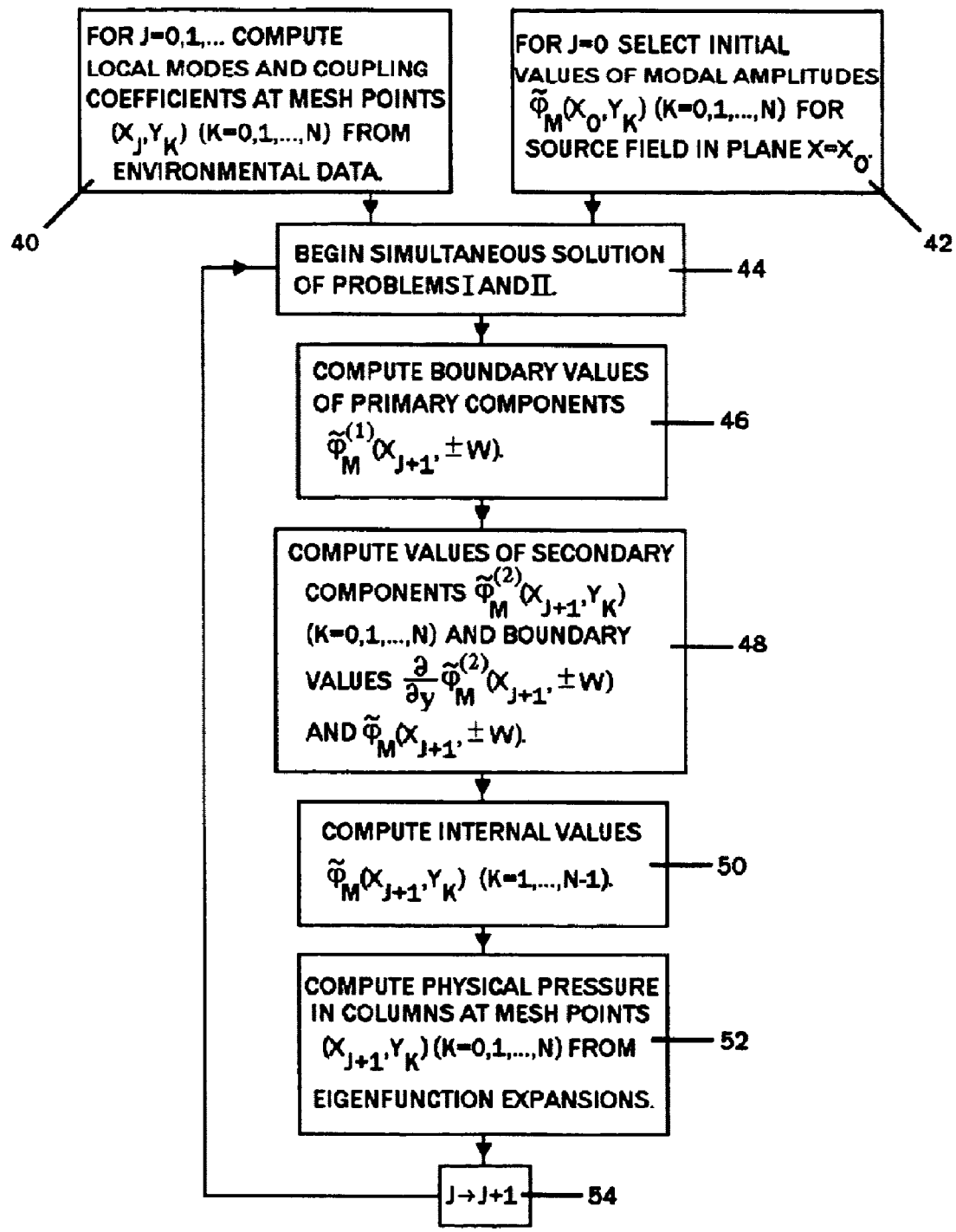

Referring now to FIG. 4, we outline the operation of the preferred embodiment. We begin the process in block 40 by computing the modal wavenumbers and the coupling coefficients at the mesh points $(x_j,y_k)(k=0,1,\ldots,N)$ from environmental data. They can be computed for all $j=0,1,\ldots$ and stored for subsequent use or computed as needed, beginning at $j=0$. In block 42 we select the initial values $\overline{\psi}_m(x_0,y_k)(j=0$ and $k=0,1,\ldots,N)$ for the source field in the waveguide at the plane $x=x_0$. Now we go to block 44. This block is the start of the general cycle of steps for solving problems I and II simultaneously. We must compute the values $\overline{\psi}_m(x_{j+1},y_k)$ and $\overline{\psi}_m^{(2)}(x_{j+1},y_k)$ for $m=1,\ldots,M$ and $k=0,1,\ldots,N$ at an arbitrary range step $x_j+1$ from the values $\overline{\psi}_m(x_j,y_k)$ and $\overline{\psi}_m^{(2)}(x_j,y_l)$ for $m=1,\ldots,M$ and $l=0,1,\ldots,N$ at the preceding range step $x_j$.

(1) In block 46, for each m we compute the boundary values $\overline{\psi}_m^{(1)}(x_{j+1},\pm W)$ of the primary component from eq. (9.44). These values are used in the next step.

(2) In block 48, for each m we integrate the semi-discrete parabolic equation (9.45) subject to the boundary conditions (9.57), which we evaluate with eqs.(9.58–9.61). We use the Chebyshev tau method to do the integration numerically. This method transforms the integration to an algebraic problem for the Chebyshev coefficients of $\overline{\psi}_m^{(2)}(x_{j+1},y)$ that we solve with the BEC algorithm. It is then necessary to compute the values $\overline{\psi}_m^{(2)}(x_{j+1},y_k)$ for $k=0,1,\ldots,N$ from these coefficients. Depending on the size of N, we use either Clenshaw's algorithm or an alternative algorithm to compute them. We use the internal values $\overline{\psi}_m^{(2)}(x_{j+1},y_k)$ ($k=1,\ldots,N-1$) in the next step. We compute the differential boundary values $\partial\overline{\psi}_m^{(1)}(x_{j+1},\pm W)/\partial y$ and save them for use by eqs.(9.59,9.60) at the following two range steps, $x_{j+2}$ and $x_{j+3}$. Having found $\overline{\psi}_m^{(1)}(x_{j+1},\pm W)$ in the previous step and $\overline{\psi}_m^{(2)}(x_{j+1},\pm W)$ in the present step, we compute the boundary values $\overline{\psi}_m(x_{j+1},\pm W)$ from the constraints that $\overline{\psi}_m(x_{j+1},\pm W)=\overline{\psi}_m^{(1)}(x_{j+1},\pm W)+\overline{\psi}_m^{(2)}(x_{j+1},\pm W)$.

(3) In block 50, we solve eq.(9.42) numerically by GEPP for the internal values $\overline{\psi}_m(x_{j+1},y_k)$ ($k=1,\ldots,N-1$). This completes the general cycle of steps for solving problems I and II.

In block 52 we use the modal amplitudes to evaluate the eigenfunction expansion of the complex pressure at desired depths in the waveguide at range $x_{j+1}$ and cross ranges $y_k(k=0,1,\ldots,N)$. We predict the physical acoustic pressure from these computations. Finally, we increase j to j+1 in block 54 and return to block 44 for the next cycle of computations. This completes the outline.

The discretized solutions $\overline{\psi}_m$ turn out to be inaccurate at very large range from the source due to small inaccuracies in the discretized solutions $\overline{\psi}_m^{(2)}$. However, an extrapolation method can be applied to the discretized solutions $\overline{\psi}_m^{(2)}$ to compensate for the inaccuracies in them under conditions of practical interest. Before describing this method, let us modify the notation for these solutions to indicate their dependence on the increment $\Delta x$.

$$\overline{\psi}_m^{(2)}(x_j,y) \to \overline{\psi}_m^{(2)}(x_j,y;\Delta x) \tag{9.65}$$

A simple way to improve the accuracy of these approximations is to reduce the step size $\Delta x$. Since they are even functions of $\Delta x$, it is efficient to combine this approach with Richardson extrapolation.

We shall discuss a procedure that uses Richardson extrapolation to estimate $\overline{\psi}_m^{(2)}(x_j,y)$ from the computed values of $\overline{\psi}_m^{(2)}(x_j,y;\Delta x/\upsilon)$ for $\upsilon=1,2,3,4$ if $\Delta x=o(\pi/k_0)$. First, we introduce some new notation. Define the interpolated range steps $x_\mu^{(\upsilon)}$ as follows.

$$x_\mu^{(\upsilon)}=\mu\Delta x/\upsilon \text{ for } \mu=1,2,\ldots \text{ and } \upsilon=1,2,\ldots \tag{9.66}$$

Note that $x_{\upsilon j}^{(\upsilon)}=x_j$ for all j and $\upsilon$.

The procedure requires that the discrete form of problem II be solved four times over each interval $x_j \leq x \leq x_{j+1}$ using fractional steps $\Delta x/\upsilon$ for $\upsilon=1,2,3,4$. For each $\upsilon$ we must replace $\Delta x$ in eqs.(9.45,9.49) with $\Delta x/\upsilon$ and solve this problem at the interpolated range steps $x_{\upsilon j+\mu}^{(\upsilon)}$ for $\mu=1,\ldots,\upsilon$. If we use the Chebyshev tau method to do the cross range integration in eq.(9.45), then we can do these calculations in terms of the Chebyshev expansion coefficients of the solutions $\overline{\psi}_m^{(2)}(x_{\upsilon j+\mu}^{(\upsilon)},y;\Delta x/\upsilon)$ without having to evaluate the solutions at any cross range y. These solutions require ten times as much work to compute as $\overline{\psi}_m^{(2)}(x_{j+1},y;\Delta x)$ alone, but this computational expense can be justified by the great increase in range over which the extrapolated solutions are accurate.

We denote these estimates by $\mathfrak{R}_{\Delta x}^{(4)} \circ \overline{\psi}_m^{(2)}(x_{j+1},y)$. They are computed as follows.

$$\mathfrak{R}_{\Delta x}^{(4)} \circ \overline{\psi}_m^{(2)}(x_{j+1},y)=[8195\overline{\psi}_m^{(2)}(x_{j+1},y;\Delta x/4)-6561\overline{\psi}_m^{(2)}(x_{j+1},y;\Delta x/3)$$
$$+896\overline{\psi}_m^{(2)}(x_{j+1},y;\Delta x/2)-7\overline{\psi}_m^{(2)}(x_{j+1},y;\Delta x)]/2520 \tag{9.67}$$

In the modified solution method $\overline{\psi}_m^{(2)}$ is replaced by $\mathfrak{R}_{\Delta x}^{(4)} \circ \overline{\psi}_m^{(2)}$. Thus, we use the modified solution method to find the values $\overline{\psi}_m(x_{j+1},y_k)$ and the extrapolates $\mathfrak{R}_{\Delta x}^{(4)} \circ \overline{\psi}_m^{(2)}(x_{j+1},y_k)$ for $m=1,\ldots,M$ and $k=0,1,\ldots,N$ from the values $\overline{\psi}_m(x_j,y_l)$ and from the extrapolates $\mathfrak{R}_{\Delta x}^{(4)} \circ \overline{\psi}_m^{(2)}(x_j,y_l)$ for $m=1,\ldots,M$ and $l=0,1,\ldots,N$. These quantities are related by eq. (9.37) after we have replaced $\overline{\psi}_m^{(2)}$ with $\mathfrak{R}_{\Delta x}^{(4)} \circ \overline{\psi}_m^{(2)}$ in it.

$$\{\overline{\Psi}_m(x_{j+1}-0,y_k)-k_m\mathfrak{R}_{\Delta x}^{(4)}\circ\overline{\psi}_m^{(2)}(x_{j+1},y_k)\}_{k=0}^N$$
$$=\mathfrak{J}_N^{-1}(\exp\{-i\eta^2\Delta x/2k_m\}\mathfrak{J}_N\{\overline{\Psi}_m(x_j+0,y_l)-k_m\mathfrak{R}_{\Delta x}^{(4)}\circ$$
$$\overline{\psi}_m^{(2)}(x_j,y_l)\}_{l=0}^N). \tag{9.68}$$

We also need the boundary values $\overline{\psi}_m^{(1)}(x_{\upsilon j+\mu}^{(\upsilon)},\pm W)$ at the interpolated range steps to evaluate the boundary conditions that are satisfied by the solutions $\overline{\psi}_m^{(2)}(x_{\upsilon j+\mu}^{(\upsilon)},y;\Delta x/\upsilon)$. We compute them by replacing $\Delta x$ with $\mu\Delta x/\upsilon$ in eq.(9.44). Thus, for $\mu=1,\ldots,\upsilon$, $$k_m\tilde{\varphi}_m^{(1)}(x_{\upsilon j+\mu}^{(\upsilon)},\pm W)=\mathfrak{F}_N^{-1}\atop{(y_k=\pm W)}(\exp\{-i\eta^2\mu\Delta x/\upsilon 2k_m\} \tag{9.69}$$
$$\mathfrak{F}_N\{\Psi_m(x_j+0,y_l)-k_m\mathfrak{R}_{\Delta x}^{(4)}\circ\tilde{\varphi}_m^{(2)}(x_j,y_l)\}_{l=0}^N).$$

Note that it is not necessary to compute the whole inverse DFT to evaluate the RHS of this equation because we need only the values from the inverse DFT at the endpoints $y_k=\pm W$.

In medium range applications, the lower order Richardson extrapolates $$\mathfrak{R}_{\Delta x}^{(2)}\circ\overline{\psi}_m^{(2)}(x_{j+1},y)=[4\overline{\psi}_m^{(2)}(x_{j+1},y;\Delta x/2)-\overline{\psi}_m^{(2)}(x_{j+1},y;\Delta x)]/3 \tag{9.70}$$
$$\mathfrak{R}_{\Delta x}^{(3)}\circ\overline{\psi}_m^{(2)}(x_{j+1},y)=[243\overline{\psi}_m^{(2)}(x_{j+1},y;\Delta x/3)-128\overline{\psi}_m^{(2)}(x_{j+1},y;\Delta x/2)+5\overline{\psi}_m^{(2)}(x_{j+1},y;\Delta x)]/120 \tag{9.71}$$

can be used in place of $\mathfrak{R}_{\Delta x}^{(4)} \circ \overline{\psi}_m^{(2)}(x_{j+1},y)$ to reduce the computational cost of the procedure.

10. Ramifications.

Many modifications of the invention are possible in light of the above teachings. For example, it can be adapted to waveguides with multiple internal interfaces. In addition, loss can be incorporated in the model. One way to do this is to modify the modal wavenumbers by a perturbative method that is well-known in the art. Furthermore, a variable step size and variable reference wavenumbers can be used in place of the fixed step size and fixed reference wavenumbers in the preferred embodiment.

Additional variations of the invention also are possible in light of the above teachings. Thus, it can be adapted for predicting propagation of seismic waves in the earth's crust, propagation of radio waves in the earth's atmosphere, and propagation of light waves in dielectric material. Furthermore, computer implementation of the invention is most efficient on parallel computers because many of the operations in the decomposition method can be done in parallel or can be individually vectorized. It is therefore to be understood that the invention may be practiced otherwise than has been specifically described.

What is claimed is:

1. A computer implemented method for predicting propagation of a wave in a medium, said medium bordering a top reflective surface and a bottom reflective surface, said method comprising the steps of:

(a) selecting a direction in which predictions of said propagation are desired;

(b) selecting a pair of transparent boundaries that are parallel to said direction;

(c) selecting a plurality of range steps in said direction;

(d) calculating a plurality of local modes between said transparent boundaries and at said range steps;

(e) calculating a plurality of coupling coefficients between said transparent boundaries and at said range steps;

(f) selecting a plurality of modal amplitudes between said transparent boundaries and at said range steps;

(g) splitting said modal amplitudes into a plurality of primary components and a plurality of secondary components;

(h) selecting a plurality of initial values for said modal amplitudes at a first one of said range steps;

(i) using a decomposition method to predict said modal amplitudes between said transparent boundaries and at said range steps from said initial values, said decomposition method including (1) using a coupled-parabolic-equation method with said coupling coefficients to predict boundary values of said primary components at an arbitrary range step from said modal amplitudes and said secondary components at a preceding range step, (2) using a parabolic-equation method to predict said secondary components at said arbitrary range step from said boundary values and from said secondary components at said preceding range step, (3) using said coupled-parabolic-equation method with said coupling coefficients to predict said modal amplitudes at said arbitrary range step from said secondary components at said arbitrary range step and from said modal amplitudes and said secondary components at said preceding range step, j) determining mathematically said propagation of said wave from said local modes and from said modal amplitudes.

2. A method according to claim 1 in which said wave is a sound wave and in which said medium is an ocean.

3. A method according to claim 1 in which said wave is a seismic wave and in which said medium is the earth's crust.

4. A method according to claim 1 in which said wave is a radio wave and in which said medium is the earth's crust.

5. A method according to claim 1 in which said wave is a light wave and in which said medium is a dielectric material.

* * * * *

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 2,
Line 27, change "sun" to -- sum --.

Column 3,
Line 47, change "$(X, y)$" to -- $(x, y)$ --.

Column 4,
Line 6, change "$\sigma f_n(x, y\ 0)/\sigma z$" to -- $\partial f_n(x,y,0)/\partial z$ --.
Line 8, change "$\sigma f_n(x, z, y, 0)/\sigma z$" to -- $\partial f_n(x,y,0)/\partial z$ --.
Line 19, change "$\sigma f_n(x, y, 0)/\theta z$" to -- $\partial f_n(x,y,0)/\partial z$ --.
Line 22, change "$\sigma p/\sigma x$ and $\sigma p/\sigma y$" to -- $\partial p/\partial x$ and $\partial p/\partial y$ --.

Column 5,
Line 57, change "$a_{nm}$" to -- $\alpha_{nm}$ --.
Line 59, add -- $\beta_{nm} = B_{mn} - B_{nm}, \gamma_{nm} = C_{mn} - C_{nm}$. (1.31) --.

Column 6,
Line 6, change "$\tau$" to -- r --.
Line 25, change " $\frac{\partial p}{\partial x}$ " to -- $\frac{\partial p}{\partial z}$ --.

Column 7,
Lines 12 and 23, change "$\sigma f_n(x, y, 0)/\sigma z$" to -- $\partial f_n(x,y,0)/\partial z$ --.
Line 26, change "$\sigma p/\sigma x$ and $\sigma p/\sigma y$" to -- $\partial p/\partial x$ and $\partial p/\partial y$ --.
Line 33, change "$b_n f_n d_n$" to -- $b_n f_n/d_n$ --.
Line 46, change "$B_{mn}$" to -- $B_{nm}$ --.
Line 53, change "order" to -- first–order --.
Line 65, change "$w^2$" to -- $\omega^2$ --.

Column 8,
Line 5, change " $\frac{\partial}{\partial x}$ " to -- $\frac{\partial}{\partial y}$ --.
Line 13, change "$g_m(-H)g_m(-H)$" to -- $g_m(-H)g_n(-H)$ --.

Column 9,
Line 6, add "$\beta_{nm} = B_{mn} - B_{nm}, \gamma_{nm} = C_{mn} - C_{nm}$. (1.63) --.
Line 26, change "$\alpha_{nm}$" to -- $\alpha_{mn}$ --.
Lines 33 and 41, change "$\sigma_m(x)$" to -- $\vartheta m(x)$ --.
Lines 39 and 41, change "$\phi_m(x, y)$" to -- $\varphi_m(x,y)$ --.
Line 43, Change "$d\sigma_m(x)/dx$" to -- $d\vartheta_m(x/dx)$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 9 (cont'd),

Line 43, change "letting $k_m(x)$" to -- letting $\dot{k}_m(x)$ --.

Column 10,

Line 2, change "$\frac{\partial \varphi_m}{\partial x^2}$" to -- $\frac{\partial \varphi_m}{\partial x}$ --.

Lines 2 and 14, change "$ik_m\varphi_m$" to -- $i\dot{k}_m\varphi_m$ --.

Line 5, change "$e^{i(\vartheta_m-\vartheta_n)}$" to -- $e^{-i(\vartheta_m-\vartheta_n)}$ --.

Lines 9 and 21, change "$\sigma\phi_n/\sigma x$" to -- $\partial\varphi_n/\partial x$ --.

Lines 24, 33, 36, 37 and 38, change "M" to -- M --.

Line 27, change "$e^{i(\vartheta_2-\vartheta_M)}$" to -- $e^{-i(\vartheta_2-\vartheta_M)}$ --.

Line 30, change "$\beta_{Ml}$" to -- $\beta_{M1}$ --.

Line 32, change "$B_{mm}$" to -- $\beta_{mm}$ --.

Line 34, change "$B_{mn}$" to -- $\beta_{mn}$ --.

Line 35, change "$B_{nm} = -B_{mn}$" to -- $\beta_{nm} = -\beta_{mn}$ --.

Line 53, change "$\frac{k_m}{2k_m}$" to -- $\frac{\dot{k}_m}{2k_m}$ --.

Line 63, change "$ik_m\psi_m$" to -- $i\dot{k}_m\psi_m$ --.

Column 11,

Line 2, change "$\phi_m$" to -- $\varphi_m$ --.

Lines 3 and 30, change "M" to -- M --.

Line 6, change "$\phi = [\phi_1, \phi_2, \ldots, \phi_M]^T$" to -- $\varphi = [\varphi_1, \varphi_2, \ldots, \varphi_M]^T$ --.

Line 9, change "$\psi = M\phi$" to -- $\psi = \mathbf{M}\varphi$ --.

Line 10, change "$\phi = M^{-1}\psi$" to -- $\varphi = \mathbf{M}^{-1}\psi$ --.

Line 19, change "$\varphi_m \frac{\partial \varphi_m}{\partial y} - \frac{\partial \varphi_m}{\partial y}\varphi_m$" to -- $\varphi_m \frac{\partial \bar{\varphi}_m}{\partial y} - \frac{\partial \varphi_m}{\partial y}\bar{\varphi}_m$ --.

Line 19, change "$\gamma_{mn}\varphi_m\varphi_n$" to -- $\gamma_{mn}\bar{\varphi}_m\varphi_n$ --.

Line 22, change "$\bar{\phi}$ is the conjugate of $\phi$" to -- $\bar{\varphi}$ is the conjugate of $\varphi$ --.

Line 29, change "$\phi^H M \phi$" to -- $\varphi^H \mathbf{M} \varphi$ --.

Line 29, change "$\phi^H 32 [\bar{\phi}_1, \bar{\phi}_2, \ldots, \bar{\phi}_M]$" to -- $\varphi^H = [\bar{\varphi}_1, \bar{\varphi}_2, \ldots, \bar{\varphi}_M]$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 11 (cont'd),
Line 30, change "of $\phi$. If $\phi$" to -- of $\varphi$. If $\varphi$ --.
Line 47, change "$(2w)^{-1}$" to -- $(2\omega)^{-1}$ --.
Line 63, change "$\sigma A$" to -- $\vartheta A$ --.
Line 64, change "$\sigma J/\sigma x$" to -- $\vartheta J/\vartheta x$ --.
Line 65, change "$\sigma K/\sigma y$" to -- $\vartheta K/\vartheta y$ --.

Column 12,
Lines 17 and 44, change "$\phi_m$" to -- $\varphi_m$ --.
Line 40, change "bean" to -- beam --.
Line 47, change "$x\pm$ W" to -- $x, \pm$ W --.

Column 13,
Line 30, change "$\varphi_m i \beta_{mn} \varphi_n$" to -- $\bar{\varphi}_m i \beta_{mn} \varphi_n$ --.
Line 35, change "$\varphi_m$" to -- $\bar{\varphi}_m$ --.
Lines 46, 64 and 67, change "$\sigma g/\sigma k$" to -- $\partial g/\partial k$ --.
Line 65, change "$\phi_m$" to -- $\varphi_m$ --.
Line 66, change "M" to -- M --.

Column 14,
Line 17, change "$\varphi_m$" to -- $\psi_m$ --.
Line 22, change "$\hat{g}$" to -- $\hat{g}_n$ --.
Line 37, change "$\mathfrak{I}$ and $\mathfrak{I}^{-1}$" to -- $\mathfrak{F}$ and $\mathfrak{F}^{-1}$ --.
Line 40, change "$\mathfrak{I}g = \hat{g}, \mathfrak{I}^{-1}\hat{g} = g$" to -- $\mathfrak{F}g = \hat{g}, \mathfrak{F}^{-1}\hat{g} = g$ --.
Lines 47, 48 and 50, change "$\mathfrak{I}$" to -- $\mathfrak{F}$ --.
Line 50, change "$\eta\pi$" to -- $n\pi$ --.
Line 62, change "$\int_{x_j}^{x_{j+1}}$" to -- $\int_{x}^{x_{j+1}}$ --.

Column 15,
Line 4, change "(m" to -- $\varphi_m$ --.
Lines 8, 19 and 26, change "$o((\Delta x)^3)$" to -- $\mathcal{O}((\Delta x)^3)$ --.
Line 14, change "+" to -- — --.
Line 25, change "$\sigma m$" to -- $\vartheta m$ --.

UNITED STATES PATENT AND TRADEMARK OFFICE
CERTIFICATE OF CORRECTION

PATENT NO.    : 6,876,598 B1
DATED         : April 5, 2005
INVENTOR(S)   : Ronald Francis Pannatoni It is certified that error appears in the above-identified patent and that said Letters Patent is hereby corrected as shown below:

Column 15 (cont'd),
Line 34, change "$\mathfrak{I}$ and $\mathfrak{I}^{-1}$" to -- $\mathfrak{F}$ and $\mathfrak{F}^{-1}$ --.

Lines 37 and 40, change "$\bar{g}_n$" to -- $\tilde{g}_n$ --.

Lines 40 and 48, change "$\bar{\epsilon}_n$" to -- $\tilde{\epsilon}_n$ --.

Line 40, change "$\bar{\epsilon}_k$" to -- $\tilde{\epsilon}_k$ --.

Line 42, delete "where $\bar{\epsilon}_0 = \bar{\epsilon}_N = \frac{1}{2}$ and $\bar{\epsilon}_n = 1$ for $n = 1, \ldots, N-1$. Now".

Line 46, delete "for $n = 0, 1, \ldots, N$, (5.4) --.

Line 48, change "$\bar{\epsilon}_0 = \bar{\epsilon}_N$" to -- $\tilde{\epsilon}_0 = \tilde{\epsilon}_N$ --.

Lines 50 and 56, change "$\bar{g}_n$" to -- $\tilde{g}_n$ --.

Line 57, change "$\bar{g} = \{\bar{g}_0, \bar{g}_1, \ldots, \bar{g}_N\}$" to -- $\tilde{g} = \{\tilde{g}_0, \tilde{g}_1, \ldots, \tilde{g}_N\}$ --.

Lines 58 and 62, change "$\mathfrak{I}_N$ and $\mathfrak{I}_N^{-1}$" to -- $\mathfrak{F}_N$ and $\mathfrak{F}_N^{-1}$ --.

Line 60, change "$\mathfrak{I}_N g = \bar{g}, \mathfrak{I}_N^{-1} \bar{g} = g$" to -- $\mathfrak{F}_N g = \tilde{g}, \mathfrak{F}_N^{-1} \tilde{g} = g$ --.

Line 61, change "$\mathfrak{I}$ and $\mathfrak{I}^{-1}$" to -- $\mathfrak{F}$ and $\mathfrak{F}^{-1}$ --.

Column 16,
Line 12, change "$\eta\pi$" to -- $n\pi$ --.

Line 15, change "$\sigma\phi_n/\sigma y$" to -- $\partial\varphi_n/\partial y$ --.

Line 16, change "$\sigma^2(\beta_{mn}\phi_n)/\sigma y^2$" to -- $\partial^2(\beta_{mn}\varphi_n)/\partial y^2$ --.

Line 52, change "$o(\Delta x(\Delta y)^2)$" to -- $\mathcal{O}(\Delta x(\Delta y)^2)$ --.

Column 17,
Line 12, change "$\sigma_n = \sigma_n(x_{j+1})$" to -- $\vartheta_n = \vartheta_n(x_{j+1})$ --.

Line 13, change "$o(\Delta x(\Delta y)^2)$" to -- $\mathcal{O}(\Delta x(\Delta y)^2)$ --.

Line 18, change "$ik_m\Delta x$" to -- $ik_m\Delta x$ --.

Line 30, change "$-\frac{i\Delta x}{8\Delta y}$" to -- $\frac{i\Delta x}{8\Delta y}$ --.

Line 36, change "$\sigma_n = \sigma_n(x_j)$" to -- $\vartheta_n = \vartheta_n(x_j)$ --.

Line 42, change "$\phi_n(x_j, y_{k-1}) + \phi_n(x_j, y_{k+1})$" to -- $\varphi_n(x_j, y_{k-1}) = \varphi_n(x_j, y_{k+1})$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 17 (cont'd),
Line 46, change "$\phi_m$" to -- $\varphi_m$ --.
Line 48, change "$\phi_m(x_j, y_l)$" to -- $\varphi_m(x_j, y_l)$ --.
Line 55, change "$\int_{x_i}^{x_{i+1}}$" to -- $\int_{x_j}^{x_{j+1}}$ --.
Line 62, change "$\Psi_m(x_j + 0, y_l)$" to -- $\Psi_m(x_j + 0, y_l)$ --.
Line 62, change "$\psi_m(x_j, y_l)$" to -- $\psi_m(x_j, y_l)$ --.
Line 62, change "$q_m(x_j, y_l)$" to -- $q_m(x_j, y_l)$ --.
Line 65, change "$\phi_k$" to -- $\varphi_k$ --.
Line 65, change "$\phi_1$" to -- $\varphi_1$ --.
Line 65, change "$\phi_M$" to -- $\varphi_M$ --.

Column 18,
Line 2, change "$\sigma_n = \sigma_n(x_{j+1})$" to -- $\vartheta_n = \vartheta_n(x_{j+1})$ --.
Line 44, change "$\Psi\_$" to -- $\Psi^-$ --.
Lines 49 and 51, change "$\tau_0$" to -- $r_0$ --.
Line 53, change "$\Phi_l$" to -- $\Phi_1$ --.
Line 62, change "$a_{nn}$" to -- $\alpha_{nn}$ --.
Line 64, change "$ik_m\Delta x$" to -- $ik_m\Delta x$ --.

Column 19,
Line 2, change "$a_{mn}$" to -- $\alpha_{mn}$ --.
Line 8, change "$\frac{i\Delta x}{8\Delta y}$" to -- $-\frac{i\Delta x}{8\Delta y}$ --.
Line 15, change "M" to -- M --.
Line 21, change "$k_m\Delta x \leq o(1)$" to -- $k_m\Delta x \leq \mathcal{O}(1)$ --.
Line 21, change "$k_m\Delta y \geq o(1)$" to -- $k_m\Delta y \geq \mathcal{O}(1)$ --.
Line 22, change "$\Delta r$" to -- $\Delta x$ --.
Line 23, change "$o(1)$" to -- $\mathcal{O}(1)$ --.
Lines 39, 42, 44, 49 and 58, change "$\phi$" to -- $\varphi$ --.
Line 46, change "$\phi(x, y)$" to -- $\varphi(x, y)$ --.
Line 55, change "σ/σy" to -- $\partial/\partial y$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 20,
Line 19, change "$xj$" to -- $x_j$ --.
Line 20, change " $\phi(x,y)$ " to -- $\varphi(x_j, y)$ --.
Lines 22 and 37, change " $o((\tau_{j+1} - \tau_j)^3)$ " to -- $\mathcal{O}((\tau_{j+1} - \tau_j)^3)$ --.

Column 21,
Line 8, change " $\sigma \psi_{j-1}(0)/\sigma y$ " to -- $\partial \psi_{j-1}(0)/\partial y$ --.
Line 8, change " $\sigma \psi_j(0)/\sigma y$ " to -- $\partial \psi_j(0)/\partial y$ --.
Lines 9 (both occurrences), 12, 16 and 59, change " $\bar{a}_1^{j-1}$ " to -- $\tilde{a}_1^{j-1}$ --.
Lines 9, 16, 22, 59 and 61, change " $\bar{b}_1^{j-1}$ " to -- $\tilde{b}_1^{j-1}$ --.
Lines 9 and 32, change " $\bar{b}_j^{j-1}$ " to -- $\tilde{b}_j^{j-1}$ --.
Line 14, change " $\bar{a}_k^{j-1} = \bar{a}_k^{j-1} - g_{k-1}^j \bar{a}_{k-1}^{j-1}$ " to -- $\tilde{a}_k^{j-1} = a_k^{j-1} - g_{k-1}^j \tilde{a}_{k-1}^{j-1}$ --.
Lines 18 and 24, change " $\bar{b}_k^{j-1}$ " to -- $\tilde{b}_k^{j-1}$ --.
Line 18, change " $g_k^j \bar{a}_k^{j-1} + \bar{a}_{k-1}^{j-1}$ " to -- $g_k^j \tilde{a}_k^{j-1} + \tilde{a}_{k-1}^{j-1}$ --.
Lines 18 and 24, change " $\bar{b}_{k-1}^{j-1}$ " to -- $\tilde{b}_{k-1}^{j-1}$ --.
Line 30, change " $-\frac{1}{2}a_j^{j-1} - \frac{1}{2}a_j^{j-1} - \frac{1}{2}b_{j-1}^{j-1}$ " to -- $-\frac{1}{2}a_j^{j-1} - \frac{1}{2}\tilde{a}_j^{j-1} - \frac{1}{2}\tilde{b}_{j-1}^{j-1}$ --.
Line 32, change " $\frac{1}{2}p_j^{-2}$ " to -- $-\frac{1}{2}p_j^{-2}$ --.
Lines 32 and 61, change " $\bar{b}_j^{j-1}$ " to -- $\tilde{b}_j^{j-1}$ --.
Lines 35 and 44, change " $\bar{a}_{j+1}^j$ " to -- $\tilde{a}_{j+1}^j$ --.
Line 39, change " $\frac{\partial}{\partial y}\psi_j(0) + p_{j+1}\psi_j(0)$ " to -- $\frac{\partial}{\partial y}\psi_1(0) + p_1\psi_1(0)$ --.
Line 55, change "$e^{ix/4}$" to -- $e^{-ix/4}$ --.
Line 63, change " $\bar{b}_k^{j-1} = \bar{a}_k^{j-1}$ " to -- $\tilde{b}_k^{j-1} = \tilde{a}_k^{j-1}$ --.
Line 66, change " $\bar{a}_k^{j-1}$ and $\bar{b}_k^{j-1}$ " to -- $\tilde{a}_k^{j-1}$ and $\tilde{b}_k^{j-1}$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 22,
Line 7, change "$-\frac{1}{2}a_k^{j-1} - \frac{1}{2}a_k^{j-1}$" to -- $-\frac{1}{2}a_k^{j-1}$ --.
Lines 18, 38 and 44, change "$\sigma\psi_0(0)/\sigma y$" to -- $\partial\psi_0(0)/\partial y$ --.
Line 58, change "(6.36)" to -- (6.35) --.

Column 23,
Line 40, change "$\hat{v}u'$" to -- $\hat{u}'$ --.
Line 42, change "$\hat{\delta}u'$" to -- $\hat{\delta}'$ --.
Lines 46 and 48, change "$\Delta$" to -- $\hat{\Delta}$ --.
Line 64, change "$a_k^j$" to -- $\hat{a}_k^j$ --.
Line 64, change "$a_k^{j-1}$" to -- $\hat{a}_k^{j-1}$ --.
Line 64, change "$a_{k-2}^{j-1}$" to -- $\hat{a}_{k-2}^{j-1}$ --.

Column 24,
Line 15, change "$a_k^j$" to -- $\hat{a}_k^j$ --.
Line 15, change "$a_k^{j-1}$" to -- $\hat{a}_k^{j-1}$ --.
Line 15, change "$a_{k-2}^{j-1}$" to -- $\hat{a}_{k-2}^{j-1}$ --.
Line 27, change "=(" to -- =−( --.
Line 35, change "$\Delta_k^j$" to -- $\hat{\Delta}_k^j$ --.
Line 46, change "$\hat{v} = \frac{1}{2}a_{k-2}^{j-1}$" to -- $\hat{v} = \frac{1}{2}\hat{a}_{k-2}^{j-1}$ --.

Column 25,
Line 8, change "=(" to -- =−( --.
Line 33, change "$\hat{v} = \frac{1}{2}a_{j-2}^{j-1}$" to -- $\hat{v} = \frac{1}{2}\hat{a}_{j-2}^{j-1}$ --.

Column 26,
Line 25, change "$\tilde{e}_{j+1}^j$" to -- $\hat{e}_{j+1}^j$ --.
Line 35, change "$\hat{a}_1^{j-1}$" to -- $\hat{a}_2^{j-1}$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 26 (cont'd),
Line 38, change "$\hat{\epsilon}_k^{-j}$" to -- $\hat{\epsilon}_k^j$ --.
Line 40, change "$\hat{\epsilon}_j^{-j}$" to -- $\hat{\epsilon}_j^j$ --.
Line 42, change "$= \frac{1}{2}\hat{a}_{j-1}^{j-1}$ and $\hat{\epsilon}_{j+1}^{-j}$" to -- $= -\frac{1}{2}\hat{a}_{j-1}^{j-1}$ and $\hat{\epsilon}_{j+1}^j$ --.
Line 44, change "$\hat{\epsilon}_{j+1}^{-j}$" to -- $\hat{\epsilon}_{j+1}^j$ --.
Line 63, change "$a_i^{j-1}$" to -- $\alpha_i^{j-1}$ --.
Line 67, change "$a_i^0$" to -- $\alpha_i^0$ --.

Column 27,
Line 3, change "$a_0^j$" to -- $\alpha_0^j$ --.
Line 11, change "$\frac{1}{2}p_0^{-2}$" to -- $-\frac{1}{2}p_0^{-2}$ --.
Lines 26 and 39, change "$\sigma\psi_j(0)/\sigma y$" to -- $\partial\psi_j(0)/\partial y$ --.
Line 31, change "$\sigma\psi_0(0)/\sigma y$" to -- $\partial\psi_0(0)/\partial y$ --.
Line 47, change "$c^{-2/\epsilon}$" to -- $e^{-2/\epsilon}$ --.
Line 63, change "$o(J^{1/2})$" to -- $\mathcal{O}(J^{1/2})$ --.

Column 28,
Line 17, change "arithm(6.82)" to -- arithmetic. (6.82) --.
Line 19, change "$\sigma\psi_j(0)/\sigma y$" to -- $\partial\psi_j(0)/\partial y$ --.
Line 23, change "$a_i^j$" to -- $\alpha_i^j$ --.
Line 46, change "$a_L^0$" to -- $\alpha_L^0$ --.
Line 61, change "$a_L^j$" to -- $-\alpha_L^j$ --.
Line 62, change "$a_i^3$" to -- $\alpha_i^3$ --.

Column 29,
Line 4, change "$a_k^j$" to -- $\alpha_k^j$ --.
Line 4, change "$\hat{a}_k^j$" to -- $\hat{\alpha}_k^j$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 29 (cont'd),
Line 18, change " $\hat{\epsilon}_j^{(L)}$ " to -- $\hat{e}_j^{(L)}$ --.
Line 18, change " $\hat{\epsilon}_{j-1}^{(L)}$ " to -- $\hat{e}_{j-1}^{(L)}$ --.
Line 34, change " $\hat{a}_L^{j-1}$ " to -- $\hat{\alpha}_L^{j-1}$ --.
Line 60, change " sum $\hat{\sigma}_j^{(L)}$ " to -- sum $\hat{\sigma}_j^{(L)} + \hat{e}_j^{(L)}$ --.
Line 61, change " $\hat{\sigma}_j^{(L)}$ " to -- $\tilde{\sigma}_j^{(L)}$ --.

Column 30,
Line 65, change "$f_{j+1,N-1}$" to -- $f_{j+1,N-1} - f_{j,N-1}$ --.

Column 31,
Line 1, change "$\Delta z$" to -- $\Delta x$ --.
Line 49, delete "for $k = N - 4, \ldots, 3,$  (7.18) --.

Column 32,
Line 12, change "$\ldots, f_{j+1},$" to -- $\ldots, f_{j+1,2},$ --.
Line 27, delete "$j = 0, 1, \ldots,$  (7, 26)".
Line 65, change "$\sigma f_{j+1}(\pm W)/\sigma y$" to -- $\partial f_{j+1}(\pm W)/\partial y$ --.

Column 33,
Line 3, change "$f_{j+1}\pm(W)$" to -- $f_{j+1}(\pm W)$ --.
Line 9, change "$(k_0 \Delta x)$" to -- $(k_0/\Delta x)$ --.
Line 28, change "$g_j(W) + g_j(W)$" to -- $g_j(W) + g_j(-W)$ --.
Line 45, change "$v^T$" to -- $\upsilon^T$ --.
Line 51, change "$\tau_k$" to -- $r_k$ --.
Line 55, change "$k_2$" to -- $k^2$ --.
Line 64, change "$e_{ix/4}$" to -- $e^{i\pi/4}$ --.

Column 34,
Line 3, change " $\nu_0^T$ " to -- $\upsilon_0^T$ --.
Line 9, change "$T_{N-2}$" to -- $r_{N-2}$ --.
Line 10, change "$T_{N-4}$" to -- $r_{N-4}$ --.
Line 20, change "$v_0$" to -- $\upsilon_0$ --.
Line 25, add -- $\gamma_0 = b_0, \alpha_0 = f_{j+1,0}, \beta_0 = \frac{1}{2}[g_j(W) + g_j(-W)].$  (7.48) --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 34 (cont'd),
Line 33, change "$v_1^T$" to -- $v_1^T$ --.
Line 39, change "$\tau_{N-3}$" to -- $r_{N-3}$ --.
Line 40, change "$\tau_{N-5}$" to -- $r_{N-5}$ --.
Line 43, change "$\tau_5$" to -- $r_5$ --.
Line 44, change "$\tau_3$" to -- $r_3$ --.
Line 49, change "$v_1$" to -- $\upsilon_1$ --.
Line 49, change "$x_1$" to -- $x_1 =$ --.
Line 56, change "$a_1$" to -- $\alpha_1$ --.
Line 56, change "$|g_j(W) - g_j(-W)|$" to -- $[g_j(W) - g_j(-W)]$ --.
Line 64, change "x and a" to -- $x$ and $\alpha$ --.

Column 35,
Lines 12 and 16, change "a" to -- $\alpha$ --.
Line 31, change "$\tau_{N-4}$" to -- $r_{N-4}$ --.
Line 33, change "$\tau_4$" to -- $r_4$ --.
Lines 34 and 50, change "$\tau_2$" to -- $r_2$ --.
Line 49, change "$\tau_k\tau_{k+2}$" to -- $r_k\tau_{k+2}$ --.
Line 62, change "$\tau_{N-5}$" to -- $r_{N-5}$ --.
Line 64, change "$\tau_5$" to -- $r_5$ --.
Line 65, change "$\tau_3$" to -- $r_3$ --.

Column 36,
Line 14, change "$\tau_k\tau_{k+2}$" to -- $r_k\tau_{k+2}$ --.
Line 16, change "$\tau_3$" to -- $r_3$ --.
Line 32, change "$q = o(N^{1/2})$" to -- $q = \mathcal{O}(N^2)$ --.
Line 32, change "$\delta = o(N^{1/2})$" to -- $\delta = \mathcal{O}(N^{1/2})$ --.
Line 38, change "$o(N_2)$" to -- $\mathcal{O}(N^2)$ --.
Lines 63 and 65, change "o(" to -- $\mathcal{O}($ --.

Column 37,
Line 3, delete "N".
Lines 6 and 61, change "$v$" to -- $\upsilon$ --.
Line 6, change "$l = 0$" to -- $k = 0$ --.
Lines 26 and 43, change "o(" to -- $\mathcal{O}($ --.
Line 55, change "$v(\theta_j) + t\Delta v(\theta_j)$" to -- $\upsilon(\theta_j) + t\Delta\upsilon(\theta_j)$ --.
Line 55, change "$\Delta^2 v$" to -- $\Delta^2 \upsilon$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 37 (cont'd),
Line 55, change "$\Delta^3 v$" to -- $\Delta^3 \upsilon$ --.
Line 58, change "$\Delta^{2k} v$" to -- $\Delta^{2k} \upsilon$ --.
Line 58, change "$\Delta^{2k+1} v$" to -- $\Delta^{2k+1} \upsilon$ --.

Column 38,
Lines 4, 12 and 48, change "$v$" to -- $\upsilon$ --.
Line 8, change "some $\sigma$" to -- some $\partial$ --.
Line 8, change "$< \sigma <$" to -- $< \partial <$ --.
Line 16, change "$\Delta^{2k} v$" to -- $\Delta^{2k} \upsilon$ --.
Line 16, change "$\Delta^{2k+1} v$" to -- $\Delta^{2k+1} \upsilon$ --.
Line 27, change "$v(\phi_n)$" to -- $\upsilon(\phi_N)$ --.
Line 39, change "$\theta_{jn} t_n h$" to -- $\theta_{jn} + t_n h$ --.

Column 39,
Lines 2 and 4, change "o(" to -- $\mathcal{O}($ --.
Lines 35 and 66, change "$\phi_m$" to -- $\varphi_m$ --.
Line 47, change "$\sigma_m$" to -- $\partial_m$ --.
Line 54, change "$a_{mn}$" to -- $\alpha_{mn}$ --.
Line 57, change "$\pm W_a$" to -- $\pm W_s$ --.
Line 57, change "$W_a <$" to -- $W_s <$ --.

Column 40,
Line 12, change "$\bar{\phi}_m = \phi_m e^{-1 z_m x}$" to -- $\bar{\varphi}_m = \varphi_m e^{-i \kappa_m z}$ --.
Line 15, change "$\{\xi_m^{(0)}\}_2$" to -- $\{\xi_m^{(0)}\}^2$ --.
Line 17, 54 and 67, change "$\phi_m$" to -- $\bar{\varphi}_m$ --.
Line 40, change "$a_{mn}$" to -- $\alpha_{mn}$ --.
Lines 43, 45 and 47, change "$\bar{k}_m$" to -- $\tilde{k}_m$ --.
Lines 54 and 57, change "$\bar{\phi}_m^{(1)}$" to -- $\bar{\varphi}_m^{(1)}$ --.
Line 55, change "$\bar{\phi}_m^{(2)}$" to -- $\bar{\varphi}_m^{(2)}$ --.

Column 41,
Lines 1 and 3, change "$W_3$" to -- $W_s$ --.
Line 12, change "$\bar{\phi}_m^{(1)}$" to -- $\bar{\varphi}_m^{(1)}$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 41 (cont'd),

Line 14, change "$\bar{k}_m^{(2)}$" to -- $\bar{\varphi}_m^{(2)}$ --.

Lines 23 and 31, change "$\bar{\phi}_m^{(2)}$" to -- $\bar{\varphi}_m^{(2)}$ --.

Lines 35 and 41, change "$\bar{\phi}_m = \bar{\phi}_m^{(1)} + \bar{\phi}_m^{(2)}$" to -- $\bar{\varphi}_m = \bar{\varphi}_m^{(1)} + \bar{\varphi}_m^{(2)}$ --.

Lines 38, 39, 40 and 42, change "$\bar{\phi}_m$" to -- $\bar{\varphi}_m$ --.

Line 41, change "$\bar{\phi}_m^{(1)}, \bar{\phi}_m^{(2)}$" to -- $\bar{\varphi}_m^{(1)}, \bar{\varphi}_m^{(2)}$ --.

Line 52, change "$k_m \tilde{\psi}_m^{(1)}$" to -- $k_m \bar{\varphi}_m^{(1)}$ --.

Line 52, change "$\theta_{mn} \bar{\psi}_n$" to -- $\beta_{mn} \bar{\varphi}_n$ --.

Line 52, change "$k_m - k_n$" to -- $\bar{k}_m - \bar{k}_n$ --.

Line 57, change "$\bar{q}_m$" to -- $\tilde{q}_m$ --.

Line 60, change "$\bar{k}_m$" to -- $\tilde{k}_m$ --.

Line 63, change "$\bar{k}_m - \bar{k}_n$" to -- $\tilde{k}_m - \tilde{k}_n$ --.

Column 42,

Lines 8, 11, 31, 32, 36 and 67, change "$\bar{\psi}_m^{(1)}$" to -- $\tilde{\psi}_m^{(1)}$ --.

Line 8, change "$\bar{\phi}_m^{(1)}$" to -- $\bar{\varphi}_m^{(1)}$ --.

Lines 8, 31, 49, 59 and 67, change "$\bar{q}_m$" to -- $\tilde{q}_m$ --.

Line 13, change "$\mathcal{J}$" to -- $\mathfrak{F}$ --.

Lines 16, 31 and 53, change "$\mathcal{J}^{-1}$" to -- $\mathfrak{F}^{-1}$ --.

Line 19, change "$\mathcal{F}^{-1}$" to -- $\mathfrak{F}^{-1}$ --.
Line 19, change "$2/k_m$" to -- $2k_m$ --.
Line 19, change "$\mathcal{F}$" to -- $\mathfrak{F}$ --.
Line 21, change "—exp{$i$" to -- exp{—i --.
Line 21, change "$\mathcal{F}\bar{q}_m$" to -- $\mathfrak{F}\tilde{q}_m$ --.
Line 26, change "$\bar{\phi}_m$" to -- $\bar{\varphi}_m$ --.
Line 28, change "o(" to -- $\mathcal{O}($ --.
Lines 31 and 59, change "$\bar{q}_m$" to -- $\tilde{q}_m$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 42 (cont'd),
Line 32, change "$\bar{\psi}_m^{(1)}$" to -- $\tilde{\psi}_m^{(1)}$ --.
Line 43, delete "for $|y| \leq W$ (9.23) --.
Line 49, change "$\bar{\psi}_m^{(1)}(x_j \pm 0, y)$" to -- $\tilde{\psi}_m^{(1)}(x_j \pm 0, y)$ --.
Line 49, change "$\bar{\psi}_m^{(1)}(x_j, y)$" to -- $\tilde{\psi}_m^{(1)}(x_j, y)$ --.
Line 53, change "$\bar{\psi}_m^{(1)}(x_{j+1} - 0)$" to -- $\tilde{\psi}_m^{(1)}(x_{j+1} - 0)$ --.
Line 53, change "$\mathfrak{I}[\bar{\psi}_m^{(1)}$" to -- $\mathfrak{F}[\tilde{\psi}_m^{(1)}$ --.
Line 64, change "$\mathfrak{I}$ and $\mathfrak{I}^{-1}$" to -- $\mathfrak{F}$ and $\mathfrak{F}^{-1}$ --.
Line 65, change "$\mathfrak{I}_N$ and $\mathfrak{I}_N^1$" to -- $\mathfrak{F}_N$ and $\mathfrak{F}_N^{-1}$ --.

Column 43,
Lines 2, 5 and 6, change "$\bar{\psi}_m^{(1)}$" to -- $\tilde{\psi}_m^{(1)}$ --.
Lines 2, 5, 6, 32 and 49, change "$\bar{q}_m$" to -- $\tilde{q}_m$ --.
Line 5, change "$\mathfrak{I}^{-1}$" to -- $\mathfrak{F}_N^{-1}$ --.
Line 5, change "$\mathfrak{I}_N$" to -- $\mathfrak{F}_N$ --.
Line 6, change "$\}_{l=0}^{N}$" to -- $\}_{l=0}^{N})$ --.
Line 11, change "$\sigma \bar{\phi}_n / \sigma y$" to -- $\partial \tilde{\varphi}_n / \partial y$ --.
Line 12, change "$\sigma^2 (\beta_{mn} \bar{\phi}_n) / \sigma^2 y$" to -- $\partial^2 (\beta_{mn} \tilde{\varphi}_n) / \partial y^2$ --.
Line 12, change "$\bar{\phi}_m^{(1)}$" to -- $\tilde{q}_m$ --.
Lines 34, 51 and 53, change "$\bar{k}_m$" to -- $\tilde{k}_m$ --.
Lines 36, 39, 42, 55, 60 and 65, change "$\bar{k}_m - \bar{k}_n$" to -- $\tilde{k}_m - \tilde{k}_n$ --.
Line 47, change "o(" to -- $\mathcal{O}($ --.

Column 44,
Lines 5, 22, 27, 31, 36, 49, 52, 58 and 62, change "$\bar{k}_m - \bar{k}_n$" to -- $\tilde{k}_m - \tilde{k}_n$ --.
Line 8, change "$\bar{\phi}_m = \bar{\phi}_m^{(1)} + \bar{\phi}_m^{(2)}$" to -- $\tilde{\varphi}_m = \tilde{\varphi}_m^{(1)} + \tilde{\varphi}_m^{(2)}$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 44 (cont'd),
Line 9, change "$\bar{\phi}_m^{(1)}(x_{+1}, y_k)$" to -- $\tilde{\varphi}_m^{(1)}(x_{j+1}, y_k)$ --.
Line 10, change "$\bar{\phi}_m(x_{+1}, y_k)$" to -- $\tilde{\varphi}_m(x_{j+1}, y_k)$ --.
Line 10, change "$\bar{\phi}_m^{(2)}(x_{+1}, y_k)$" to -- $\tilde{\varphi}_m^{(2)}(x_{j+1}, y_k)$ --.
Line 13, change "$\bar{\psi}_m^{(1)}$" to -- $\tilde{\psi}_m^{(1)}$ --.
Lines 13 and 40, change "$\bar{q}_m$" to -- $\tilde{q}_m$ --.
Line 13, change "$= \bar{\psi}_m$" to -- $= \tilde{\Psi}_m$ --.
Line 13, change "$\bar{\psi}_m^{(2)}(x_{j+1}(9,33))$" to -- $\tilde{\varphi}_m^{(2)}(x_{j+1}, y_k)$   (9.33) --.
Lines 19 and 46, change "$\bar{k}_m$" to -- $\tilde{k}_m$ --.
Line 40, change "$\bar{\psi}_m^{(1)}$" to -- $\tilde{\psi}_m^{(1)}$ --.
Line 40, change "$= \bar{\psi}_m$" to -- $= \tilde{\Psi}_m$ --.
Line 40, change "$\bar{\psi}_m^{(2)}$" to -- $\tilde{\varphi}_m^{(2)}$ --.
Line 44, change "$x_j - 0$" to -- $x_j + 0$ --.
Line 49, change "+" to -- – --.
Line 52, change "$(x, y_l)$" to -- $(x_i, y_l)$ --.
Line 52, change "$x_{j+1}$" to -- $x_j$ --.
Line 60, change "–" to -- + --.
Line 66, change "$a_{mn}$" to -- $\alpha_{mn}$ --.

Column 45,
Lines 1 and 3, change "$\bar{\sigma}_m$" to -- $\tilde{\varphi}_m$ --.
Lines 6 and 11, change "$\bar{\Psi}_m$" to -- $\tilde{\Psi}_m$ --.
Lines 6, 7 and 9, change "$\bar{\psi}_m^{(2)}$" to -- $\tilde{\varphi}_m^{(2)}$ --.
Line 7, change "$\mathcal{J}_N^{-1}$" to -- $\mathcal{F}_N^{-1}$ --.
Line 7, change "$\mathcal{J}_N\{\bar{\psi}_m\}$" to -- $\mathcal{F}_N\{\tilde{\Psi}_m\}$ --.
Lines 15 and 48, change "$\bar{\psi}_k$" to -- $\tilde{\varphi}_k$ --.
Line 15, change "$\bar{\psi}_1$" to -- $\tilde{\varphi}_1$ --.
Line 15, change "$\bar{\psi}_M$" to -- $\tilde{\varphi}_M$ --.

UNITED STATES PATENT AND TRADEMARK OFFICE
CERTIFICATE OF CORRECTION

PATENT NO.    : 6,876,598 B1
DATED         : April 5, 2005
INVENTOR(S)   : Ronald Francis Pannatoni It is certified that error appears in the above-identified patent and that said Letters Patent is hereby corrected as shown below:

Column 45 (cont'd),

Lines 17 and 46, change " $\bar{\Psi}_k^-$ " to -- $\tilde{\Psi}_k^-$ --.

Lines 17 and, change " $\bar{\Psi}_1$ " to -- $\tilde{\Psi}_1$ --.

Line 17, change " $\bar{\Psi}_M$ " to -- $\tilde{\Psi}_M$ --.

Line 20, change "$A_{kk+1}$" to -- $A_{kk\pm1}$ --.

Line 24, change " $\bar{k}_m$ " to -- $\tilde{k}_m$ --.

Lines 26 and 29, change " $\bar{k}_m - \bar{k}_n$ " to -- $\tilde{k}_m - \tilde{k}_n$ --.

Line 34, change " $\bar{\psi}_m$ " to -- $\bar{\varphi}_m$ --.

Line 38, change " $\bar{\Psi}_1^-$ " to -- $\tilde{\Psi}_1^-$ --.

Line 39, change " $\bar{\Psi}_2^-$ " to -- $\tilde{\Psi}_2^-$ --.

Line 41, change " $\bar{\Psi}_{N-2}^-$ " to -- $\tilde{\Psi}_{N-2}^-$ --.

Line 42, change " $\bar{\Psi}_{N-1}^-$ " to -- $\tilde{\Psi}_{N-1}^-$ --.

Line 45, change " $\bar{\psi}_m^{(2)}$ " to -- $\bar{\varphi}_m^{(2)}$ --.

Line 48, change " $\bar{\psi}_k$ " to -- $\bar{\varphi}_k$ --.

Line 63, delete " $|k_n + (i\Delta x/4)(\{\xi_n^{(0)}\}^2 - \xi_n^2(x_{j+1}y_k) + a_{nn}(x_{j+1},y_k))|$ ".

Column 46,

Lines 3 and 33, change " $\bar{k}_m$ " to -- $\tilde{k}_m$ --.

Line 17, delete "for $n = 1, \ldots, M.$       (9.43) --.

Line 35 (both occurrences), change "< o(" to -- $\leq \mathcal{O}($ --.

Lines 37 and 57, change "o(" to -- $\mathcal{O}($ --.

Lines 39, 42 and 44, change " $\bar{\psi}_m^{(1)}$ " to -- $\bar{\varphi}_m^{(1)}$ --.

Lines 40 and 46, change " $\bar{\psi}_m^{(2)}$ " to -- $\bar{\varphi}_m^{(2)}$ --.

Line 41, change " $\bar{\psi}_m^{(1)}$ " to -- $\bar{\psi}_m^{(1)}$ --.

Line 41, change " $\bar{q}_m$ " to -- $\bar{q}_m$ --.

Line 46, change "$vh \pm w$" to -- $y_k = \pm W$ --.

Line 46, change "$yl$" to -- $y_l$ --.

Line 46, change "$yn$" to -- $y_l$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 46 (cont'd),
Line 46, change "$t = 0$" to -- $l = 0$ --.

Line 60, change " $\tilde{\varphi}_m^{(2)}$ " to -- $\bar{\varphi}_m^{(2)}$ --.

Column 47,

Lines 7, 17 and 53, change " $\tilde{\psi}_m$ " to -- $\bar{\varphi}_m$ --.

Line 13, change " $\frac{\partial}{\partial y^2}$ " to -- $\frac{\partial^2}{\partial y^2}$ --.

Lines 54 and 56, change " $\tilde{\psi}_m^{(1)}$ " to -- $\bar{\varphi}_m^{(1)}$ --.

Lines 54 and 55, change " $\tilde{\psi}_m^{(2)}$ " to -- $\bar{\varphi}_m^{(2)}$ --.

Line 67, change " $\overline{104}_m^{(2)}$ " to -- $\bar{\varphi}_m^{(2)}$ --.

Column 48,

Line 8, change " $\hat{\varphi}_m^{(2)}$ " to -- $\bar{\varphi}_m^{(2)}$ --.

Line 34, change " $a_{Lj,m}^k$ " to -- $\alpha_{Lj,m}^k$ --.

Line 44, change " $\alpha_{Lj,m}^{-1}$ " to -- $\alpha_{Lj,m}^{j-1}$ --.

Line 54, change " $a_{l,m}^0$ " to -- $\alpha_{l,m}^0$ --.

Line 54, change " $a_{0,m}^j$ " to -- $\alpha_{0,m}^j$ --.

Column 49,

Lines 18, 22, 45, 48 and 58, change " $\psi_m$ " to -- $\bar{\varphi}_m$ --.

Lines 22, 24, 34, 36, 39, 44, 46, 60 and 61, change " $\tilde{\psi}_m^{(2)}$ " to -- $\bar{\varphi}_m^{(2)}$ --.

Line 23, change "$x_j + 1$" to -- $x_{j+1}$ --.

Line 24, change " $\psi_m(x_j, y_k)$ " to -- $\bar{\varphi}_m(x_j, y_l)$ --.

Lines 27, 43 and 46, change " $\psi_m^{(1)}$ " to -- $\bar{\varphi}_m^{(1)}$ --.

Line 41, change " $\sigma \tilde{\psi}_m^{(1)}(x_{j+1}, \pm W)/\sigma y$ " to -- $\partial \bar{\varphi}_m^{(2)}(x_{j+1}, \pm W)/\partial y$ --.

Line 46, change " $\psi_m($ " to -- $\bar{\varphi}_m($ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 49 (cont'd),

Line 67, change " $\bar{\psi}_m^{(2)}(x_j, y)$ " to -- $\bar{\varphi}_m^{(2)}(x_j, y)$ --.

Line 67, change " $\bar{\psi}_m^{(2)}(x_j, y; \Delta x)$ " to -- $\bar{\varphi}_m^{(2)}(x_j, y; \Delta x)$ --.

Column 50,

Lines 6 and 7, change " $\bar{\psi}_m^{(2)}(x_j$ " to -- $\bar{\varphi}_m^{(2)}(x_{j+1}$ --.

Line 7, change "$o($" to -- $O($ --.

Line 11, change "/$y$" to -- /$v$ --.

Line 13, change " $x_{\nu j}^{(\nu)=x}{}_j$ " to -- $x_{\nu j}^{(\nu)} = x_j$ --.

Lines 22, 25, 28, 35, 36, 38, 40, 44, 46 and 51, change " $\bar{\psi}_m^{(2)}$ " to -- $\bar{\varphi}_m^{(2)}$ --.

Line 32, change " $\bar{\psi}_m^{(2)}(x_{j+1}, y)$ " to -- $\bar{\varphi}_m^{(2)}(x_{j+1}, y)$ --.

Line 32, change " $8195\bar{\psi}_m^{(2)}$ " to -- $8192\bar{\varphi}_m^{(2)}$ --.

Line 32, change " $6561\bar{\psi}_m^{(2)}$ " to -- $6561\bar{\varphi}_m^{(2)}$ --.

Line 34, change " $896\bar{\psi}_m^{(2)}$ " to -- $896\bar{\varphi}_m^{(2)}$ --.

Line 34, change " $7\bar{\psi}_m^{(2)}$ " to -- $7\bar{\varphi}_m^{(2)}$ --.

Lines 37 and 39, change " $\bar{\Psi}_m$ " to -- $\bar{\Phi}_m$ --.

Line 42, change " $\bar{\psi}_m^{(2)}$ with " to -- $\bar{\varphi}_m^{(2)}$ with --.

Line 42, change " $\bar{\psi}_m^{(2)}$ in " to -- $\bar{\varphi}_m^{(2)}$ in --.

Line 44, change " $\bar{\Psi}_m$ " to -- $\bar{\Phi}_m$ --.

Line 45, change " $\mathcal{J}_N^{-1}$ " to -- $\mathcal{F}_N^{-1}$ --.

Line 45, change " $\mathcal{J}_N\{\bar{\Psi}_m$ " to -- $\mathcal{F}_N\{\bar{\Phi}_m$ --.

Line 48, change " $\bar{\psi}_m^{(1)}$ " to -- $\bar{\varphi}_m^{(1)}$ --.

Line 54, change "$n^2$" to -- $\eta^2$ --.

Line 65, change " $\bar{\psi}_m^{(2)}(x_{j+1}, y)$ " to -- $\bar{\varphi}_m^{(2)}(x_{j+1}, y)$ --.

Line 65, change " $4\bar{\psi}_m^{(2)}$ " to -- $4\bar{\varphi}_m^{(2)}$ --.

Line 65, change " $-\bar{\psi}_m^{(2)}$ " to -- $-\bar{\varphi}_m^{(2)}$ --.

UNITED STATES PATENT AND TRADEMARK OFFICE
CERTIFICATE OF CORRECTION

PATENT NO. : 6,876,598 B1
DATED : April 5, 2005
INVENTOR(S) : Ronald Francis Pannatoni It is certified that error appears in the above-identified patent and that said Letters Patent is hereby corrected as shown below:

Column 50 (cont'd),
Line 66, change "$\bar{\psi}_m^{(2)}(x_{j+1}, y)$" to -- $\bar{\varphi}_m^{(2)}(x_{j+1}, y)$ --.
Line 66, change "$243\bar{\psi}_m^{(2)}$" to -- $243\bar{\varphi}_m^{(2)}$ --.
Line 66, change "$128\bar{\psi}_m^{(2)}$" to -- $128\bar{\varphi}_m^{(2)}$ --.
Line 67, change "$5\bar{\psi}_m^{(2)}$" to -- $5\bar{\varphi}_m^{(2)}$ --.

Column 51,
Line 1, change "$\bar{\psi}_m^{(2)}$" to -- $\bar{\varphi}_m^{(2)}$ --.

Column 52,
Line 35, change "crust" to -- atmosphere --.

Signed and Sealed this

Sixth Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,876,598 B1 | |
| APPLICATION NO. | : 10/860905 | |
| DATED | : April 5, 2005 | |
| INVENTOR(S) | : Ronald Francis Pannatoni | |

It is certified that error appears in the above-identified patent and that said Letters Patent is hereby corrected as shown below:

Delete the title page and substitute therefore the attached title page.

Delete Drawing Sheets 1-4 and substitute therefore the attached Drawing Sheets 1-4.

Delete Columns 1-54 and substitute therefore the attached Columns 1-54.

This certificate supersedes the Certificate of Correction issued June 6, 2006.

Signed and Sealed this

Twelfth Day of August, 2008

JON W. DUDAS
*Director of the United States Patent and Trademark Office*

United States Patent
Pannatoni

(10) Patent No.: US 6,876,598 B1
(45) Date of Patent: Apr. 5, 2005

(54) METHOD FOR PREDICTING PROPAGATION OF SOUND IN AN OCEAN

(76) Inventor: Ronald Francis Pannatoni, 540 Mark Dowdle Rd., Franklin, NC (US) 28734

( * ) Notice: Subject to any disclaimer, the term of this patent is extended or adjusted under 35 U.S.C. 154(b) by 38 days.

(21) Appl. No.: 10/860,905

(22) Filed: Jun. 4, 2004

Related U.S. Application Data
(60) Provisional application No. 60/478,573, filed on Jun. 12, 2003.

(51) Int. Cl.$^7$ ............... H04B 11/00; G01V 1/28
(52) U.S. Cl. ............... 367/13; 367/131; 702/14; 703/5
(58) Field of Search ............... 367/13, 131; 702/127, 702/181, 14; 455/423; 703/5

(56) References Cited

U.S. PATENT DOCUMENTS
| | | | |
|---|---|---|---|
| 5,126,978 A | * | 6/1992 | Chaum ............... 367/135 |
| 5,642,445 A | * | 6/1997 | Bucaro et al. ............... 367/13 |
| 6,640,089 B1 | * | 10/2003 | Kanaan et al. ............... 702/127 |

OTHER PUBLICATIONS

Ahmad T. Abawi, William A. Kuperman, Michael D. Collins "The Coupled Mode Parabolic Equation", Journal of the Acoustical Society of America, Jul. 1997, pp. 233–238, vol. 102, No. 1, Acoustical Society of America, USA.*

Michael D. Collins, "The Adiabatic Mode Parabolic Equation", Journal of the Acoustical Society of America, Oct. 1993, pp. 2269–2278, vol. 94, No. 4, Acoustical Society of America, USA.

* cited by examiner

*Primary Examiner*—Ian J. Lobo

(57) ABSTRACT

Propagation of sound in an ocean is accurately predicted at all ranges from a source by a computational method that uses a newly created Decomposition Method to make the predictions at long range from the source. The predictions are done in a limited region of the ocean without the need to predict propagation of sound outside the region. The vertical boundaries of the region are parallel to a given direction of propagation of sound from the source. These boundaries are transparent, and sound penetrates them without reflection. The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region. The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sum. The actual sound field in the region is found from this sum. A modification of the Decomposition Method incorporates an extrapolation procedure to ensure accuracy of the predictions at long range from the source.

5 Claims, 4 Drawing Sheets

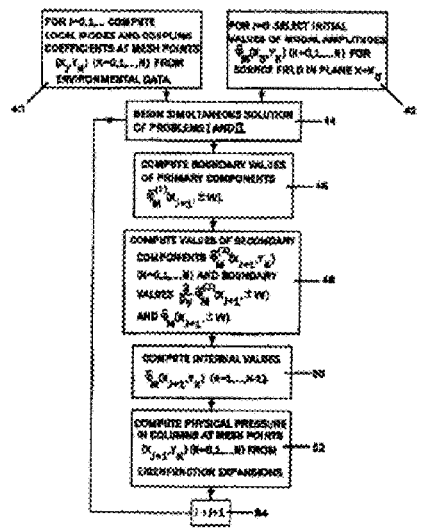

METHOD FOR PREDICTING PROPAGATION OF SOUND IN AN OCEAN

CROSS-REFERENCE TO RELATED APPLICATIONS

This application claims the benefit of PPA Ser. No. 60/478,573, filed Jun. 12, 2003 by the present inventor.

FEDERALLY SPONSORED RESEARCH

Not applicable

SEQUENCE LISTING OR PROGRAM

Not applicable

BACKGROUND OF THE INVENTION

1. Field of the Invention

The invention pertains to a method for predicting propagation of sound in an ocean.

2. Description of the Related Art

For the purpose of predicting propagation of sound in an ocean, the ocean can be modelled as a three-dimensional acoustic waveguide that is spatially irregular. A partial differential wave equation governs propagation of sound in the waveguide. A complex-valued distribution of pressure represents the sound field in this equation. However, the sound field also can be represented in terms of the local modes of the waveguide. This representation is useful because it reduces the dimensionality of the model. The equations that govern this representation are obtained by taking moments of the wave equation with respect to the local modes. These moments produce a system of coupled mode equations in two horizontal dimensions. The solution of these coupled mode equations can be used to reconstruct the sound field at any depth in the waveguide from the local mode representation.

Figure 1:
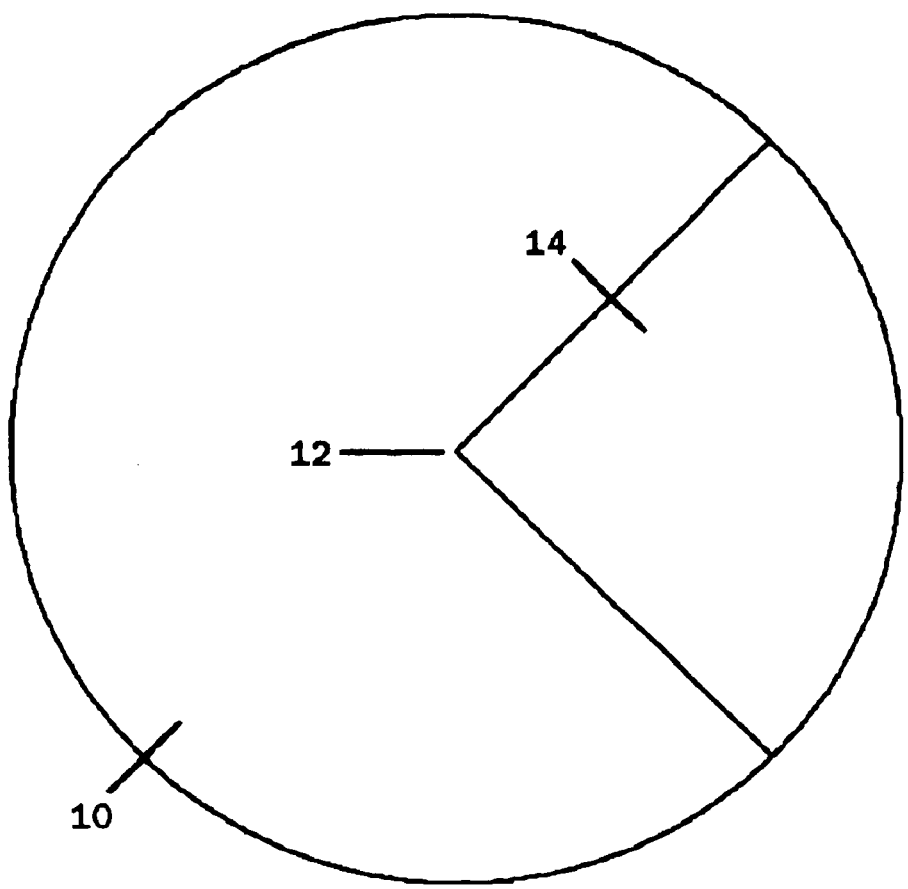
FIG. 1 shows a circular region where prior art methods predict propagation of sound.

In FIG. 1 there is shown a circular region 10 in the horizontal plane with a source of sound at the center 12. An article by A. T. Abawi, W. A. Kuperman and M. D. Collins ("The coupled mode parabolic equation", Journal of the Acoustical Society of America, Vol. 102, No. 1, pp. 233-238, July 1997) discusses a numerical method for solving coupled mode equations to predict propagation of sound over region 10. This method is an elaboration of an earlier numerical method that was developed by M. D. Collins ignoring coupling among the modes. Propagation of sound is predicted over all of region 10. The preferred direction of propagation is the radially outward direction from the center 12.

An article by M. D. Collins ("The adiabatic mode parabolic equation", Journal of the Acoustical Society of America, Vol. 94, No. 4, pp. 2269-2278, October 1993) points out that it would be very efficient to make predictions just over an angular sector 14 of small angular width. The article notes that transparent boundary conditions would have to be imposed along the radial edges of sector 14 for this purpose, but it does not indicate how to formulate these conditions or how to adopt them in a solution method. The article by A. T. Abawi, W. A. Kuperman and M. D. Collins does not address these issues at all.

SUMMARY OF THE INVENTION

The invention permits propagation of sound in an ocean to be accurately predicted at all ranges from a source. At long ranges this prediction is done by a newly created Decomposition Method. The predictions are done for fully three-dimensional ocean environments.

The invention permits the predictions to be done in a limited region of the ocean without the need to predict propagation of sound outside the region. The vertical boundaries of the region are parallel to a given direction of propagation of sound from the source. These boundaries are transparent, and sound penetrates them without reflection.

The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region.

The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sum. The actual sound field in the region is found from this sum.

A modification of the Decomposition Method incorporates an extrapolation procedure to ensure that the predictions are accurate at long range from the source.

It is an object of the invention to provide an accurate method for predicting propagation of sound in an ocean.

Another object of the invention is to provide an accurate method for predicting propagation of sound from a source in a limited region of an ocean without the need to predict propagation of sound outside the region.

Yet another object of the invention is to provide an accurate method for predicting propagation of sound from a source in a limited region of an ocean without the need to predict propagation of sound outside the region when the length of the region is much greater than the width of the region.

Other objects, advantages and new features of the invention will be apparent from the following detailed description of the invention when considered in conjunction with the accompanying drawings.

DRAWINGS

FIG. 1 shows a circular region where prior art methods predict propagation of sound.

FIG. 2 shows a section of a waveguide that models the ocean environment.

FIG. 3 shows initial and boundary conditions in the horizontal plane of range and cross-range.

FIG. 4 shows a flowchart for the preferred embodiment of the method of the invention.

DETAILED DESCRIPTION OF THE PREFERRED EMBODIMENT

1. Coupled mode equations in slab geometry and in spherical geometry.

The propagation of sound in an irregular three-dimensional waveguide can be described mathematically by a partial differential equation subject to certain conditions at the boundaries of the waveguide. (By "irregular" we mean that the medium in the waveguide is spatially inhomogeneous. We also assume that this medium can be modelled as a lossless fluid.) Let the variables x, y and z denote range, cross-range and depth in the waveguide, respectively. Let the variables ω, c and ρ denote source frequency, local sound speed and local fluid density in the waveguide, respectively. We let the variable p denote the complex acoustic pressure. This quantity is defined by the property that the physical acoustic pressure is the real part of the product $p \exp(-i\omega t)$, where t denotes time. The partial differential equation in three dimensions that governs p is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \frac{\partial}{\partial z}\left(\frac{1}{\rho}\frac{\partial p}{\partial z}\right) + \frac{1}{\rho}\frac{\omega^2}{c^2} p = 0. \quad (1.1)$$

Referring now to FIG. 2, we assume that the pressure vanishes at a reflective top surface 20 of the waveguide, where z=0, and at a reflective bottom surface 22 of the waveguide, where z=−L:

$$p=0 \text{ at } z=0 \text{ and at } z=-L. \quad (1.2)$$

We also assume that there is a single interface 24 between the surface and the bottom where the local sound speed and the local fluid density can be discontinuous. The depth of this interface can vary with range and with cross-range. We describe the interface by the equation $$S(x,y,z) = H(x,y) + z = 0, \quad (1.3)$$

where $0 < H(x,y) < L$. The acoustic pressure must be continuous across this interface. The component of acoustic fluid velocity that is normal to the interface must also be continuous across the interface. We can express these continuity conditions as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \frac{\partial p}{\partial z}\right) \quad (1.4)$$

are continuous across $z = -H(x, y)$.

It is possible to convert the acoustic equation (1.1) and the conditions (1.2) and (1.4) on it to an equivalent infinite system of coupled partial differential equations in two dimensions. This system is based on the local modes of the waveguide, which are characterized by the eigenfunctions $f_n(x,y,z)$ and by the squared wavenumbers $\xi_n^2(x,y)$ that satisfy the differential equation $$\frac{\partial}{\partial z}\left(\frac{1}{\rho}\frac{\partial f_n}{\partial z}\right) + \frac{1}{\rho}\left(\frac{\omega^2}{c^2} - \xi_n^2\right)f_n = 0 \quad (1.5)$$

if $-L < z < 0$ and $z \neq -H(x, y)$.

subject to the conditions that $$f_n = 0 \text{ at } z = -L \text{ and at } z = 0, \quad (1.6)$$

$$f_n \text{ and } \frac{1}{\rho}\frac{\partial f_n}{\partial z} \text{ are continuous across } z = -H(x, y). \quad (1.7)$$

At each position (x,y) these equations describe a nonsingular selfadjoint characteristic value problem. The squared wavenumbers $\xi_n^2(x,y)$ are real and countably infinite in number. They can be indexed to decrease monotonically to $-\infty$ as the index n increases through the positive integers. The local modes can be computed with numerical methods that are well-known in the art.

At each position (x,y), $\partial f_n(x,y,0)/\partial z = 0$ if and only if $f_n(x,y,z)$ vanishes identically for $-L \leq z \leq 0$. Therefore, we can assume that $\partial f_n(x,y,0)/\partial z \neq 0$ and that $f_n(x,y,z)$ does not vanish identically. Furthermore, we can assume that $f_n(x,y,z)$ is real-valued. Since the density ρ is positive, the eigenfunctions are orthogonal in the following sense:

$$\int_{-L}^{0} \frac{1}{\rho} f_m f_n \, dz = \begin{cases} d_n(x,y) > 0 \text{ if } m = n, \\ 0 \text{ if } m \neq n. \end{cases} \quad (1.8)$$

We also assume that the eigenfunctions are normalized so that the signs of the partial derivatives $\partial f_n(x,y,0)/\partial z$ and the values of the integrals $d_n(x,y)$ are independent of the position (x,y).

The functions p, ∂p/∂x and ∂p/∂y have the following eigenfunction expansions:

$$p = \sum_{n=1}^{\infty} a_n f_n / d_n \text{ where } a_n = \int_{-L}^{0} \frac{1}{\rho} p f_n \, dz, \quad (1.9)$$

$$\frac{\partial p}{\partial x} = \sum_{n=1}^{\infty} b_n f_n / d_n \text{ where } b_n = \int_{-L}^{0} \frac{1}{\rho}\frac{\partial p}{\partial x} f_n \, dz, \quad (1.10)$$

$$\frac{\partial p}{\partial y} = \sum_{n=1}^{\infty} c_n f_n / d_n \text{ where } c_n = \int_{-L}^{0} \frac{1}{\rho}\frac{\partial p}{\partial y} f_n \, dz. \quad (1.11)$$

The coefficients $a_n$, $b_n$ and $c_n$ in these expansions are functions of the position (x,y). They are governed by the following system of coupled partial differential equations.

$$\frac{\partial b_n}{\partial x} + \frac{\partial c_n}{\partial y} + \xi_n^2 a_n = \sum_{m=1}^{\infty} (b_m B_{mn} + c_m C_{mn})\frac{1}{d_m}, \quad (1.12)$$

$$b_n = \frac{\partial a_n}{\partial x} + \sum_{m=1}^{\infty} a_m B_{mn} \frac{1}{d_m}, \quad (1.13)$$

$$c_n = \frac{\partial a_n}{\partial y} + \sum_{m=1}^{\infty} a_m C_{mn} \frac{1}{d_m}. \quad (1.14)$$

These equations constitute the fundamental first-order formulation of coupled mode theory for an irregular three-dimensional waveguide.

The coupling coefficients $B_{mn}$ and $C_{mn}$ can be computed as follows. Let $$g_n = \frac{1}{\rho}\frac{\partial f_n}{\partial z} \quad (1.15)$$

and define the following matrix elements:

$$D_{mn} = \int_{-L}^{0} \left[\frac{\partial}{\partial x}\left(\frac{1}{\rho}\frac{\omega^2}{c^2}\right)f_m f_n + \frac{\partial \rho}{\partial x} g_m g_n\right] dz, \quad (1.16)$$

$$E_{mn} = \int_{-L}^{0} \frac{\partial}{\partial x}\left(\frac{1}{\rho}\right) f_m f_n \, dz, \quad (1.17)$$

$$F_{mn} = \int_{-L}^{0} \left[\frac{\partial}{\partial y}\left(\frac{1}{\rho}\frac{\omega^2}{c^2}\right)f_m f_n + \frac{\partial \rho}{\partial y} g_m g_n\right] dz, \quad (1.18)$$

$$G_{mn} = \int_{-L}^{0} \frac{\partial}{\partial y}\left(\frac{1}{\rho}\right) f_m f_n \, dz, \quad (1.19)$$

-continued $$J_{mn} = \left[\frac{1}{\rho}\frac{\omega^2}{c^2}\right]_{-H-0}^{-H+0} f_m(-H)f_n(-H) + \quad (1.20)$$
$$[\rho]_{-H-0}^{-H+0} g_m(-H)g_n(-H).$$

$$K_{mn} = \left[\frac{1}{\rho}\right]_{-H-0}^{-H+0} f_m(-H)f_n(-H). \quad (1.21)$$

If $m \ne n$ then $$B_{mn} = -(\xi_m^2 - \xi_n^2)^{-1}\left[D_{mn} - E_{mn}\xi_n^2 + \frac{\partial H}{\partial x}(J_{mn} - K_{mn}\xi_n^2)\right], \quad (1.22)$$

$$C_{mn} = -(\xi_m^2 - \xi_n^2)^{-1}\left[F_{mn} - G_{mn}\xi_n^2 + \frac{\partial H}{\partial y}(J_{mn} - K_{mn}\xi_n^2)\right], \quad (1.23)$$

and $$B_{nn} = -\frac{1}{2}\left(E_{nn} + \frac{\partial H}{\partial x}K_{nn}\right), \quad (1.24)$$

$$C_{nn} = -\frac{1}{2}\left(G_{nn} + \frac{\partial H}{\partial y}K_{nn}\right). \quad (1.25)$$

In practice, it is necessary to work with a finite number of coupled mode equations. For this reason, we truncate the coupled mode equations (1.12–1.14) as follows. Fixing a positive integer M, we assume that the expansion coefficients $a_n$, $b_n$, and $c_n$ vanish if $n > M$. Thus, if $n = 1, \ldots, M$ then $$\frac{\partial b_n}{\partial x} + \frac{\partial c_n}{\partial y} + \xi_n^2 a_n = \sum_{m=1}^{M} (b_m B_{mn} + c_m C_{mn})\frac{1}{d_m}, \quad (1.26)$$

$$b_n = \frac{\partial a_n}{\partial x} + \sum_{m=1}^{M} a_m B_{nm}\frac{1}{d_m}, \quad (1.27)$$

$$c_n = \frac{\partial a_n}{\partial y} + \sum_{m=1}^{M} a_m C_{nm}\frac{1}{d_m}. \quad (1.28)$$

We can reduce this system of equations to an equivalent system of second-order partial differential equations for just the coefficients $a_n$. If $n = 1, \ldots, M$ then $$\frac{\partial^2 a_n}{\partial x^2} + \frac{\partial^2 a_n}{\partial y^2} + \xi_n^2 a_n = \sum_{m=1}^{M}\left(\alpha_{mn}a_m + \beta_{mn}\frac{\partial a_m}{\partial x} + \gamma_{mn}\frac{\partial a_m}{\partial y}\right)\frac{1}{d_m}, \quad (1.29)$$

where $$\alpha_{mn} = \sum_{l=1}^{M}(B_{lm}B_{ln} + C_{lm}C_{ln})\frac{1}{d_l} - \frac{\partial B_{mn}}{\partial x} - \frac{\partial C_{mn}}{\partial y}, \quad (1.30)$$

$$\beta_{mn} = B_{mn} - B_{nm}, \quad \gamma_{mn} = C_{mn} - C_{nm}. \quad (1.31)$$

The waveguide considered in the preceding discussion is a slab between two parallel planes. Now let us consider a waveguide that is a shell between two concentric spheres. Let the radius of the outer sphere be $R_0$, and let the radius of the inner sphere be $R_0 - L$. We pick a spherical coordinate system for this problem anticipating that our analysis of sound propagating in the shell will be restricted to a neighborhood of a great circle E on the outer sphere. We identify E as the equator of this sphere. Let M denote another great circle on the outer sphere that intersects E at right angles and near the source of sound in the waveguide. We identify M as the prime meridian of the outer sphere.

Let P denote a point in the shell. We let r be the radial distance of P from the common center of the spheres. We let $\psi$ be the angle of latitude of P relative to the equator E. We let $\phi$ be the angle of longitude of P relative to the prime meridian M. For definiteness let $\phi=0$ where E intersects M near the source.

It is convenient to introduce a new system of coordinates (x,y,z).

$$x = R_0\phi, \quad y = R_0\ln(\sec\psi + \tan\psi), \quad z = r - R_0. \quad (1.32)$$

Note that $y \approx R_0\psi$ if $|\psi| \ll 1$. In the new coordinate system the partial differential equation that governs the acoustic pressure p in the waveguide is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \quad (1.33)$$
$$\cos^2\psi\frac{\partial}{\partial z}\left(\frac{1}{\rho}\frac{r^2}{R_0^2}\frac{\partial p}{\partial z}\right) + \cos^2\psi\frac{1}{\rho}\frac{\omega^2}{c^2}\frac{r^2}{R_0^2}p = 0.$$

We assume that the pressure vanishes on the outer sphere, where $z=0$, and on the inner sphere, where $z=-L$:

$$p=0 \text{ at } z=0 \text{ and at } z=-L. \quad (1.34)$$

We also assume that there is a single interface between these spheres where the local sound speed and the local fluid density in the shell can be discontinuous. The radial coordinate of this interface can vary with latitude and with longitude. We describe the interface in the new coordinate system by the equation $$S(x,y,z) = H(x,y) + z = 0, \quad (1.35)$$

where $0 < H(x,y) < L$. We can express the continuity conditions at the interface as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \cos^2\psi\frac{r^2}{R_0^2}\frac{\partial p}{\partial z}\right) \quad (1.36)$$

are continuous across $z = -H(x, y)$.

The local modes of the spherical shell waveguide are characterized by the eigenfunctions $f_n(x,y,z)$ and by the squared wavenumbers $\xi_n^2(x,y)$ that satisfy the differential equation $$\frac{\partial}{\partial z}\left(\frac{1}{\rho}\frac{r^2}{R_0^2}\frac{\partial f_n}{\partial z}\right) + \frac{1}{\rho}\left(\frac{\omega^2}{c^2}\frac{r^2}{R_0^2} - \xi_n^2\right)f_n = 0 \quad (1.37)$$

if $-L < z < 0$ and $z \ne -H(x, y)$, subject to the conditions that $$f_n = 0 \text{ at } z = -L \text{ and at } z = 0, \quad (1.38)$$

$$f_n \text{ and } \frac{1}{\rho}\frac{\partial f_n}{\partial z} \text{ are continuous across } z = -H(x, y). \quad (1.39)$$

At each position (x,y) these equations describe a nonsingular selfadjoint characteristic value problem. The squared wavenumbers $\xi_n^2(x,y)$ are real and countably infinite in number. We can assume that they are indexed to decrease monotonically to $-\infty$ as the index n increases through the positive integers. We can also assume that $\partial f_n(x,y,0)/\partial z \neq 0$ and that $f_n(x,y,z)$ does not vanish identically. Furthermore, we can assume that $f_n(x,y,z)$ is real-valued. Since the density $\rho$ is positive, the eigenfunctions are orthogonal in the following sense:

$$\int_{-L}^{0} \frac{1}{\rho} f_m f_n \, dz = \begin{cases} d_n(x,y) > 0 \text{ if } m = n, \\ 0 \text{ if } m \neq n. \end{cases} \quad (1.40)$$

We assume that the eigenfunctions are normalized so that the signs of the partial derivatives $\partial f_n(x,y,0)/\partial z$ and the values of the integrals $d_n(x,y)$ are independent of the position $(x,y)$.

The functions $p$, $\partial p/\partial x$ and $\partial p/\partial y$ have the following eigenfunction expansions:

$$p = \sum_{n=1}^{\infty} a_n f_n / d_n \text{ where } a_n = \int_{-L}^{0} \frac{1}{\rho} p f_n \, dz, \quad (1.41)$$

$$\frac{\partial p}{\partial x} = \sum_{n=1}^{\infty} b_n f_n / d_n \text{ where } b_n = \int_{-L}^{0} \frac{1}{\rho} \frac{\partial p}{\partial x} f_n \, dz, \quad (1.42)$$

$$\frac{\partial p}{\partial y} = \sum_{n=1}^{\infty} c_n f_n / d_n \text{ where } c_n = \int_{-L}^{0} \frac{1}{\rho} \frac{\partial p}{\partial y} f_n \, dz. \quad (1.43)$$

The coefficients $a_n$, $b_n$ and $c_n$ in these expansions are functions of the position $(x,y)$. They are governed by the following system of partial differential equations.

$$\frac{\partial b_n}{\partial x} + \frac{\partial c_n}{\partial y} + \xi_n^2 \cos^2 \psi \, a_n = \sum_{m=1}^{\infty} (b_m B_{mn} + c_m C_{mn}) \frac{1}{d_m}, \quad (1.44)$$

$$b_n = \frac{\partial a_n}{\partial x} + \sum_{m=1}^{\infty} a_m B_{nm} \frac{1}{d_m}, \quad (1.45)$$

$$c_n = \frac{\partial a_n}{\partial y} + \sum_{m=1}^{\infty} a_m C_{nm} \frac{1}{d_m}. \quad (1.46)$$

These equations constitute the fundamental first-order formulation of coupled mode theory for an irregular three-dimensional waveguide in spherical geometry.

The coupling coefficients $B_{mn}$ and $C_{mn}$ can be computed as follows. Let $$g_n = \frac{1}{\rho} \frac{\partial f_n}{\partial z} \quad (1.47)$$

and define the following matrix elements:

$$D_{mn} = \int_{-L}^{0} \left[ \frac{\partial}{\partial x} \left( \frac{1}{\rho} \frac{\omega^2}{c^2} \right) f_m f_n + \frac{\partial \rho}{\partial x} g_m g_n \right] \frac{r^2}{R_0^2} \, dz, \quad (1.48)$$

$$E_{mn} = \int_{-L}^{0} \frac{\partial}{\partial x} \left( \frac{1}{\rho} \right) f_m f_n \, dz, \quad (1.49)$$

$$F_{mn} = \int_{-L}^{0} \left[ \frac{\partial}{\partial y} \left( \frac{1}{\rho} \frac{\omega^2}{c^2} \right) f_m f_n + \frac{\partial \rho}{\partial y} g_m g_n \right] \frac{r^2}{R_0^2} \, dz, \quad (1.50)$$

$$G_{mn} = \int_{-L}^{0} \frac{\partial}{\partial y} \left( \frac{1}{\rho} \right) f_m f_n \, dz, \quad (1.51)$$

-continued $$J_{mn} = \left\{ \left[ \frac{1}{\rho} \frac{\omega^2}{c^2} \right]_{-H-0}^{-H+0} f_m(-H) f_n(-H) + [\rho]_{-H-0}^{-H+0} g_m(-H) g_n(-H) \right\} (1 - H/R_0)^2, \quad (1.52)$$

$$K_{mn} = \left[ \frac{1}{\rho} \right]_{-H-0}^{-H+0} f_m(-H) f_n(-H). \quad (1.53)$$

These definitions differ in form from the corresponding definitions for the slab waveguide only by the radial factors in the formulas for the matrix elements $D_{mn}$, $F_{mn}$ and $J_{mn}$. If $m \neq n$ then $$B_{mn} = -(\xi_m^2 - \xi_n^2)^{-1} \left[ D_{mn} - E_{mn}\xi_n^2 + \frac{\partial H}{\partial x}(J_{mn} - K_{mn}\xi_n^2) \right], \quad (1.54)$$

$$C_{mn} = -(\xi_m^2 - \xi_n^2)^{-1} \left[ F_{mn} - G_{mn}\xi_n^2 + \frac{\partial H}{\partial y}(J_{mn} - K_{mn}\xi_n^2) \right], \quad (1.55)$$

and $$B_{nn} = -\frac{1}{2} \left( E_{nn} + \frac{\partial H}{\partial x} K_{nn} \right), \quad (1.56)$$

$$C_{nn} = -\frac{1}{2} \left( G_{nn} + \frac{\partial H}{\partial y} K_{nn} \right). \quad (1.57)$$

These equations are formally identical to the corresponding equations for the slab waveguide.

Let us truncate eqs.(1.44–1.46) by fixing a positive integer M and assuming that the expansion coefficients $a_n$, $b_n$ and $c_n$ vanish if $n > M$. Thus, if $n = 1, \ldots, M$ then $$\frac{\partial b_n}{\partial x} + \frac{\partial c_n}{\partial y} + \xi_n^2 \cos^2 \psi \, a_n = \sum_{m=1}^{M} (b_m B_{mn} + c_m C_{mn}) \frac{1}{d_m}, \quad (1.58)$$

$$b_n = \frac{\partial a_n}{\partial x} + \sum_{m=1}^{M} a_m B_{nm} \frac{1}{d_m}, \quad (1.59)$$

$$c_n = \frac{\partial a_n}{\partial y} + \sum_{m=1}^{M} a_m C_{nm} \frac{1}{d_m}. \quad (1.60)$$

We can reduce this system of equations to an equivalent system of second-order partial differential equations for just the coefficients $a_n$. If $n = 1, \ldots, M$ then $$\frac{\partial^2 a_n}{\partial x^2} + \frac{\partial^2 a_n}{\partial y^2} + \xi_n^2 \cos^2 \psi \, a_n = \sum_{m=1}^{M} \left( \alpha_{mn} a_m + \beta_{mn} \frac{\partial a_m}{\partial x} + \gamma_{mn} \frac{\partial a_m}{\partial y} \right) \frac{1}{d_m}, \quad (1.61)$$

where $$\alpha_{mn} = \sum_{l=1}^{M} (B_{ln} B_{lm} + C_{ln} C_{lm}) \frac{1}{d_l} - \frac{\partial B_{mn}}{\partial x} - \frac{\partial C_{mn}}{\partial y}, \quad (1.62)$$

$$\beta_{mn} = B_{mn} - B_{nm}, \quad \gamma_{mn} = C_{mn} - C_{nm}. \quad (1.63)$$

2. Paraxial approximations for coupled mode equations.

Since the coupled mode equations (1.29,1.61) are elliptic partial differential equations, they can model propagation in all directions at the same time. In many problems of practical interest, however, it is sufficient to consider a single direction of propagation at a time. In slab geometry we can take this direction to be the direction of increasing range, and in spherical geometry we can take it to be the direction of increasing longitude along the equator. In each case, we can formulate parabolic equations from the coupled mode equations to model propagation of sound in the given direction. We shall describe how to formulate these parabolic equations from the coupled mode equations in slab geometry. The approach is identical for the coupled mode equations in spherical geometry.

We let the normalization integral $d_m=1$ for every index m. Hence, the coupled mode equations take the form $$\frac{\partial^2 a_m}{\partial x^2} + \frac{\partial^2 a_m}{\partial y^2} + \xi_m^2 a_m = \sum_{n=1}^{M}\left(\alpha_{mn} a_n + \beta_{mn}\frac{\partial a_n}{\partial x} + \gamma_{mn}\frac{\partial a_n}{\partial y}\right) \quad (2.1)$$

$(m=1,\ldots,M)$.

We introduce a positive reference wavenumber $k_m(x)$ for each index m at every range x. We define the corresponding reference phase $\vartheta_m(x)$ by $$\vartheta_m(x) = \int_0^x k_m(u)du \quad (2.2)$$

We define the complex amplitude $\varphi_m(x,y)$ of the expansion coefficient $a_m(x,y)$ as follows.

$$\varphi_m(x,y) = a_m(x,y)\exp\{-i\vartheta_m(x)\}. \quad (2.3)$$

Noting that $d\vartheta_m(x)/dx = k_m(x)$ and letting $\dot{k}_m(x) = dk_m(x)/dx$, we see that $$\frac{\partial a_m}{\partial x} = \left(\frac{\partial \varphi_m}{\partial x} + ik_m\varphi_m\right)e^{i\vartheta_m}, \quad (2.4)$$

$$\frac{\partial^2 a_m}{\partial x^2} = \left(\frac{\partial^2 \varphi_m}{\partial x^2} + 2ik_m\frac{\partial \varphi_m}{\partial x} + i\dot{k}_m\varphi_m - k_m^2\varphi_m\right)e^{i\vartheta_m}. \quad (2.5)$$

Now we assume that the following paraxial approximations are valid:

$$\left|\frac{\partial^2 \varphi_m}{\partial x^2}\right| \ll 2k_m\left|\frac{\partial \varphi_m}{\partial x}\right| \quad (m=1,\ldots,M). \quad (2.6)$$

These assumptions allow us to approximate eq.(2.5) by deleting the first term on its right-hand side (RHS).

$$\frac{\partial^2 a_m}{\partial x^2} \approx \left(2ik_m\frac{\partial \varphi_m}{\partial x} + i\dot{k}_m\varphi_m - k_m^2\varphi_m\right)e^{i\vartheta_m}. \quad (2.7)$$

Combining eqs.(2.3,2.4,2.7) with eq.(2.1), we get the following coupled parabolic equations.

$$2ik_m\frac{\partial \varphi_m}{\partial x} + i\dot{k}_m\varphi_m + \frac{\partial^2 \varphi_m}{\partial y^2} = (k_m^2 - \xi_m^2)\varphi_m + \quad (2.8)$$
$$\sum_{n=1}^{M}\left\{(\alpha_{mn} + \beta_{mn}ik_n)\varphi_n + \beta_{mn}\frac{\partial \varphi_n}{\partial x} + \gamma_{mn}\frac{\partial \varphi_n}{\partial y}\right\}e^{i(\vartheta_n-\vartheta_m)}$$

for $m=1,\ldots,M$.

Note the appearance of the partial derivatives $\partial\varphi_n/\partial x$ on the RHS of eq.(2.8). Let us rewrite the coupled parabolic equations as follows.

$$2i\left[k_m\frac{\partial\varphi_m}{\partial x} + \frac{1}{2}\sum_{n=1}^{M}\beta_{mn}e^{i(\vartheta_n-\vartheta_m)}\frac{\partial\varphi_n}{\partial x}\right] = -i\dot{k}_m\varphi_m - \frac{\partial^2\varphi_m}{\partial y^2} + \quad (2.9)$$
$$(k_m^2 - \xi_m^2)\varphi_m + \sum_{n=1}^{M}\left\{(\alpha_{mn} + \beta_{mn}ik_n)\varphi_n + \gamma_{mn}\frac{\partial\varphi_n}{\partial y}\right\}e^{i(\vartheta_n-\vartheta_m)}$$

for $m=1,\ldots,M$. This system of equations can be solved uniquely for the partial derivatives $\partial\varphi_n/\partial x$ if and only if the matrix $$\mathbf{M} = \begin{bmatrix} k_1 & (i/2)\beta_{12}e^{i(\vartheta_2-\vartheta_1)} & \cdots & (i/2)\beta_{1M}e^{i(\vartheta_M-\vartheta_1)} \\ (i/2)\beta_{21}e^{i(\vartheta_1-\vartheta_2)} & k_2 & \cdots & (i/2)\beta_{2M}e^{i(\vartheta_M-\vartheta_2)} \\ \cdots & \cdots & \cdots & \cdots \\ (i/2)\beta_{M1}e^{i(\vartheta_1-\vartheta_M)} & (i/2)\beta_{M2}e^{i(\vartheta_2-\vartheta_M)} & \cdots & k_M \end{bmatrix} \quad (2.10)$$

is nonsingular. (Note that $\beta_{mm}=0$ for every m.)

We call $\mathbf{M}$ the reference matrix. Since the coupling coefficients $\beta_{mn}$ are real-valued and skew-symmetric (that is, $\beta_{nm}=-\beta_{mn}$ for every m and n), this matrix is Hermitian. Note that $\mathbf{M}$ is a function of position (x,y). We shall assume that $\mathbf{M}$ is positive definite at every position (x,y). A sufficient condition for $\mathbf{M}$ to be positive definite is that this matrix be strictly diagonally dominant.

$$k_n > (1/2)\sum_{m\neq n}|\beta_{mn}| \quad \text{for } n=1,\ldots,M. \quad (2.11)$$

There is a useful alternative formulation of the coupled parabolic equations. First, define $$\psi_m = k_m\varphi_m + (i/2)\sum_{n=1}^{M}\beta_{mn}\varphi_n e^{i(\vartheta_n-\vartheta_m)}, \quad (2.12)$$

$$q_m = (k_m^2 - \xi_m^2)\varphi_m + \quad (2.13)$$
$$\sum_{n=1}^{M}\left\{\left(\alpha_{mn} + \frac{\dot{k}_n}{2k_n}\beta_{mn} + ik_n\beta_{mn} - \frac{\partial\beta_{mn}}{\partial x}\right)\varphi_n + \gamma_{mn}\frac{\partial\varphi_n}{\partial y} + \frac{i}{2k_n}\frac{\partial^2}{\partial y^2}(\beta_{mn}\varphi_n)\right\}e^{i(\vartheta_n-\vartheta_m)}$$

Now the following equation is equivalent to eq.(2.8).

$$2ik_m \frac{\partial \psi_m}{\partial x} - ik_m \psi_m + \frac{\partial^2 \psi_m}{\partial y^2} = k_m Q_m. \quad (2.14)$$

Although eqs.(2.8,2.14) are similar, they differ in one important way: no partial derivative with respect to x of any dependent variable appears on the RHS of eq.(2.14).

Note that we can solve the system of equations (2.12) (m=1, ..., M) for the complex amplitudes $\varphi_m$ because the reference matrix $\mathbf{M}$ is nonsingular. Define the complex column vectors $$\varphi = (\varphi_1, \varphi_2, \ldots, \varphi_M)^T, \quad (2.15)$$

$$\psi = (\psi_1, \psi_2, \ldots, \psi_M)^T, \quad (2.16)$$

where the superscript T indicates transpose. Then, $\psi = \mathbf{M}\varphi$, so $\varphi = \mathbf{M}^{-1}\psi$.

Solutions of the coupled parabolic equations (2.8) obey a conservation law involving two quantities that are closely related to power flow in the waveguide. These quantities are $$J_P = \sum_{m=1}^{M} k_m |\varphi_m|^2 + (i/2) \sum_{m,n=1}^{M} \beta_{mn} \bar{\varphi}_m \varphi_n e^{-i(k_m - k_n)x}, \quad (2.17)$$

$$K_P = \frac{i}{2} \left[ \sum_{m=1}^{M} \left( \varphi_m \frac{\partial \bar{\varphi}_m}{\partial y} - \frac{\partial \varphi_m}{\partial y} \bar{\varphi}_m \right) + \sum_{m,n=1}^{M} \gamma_{mn} \bar{\varphi}_m \varphi_n e^{-i(k_m - k_n)x} \right], \quad (2.18)$$

where $\bar{\varphi}$ is the complex conjugate of $\varphi$. The conservation law states that $$\frac{\partial J_P}{\partial x} + \frac{\partial K_P}{\partial y} = 0. \quad (2.19)$$

Note that $J_P = \varphi^H \mathbf{M} \varphi$, where $\varphi^H = [\bar{\varphi}_1, \bar{\varphi}_2, \ldots, \bar{\varphi}_M]$ is the Hermitian transpose of $\varphi$. If $\varphi \neq 0$, then $J_P > 0$ because $\mathbf{M}$ is positive definite.

Now let us discuss power flow in the waveguide and show how the quantities $J_P$ and $K_P$ are related to it. First, consider a vertical strip of infinitesimal width $\Delta y$ that extends from the bottom of the waveguide at $z=-L$ to the surface of the waveguide at $z=0$ and that is perpendicular to the x direction. The time-averaged power through the strip is $(2\omega)^{-1} J \Delta y$, where $$J = \frac{1}{2i} \int_{-L}^{0} \frac{1}{\rho} \left( \bar{p} \frac{\partial p}{\partial x} - p \frac{\partial \bar{p}}{\partial x} \right) dz. \quad (2.20)$$

Second, consider a vertical strip of infinitesimal width $\Delta x$ that extends from the bottom of the waveguide to the surface of the waveguide and that is perpendicular to the y direction. The time-averaged power through this strip is $(2\omega)^{-1} K \Delta x$, where $$K = \frac{1}{2i} \int_{-L}^{0} \frac{1}{\rho} \left( \bar{p} \frac{\partial p}{\partial y} - p \frac{\partial \bar{p}}{\partial y} \right) dz. \quad (2.21)$$

Finally, consider a vertical cylinder that extends from the bottom of the waveguide to the surface of the waveguide and that has a simply-connected cross-section A. Using Green's theorem, we find that the time-averaged power out of this cylinder is $$\frac{1}{2\omega} \oint_{\partial A} (J dy - K dx) = \frac{1}{2\omega} \int\int_A \left( \frac{\partial J}{\partial x} + \frac{\partial K}{\partial y} \right) dx \, dy, \quad (2.22)$$

where the boundary curve $\partial A$ has the usual counterclockwise orientation. Note that the partial derivatives $\partial J/\partial x$ and $\partial K/\partial y$ have the physical dimensions of power flux, that is, power/area×time. For this reason, we call J and K power flux integrals.

Suppose that we evaluate these power flux integrals for a solution of the acoustic equation (1.1) that satisfies eq.(1.2) at the boundaries and eq.(1.4) at the interface. We can use these equations and the divergence theorem to show that the integral on the left-hand side (LHS) of eq.(2.22) vanishes. Clearly, the integral on the RHS of this equation vanishes as well. Since the cross-section A is arbitrary, it follows that the integrand of this integral must vanish. Thus, $$\frac{\partial J}{\partial x} + \frac{\partial K}{\partial y} = 0 \quad (2.23)$$

for exact solutions of eqs.(1.1,1.2,1.4).

If, however, we evaluate the power flux integrals J and K for an approximate solution of these equations that is constructed from complex amplitude solutions $\varphi_m$ of the coupled parabolic equations (2.8), then we find that $$J = \frac{1}{2i} \sum_{m=1}^{M} \left( \bar{\varphi}_m \frac{\partial \varphi_m}{\partial x} - \varphi_m \frac{\partial \bar{\varphi}_m}{\partial x} \right) + J_P, \quad (2.24)$$

$$K = K_P. \quad (2.25)$$

In this case, eq.(2.19) implies that eq.(2.23) is not valid. Instead, we find that $$\frac{\partial J}{\partial x} + \frac{\partial K}{\partial y} = \frac{1}{2i} \sum_{m=1}^{M} \left( \bar{\varphi}_m \frac{\partial^2 \varphi_m}{\partial x^2} - \varphi_m \frac{\partial^2 \bar{\varphi}_m}{\partial x^2} \right) \quad (2.26)$$

This equation agrees with eq.(2.23) only to the extent that the paraxial approximations (2.6) are satisfied.

3. Adaptive selection of reference wavenumbers to conserve power.

There may be a cross-range W such that we can neglect the acoustic pressure in sections of the waveguide where $|y| > W$. For example, this can happen if the source produces a beam. In this case, we can assume that a pair of hard vertical walls in the planes through $y = \pm W$ transversely bound the waveguide. This assumption makes the waveguide a duct, and it imposes the following Neumann boundary conditions on the complex amplitudes $\varphi_m$.

$$\frac{\partial}{\partial y}\varphi_m(x, \pm W) = 0 \quad \text{for } m = 1, \ldots, M. \quad (3.1)$$

In this case we also can assume that the coupling coefficients $\gamma_{mn}$ vanish at the walls.

$$\gamma_{mn}(x, \pm W) = 0 \quad \text{for } m, n = 1, \ldots, M. \quad (3.2)$$

Under these assumptions, eqs.(2.18, 2.25) imply that the power flux integrals $K = K_p$ vanish at the walls.

$$K(x, \pm W) = K_p(x, \pm W) = 0. \quad (3.3)$$

Thus, if we integrate the conservation law (2.19) from $y = -W$ to $y = W$, then we find that $$\frac{\partial}{\partial x}\int_{-W}^{W} J_p \, dy = 0. \quad (3.4)$$

This equation implies that the integral $$\int_{-W}^{W} J_p \, dy$$

is independent of the range.

If eq.(2.23) were valid, then the longitudinal power $$(2\omega)^{-1}\int_{-W}^{W} J \, dy$$

through the duct would be independent of the range as well. Although eq.(2.23) is not valid for the coupled parabolic equations, we can adaptively select the reference wavenumbers to make the longitudinal power through the duct be independent of the range. If we integrate eq. (2.24) from $y = -W$ to $y = W$, then we get $$\int_{-W}^{W} J \, dy = \sum_{m=1}^{M} \frac{1}{2i}\int_{-W}^{W}\left(\overline{\varphi}_m\frac{\partial \varphi_m}{\partial x} - \varphi_m\frac{\partial \overline{\varphi}_m}{\partial x}\right)dy + \int_{-W}^{W} J_p \, dy. \quad (3.5)$$

Since the integral $$\int_{-W}^{W} J_p \, dy$$

is independent of the range, this equation implies that the longitudinal power through the duct also will be independent of the range if the sum on the RHS is constant. The best way to accomplish this is to require that each summand vanish, which yields the integral constraints $$\int_{-W}^{W}\left(\overline{\varphi}_m\frac{\partial \varphi_m}{\partial x} - \varphi_m\frac{\partial \overline{\varphi}_m}{\partial x}\right)dy = 0 \quad \text{for } m = 1, \ldots, M. \quad (3.6)$$

These constraints are equivalent to a system of coupled quadratic equations in the reference wavenumbers $k_m$. Let $\mathbf{k} = [k_1, k_2, \ldots, k_M]^T$. For $m = 1, \ldots, M$ define the following functions $g_m(\mathbf{k})$.

$$g_m(k) = k_m^2 \int_{-W}^{W}|\varphi_m|^2 dy + \sum_{n=1}^{M} k_n \text{Re}\int_{-W}^{W}\overline{\varphi}_m\varphi_n e^{-i(k_n - k_m)x}dy + \int_{-W}^{W}\left(\left|\frac{\partial \varphi_m}{\partial y}\right|^2 - k_0^2|\varphi_m|^2\right)dy + \sum_{n=1}^{M}\text{Re}\int_{-W}^{W}\overline{\varphi}_m\left(\alpha_{mn}\varphi_n + \beta_{mn}\frac{\partial \varphi_n}{\partial x} + \gamma_{mn}\frac{\partial \varphi_n}{\partial y}\right)e^{-i(k_n - k_m)x}dy. \quad (3.7)$$

Then the constraints (3.6) are satisfied if and only if $$g_m(\mathbf{k}) = 0 \quad \text{for } m = 1, \ldots, M. \quad (3.8)$$

It is convenient to write this equation in vector form. Let $\mathbf{g}(\mathbf{k}) = [g_1(\mathbf{k}), \ldots, g_M(\mathbf{k})]^T$. Then eq.(3.8) is equivalent to the equation $\mathbf{g}(\mathbf{k}) = 0$. In practice we can use Newton's method to solve this equation iteratively. The Jacobian matrix $\partial \mathbf{g}/\partial \mathbf{k}$ that is associated with $\mathbf{g}(\mathbf{k})$ has the elements $$\frac{\partial g_m}{\partial k_n} = \begin{cases} 2k_m\int_{-W}^{W}|\varphi_m|^2 dy & \text{if } m = n, \text{ (since } \beta_{mm} = 0) \\ \text{Re}\int_{-W}^{W}\overline{\varphi}_m\varphi_n\varphi_n e^{-i(k_n - k_m)x}dy & \text{if } m \neq n. \end{cases} \quad (3.9)$$

Given an estimate $\mathbf{k}_0$ of the solution vector $\mathbf{k}$, we can compute a correction $\Delta\mathbf{k}$ to it as the solution of the linear equation $$\left.\frac{\partial \mathbf{g}}{\partial \mathbf{k}}\right|_{\mathbf{k}_0} \cdot \Delta\mathbf{k} = -\mathbf{g}(\mathbf{k}_0). \quad (3.10)$$

Then we replace $\mathbf{k}_0$ with $\mathbf{k}_0 + \Delta\mathbf{k}$. This completes one iteration of Newton's method. The Jacobian matrix $\partial \mathbf{g}/\partial \mathbf{k}$ is real symmetric. If no amplitude $\varphi_m$ vanishes identically and if the reference matrix $\mathbf{M}$ is positive definite at every position, then the Jacobian matrix $\partial \mathbf{g}/\partial \mathbf{k}$ also is positive definite.

The solutions of eq.(3.8) are optimal, but they are expensive to compute. There are suboptimal ways to estimate these reference wavenumbers cheaply that can be useful. For example, if we neglect the coupling coefficients in eq.(3.7), then we get the following approximate solution of eq.(3.8).

$$k_m^2 = \int_{-W}^{W}\left(k_0^2|\varphi_m|^2 - \left|\frac{\partial \varphi_m}{\partial y}\right|^2\right)dy \bigg/ \int_{-W}^{W}|\varphi_m|^2 dy \quad (3.11)$$

for $m = 1, \ldots, M$.

4. Exact integrals of the coupled parabolic equations.

We can use Fourier cosine expansions to integrate the alternative coupled parabolic equations (2.14) subject to Neumann boundary conditions at the boundaries $y = \pm W$, $$\frac{\partial}{\partial y}\varphi_m(x, \pm W) = 0 \quad \text{for } m = 1, \ldots, M. \quad (4.1)$$

It is convenient to introduce the following operator notation. Let $g(y)$ be a continuously differentiable function over the interval $-W \leq y \leq W$ such that $dg(\pm W)/dy = 0$. The Fourier cosine coefficients $g_n$ of $g$ are defined by the integrals $$\hat{g}_n = \hat{\epsilon}_n \int_0^{2W} g(s-W)\cos(n\pi/2W)s)ds/W \qquad (4.2)$$

for $n = 0, 1, 2, \ldots$.

where $\hat{\epsilon}_0 = \frac{1}{2}$ and $\hat{\epsilon}_n = 1$ for $n = 1, 2, \ldots$. Then the Fourier cosine expansion $$g(s-W) = \sum_{n=0}^{\infty} \hat{g}_n \cos((n\pi/2W)s) \quad (0 \le s \le 2W) \qquad (4.3)$$

is uniformly convergent. Let $\hat{g}$ denote the sequence $\{\hat{g}_0, \hat{g}_1, \ldots, \hat{g}_n, \ldots\}$. The function $g$ and the sequence $\hat{g}$ uniquely determine each other. We define the operators $\mathcal{F}$ and $\mathcal{F}^{-1}$ by the relations $$\mathcal{F} g = \hat{g}, \quad \mathcal{F}^{-1} \hat{g} = g. \qquad (4.4)$$

Next, we introduce the spectral parameter $\eta$. This parameter takes on the discrete values $$\eta = n\pi/2W \text{ for } n = 0, 1, 2, \ldots \qquad (4.5)$$

Given a function $h(\eta)$ and a sequence $\mathcal{F} g$, we define the new sequence $h(\eta)\mathcal{F} g$ as follows.

$$h(\eta)\mathcal{F} g = \{h(0)\hat{g}_0, h(\pi/2W)\hat{g}_1, \ldots, h(n\pi/2W)\hat{g}_n, \ldots\}. \qquad (4.6)$$

The integral form of eq.(2.14) is $$\psi_m(x_{j+1}) = \qquad (4.7)$$
$$\left(\frac{k_m(x_{j+1})}{k_m(x_j)}\right)^{1/2} \mathcal{F}^{-1}\left\{\exp\left[-(i\eta^2/2)\int_{x_j}^{x_{j+1}}\frac{du}{k_m(u)}\right]\mathcal{F}\psi_m(x_j)\right\} -$$
$$(i/2)\int_{x_j}^{x_{j+1}}\left(\frac{k_m(x_{j+1})}{k_m(x)}\right)^{1/2}\mathcal{F}^{-1}$$
$$\left\{\exp\left[-(i\eta^2/2)\int_x^{x_{j+1}}\frac{du}{k_m(u)}\right]\mathcal{F}q_m(x)\right\}dx.$$

This equation, which holds for $m = 1, \ldots, M$, is the basis of our method for integrating the coupled parabolic equations numerically.

5. Discrete approximation of the exact integrals.

We shall introduce three numerical approximations in eq.(4.7) that lead to a system of linear equations for the values of the complex amplitudes $\psi_m$ at discrete mesh points in the x,y plane. First, we use the trapezoidal rule to approximate the integral from $x = x_j$ to $x = x_{j+1}$ on the RHS of this equation. Letting $\Delta x = x_{j+1} - x_j$ and neglecting terms of $O((\Delta x)^3)$, we get $$\psi_m(x_{j+1}) + (i\Delta x/4)q_m(x_{j+1}) = \left(\frac{k_m(x_{j+1})}{k_m(x_j)}\right)^{1/2} \times \mathcal{F}^{-1} \qquad (5.1)$$
$$\left\{\exp\left[-(i\eta^2/2)\int_{x_j}^{x_{j+1}}\frac{du}{k_m(u)}\right]\mathcal{F}[\psi_m(x_j) - (i\Delta x/4)q_m(x_j)]\right\}$$

We also can use the trapezoidal rule to approximate the argument of the exponential function in eq.(5.1). Neglecting terms of $O((\Delta x)^3)$, we get $$\int_{x_j}^{x_{j+1}} \frac{du}{k_m(u)} = (k_m^{-1}(x_j) + k_m^{-1}(x_{j+1}))\Delta x/2. \qquad (5.2)$$

We can approximate the phases $\vartheta_m(x_{j+1})$ the same way. Neglecting terms of $O((\Delta x)^3)$, we get $$\vartheta_m(x_{j+1}) = \vartheta_m(x_j) + \int_{x_j}^{x_{j+1}} k_m(u) du \qquad (5.3)$$
$$= \vartheta_m(x_j) + (k_m(x_j) + k_m(x_{j+1}))\Delta x/2.$$

The second numerical approximation that we introduce is to discretize the operators $\mathcal{F}$ and $\mathcal{F}^{-1}$ using discrete cosine transforms. Fix a positive integer $N$, and let $g = \{g_0, g_1, \ldots, g_N\}$ be a sequence of $N+1$ complex numbers. Define the discrete Fourier cosine coefficients $\hat{g}_n$ as follows.

$$\hat{g}_n = \hat{\epsilon}_n (2/N) \sum_{k=0}^{N} \hat{\epsilon}_k g_k \cos(\pi k n/N) \text{ for } n = 0, 1, \ldots, N, \qquad (5.4)$$

where $\hat{\epsilon}_0 = \hat{\epsilon}_N = \frac{1}{2}$ and $\hat{\epsilon}_n = 1$ for $n = 1, \ldots, N-1$. Now $$g_k = \sum_{n=0}^{N} \hat{g}_n \cos(\pi k n/N) \text{ for } k = 0, 1, \ldots, N \qquad (5.5)$$

if and only if the coefficients $\hat{g}_n$ are given by eq.(5.4). Let $\hat{g} = \{\hat{g}_0, \hat{g}_1, \ldots, \hat{g}_N\}$ denote the sequence of these coefficients. We define the operators $\mathcal{F}_N$ and $\mathcal{F}_N^{-1}$ by the relations $$\mathcal{F}_N g = \hat{g}, \quad \mathcal{F}_N^{-1} \hat{g} = g \qquad (5.6)$$

We replace the operators $\mathcal{F}$ and $\mathcal{F}^{-1}$ in eq.(5.1) by the operators $\mathcal{F}_N$ and $\mathcal{F}_N^{-1}$. Since these operators transform sequences to sequences, however, we must also replace the functions $\psi_m \pm (i\Delta x/4)q_m$ in this equation with the sequences of their values at the points $y_k$, which we write as $\{\psi_m(y_k) \pm (i\Delta x/4)q_m(y_k)\}_{k=0}^{N}$. Under these approximations, eq.(5.1) becomes $$\{\psi_m(x_{j+1}, y_k) + (i\Delta x/4)q_m(x_{j+1}, y_k)\}_{k=0}^{N} = \qquad (5.7)$$
$$\left(\frac{k_m(x_{j+1})}{k_m(x_j)}\right)^{1/2} \times \mathcal{F}_N^{-1}\left\{\exp\left[-(i\eta^2/2)\int_{x_j}^{x_{j+1}}\frac{du}{k_m(u)}\right]\right.$$
$$\left.\mathcal{F}_N\{\psi_m(x_j, y_k) - (i\Delta x/4)q_m(x_j, y_k)\}_{k=0}^{N}\right\}.$$

Note that the spectral parameter $\eta$ in this equation is bounded because $\eta = n\pi/2W$ for $n = 0, 1, \ldots, N$. Hence, $0 \le \eta \le \pi/\Delta y$.

We must approximate the partial derivatives $\partial \varphi_m/\partial y$ and $\partial^2(\beta_{mm}\varphi_m)/\partial y^2$ that appear in eq.(2.13) for $q_m$ before we can evaluate the sequences in eq.(5.7). Since the variable $y$ in this equation is restricted to the uniformly spaced points $y_k$, our third approximation is to replace the partial derivatives at these points with central differences. At the lowest order of approximation, we use the three-point formulas $$\frac{\partial}{\partial y}\varphi_n(y_k) \approx \frac{1}{2\Delta y}[\varphi_n(y_{k+1}) - \varphi_n(y_{k-1})] + O(\Delta y^2), \quad (5.8)$$

$$\frac{\partial^2}{\partial y^2}(\beta_{mn}\varphi_n)(y_k) \approx \quad (5.9)$$

$$\frac{1}{(\Delta y)^2}\{(\beta_{mn}\varphi_n)(y_{k+1}) - 2(\beta_{mn}\varphi_n)(y_k) + (\beta_{mn}\varphi_n)(y_{k-1})\} + O(\Delta y^2).$$

Now we combine eqs.(5.8, 5.9) with eq.(2.13). Rearranging terms in the result, we find that $$q_m(y_k) \approx (k_m^2 - \xi_m^2(y_k))\varphi_m(y_k) + \quad (5.10)$$

$$\sum_{n=1}^{M}\left[\alpha_{mn}(y_k) + \left(\frac{k_m}{2k_m} + ik_m - \frac{i}{k_m(\Delta y)^2}\right)\beta_{mn}(y_k) - \frac{\partial}{\partial x}\beta_{mn}(y_k)\right]e^{-i(\vartheta_n - \vartheta_0)}\varphi_n(y_k) + \sum_{n=1}^{M}\left(\frac{1}{2\Delta y}\gamma_{mn}(y_k) + \frac{i}{2k_m(\Delta y)^2}\beta_{mn}(y_{k+1})\right)e^{-i(\vartheta_n - \vartheta_0)}\varphi_n(y_{k+1}) +$$

$$\sum_{n=1}^{M}\left(-\frac{1}{2\Delta y}\gamma_{mn}(y_k) + \frac{i}{2k_m(\Delta y)^2}\beta_{mn}(y_{k-1})\right)e^{-i(\vartheta_n - \vartheta_0)}\varphi_n(y_{k-1}) + O(\Delta y^2).$$

Therefore, neglecting terms of $O(\Delta x(\Delta y)^2)$, we find that $$\psi_m(x_{j+1}, y_k) + (i\Delta x/4)q_m(x_{j+1}, y_k) \approx \quad (5.11)$$

$$\{k_m + (i\Delta x/4)(k_m^2 - \xi_m^2(x_{j+1}, y_k))\}\varphi_m(x_{j+1}, y_k) + \left(\frac{i}{2} + \frac{ik_m\Delta x}{8k_m} - \frac{k_m\Delta x}{4} + \frac{\Delta x}{4k_m(\Delta y)^2}\right)$$

$$\sum_{n=1}^{M}\beta_{mn}(x_{j+1}, y_k)e^{-i(\vartheta_n - \vartheta_0)}\varphi_n(x_{j+1}, y_k) + (i\Delta x/4)$$

$$\sum_{n=1}^{M}\left(\alpha_{mn}(x_{j+1}, y_k) - \frac{\partial}{\partial x}\beta_{mn}(x_{j+1}, y_k)\right)e^{-i(\vartheta_n - \vartheta_0)}\varphi_n(x_{j+1}, y_k) +$$

$$\sum_{n=1}^{M}\left(\frac{i\Delta x}{8\Delta y}\gamma_{mn}(x_{j+1}, y_k) - \frac{\Delta x}{8k_m(\Delta y)^2}\beta_{mn}(x_{j+1}, y_{k+1})\right)e^{-i(\vartheta_n - \vartheta_0)}\varphi_n(x_{j+1}, y_{k+1}) +$$

$$\sum_{n=1}^{M}\left(-\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1})\right)e^{-i(\vartheta_n - \vartheta_0)}\varphi_n(x_{j+1}, y_{k-1}),$$

where $k_n = k_n(x_{j+1})$ and $\vartheta_n = \vartheta_n(x_{j+1})$ for $n=1, \ldots, M$.

Similarly, neglecting terms of $O(\Delta x(\Delta y)^2)$, we find that $$\psi_m(x_j, y_k) - (5.12)$$

$$(i\Delta x/4)q_m(x_j, y_k) \approx [k_m - (i\Delta x/4)(k_m^2 - \xi_m^2(x_j, y_k))]\varphi_m(x_j, y_k) + \left(\frac{i}{2} - \frac{ik_m\Delta x}{8k_m} + \frac{k_m\Delta x}{4} - \frac{\Delta x}{4k_m(\Delta y)^2}\right)$$

$$\sum_{n=1}^{M}\beta_{mn}(x_j, y_k)e^{-i(\vartheta_n - \vartheta_0)}\varphi_n(x_j, y_k) -$$

$$(i\Delta x/4)\sum_{n=1}^{M}\left(\alpha_{mn}(x_j, y_k) - \frac{\partial}{\partial x}\beta_{mn}(x_j, y_k)\right)e^{-i(\vartheta_n - \vartheta_0)}\varphi_n(x_j, y_k) +$$

$$\sum_{n=1}^{M}\left(-\frac{i\Delta x}{8\Delta y}\gamma_{mn}(x_j, y_k) + \frac{\Delta x}{8k_m(\Delta y)^2}\beta_{mn}(x_j, y_{k+1})\right)e^{-i(\vartheta_n - \vartheta_0)}\varphi_n(x_j, y_{k+1}) +$$

$$\sum_{n=1}^{M}\left(\frac{i\Delta x}{8\Delta y}\gamma_{mn}(x_j, y_k) + \frac{\Delta x}{8k_m(\Delta y)^2}\beta_{mn}(x_j, y_{k-1})\right)e^{-i(\vartheta_n - \vartheta_0)}\varphi_n(x_j, y_{k-1}),$$

where $k_n = k_n(x_j)$ and $\vartheta_n = \vartheta_n(x_j)$ for $n=1, \ldots, M$.

We need additional information to interpret these equations at the boundaries $y = \pm W$. Let us require that eq.(4.1) be consistent with eq.(3.1). It follows that for $k=0, N$ and for all $x_j$, $$\varphi_n(x_j, y_{k-1}) = \varphi_n(x_j, y_{k+1}) \text{ for } n=1, \ldots, M, \quad (5.13)$$

$$\beta_{mn}(x_j, y_{k-1}) = \beta_{mn}(x_j, y_{k+1}) \text{ for } m,n=1, \ldots, M. \quad (5.14)$$

Equations (5.7, 5.11), subject to eqs (5.13, 5.14), determine a system of linear equations for the values $\varphi_m(x_{j+1}, y_k)$ at a range step $x_{j+1}$, which in turn depend linearly on the values $\varphi_m(x_j, y_k)$ at the previous range step $x_j$ through eq.(5.12). In order to solve these equations numerically, it is helpful to put them in matrix form. First, we write eq.(5.7) as follows.

$$\{\Psi_m(x_{j+1} - 0, y_k)\}_{k=0}^{N} = \left(\frac{k_m(x_{j+1})}{k_m(x_j)}\right)^{1/2} \times \mathfrak{I}_N^{-1} \quad (5.15)$$

$$\left(\exp\left\{-(i\eta^2/2)\int_{x_j}^{x_{j+1}}\frac{du}{k_m(u)}\right\}\mathfrak{I}_N\{\Psi_m(x_j + 0, y_k)\}_{k=0}^{N}\right),$$

where $$\Psi_m(x_{j+1} - 0, y_k) = \psi_m(x_{j+1}, y_k) + (i\Delta x/4)q_m(x_{j+1}, y_k), \quad (5.16)$$

$$\Psi_m(x_j + 0, y_k) = \psi_m(x_j, y_k) - (i\Delta x/4)q_m(x_j, y_k). \quad (5.17)$$

Second, for $k=0, 1, \ldots, N$ we define the column vectors $$\varphi_k = [\varphi_1(x_{j+1}, y_k), \ldots, \varphi_M(x_{j+1}, y_k)]^T, \quad (5.18)$$

$$\Psi_k = [\Psi_1(x_{j+1} - 0, y_k), \ldots, \Psi_M(x_{j+1} - 0, y_k)]^T. \quad (5.19)$$

Third, for $k=0, 1, \ldots, N$ we define the $M \times M$ matrices $A_{k,k}$, $A_{k,k+1}$ and $A_{k,k-1}$ as follows. If $k_n = k_n(x_{j+1})$ and $\vartheta_n = \vartheta_n(x_{j+1})$ for $n=1, \ldots, M$, then $$(A_{k,k})_{mn} = \quad (5.20)$$

$$\begin{cases} k_m + (i\Delta x/4)(k_m^2 - \xi_m^2(x_{j+1}, y_k) + \alpha_{mm}(x_{j+1}, y_k)), & \text{(if } m = n) \\ \left[\left(\frac{i}{2} + \frac{ik_m\Delta x}{8k_m} - \frac{k_m\Delta x}{4} + \frac{\Delta x}{4k_m(\Delta y)^2}\right)\beta_{mn}(x_{j+1}, y_k) + (i\Delta x/4)\left(\alpha_{mn}(x_{j+1}, y_k) - \frac{\partial}{\partial x}\beta_{mn}(x_{j+1}, y_k)\right)\right]e^{-i(\vartheta_n - \vartheta_0)}, & \text{(if } m \neq n) \end{cases}$$

$$(A_{k,k+1})_{mn} = \left( \pm \frac{i\Delta x}{8\Delta y} \gamma_{mn}(x_{j+1}, y_k) - \frac{\Delta x}{8k_m(\Delta y)^2} \beta_{mn}(x_{j+1}, y_{k\pm 1}) \right) e^{-i(\alpha_m - \alpha_n)}. \quad (5.21)$$

Finally, we define the M×M matrices $B_1$ and $B_{N-1}$ as follows. For k=1, N−1, $$(B_k)_{mn} = -\frac{\Delta x}{8k_m(\Delta y)^2} \beta_{mn}(x_{j+1}, y_k) e^{-i(\alpha_m - \alpha_n)}. \quad (5.22)$$

Note that $B_1 = A_{0,-1} + A_{0}$, and $B_{N-1} = A_{N,N-1} + A_{N,N+1}$. Now eqs.(5.11,5.16), subject to eqs.(5.13,5.14), are equivalent to the following matrix equation.

$$\begin{bmatrix} A_{00} & B_1 & & & \\ A_{10} & A_{11} & A_{12} & & \\ & \cdot & \cdot & \cdot & \\ & & A_{N-1,N-2} & A_{N-1,N-1} & A_{N-1,N} \\ & & & B_{N-1} & A_{NN} \end{bmatrix} \begin{bmatrix} \varphi_0 \\ \varphi_1 \\ \cdot \\ \varphi_{N-1} \\ \varphi_N \end{bmatrix} = \begin{bmatrix} \Psi_0 \\ \Psi_1 \\ \cdot \\ \Psi_{N-1} \\ \Psi_N \end{bmatrix} \quad (5.23)$$

We recommend solving this equation numerically by Gaussian elimination with partial pivoting (GEPP) followed by one round of iterative refinement. The block tri-diagonal system matrix on the LHS of eq.(5.23) is also a band matrix of order M(N+1) that has 2M−1 lower diagonals and 2M−1 upper diagonals. Since M<<N in practice, it is most efficient to do the GEPP computations with subroutines that take advantage of band storage.

Let us write eq.(5.23) as $A \cdot \Phi = \Psi$, and let $\Phi_0$ be the numerical solution of this equation computed in finite precision arithmetic by GEPP. Iterative refinement is a technique to improve the accuracy of this solution. One round of this technique has three steps.

(1) Compute the residual $r_0 = \Psi - A \cdot \Phi_0$.

(2) Using the LU decomposition of $A$ from the original solution of eq. (5.23) by GEPP, solve the equation $A \cdot \delta_0 = r_0$ for the correction $\delta_0$.

(3) Refine the solution: $\Phi_1 = \Phi_0 + \delta_0$.

The computations in these steps are done at the same arithmetic precision as the original solution.

The system matrix on the LHS of eq.(5.23) is nonsingular if it is strictly diagonally dominant by columns. We see from eqs.(5.20,5.21) that this condition requires the following strict inequalities to be satisfied for the block indices k=2, ..., N−2:

$$|k_m + (i\Delta x/4)(k_m^2 - \xi_m^2(x_{j+1}, y_k) + \alpha_{mm}(x_{j+1}, y_k))| >$$

$$\sum_{n=1}^{M} \left| \left( \frac{i}{2} + \frac{ik_n \Delta x}{8k_m} - \frac{k_m \Delta x}{4} + \frac{\Delta x}{4k_m(\Delta y)^2} \right) \beta_{mn}(x_{j+1}, y_k) \right| +$$

$$(i\Delta x/4) \left| \alpha_{mn}(x_{j+1}, y_k) - \frac{\partial}{\partial y} \beta_{mn}(x_{j+1}, y_k) \right| +$$

$$\sum_{n=1}^{M} \left| \frac{i\Delta x}{8\Delta y} \gamma_{mn}(x_{j+1}, y_{k-1}) - \frac{\Delta x}{8k_m(\Delta y)^2} \beta_{mn}(x_{j+1}, y_k) \right| + \quad (5.24)$$

$$\sum_{n=1}^{M} \left| \frac{i\Delta x}{8\Delta y} \gamma_{mn}(x_{j+1}, y_{k+1}) - \frac{\Delta x}{8k_m(\Delta y)^2} \beta_{mn}(x_{j+1}, y_k) \right| \text{ for } m = 1, \ldots, M.$$

These inequalities are modified slightly for the remaining indices k=0, 1, N−1, N. This condition is more restrictive than the similar condition (2.11) for the reference matrix M to be positive definite at the points $y_k$. If this condition is satisfied, then Gaussian elimination requires no pivoting and is stable.

Note the factors $k_m \Delta x$, $\Delta x/\Delta y$ and $\Delta x/k_m(\Delta y)^2$ that appear in this equation. We recommend choosing the increments $\Delta x$ and $\Delta y$ so that $k_m \Delta x \leq O(1)$ and $k_m \Delta y \geq O(1)$. These restrictions imply that the ratios $\Delta x/\Delta y$ and $\Delta x/k_m(\Delta y)^2$ are at most $O(1)$. These restrictions also limit the errors that we make by applying the trapezoidal rule to eq.(4.7) to obtain eq.(5.1).

Finally, we note that higher order central difference formulas can be used in place of eqs.(5.8,5.9). For example, at the next order of approximation, we would use five-point formulas. They lead to a matrix formulation like eq.(5.23) in which the system matrix is block penta-diagonal.

6. Discrete transparent boundary conditions.

The most simple standard parabolic equation is $$2ik_0 \frac{\partial \varphi}{\partial x} + \frac{\partial^2 \varphi}{\partial y^2} = 0, \quad (6.1)$$

where the wavenumber $k_0$ is a positive constant. Let us assume (1) the solution $\varphi(x,y)$ is defined in a region of the x,y plane that includes the upper right quadrant where $x \geq 0$ and $y \geq 0$, (2) the solution $\varphi(x,y)$ and its partial derivatives are bounded in this quadrant, (3) $\varphi(0, y) = 0$ for $y \geq 0$.

We can translate these assumptions into a transparent boundary condition that the solution $\varphi(x,y)$ satisfies on the right-half x-axis (x>0, y=0). This condition makes the half-axis transparent in the sense that the wavefield described by the solution $\varphi(x,y)$ propagates across this half-axis into the upper right quadrant without reflection.

$$\varphi(x, 0) = -e^{i\pi/4}(2\pi k_0)^{-1/2} \int_0^x \frac{\partial}{\partial y} \varphi(u, 0)(x-u)^{-1/2} du. \quad (6.2)$$

If we change the sign of the partial derivative $\partial/\partial y$ in this equation, then we get a new condition that makes the right-half x-axis transparent in the opposite sense. Now the wavefield described by the solution $\varphi(x,y)$ propagates across this half-axis into the lower right quadrant without reflection.

$$\varphi(x, 0) = e^{i\pi/4}(2\pi k_0)^{-1/2} \int_0^x \frac{\partial}{\partial y} \varphi(u, 0)(x-u)^{-1/2} du. \quad (6.3)$$

Let us replace the reference wavenumber $k_0$ in eq.(6.1) with a function $k(x)>0$, $$2ik(x)\frac{\partial \varphi}{\partial x} + \frac{\partial^2 \varphi}{\partial y^2} = 0. \qquad (6.4)$$

The change of variable $$\tau(x) = \int_0^x \frac{du}{k(u)} \qquad (6.5)$$

transforms this equation into a standard parabolic equation, $$2i\frac{\partial \varphi}{\partial \tau} + \frac{\partial^2 \varphi}{\partial y^2} = 0. \qquad (6.6)$$

Let $\{x_0, x_1, \ldots, x_j, \ldots\}$ be an increasing sequence of discrete range steps, with $x_0=0$. Define $\psi_j(y)=\varphi(x_j,y)$ and $\tau_j=\tau(x_j)$ for $j=0,1,\ldots$. Using the trapezoidal rule to integrate eq.(6.6) from $\tau_j$ to $\tau_{j+1}$ and neglecting the $O((\tau_{j+1}-\tau_j)^3)$ remainder, we find that $$2i[\psi_{j+1}(y)-\psi_j(y)] + \frac{1}{2}(\tau_{j+1}-\tau_j)\left[\frac{\partial^2}{\partial y^2}\psi_j(y) + \frac{\partial^2}{\partial y^2}\psi_{j+1}(y)\right] = 0. \qquad (6.7)$$

Similarly, $$\tau_{j+1} - \tau_j = \int_{x_j}^{x_{j+1}} \frac{du}{k(u)} \approx \frac{1}{2}(x_{j+1}-x_j)[k^{-1}(x_j) + k^{-1}(x_{j+1})], \qquad (6.8)$$

where we evaluated the integral by the trapezoidal rule and dropped the $O((x_{j+1}-x_j)^3)$ remainder. We get a semi-discrete parabolic equation from eqs.(6.7, 6.8).

$$\frac{\partial^2}{\partial y^2}\psi_j(y) + \frac{\partial^2}{\partial y^2}\psi_{j+1}(y) + \frac{8i}{(x_{j+1}-x_j)[k^{-1}(x_j)+k^{-1}(x_{j+1})]}[\psi_{j+1}(y)-\psi_j(y)] = 0. \qquad (6.9)$$

Let us assume (1) the functions $\psi_j(y)$ and their derivatives are uniformly bounded for $y \geq 0$, (2) $\psi_0(y)=0$ for $y \geq 0$.

We can translate these assumptions into discrete transparent boundary conditions that the functions $\psi_{j+1}(y)(j=0,1,\ldots)$ satisfy at $y=0$. A newly created algorithm computes these conditions recursively. First, define $$p_{j+1} = e^{-i\pi/4}\left(\frac{8}{(x_{j+1}-x_j)[k^{-1}(x_j)+k^{-1}(x_{j+1})]}\right)^{1/2} \text{ for } j=0,1,\ldots \qquad (6.10)$$

Second, define $$g_k^j = \frac{p_k - p_j}{p_k + p_j} \text{ for } j, k = 1, 2, \ldots \qquad (6.11)$$

Note that $g_k^j$ is real and $|g_k^j|<1$ for all $j, k$.

If $j=1$, then we let $$a_1^j = \frac{1}{2}p_j^{-2}\frac{\partial}{\partial y}\psi_1(0) \text{ and } a_2^j = -\frac{1}{2}p_j^{-2}\frac{\partial}{\partial y}\psi_1(0). \qquad (6.12)$$

If $j>1$, then we compute the coefficients $a_1^j, \ldots, a_{j+1}^j$ from the coefficients $a_1^{j-1}, \ldots, a_j^{j-1}$ and from the derivatives $\partial \psi_{j-1}(0)/\partial y$ and $\partial \psi_j(0)/\partial y$ in two steps.

(1) Compute $\tilde{a}_1^{j-1}, \ldots, \tilde{a}_j^{j-1}$ and $\tilde{b}_1^{j-1}, \ldots, \tilde{b}_j^{j-1}$ from the following recurrence formulas.

$$\tilde{a}_1^{j-1} = a_1^{j-1}, \qquad (6.13)$$

$$\tilde{a}_k^{j-1} = a_k^{j-1} - g_{k-1}^j \tilde{a}_{k-1}^{j-1} \text{ for } k=2,\ldots,j, \qquad (6.14)$$

$$\tilde{b}_1^{j-1} = g_1^j \tilde{a}_1^{j-1}, \qquad (6.15)$$

$$\tilde{b}_k^{j-1} = g_k^j \tilde{a}_k^{j-1} + \tilde{a}_{k-1}^{j-1} - g_{k-1}^j \tilde{b}_{k-1}^{j-1} \text{ for } k=2,\ldots,j. \qquad (6.16)$$

(2) Compute the coefficients $a_1^j, \ldots, a_{j+1}^j$ as follows.

$$a_1^j = -\frac{1}{2}a_1^{j-1} - \frac{1}{2}g_1^j \tilde{b}_1^{j-1}, \qquad (6.17)$$

$$a_k^j = -\frac{1}{2}a_k^{j-1} - \frac{1}{2}g_k^j \tilde{b}_k^{j-1} - \frac{1}{2}\tilde{b}_{k-1}^{j-1} \text{ for } k=2,\ldots,j-1. \qquad (6.18)$$

(Note: omit the preceding equation if $j=2$.)

$$a_j^j = \frac{1}{2}p_j^{-2}\left[\frac{\partial}{\partial y}\psi_{j-1}(0) + \frac{\partial}{\partial y}\psi_j(0)\right] - \frac{1}{2}a_j^{j-1} - \frac{1}{2}\tilde{b}_j^{j-1} - \frac{1}{2}\tilde{b}_{j-1}^{j-1}, \qquad (6.19)$$

$$a_{j+1}^j = -\frac{1}{2}p_j^{-2}\left[\frac{\partial}{\partial y}\psi_{j-1}(0) + \frac{\partial}{\partial y}\psi_j(0)\right] - \frac{1}{2}\tilde{b}_j^{j-1}. \qquad (6.20)$$

The coefficients $\tilde{a}_{j+1}^j$ are used to compute the discrete transparent boundary conditions as follows.

$$\frac{\partial}{\partial y}\psi_1(0) + p_1 \psi_1(0) = 0, \qquad (6.21)$$

$$\frac{\partial}{\partial y}\psi_{j+1}(0) + p_{j+1}\psi_{j+1}(0) = -\frac{\partial}{\partial y}\psi_j(0) - p_{j+1}\psi_j(0) + 2p_{j+1}^2 \tilde{a}_{j+1}^j \qquad (6.22)$$

for $j=1,2,\ldots$

This algorithm can be greatly simplified if the quantities $p_j$ are independent of the index $j$. This happens when the range increments $x_{j+1}-x_j$ and the reference wavenumber values $k(x_j)$ are independent of the index $j$. Let us assume that $x_j=j\Delta x$ and $k(x_j)=k_0$ for $j=0,1,\ldots$, where the increment $\Delta x$ and the wavenumber $k_0$ are fixed. Then it follows from eq. (6.10) that $p_j=p_0$ for every $j$, where $$p_0 = e^{-i\pi/4}(2k_0/\Delta x)^{1/2}. \qquad (6.23)$$

In addition, eq.(6.11) implies that $g_k^j=0$ for all $j,k$. Thus, eqs.(6.13, 6.14) become $$\tilde{a}_k^{j-1} = a_k^{j-1} \text{ for } k=1,\ldots,j. \qquad (6.24)$$

eq.(6.15) becomes $\tilde{b}_1^{j-1}=0$ and eq.(6.16) becomes $$\tilde{b}_k^{j-1} = \tilde{a}_{k-1}^{j-1} \text{ for } k=2,\ldots,j. \qquad (6.25)$$

We can use these equations to eliminate the coefficients $\bar{a}_k^{j-1}$ and $\bar{b}_k^{j-1}$ from eqs.(6.17–6.20) if we extend the definition of the coefficients $a_k^j$ as follows. Let $$a_{-1}^j = 0 \text{ for } j=0,1,\ldots, \quad (6.26)$$

$$a_0^j = 0 \text{ for } j=0,1,\ldots \quad (6.27)$$

Using these extensions, we get the following simplified forms of eqs.(6.17–6.20). For $j>1$, $$a_k^j = -\frac{1}{2}a_k^{j-1} - \frac{1}{2}a_{k-2}^{j-1}, \quad \text{for } k=1,\ldots,j-1. \quad (6.28)$$

$$a_j^j = \frac{1}{2}p_0^2\left[\frac{\partial}{\partial y}\psi_{j-1}(0) + \frac{\partial}{\partial y}\psi_j(0)\right] - a_j^{j-1} - \frac{1}{2}a_{j-2}^{j-1}. \quad (6.29)$$

$$a_{j+1}^j = -\frac{1}{2}p_0^2\left[\frac{\partial}{\partial y}\psi_{j-1}(0) + \frac{\partial}{\partial y}\psi_j(0)\right] - \frac{1}{2}a_{j-1}^{j-1}. \quad (6.30)$$

We also define $a_1^0=0$. This extension has the following useful consequences.

(1) We can let $j=1$ in eqs.(6.29,6.30), which become eq.(6.12) because $\partial\psi_0(0)/\partial y=0$.

(2) Because of eq.(6.24), we can get eq.(6.21) from eq.(6.22) by letting $j=0$. Therefore, we can write these discrete transparent boundary conditions as follows.

$$\frac{\partial}{\partial y}\psi_{j+1}(0) + p_0\psi_{j+1}(0) = -\frac{\partial}{\partial y}\psi_j(0) - p_0\psi_j(0) + 2p_0^2 a_{j+1}^j \quad (6.31)$$

for $j=0,1,\ldots$ (3) An alternative form of these conditions is obtained by iterating eq.(6.31) backwards. The initial conditions $\psi_0(0)=0$ and $\partial\psi_0(0)/\partial y=0$ are used to stop the iteration.

$$\frac{\partial}{\partial y}\psi_{j+1}(0) + p_0\psi_{j+1}(0) = 2p_0^2\sum_{k=0}^{j}(-1)^{j-k}a_{k+1}^k \quad (6.32)$$

for $j=0,1,\ldots$

When eqs. (6.28–6.30) are evaluated in finite-precision computer arithmetic, roundoff errors in the additions tend to accumulate. However, we can use compensated summation to identify these errors and to cancel them to working precision. Let us describe how this is done in a simple case. Consider the following sequence of differential boundary values $\partial\psi_j(0)/\partial y$.

$$\frac{\partial}{\partial y}\psi_j(0) = \begin{cases} 2p_0^2 & \text{if } j=1, \\ 0 & \text{if } j\neq 1. \end{cases} \quad (6.33)$$

Since $a_1^0=0$, it follows from eq. (6.32) that $\psi_1(0)=-2p_0$, and $$\psi_{j+1}(0) = 2p_0\sum_{k=1}^{j}(-1)^{j-k}a_{k+1}^k \quad \text{for } j=1,2,\ldots \quad (6.34)$$

Thus, $\psi_{j+1}(0)=-2p_0\sigma_j$, where $$\sigma_j = -\sum_{k=1}^{j}(-1)^{j-k}a_{k+1}^k \quad \text{for } j=1,2,\ldots, \quad (6.35)$$

which can be calculated recursively as follows.

$$\sigma_j = a_{j+1}^j - \sigma_{j-1} \text{ for } j=2,3,\ldots \quad (6.36)$$

We can compute the coefficients $a_k^j$ for $j=1, 2, 3$ exactly from eqs.(6.28–6.30). Using the input values (6.33), we find that $$\begin{aligned} a_1^1 &= 1, \quad a_2^1 = -1, \\ a_1^2 &= -\frac{1}{2}, \quad a_2^2 = 2, \quad a_3^2 = -\frac{3}{2}, \\ a_1^3 &= \frac{1}{4}, \quad a_2^3 = -1, \quad a_3^3 = \frac{7}{4}, \quad a_4^3 = -1. \end{aligned} \quad (6.37)$$

Next, using the input values (6.33), we write eqs.(6.28–6.30) for $j\geq 4$ as follows.

$$a_1^j = -\frac{1}{2}a_1^{j-1}, \quad (6.38)$$

$$a_2^j = -\frac{1}{2}a_2^{j-1}, \quad (6.39)$$

$$a_k^j = -\frac{1}{2}a_k^{j-1} - \frac{1}{2}a_{k-2}^{j-1} \quad \text{for } k=3,\ldots,j-1. \quad (6.40)$$

$$a_j^j = -a_j^{j-1} - \frac{1}{2}a_{j-2}^{j-1}, \quad (6.41)$$

$$a_{j+1}^j = -\frac{1}{2}a_{j-1}^{j-1}. \quad (6.42)$$

We use the values of $a_1^3, a_2^3, a_3^3, a_4^3$ from eq.(6.37) to start these equations when $j=4$. We use eq.(6.36) to compute $\sigma_j$. We start this equation with $\sigma_3=\frac{1}{2}$, which follows from eqs.(6.35, 6.37).

Compensated summation is based on the following principle. Let $\hat{u}$ and $\hat{v}$ denote real floating-point numbers, and let $fl(\hat{u}\pm\hat{v})$ denote the floating-point sum and difference of $\hat{u}$ and $\hat{v}$. Define the following floating-point numbers:

$$\hat{s}=fl(\hat{u}+\hat{v}), \quad (6.43)$$

$$\hat{u}^*=fl(\hat{s}-\hat{v}), \quad (6.44)$$

$$\hat{v}^*=fl(\hat{s}-\hat{u}^*), \quad (6.45)$$

$$\delta(\hat{u})=fl(\hat{u}-\hat{u}^*), \quad (6.46)$$

$$\delta^*(\hat{v})=fl(\hat{v}-\hat{v}^*), \quad (6.47)$$

$$\hat{\Delta}(\hat{u},\hat{v})=fl(\delta(\hat{u})+\delta^*(\hat{v})). \quad (6.48)$$

The quantity $\hat{\Delta}(\hat{u},\hat{v})$ is a very good estimate of the roundoff error $(\hat{u}+\hat{v})-\hat{s}$. Note that the arithmetic operations in eqs. (6.43–6.48) carry over directly to complex floating-point arithmetic because the operations on the real parts of the complex numbers and the operations on the imaginary parts of these numbers are identical but independent.

First, let us apply compensated summation to eq.(6.40). We want to compute $$a_k^j = -\left(\frac{1}{2}a_k^{j-1} + \frac{1}{2}a_{k-2}^{j-1}\right) \quad \text{for } k=3,\ldots,j-1. \quad (6.49)$$

but we actually compute $$\hat{\alpha}_k^j = -fl\left(\frac{1}{2}\hat{\alpha}_k^{j-1} + \frac{1}{2}\hat{\alpha}_{k-2}^{j-1}\right) \quad \text{for } k=3,\ldots,j-1. \quad (6.50)$$

Let $$\delta_k^j = \left(\frac{1}{2}\hat{\alpha}_k^{j-1} + \frac{1}{2}\hat{\alpha}_{k-2}^{j-1}\right) - fl\left(\frac{1}{2}\hat{\alpha}_k^{j-1} + \frac{1}{2}\hat{\alpha}_{k-2}^{j-1}\right) \quad (6.51)$$

for $k=3,\ldots,j-1$.

and $$\epsilon_k^j = \hat{\alpha}_k^j - \alpha_k^j \quad \text{for } k=1,\ldots,j+1. \quad (6.52)$$

Now, eqs.(6.49–6.52) imply that $$\epsilon_k^j = -\left(\frac{1}{2}\hat{\alpha}_k^{j-1} + \frac{1}{2}\hat{\alpha}_{k-2}^{j-1}\right) + \delta_k^j \quad (6.53)$$

$$= -\left(\frac{1}{2}\alpha_k^{j-1} - \frac{1}{2}\epsilon_k^{j-1} + \frac{1}{2}\alpha_{k-2}^{j-1} - \frac{1}{2}\epsilon_{k-2}^{j-1}\right) + \delta_k^j$$

$$= -\left(\frac{1}{2}\alpha_k^{j-1} + \frac{1}{2}\alpha_{k-2}^{j-1}\right) + \frac{1}{2}\epsilon_k^{j-1} + \frac{1}{2}\epsilon_{k-2}^{j-1} + \delta_k^j$$

$$= \alpha_k^j + \frac{1}{2}\epsilon_k^{j-1} + \frac{1}{2}\epsilon_{k-2}^{j-1} + \delta_k^j \quad \text{for } k=3,\ldots,j-1.$$

Hence, $$\epsilon_k^j = -\left(\frac{1}{2}\epsilon_k^{j-1} + \frac{1}{2}\epsilon_{k-2}^{j-1} + \delta_k^j\right) \quad \text{for } k=3,\ldots,j-1. \quad (6.54)$$

In practice we compute an approximation to $\epsilon_k^j$ that we call $\hat{\epsilon}_k^j$:

$$\hat{\epsilon}_k^j = -fl\left(\frac{1}{2}\hat{\epsilon}_k^{j-1} + \frac{1}{2}\hat{\epsilon}_{k-2}^{j-1} + \hat{\Delta}_k^j\right) \quad \text{for } k=3,\ldots,j-1. \quad (6.55)$$

where $\hat{\Delta}_k^j$ is the estimate for $\delta_k^j$ that we get with $$\hat{u} = \frac{1}{2}\hat{\alpha}_k^{j-1}$$

and $$\hat{v} = \frac{1}{2}\hat{\alpha}_{k-2}^{j-1}$$

in eq. (6.48). Note that the RHS of eq.(6.55) is ambiguous because the associative law does not hold for floating-point addition. However, we shall ignore the small influence that the order of these additions may have on the numerical value of the total sum.

Next, we apply compensated summation to eq.(6.41). We want to compute $$\hat{\alpha}_j^j = -fl\left(\hat{\alpha}_j^{j-1} + \frac{1}{2}\hat{\alpha}_{j-2}^{j-1}\right) \quad (6.56)$$

but we actually compute $$\hat{\alpha}_j^j = -fl\left(\hat{\alpha}_j^{j-1} + \frac{1}{2}\hat{\alpha}_{j-2}^{j-1}\right) \quad (6.57)$$

Let $$\delta_j^j = \left(\hat{\alpha}_j^{j-1} + \frac{1}{2}\hat{\alpha}_{j-2}^{j-1}\right) - fl\left(\hat{\alpha}_j^{j-1} + \frac{1}{2}\hat{\alpha}_{j-2}^{j-1}\right) \quad (6.58)$$

Now, eqs.(6.52,6.56–6.58) imply that $$\epsilon_j^j = -\left(\hat{\alpha}_j^{j-1} + \frac{1}{2}\hat{\alpha}_{j-2}^{j-1}\right) + \delta_j^j \quad (6.59)$$

$$= -\left(\alpha_j^{j-1} - \epsilon_j^{j-1} + \frac{1}{2}\alpha_{j-2}^{j-1} - \frac{1}{2}\epsilon_{j-2}^{j-1}\right) + \delta_j^j$$

$$= -\left(\alpha_j^{j-1} + \frac{1}{2}\alpha_{j-2}^{j-1}\right) + \epsilon_j^{j-1} + \frac{1}{2}\epsilon_{j-2}^{j-1} + \delta_j^j$$

$$= \alpha_j^j + \epsilon_j^{j-1} + \frac{1}{2}\epsilon_{j-2}^{j-1} + \delta_j^j.$$

Hence, $$\epsilon_j^j = -\left(\epsilon_j^{j-1} + \frac{1}{2}\epsilon_{j-2}^{j-1} + \delta_j^j\right) \quad (6.60)$$

In practice we compute an approximation to $\epsilon_j^j$ that we call $\hat{\epsilon}_j^j$:

$$\hat{\epsilon}_j^j = -fl\left(\hat{\epsilon}_j^{j-1} + \frac{1}{2}\hat{\epsilon}_{j-2}^{j-1} + \hat{\Delta}_j^j\right) \quad (6.61)$$

where $\hat{\Delta}_j^j$ is the estimate for $\delta_j^j$ that we get with $\hat{u}=\hat{\alpha}_j^{j-1}$ and $$\hat{v} = \frac{1}{2}\hat{\alpha}_{j-2}^{j-1}$$

in eq.(6.48). The remarks that follow eq.(6.55) apply to eq. (6.61) as well.

The treatment of eqs.(6.38,6.39,6.42) is simple because they involve no summations. Since we want to compute $$\alpha_1^j = -\frac{1}{2}\alpha_1^{j-1}, \quad \alpha_2^j = -\frac{1}{2}\alpha_2^{j-1}, \quad \alpha_{j+1}^j = -\frac{1}{2}\alpha_{j-1}^{j-1},$$

the computed values of these coefficients satisfy the same equations:

$$\hat{\alpha}_1^j = -\frac{1}{2}\hat{\alpha}_1^{j-1}, \quad \hat{\alpha}_2^j = -\frac{1}{2}\hat{\alpha}_2^{j-1}, \quad \hat{\alpha}_{j+1}^j = -\frac{1}{2}\hat{\alpha}_{j-1}^{j-1}. \quad (6.62)$$

Now the errors $\epsilon_1^j$, $\epsilon_2^j$, $\epsilon_{j+1}^j$ also satisfy these equations:

$$\epsilon_1^j = -\frac{1}{2}\epsilon_1^{j-1}, \quad \epsilon_2^j = -\frac{1}{2}\epsilon_2^{j-1}, \quad \epsilon_{j+1}^j = -\frac{1}{2}\epsilon_{j-1}^{j-1}. \quad (6.63)$$

Hence, we use the same equations to compute the approximations $\hat{\epsilon}_j{}^1, \hat{\epsilon}_j{}^2, \hat{\epsilon}_{j+1}{}^1$ to these errors:

$$\hat{\epsilon}_j^1 = -\frac{1}{2}\hat{a}_j^{j-1}, \quad \hat{\epsilon}_j^2 = -\frac{1}{2}\hat{a}_j^{j-1}, \quad \hat{\epsilon}_{j-1}^1 = -\frac{1}{2}\hat{a}_{j-1}^{j-1}. \tag{6.64}$$

The approximate corrections $\hat{\epsilon}_j^3$ vanish because the computed coefficients $\hat{a}_j^3$ are exact. We use the values $\hat{\epsilon}_3^3=0$, $\hat{\epsilon}_3^2=0$, $\hat{\epsilon}_4^2=0$, $\hat{\epsilon}_4^1=0$ to start eqs.(6.55,6.61,6.64) when $j=4$. Since $\hat{\epsilon}_4^3=0$ and $\hat{\epsilon}_4^2=0$, the first two parts of eq.(6.64) imply that $\hat{\epsilon}_j^2=0$ and $\hat{\epsilon}_j^1=0$ for all $j \geq 4$. Therefore, we need only the last part of eq.(6.64).

Finally, we consider $\sigma_j$ and develop an approximate correction to it. We want to compute $$\sigma_j = -(\hat{\sigma}_{j-1} + \hat{\sigma}_{j-1}) \text{ for } j \geq 4, \tag{6.65}$$

with $\sigma_3 = \frac{1}{2}$. In practice, we compute $$\hat{\sigma}_j = -\beta(\hat{\sigma}_{j-1} + \hat{\sigma}_{j-1}) \text{ for } j \geq 4, \tag{6.66}$$

with $\hat{\sigma}_3 = \frac{1}{2}$. Define $$e_j = \sigma_j - \hat{\sigma}_j, \text{ for } j \geq 3. \tag{6.67}$$

By the same approach that lead to eqs.(6.54,6.60) we find that $$e_j = -(\hat{e}_{j-1} + \hat{\delta}_j) \text{ for } j \geq 4, \tag{6.68}$$

where $$\delta_j = \hat{\sigma}_{j-1} + \hat{\sigma}_{j-1} - \beta(\hat{\sigma}_{j-1} + \hat{\sigma}_{j-1}). \tag{6.69}$$

Although we could use eq.(6.48) to estimate $\delta_j$, we shall neglect it against $e_{j-1}^1$. Therefore, we compute an approximate correction $\hat{e}_j$ to $\sigma_j$ by the following recurrence formula.

$$\hat{e}_j = -\beta(\hat{e}_{j-1} + \hat{e}_{j-1}) \text{ for } j \geq 4, \tag{6.70}$$

where $\hat{e}_3 = 0$.

Let us summarize the computational forms of eqs.(6.36, 6.38-6.42) for $j \geq 4$ that use compensated summation to identify roundoff errors and to cancel them to working precision.

$$\begin{aligned}
\hat{a}_1^j &= -\frac{1}{2}\hat{a}_1^{j-1}, \\
\hat{a}_2^j &= -\frac{1}{2}\hat{a}_2^{j-1}, \\
\text{for } k &= 3, \ldots, j-1: \\
\hat{a}_k^j &= -\beta\left(\frac{1}{2}\hat{a}_k^{j-1} + \frac{1}{2}\hat{a}_{k-2}^{j-1}\right) \text{ and} \\
\hat{e}_k^j &= -\beta\left(\frac{1}{2}\hat{e}_k^{j-1} + \frac{1}{2}\hat{e}_{k-2}^{j-1} + \hat{\delta}_k^j\right), \\
\hat{a}_j^j &= -\beta\left(\hat{a}_j^{j-1} + \frac{1}{2}\hat{a}_{j-2}^{j-1}\right) \text{ and} \\
\hat{e}_j^j &= -\beta\left(\hat{e}_j^{j-1} + \frac{1}{2}\hat{e}_{j-2}^{j-1} + \hat{\delta}_j^j\right), \\
\hat{a}_{j+1}^j &= -\frac{1}{2}\hat{a}_{j-1}^{j-1} \text{ and } \hat{e}_{j+1}^j = -\frac{1}{2}\hat{e}_{j-1}^{j-1}, \\
\hat{\sigma}_j &= -\beta(\hat{\sigma}_{j-1} + \hat{\sigma}_{j-1}) \text{ and } \hat{e}_j = -\beta(\hat{e}_{j-1} + \hat{e}_{j-1}).
\end{aligned} \tag{6.71}$$

We approximate $\sigma_j$ by the sum $\hat{\sigma}_j + \hat{e}_j$.

The number of arithmetic operations in eq.(6.28) of the simple algorithm is proportional to $j-1$, which increases with range. We can limit the size of this operation count by truncating the algorithm. First, we choose an integer $L \geq 3$, which will be called the length of the truncated algorithm. If $j \geq L$, then we discard all the coefficients $a_k^{j-1}$ such that $k \leq j-L$. We effectively equate these coefficients to 0, which lets us start the recursion in eq.(6.28) for the truncated algorithm at $k=j-L+1$. Since the coefficient $a_{j-L+1}^j$ is not used in subsequent steps, however, there is no need to evaluate it. For this reason, if $j \geq L$, then we can start the recursion in eq.(6.28) for the truncated algorithm at $k=j-L+2$. Now the operation count is proportional to $L-2$, which is fixed.

We shall state the truncated algorithm in terms of new coefficients $\alpha_l^{j-1}$ that are defined for $j=1, 2, \ldots$ and $l=1, \ldots, L$ as follows.

(1) Let
$$\alpha_l^0 = 0 \text{ for } l=1, \ldots, L. \tag{6.72}$$

(2) Let
$$\alpha_0^j = 0 \text{ for } j=0, 1, \ldots \tag{6.73}$$

(3) For $j=1, 2, \ldots$, $$\alpha_l^j = -\frac{1}{2}\alpha_l^{j-1} - \frac{1}{2}\alpha_{l-1}^{j-1}, \quad \text{for } l=1, \ldots, L-2, \tag{6.74}$$

$$\alpha_{L-1}^j = \frac{1}{2}\rho_0^2\left[\frac{\partial}{\partial y}\psi_{j-1}(0) + \frac{\partial}{\partial y}\psi_j(0)\right] - \alpha_{L-1}^{j-1} - \frac{1}{2}\alpha_{L-2}^{j-1}, \tag{6.75}$$

$$\alpha_L^j = -\frac{1}{2}\rho_0^2\left[\frac{\partial}{\partial y}\psi_{j-1}(0) + \frac{\partial}{\partial y}\psi_j(0)\right] - \frac{1}{2}\alpha_{L-1}^{j-1}. \tag{6.76}$$

The transparent boundary conditions associated with this algorithm are $$\frac{\partial}{\partial y}\psi_{j+1}(0) + \rho_0\psi_{j+1}^{(L)}(0) = -\frac{\partial}{\partial y}\psi_j(0) - \rho_0\psi_j^{(L)}(0) + 2\rho_0^2\alpha_L^j \tag{6.77}$$

for $j = 0, 1, \ldots$

The superscript "L" indicates that the sequence of boundary values $\{\psi_j^{(L)}(0)\}_{j=0}^\infty$ is produced from the sequence of boundary derivatives $\{\partial\psi_j(0)/\partial y\}_{j=0}^\infty$ by the truncated algorithm of length L. These boundary values are only approximate.

An alternative form of these conditions is obtained by iterating eq.(6.77) backwards. The initial conditions $\psi_0^{(L)}(0)=0$ and $\partial\psi_0(0)/\partial y=0$ are used to stop the iteration. The result is like eq.(6.32).

$$\frac{\partial}{\partial y}\psi_{j+1}(0) + \rho_0\psi_{j+1}^{(L)}(0) = 2\rho_0^2 \sum_{k=0}^{j}(-1)^{j-k}\alpha_L^k \tag{6.78}$$

for $j = 0, 1, \ldots$

Suppose the sequence of differential boundary values $\partial\psi_j(0)/\partial y$ in eq.(6.33) is used as input to the truncated algorithm. The errors in the approximate boundary values $\psi_j^{(L)}(0)$ relative to the exact boundary values $\psi_j(0)$ can be characterized as follows. Fix $\xi > 0$, and let $(j_1, j_2, \ldots, j_L, \ldots)$ be a sequence of integers such that $j_L \sim \xi L^2$ as $L \to \infty$. Then the relative error in $\psi_{j_L}^{(L)}(0)$ converges to a finite limit as $L \to \infty$ that is exponentially small if $\xi$ is small.

$$0 < \lim_{L \to \infty}(1 - \psi_{j_L}^{(L)}(0)/\psi_{j_L}(0)) < 2e^{-2/\xi}. \tag{6.79}$$

Suppose the index j and the length L are given, and let $\xi = jL^{-2}$. A practical way to interpret eq.(6.79) is that $1 - \psi_j^{(L)}(0)/\psi_j(0) \approx 2\exp(-2/\xi)$ if $L \gg 1$.

Let u denote the unit roundoff in a finite-precision floating-point computer arithmetic. Two real numbers a and b are represented by the same floating-point number if $|1-a/b|<u$. These numbers are equivalent in this computer arithmetic. If $L>[\ln(2/u)/2]^{1/2}$, then $2\exp(-L^2/2)<u$. Hence, $\psi_j^{(L)}(0)$ and $\psi_j(0)$ are equivalent in the computer arithmetic if $L>>1$.

Now let $J$ be an integer, and let $L_J$ be the smallest integer greater than $[\ln(2/u)J/2]^{1/2}$.

$$L_J = \lceil [\ln(2/u)J/2]^{1/2}\rceil = O(J^{1/2}). \qquad (6.80)$$

If $L_J>>1$, then $\psi_j^{(L_J)}(0)$ and $\psi_j(0)$ are equivalent in the computer arithmetic for all $j \leq J$. The number of arithmetic operations to compute each $\psi_j^{(L_J)}(0)$ is proportional to $L_J$, but the number of arithmetic operations to compute each $\psi_j(0)$ is proportional to $j$. The ratio $\rho(J)$ of the total operation count for computing the subsequence $\{\psi_j^{(L_J)}(0)\}_{j=1}^J$ to the total operation count for computing the subsequence $\{\psi_j(0)\}_{j=1}^J$ is approximately $$\rho(J) \approx JL_J / \tfrac{1}{2}J^2 = 2L_J/J = O(J^{-1/2}). \qquad (6.81)$$

Therefore, if $L_J>>1$, then the truncated algorithm of length $L_J$ is more efficient for computing the first $J$ boundary values to working precision than the complete algorithm. As an example of practical importance, consider IEEE double-precision floating-point arithmetic. Since $u=2^{-53}$ in this arithmetic, $$L_J \approx 4.326 J^{1/2} \text{ for IEEE double-precision floating-point arithmetic.} \qquad (6.82)$$

These criteria are valid for all sequences of differential boundary values $\partial\psi_j(0)/\partial y$. However, let us continue to use the sequence in eq.(6.33) to explain how to program the truncated algorithm with compensated summation.

Assume that $L>4$. We can calculate the coefficients $\alpha_l^j$ for $j=1,2,3$ exactly.

$$\left.\begin{array}{l}\alpha_l^1=0 \text{ for } l \leq L-2, \quad \alpha_{L-1}^1=1, \quad \alpha_L^1=-1, \\ \alpha_l^2=0 \text{ for } l \leq L-3, \quad \alpha_{L-2}^2=-\tfrac{1}{2}, \quad \alpha_{L-1}^2=2, \quad \alpha_L^2=-\tfrac{3}{2}, \\ \alpha_l^3=0 \text{ for } l \leq L-4, \quad \alpha_{L-3}^3=\tfrac{1}{4}, \quad \alpha_{L-2}^3=-1, \quad \alpha_{L-1}^3=\tfrac{7}{4}, \quad \alpha_L^3=-1.\end{array}\right\} \qquad (6.83)$$

Next, we use eqs.(6.33,6.73) to write eqs.(6.74–6.76) for $j \geq 4$ as follows.

$$\alpha_1^j = -\tfrac{1}{2}\alpha_2^{j-1}. \qquad (6.84)$$

$$\alpha_l^j = -\tfrac{1}{2}\alpha_{l-1}^{j-1} - \tfrac{1}{2}\alpha_{l+1}^{j-1} \text{ for } l=2,\ldots,L-2. \qquad (6.85)$$

$$\alpha_{L-1}^j = -\alpha_L^{j-1} - \tfrac{1}{2}\alpha_{L-2}^{j-1}. \qquad (6.86)$$

$$\alpha_L^j = -\tfrac{1}{2}\alpha_{L-1}^{j-1}. \qquad (6.87)$$

Since $\alpha_L^0=0$, it follows from eq.(6.78) that $\psi_1^{(L)}(0)=-2p_0$ and $$\psi_{j+1}^{(L)}(0) = 2p_0 \sum_{k=1}^j (-1)^{j-k} \alpha_L^k \text{ for } j=1,2,\ldots \qquad (6.88)$$

Thus, $\psi_{j+1}^{(L)}(0)=-2p_0 \sigma_j^{(L)}$ where $$\sigma_j^{(L)} = -\sum_{k=1}^j (-1)^{j-k} \alpha_L^k \text{ for } j=1,2,\ldots \qquad (6.89)$$

which can be calculated recursively as follows.

$$\sigma_j^{(L)} = \alpha_L^j - \sigma_{j-1}^{(L)} \text{ for } j=2,3,\ldots \qquad (6.90)$$

We use the values of $\alpha_l^3$ for $l=1,\ldots,L$ from eq.(6.83) to start eqs.(6.84–6.87) when $j=4$. We compute $\sigma_j^{(L)}$ from eq.(6.90). We start this equation with $\sigma_3^{(L)}=\tfrac{1}{4}$, which follows from eqs.(6.83,6.89).

If eqs.(6.84–6.87,6.90) are programmed directly, then roundoff errors tend to accumulate. We can use compensated summation to counteract these roundoff errors in the same way that we use it to counteract roundoff errors for the complete algorithm. Let us denote the computed values of $\alpha_l^j$ and $\sigma_j^{(L)}$ by $\hat\alpha_l^j$ and $\hat\sigma_j^{(L)}$, respectively. We list the corrected computational forms of eqs.(6.84–6.87,6.90) next. If $j \geq 4$, then $$\left.\begin{array}{l}\hat\alpha_1^j \approx -\tfrac{1}{2}\hat\alpha_2^{j-1} \text{ and } \hat\epsilon_1^j \approx -\tfrac{1}{2}\hat\epsilon_2^{j-1}; \\ \text{for } l=2,\ldots,L-2: \\ \hat\alpha_l^j \approx -\mathit{fl}\!\left(\tfrac{1}{2}\hat\alpha_{l-1}^{j-1} + \tfrac{1}{2}\hat\alpha_{l+1}^{j-1}\right) \text{ and} \\ \hat\epsilon_l^j \approx -\mathit{fl}\!\left(\tfrac{1}{2}\hat\epsilon_{l-1}^{j-1} + \tfrac{1}{2}\hat\epsilon_{l+1}^{j-1} + \Delta_l^j\right); \\ \hat\alpha_{L-1}^j \approx -\mathit{fl}\!\left(\hat\alpha_L^{j-1} + \tfrac{1}{2}\hat\alpha_{L-2}^{j-1}\right) \text{ and} \\ \hat\epsilon_{L-1}^j \approx -\mathit{fl}\!\left(\hat\epsilon_L^{j-1} + \tfrac{1}{2}\hat\epsilon_{L-2}^{j-1} + \Delta_{L-1}^j\right); \\ \hat\alpha_L^j \approx -\tfrac{1}{2}\hat\alpha_{L-1}^{j-1} \text{ and } \hat\epsilon_L^j \approx -\tfrac{1}{2}\hat\epsilon_{L-1}^{j-1}; \\ \hat\sigma_j^{(L)} \approx -\mathit{fl}(\hat\alpha_L^j + \hat\sigma_{j-1}^{(L)}) \text{ and } \hat\epsilon_j^{(L)} \approx -\mathit{fl}(\hat\epsilon_L^j + \hat\epsilon_{j-1}^{(L)}).\end{array}\right\} \qquad (6.91)$$

Using eqs.(6.43–6.48), we compute $\hat\Delta_l^j$ for $l=2,\ldots,L-2$ as $\hat\Delta(\hat u,\hat v)$ with $$\hat{u} = \frac{1}{2}\hat{\sigma}_{\ell,1}^{(z)}$$

and $$\hat{v} = \frac{1}{2}\hat{\sigma}_{\ell,2}^{(z)},$$

and we compute $\tilde{\Delta}_{\ell,j}^{(z)}$ as $\hat{\Delta}(\hat{u},\hat{v})$ with $\hat{u}=\hat{\sigma}_{\ell,j-1}^{(z)}$ and $$\hat{v} = \frac{1}{2}\hat{\sigma}_{\ell,j}^{(z)}.$$

These equations are developed like the ones that are collected as eq.(6.71). We start them when $j=4$ with the following initial values:

$$\hat{a}_l^2 = 0 \text{ for } l \leq L-4, \quad \hat{a}_{L-3}^2 = \frac{1}{4}, \quad \hat{a}_{L-2}^2 = -1, \quad \hat{a}_{L-1}^2 = \frac{7}{4} \quad (6.92)$$

$$\hat{a}_L^2 = -1, \quad \hat{a}_j^{(0)} = \frac{1}{2}.$$

$$\hat{e}_l^3 = 0 \text{ for } l \leq L, \quad \hat{v}_L^{(0)} = 0.$$

We approximate $\sigma_j^{(z)}$ by the sum $\hat{\sigma}_j^{(z)} + \hat{e}_j^{(z)}$, which we denote by $\tilde{\sigma}_j^{(z)}$.

7. A Chebyshev tau method for semi-discrete parabolic equations.

If $x_j = j\Delta x$ and $k(x_j) = k_0$ for $j=0,1,\ldots$, where the increment $\Delta x$ and the wavenumber $k_0$ are fixed, then eq.(6.9) takes the following simple form.

$$\psi_{j+1}(y) - \psi_j(y) = (i\Delta x/4k_0)\left[\frac{\partial^2}{\partial y^2}\psi_j(y) + \frac{\partial^2}{\partial y^2}\psi_{j+1}(y)\right] \quad (7.1)$$

for $j = 0, 1, \ldots$.

We can use Chebyshev interpolation polynomials to integrate this equation numerically over an interval $-W \leq y \leq W$. Let $T_k(\xi)$ denote the k-th Chebyshev polynomial (of the first kind). For $k=0,1,\ldots$ these polynomials are defined by the identity $$T_k(\xi) = \cos(k\theta), \text{ where } \xi = \cos\theta. \quad (7.2)$$

Let N be a positive integer. A Chebyshev interpolation polynomial of degree N over the interval $-W \leq y \leq W$ is a sum of the form $$f(y) = \sum_{k=0}^{N} f_k T_k(y/W). \quad (7.3)$$

We shall approximate each function $\psi_j(y)$ by a polynomial $f_j(y)$ of degree N, which we represent uniquely as a Chebyshev interpolation polynomial.

$$f_j(y) = \sum_{k=0}^{N} f_{j,k} T_k(y/W) \text{ for } -W \leq y \leq W. \quad (7.4)$$

The first and second derivatives of $f_j(y)$ with respect to y are polynomials of degrees N-1 and N-2. We also represent these polynomials uniquely as Chebyshev interpolation polynomials.

$$\frac{\partial}{\partial y} f_j(y) = \frac{1}{W}\sum_{k=0}^{N-1} f_{j,k}^{(1)} T_k(y/W) \text{ for } -W \leq y \leq W. \quad (7.5)$$

$$\frac{\partial^2}{\partial y^2} f_j(y) = \frac{1}{W^2}\sum_{k=0}^{N-2} f_{j,k}^{(2)} T_k(y/W) \text{ for } -W \leq y \leq W. \quad (7.6)$$

Assume that the coefficients in these equations satisfy the following Chebyshev tau equations.

$$f_{j+1,k} - f_{j,k} = (i\Delta x/4k_0)(W^2)(f_{j,k}^{(2)} + f_{j+1,k}^{(2)}) \text{ for } \quad (7.7)$$

$$\begin{cases} j = 0, 1, \ldots \text{ and} \\ k = 0, 1, \ldots, N-2. \end{cases}$$

Under this assumption, the polynomials $f_j(y)$ satisfy equations that are similar to eq.(7.1). For $j=0,1,\ldots$ and $-W \leq y \leq W$, $$f_{j+1}(y) - f_j(y) = (i\Delta x/4k_0)\left[\frac{\partial^2}{\partial y^2} f_j(y) + \frac{\partial^2}{\partial y^2} f_{j+1}(y)\right] + \quad (7.8)$$

$$e_{j+1,N-1}T_{N-1}(y/W) + e_{j+1,N}T_N(y/W).$$

where $$e_{j+1,N-1} = f_{j+1,N-1} - f_{j,N-1} \text{ and } e_{j+1,N} = f_{j+1,N} - f_{j,N}. \quad (7.9)$$

We also define the following dimensionless and real-valued parameter.

$$q = 4k_0 W^2/\Delta x. \quad (7.10)$$

Now the Chebyshev tau equations can be written in the following equivalent form.

$$f_{j+1,k}^{(2)} + iq f_{j+1,k} = g_{j,k} \text{ for } \begin{cases} j = 0, 1, \ldots \text{ and} \\ k = 0, 1, \ldots, N-2. \end{cases} \quad (7.11)$$

where $$g_{j,k} = -f_{j,k}^{(2)} + iq f_{j,k}. \quad (7.12)$$

The quantities $g_{j,k}$ can be computed recursively without the coefficients $f_{j,k}^{(2)}$.

$$g_{j+1,k} = -f_{j+1,k}^{(2)} + iq f_{j+1,k} \quad (7.13)$$

$$= -(f_{j,k}^{(2)} + iq f_{j+1,k}) + 2iq f_{j+1,k}$$

$$= -g_{j,k} + 2iq f_{j+1,k}.$$

It is possible also to eliminate the coefficients $f_{j+1,k}^{(2)}$ from the Chebyshev tau equations. This leads to an alternative formulation of these equations in terms of the coefficients $f_{j+1,k}$ alone. The coefficients $f_{j+1,k}$ and $f_{j+1,k}^{(2)}$ in eqs.(7.4,7.6) satisfy eq.(7.7) if and only if $$f_{j+1,N} + \frac{1}{4}\frac{1}{N(N-1)}iqf_{j+1,N-1} = h_{j,N}, \quad (7.14)$$

$$f_{j+1,N-1} + \frac{1}{4}\frac{1}{(N-1)(N-2)}iqf_{j+1,N-3} = h_{j,N-1}, \quad (7.15)$$

$$\left(1 - \frac{1}{2}\frac{1}{(N-1)(N-3)}iq\right)f_{j+1,N-2} + \quad (7.16)$$
$$\frac{1}{4}\frac{1}{(N-2)(N-3)}iqf_{j+1,N-4} = h_{j,N-2},$$

$$\left(1 - \frac{1}{2}\frac{1}{(N-2)(N-4)}iq\right)f_{j+1,N-3} + \quad (7.17)$$
$$\frac{1}{4}\frac{1}{(N-3)(N-4)}iqf_{j+1,N-5} = h_{j,N-3},$$

$$\frac{1}{4}\frac{1}{(k+1)k}iqf_{j+1,k+2} + \left(1 - \frac{1}{2}\frac{1}{k^2-1}iq\right)f_{j+1,k} + \frac{1}{4}\frac{1}{k(k-1)}iqf_{j+1,k-2} = \quad (7.18)$$
$$h_{j,k} \quad \text{for } k = N-4, \ldots, 3,$$

$$\frac{1}{24}iqf_{j+1,4} + \left(1 - \frac{1}{6}iq\right)f_{j+1,2} + \frac{1}{4}iqf_{j+1,0} = h_{j,2}, \quad (7.19)$$
$$\text{for } j = 0, 1, \ldots,$$

where $$h_{j,N} = \frac{1}{4}\frac{1}{N(N-1)}g_{j,N-2}, \quad (7.20)$$

$$h_{j,N-1} = \frac{1}{4}\frac{1}{(N-1)(N-2)}g_{j,N-3}, \quad (7.21)$$

$$h_{j,N-2} = -\frac{1}{2}\frac{1}{(N-1)(N-3)}g_{j,N-2} + \frac{1}{4}\frac{1}{(N-2)(N-3)}g_{j,N-4}, \quad (7.22)$$

$$h_{j,N-3} = -\frac{1}{2}\frac{1}{(N-2)(N-4)}g_{j,N-3} + \frac{1}{4}\frac{1}{(N-3)(N-4)}g_{j,N-5}, \quad (7.23)$$

$$h_{j,k} = \frac{1}{4}\frac{1}{(k+1)k}g_{j,k+2} - \frac{1}{2}\frac{1}{k^2-1}g_{j,k} + \frac{1}{4}\frac{1}{k(k-1)}g_{j,k-2} \quad \text{for } k = N-4, \ldots, 3, \quad (7.24)$$

$$h_{j,2} = \frac{1}{24}g_{j,4} - \frac{1}{6}g_{j,2} + \frac{1}{4}g_{j,0}. \quad (7.25)$$

From this point on we assume that N is even. Note that (1) there are N−1 equations in eqs.(7.14–7.19);
(2) the even-indexed coefficients $f_{j+1,N}, f_{j+1,N-2}, \ldots, f_{j+1,2}, f_{j+1,0}$ are uncoupled from the odd-indexed coefficients $f_{j+1,N-1}, f_{j+1,N-3}, \ldots, f_{j+1,1}$ in eqs.(7.14–7.19);
(3) the coefficient $f_{j+1,N}$ appears only in eq.(7.14), and the coefficient $f_{j+1,N-1}$ appears only in eq.(7.15).

We adopt conditions at the boundaries $y=\pm W$ that combine the discrete transparent boundary conditions (6.32) with source terms $-f_{j+1}^{(S)}(\pm W)$ that are independent of the solutions $f_k(y)$ for $k \leq j+1$. Thus, $$f_{j+1}(\pm W) \pm \frac{1}{\rho_0}\frac{\partial}{\partial y}f_{j+1}(\pm W) = g_j(\pm W) \text{ for } j = 0, 1, \ldots, \quad (7.26)$$

where $$g_j(\pm W) = -f_{j+1}^{(S)}(\pm W) + 2\rho_0 \sum_{k=0}^{j}(-1)^{j-k}a_{k+1}^j(\pm W). \quad (7.27)$$

The coefficients $a_{k+1}^k(\pm W)$ in this equation are computed recursively. First, $a_1^0(\pm W)=0$. Second, for $j=1,2,\ldots$, $$a_k^j(\pm W) = -\frac{1}{2}a_k^{j-1}(\pm W) - \frac{1}{2}a_{k-2}^{j-1}(\pm W), \quad (7.28)$$
for $k = 1, \ldots, j-1,$
Skip this when $j=1$.

$$a_j^j(\pm W) = \pm \frac{1}{2}\rho_0^{-1}\left[\frac{\partial}{\partial y}f_{j-1}(\pm W) + \frac{\partial}{\partial y}f_j(\pm W)\right] - a_j^{j-1}(\pm W) - \frac{1}{2}a_{j-2}^{j-1}(\pm W), \quad (7.29)$$

$$a_{j+1}^j(\pm W) = \pm \frac{1}{2}\rho_0^{-1}\left[\frac{\partial}{\partial y}f_{j-1}(\pm W) + \frac{\partial}{\partial y}f_j(\pm W)\right] - \frac{1}{2}a_{j-1}^{j-1}(\pm W), \quad (7.30)$$

where $$a_{-1}^j(\pm W) = 0 \text{ for } j=0,1,\ldots, \quad (7.31)$$

$$a_0^j(\pm W) = 0 \text{ for } j=0,1,\ldots \quad (7.32)$$

If $f_0(y)$ is specified, then the N+1 equations in eqs. (7.14–7.19,7.26)) determine the polynomials $f_{j+1}(y)$ for $j=0,1,\ldots$ uniquely.

It is easy to evaluate $f_{j+1}(\pm W)$ from eq.(7.4) because $T_k(\pm 1)=(\pm 1)^k$, $$f_{j+1}(\pm W) = \sum_{k=0}^{N}(\pm 1)^k f_{j+1,k}. \quad (7.33)$$

It is more convenient to evaluate $\partial f_{j+1}(\pm W)/\partial y$ by differentiating eq.(7.4) directly than by using eq.(7.5) because $T_k'(\pm 1)=(\pm 1)^{k+1}k^2$. Thus, $$\pm \frac{\partial}{\partial y}f_{j+1}(\pm W) = \frac{1}{W}\sum_{k=0}^{N}(\pm 1)^k k^2 f_{j+1,k}. \quad (7.34)$$

Now $$\rho_0 W = e^{-i\pi/4} 2W(k_0/\Delta x)^{1/2} = e^{-i\pi/4} q^{1/2}. \quad (7.35)$$

Therefore, it follows from eqs.(7.26,7.33–7.35) that $$\sum_{k=0}^{N}f_{j+1,k} + e^{i\pi/4}q^{-1/2}\sum_{k=0}^{N}k^2 f_{j+1,k} = g_j(W), \quad (7.36)$$

$$\sum_{k=0}^{N}(-1)^k f_{j+1,k} + e^{i\pi/4}q^{-1/2}\sum_{k=0}^{N}(-1)^k k^2 f_{j+1,k} = g_j(-W). \quad (7.37)$$

It is easy to decouple the even-indexed Chebyshev coefficients from the odd-indexed Chebyshev coefficients in these equations. If we add eqs.(7.36,7.37), then we get an equation that involves only the even-indexed Chebyshev coefficients, $$\sum_{l=1}^{N/2} \left[1 + e^{i\pi/4} q^{-1/2}(2l)^2\right] f_{j+1,2l} = \frac{1}{2}\{g_j(W) + g_j(-W)\}. \quad (7.38)$$

If we subtract eq.(7.37) from eq.(7.36), then we get an equation that involves only the odd-indexed Chebyshev coefficients.

$$\sum_{l=1}^{N/2} \left[1 + e^{i\pi/4} q^{-1/2}(2l-1)^2\right] f_{j+1,2l-1} = \frac{1}{2}\{g_j(W) - g_j(-W)\}. \quad (7.39)$$

It is useful to express eqs.(7.14–7.19) and eqs.(7.38,7.39) as a pair of independent matrix equations of the form $$\begin{bmatrix} A & u \\ v^T & \gamma \end{bmatrix} \begin{bmatrix} x \\ \alpha \end{bmatrix} = \begin{bmatrix} y \\ \beta \end{bmatrix} \quad (7.40)$$

First, define $$r_k = \begin{cases} 0 & \text{for } k = N-2, N-3, \\ \frac{1}{4}\frac{1}{(k+1)k} iq & \text{for } k = N-4, \ldots, 2. \end{cases} \quad (7.41)$$

$$s_k = \begin{cases} 1 & \text{for } k = N, N-1, \\ 1 - \frac{1}{2}\frac{1}{k^2-1} iq & \text{for } k = N-2, \ldots, 2. \end{cases} \quad (7.42)$$

$$t_k = \begin{cases} \frac{1}{4}\frac{1}{k(k-1)} iq & \text{for } k = N, \ldots, 3, \\ \frac{1}{4} iq & \text{for } k = 2. \end{cases} \quad (7.43)$$

$$b_k = 1 + e^{i\pi/4} q^{-1/2} k^2 \text{ for } k = N, \ldots, 2. \quad (7.44)$$

The even-indexed Chebyshev coefficients $f_{j+1,2l}$ are determined by the matrix equation $$\begin{bmatrix} A_0 & u_0 \\ v_0^T & \gamma_0 \end{bmatrix} \begin{bmatrix} x_0 \\ \alpha_0 \end{bmatrix} = \begin{bmatrix} y_0 \\ \beta_0 \end{bmatrix} \quad (7.45)$$

where $$A_0 = \begin{bmatrix} s_N & t_N & & & & \\ r_{N-2} & s_{N-2} & t_{N-2} & & & \\ & r_{N-4} & s_{N-4} & t_{N-4} & & \\ & & \ddots & \ddots & \ddots & \\ & & & r_6 & s_6 & t_6 \\ & & & & r_2 & s_2 \end{bmatrix}, \quad u_0 = \begin{bmatrix} 0 \\ 0 \\ 0 \\ \vdots \\ 0 \\ t_2 \end{bmatrix} \quad (7.46)$$

$$v_0 = \begin{bmatrix} b_N \\ b_{N-2} \\ b_{N-4} \\ \vdots \\ b_4 \\ b_2 \end{bmatrix}, \quad x_0 = \begin{bmatrix} f_{j+1,N} \\ f_{j+1,N-2} \\ f_{j+1,N-4} \\ \vdots \\ f_{j+1,4} \\ f_{j+1,2} \end{bmatrix}, \quad y_0 = \begin{bmatrix} h_{j,N} \\ h_{j,N-2} \\ h_{j,N-4} \\ \vdots \\ h_{j,4} \\ h_{j,2} \end{bmatrix}, \quad (7.47)$$

$$\gamma_0 = b_0, \ \alpha_0 = f_{j+1,0}, \ \beta_0 = \frac{1}{2}\{g_j(W) + g_j(-W)\}. \quad (7.48)$$

The rows of eq.(7.45) are eqs.(7.14,7.16), eq.(7.18) for $k=2l$ ($l=N/2-2,\ldots,2$), eq.(7.19) and eq.(7.38).

The odd-indexed Chebyshev coefficients $f_{j+1,2l-1}$ are determined by the matrix equation $$\begin{bmatrix} A_1 & u_1 \\ v_1^T & \gamma_1 \end{bmatrix} \begin{bmatrix} x_1 \\ \alpha_1 \end{bmatrix} = \begin{bmatrix} y_1 \\ \beta_1 \end{bmatrix} \quad (7.49)$$

where $$A_1 = \begin{bmatrix} s_{N-1} & t_{N-1} & & & & \\ r_{N-3} & s_{N-3} & t_{N-3} & & & \\ & r_{N-5} & s_{N-5} & t_{N-5} & & \\ & & \ddots & \ddots & \ddots & \\ & & & r_5 & s_5 & t_5 \\ & & & & r_3 & s_3 \end{bmatrix}, \quad u_1 = \begin{bmatrix} 0 \\ 0 \\ 0 \\ \vdots \\ 0 \\ 0 \end{bmatrix} \quad (7.50)$$

$$v_1 = \begin{bmatrix} b_{N-1} \\ b_{N-3} \\ b_{N-5} \\ \vdots \\ b_5 \\ b_3 \end{bmatrix}, \quad x_1 = \begin{bmatrix} f_{j+1,N-1} \\ f_{j+1,N-3} \\ f_{j+1,N-5} \\ \vdots \\ f_{j+1,5} \\ f_{j+1,3} \end{bmatrix}, \quad y_1 = \begin{bmatrix} h_{j,N-1} \\ h_{j,N-3} \\ h_{j,N-5} \\ \vdots \\ h_{j,5} \\ h_{j,3} \end{bmatrix}, \quad (7.51)$$

$$\gamma_1 = b_1, \ \alpha_1 = f_{j+1,1}, \ \beta_1 = \frac{1}{2}\{g_j(W) - g_j(-W)\}. \quad (7.52)$$

The rows of eq.(7.49) are eqs.(7.15,7.17), eq.(7.18) for $k=2l-1$ ($l=N/2-2,\ldots,2$) and eq.(7.39).

We can solve eqs.(7.45,7.49) numerically by the Crout form of the block elimination method. The BEC algorithm to carry out this method has five steps. We outline them for eq.(7.40), which includes eqs.(7.45,7.49) as particular cases. Given y and β, we want to solve that equation for x and α.

(1) Solve the equation $$A\xi = u. \quad (7.53)$$

(2) Use the solution vector ξ to compute the divisor $$\delta = \gamma - v^T \xi. \quad (7.54)$$

(3) Solve the equation $$A\eta = y. \quad (7.55)$$

(4) Use the solution vector η to compute the scalar $$\alpha = (\beta - v^T \eta)/\delta. \quad (7.56)$$

(5) Compute the vector $$x = \eta - \alpha\xi. \quad (7.57)$$

We can solve eqs.(7.53,7.55) with a method that uses an LU factorization of the matrix $A$. If $A = A_0$ or $A = A_1$, then the Crout LU factorization can be done numerically without pivoting and is stable.

Since $s_N=1$, we find that
$$A_0=L_0U_0, \quad (7.58)$$
where $$L_0 = \begin{bmatrix} 1 & & & & & \\ \sigma_{N-1} & & & & & \\ s_{N-3} & \sigma_{N-3} & & & & \\ & & \ddots & & & \\ & & & s_2 & \sigma_4 & \\ & & & & s_1 & \sigma_2 \end{bmatrix} \quad (7.59)$$

$$U_0 = \begin{bmatrix} 1 & t_N & & & & \\ & 1 & \tau_{N-2} & & & \\ & & 1 & \tau_{N-4} & & \\ & & & \ddots & \ddots & \\ & & & & 1 & \tau_4 \\ & & & & & 1 \end{bmatrix}$$

and $$\left.\begin{array}{l} \sigma_{N-2} = s_{N-2}, \tau_{N-2} = t_{N-2}/\sigma_{N-2}, \\ \sigma_k = s_k - s_k\tau_{k+2}, \tau_k = t_k/\sigma_k \text{ for } k=2l \; (l=N/2-2,\ldots,2), \\ \sigma_2 = s_2 - s_2\tau_4. \end{array}\right\} \quad (7.60)$$

Since $s_{N-1}=1$, we find that
$$A_1=L_1U_1, \quad (7.61)$$
where $$L_1 = \begin{bmatrix} 1 & & & & & \\ \sigma_{N-2} & & & & & \\ s_{N-4} & \sigma_{N-4} & & & & \\ & & \ddots & & & \\ & & & s_3 & \sigma_5 & \\ & & & & s_1 & \sigma_3 \end{bmatrix}, \quad (7.62)$$

$$U_1 = \begin{bmatrix} 1 & t_{N-1} & & & & \\ & 1 & \tau_{N-3} & & & \\ & & 1 & \tau_{N-5} & & \\ & & & \ddots & \ddots & \\ & & & & 1 & \tau_5 \\ & & & & & 1 \end{bmatrix}$$

and $$\left.\begin{array}{l} \sigma_{N-3} = s_{N-3}, \tau_{N-3} = t_{N-3}/\sigma_{N-3}, \\ \sigma_k = s_k - s_k\tau_{k+2}, \tau_k = t_k/\sigma_k \text{ for } k=2l-1 \; (l=N/2-2,\ldots,3), \\ \sigma_3 = s_3 - s_3\tau_5. \end{array}\right\} \quad (7.63)$$

If $A=A_0$, then eqs.(7.53,7.55) are of the form $A_0z_0=w_0$. To solve this equation we introduce a vector $p_0$ and solve the first intermediate equation $L_0p_0=w_0$ for $p_0$ by forward substitution. Then we solve the second intermediate equation $U_0z_0=p_0$ for $z_0$ by backward substitution.

If $A=A_1$, then eqs.(7.53,7.55) are of the form $A_1z_1=w_1$. This equation is solved the same way. We introduce a vector $p_1$ and solve the intermediate equation $L_1p_1=w_1$ for $p_1$ by forward substitution. Then we solve the intermediate equation $U_1z_1=p_1$ for $z_1$ by backward substitution.

Since the LU solution method for eqs.(7.53,7.55) is stable if $A=A_0$ or $A=A_1$, the BEC algorithm can be numerically unstable in finite-precision arithmetic only if the divisor $\delta$ is too small. However, if $q=\mathcal{O}(N^2)$, then $\delta=\mathcal{O}(N^{1/2})$ in each case.

$$\delta_0 \sim (2\pi)^{1/2} e^{-\pi/4} q^{1/4}, \quad (7.64)$$

$$\delta_1 \sim (\pi/2)^{1/2} e^{-\pi/4} q^{1/4}. \quad (7.65)$$

Hence, if $q=\mathcal{O}(N^2)$, then the BEC algorithm is stable. Each computer solution with the BEC algorithm should be followed by one round of iterative refinement. Solutions of eqs.(7.45,7.49) that are computed this way are accurate to machine precision.

8. Efficient evaluation of Chebyshev interpolation polynomials.

Clenshaw's algorithm is a stable and accurate method to evaluate the Chebyshev interpolation polynomial $$u(\xi) = \sum_{k=0}^{N} u_k T_k(\xi) \quad (8.1)$$

at a single argument $\xi$: $u(\xi)=v_0$ where
 (1) Start: $v_N=u_N$ and $v_{N-1}=u_{N-1}+2\xi u_N$.
 (2) For $k=N-2,\ldots,1$: $v_k=u_k+2\xi v_{k+1}-v_{k+2}$.
 (3) End: $v_0=u_0+\xi v_1-v_2$.

The arithmetic operation count for Clenshaw's algorithm is about $3N$ per evaluation. If we use this algorithm to evaluate $u(\xi)$ at the $N+1$ points $$\xi_n=1-2n/N \text{ for } n=0,\ldots,N, \quad (8.2)$$

then the total operation count for these evaluations is $\mathcal{O}(3N^2)$. There are several alternative algorithms that also perform these evaluations but have total operation counts like $\mathcal{O}(AN \log N)$, where $A$ is a constant. We shall describe an alternative algorithm that is based on Lagrange polynomial interpolation. If $N$ is moderately large, say $N>100$, then it is more efficient to evaluate $u(\xi)$ at all $N+1$ points $\xi_n$ with this algorithm than with Clenshaw's algorithm.

If $v(\theta)=u(\cos\theta)$, then $$v(\theta) = \sum_{k=0}^{N} u_k \cos(k\theta) \text{ for } 0 \le \theta \le \pi. \quad (8.3)$$

Since $\xi_n=\cos\phi_n$ where $$\phi_n = 2 \arcsin((n/N)^{1/2}) \text{ for } n=0,\ldots,N, \quad (8.4)$$

evaluating the polynomial $u(\xi)$ at the regularly spaced points $\xi_n$ is equivalent to evaluating $v(\theta)$ at the irregularly spaced points $\phi_n$, which is what the alternative algorithm really does.

The first step of this algorithm is to compute the values of $v(\theta)$ at the regularly spaced points $\theta_j=j\pi/3N$ for $j=0,\ldots,3N$. A very efficient way to do these computations is to pad the spectral coefficients $u_n$ in eq.(8.3) with $2N$ trailing zeros and then to take a cosine FFT of length $3N$. The total operation count in this approach is $\mathcal{O}(15N \log N)$.

Next, let $K$ be a positive integer. We shall discuss some choices for $K$ after the algorithm has been described. The second step of the algorithm is to compute the forward differences of orders up to 2K that are associated with the points $\theta_j$. Let $$\Delta^0 v(\theta_j) = v(\theta_j) \text{ for } j=0,\ldots,3N. \quad (8.5)$$

For $k=1,\ldots,2K$ the forward differences of order k are defined as follows.

$$\Delta^k v(\theta_j) = \Delta^{k-1} v(\theta_{j+1}) - \Delta^{k-1} v(\theta_j) \text{ for } j=0,\ldots,3N-k. \quad (8.6)$$

The operation count for computing all of these differences is $\mathcal{O}(6KN)$. Note, however, that the subtractions in eq.(8.6) can be done in parallel for each k. Therefore, this step could be expedited on an array processor or on a computer that has a hardware implementation of vector arithmetic.

The third step of the algorithm is based on the Gaussian (forward) form of the Lagrange interpolation polynomials of even order. Let $h=\pi/3N$, and let $Q_{2K}(\theta_j+th)$ be the following polynomial in t of degree 2K.

$$Q_{2K}(\theta_j+th) = \quad (8.7)$$
$$u(\theta_j) + t\Delta u(\theta_j) + \frac{1}{2}t(t-1)\Delta^2 u(\theta_{j-1}) + \frac{1}{6}t(t^2-1)\Delta^3 u(\theta_{j-1}) +$$
$$\sum_{k=2}^{K-1}\prod_{l=1}^{k-1}\left[(t^2-l^2)\left[\frac{t(t-k)}{(2k)!}\Delta^{2k}u(\theta_{j-k}) + \frac{t(t^2-k^2)}{(2k+1)!}\Delta^{2k+1}u(\theta_{j-k})\right]\right] +$$
$$\prod_{l=1}^{K-1}(t^2-l^2)\frac{t(t-K)}{(2K)!}\Delta^{2K}u(\theta_{j-K}).$$

Then $$v(\theta_j+th) = Q_{2K}(\theta_j+th) + R_{2K}(\theta_j+th), \quad (8.8)$$

where the remainder $R_{2K}(\theta_j+th)$ can written in the form $$R_{2K}(\theta_j+th) = t\prod_{l=1}^{K}(t^2-l^2)\frac{h^{2K+1}}{(2K+1)!}\frac{\partial^{2K+1}}{\partial\theta^{2K+1}}u(\vartheta) \quad (8.9)$$

for some $\vartheta$ depending on t such that $\theta_{j-K}<\vartheta<\theta_{j+K}$. The polynomial $Q_{2K}(\theta_j+th)$ can be evaluated with about 4K operations as follows.

(1) Start: $q_K = \frac{t-K}{2K}\Delta^{2K}u(\theta_{j-K})$.

(2) For $k=K-1,\ldots,$ $$q_k = \frac{t-k}{2k}\left[\Delta^{2k}u(\theta_{j-k}) + \frac{t+k}{2k+1}(\Delta^{2k+1}u(\theta_{j-k}) + q_{k+1})\right].$$

(3) End: $Q_{2K}(\theta_j+th) = v(\theta_j) + t(\Delta v(\theta_j)+q_1)$.

Now for $n=0,\ldots,N$ let $j_n$ be the index j for which the absolute difference $|\phi_n-\theta_j|$ is smallest, and let $t_n=(\phi_n-\theta_{j_n})/h$. Clearly, $$|t_n| \leq \frac{1}{2}.$$

Since $\phi_0=0=\theta_0$ and $\phi_N=\pi=\theta_{3N}$, $v(\phi_0)=v(\theta_0)$ and $v(\phi_N)=v(\theta_{3N})$. If $0<n<N$, then we use eq.(8.8) to approximate $v(\phi_n)$ as follows.

$$v(\phi_n) = v(\theta_{j_n}+t_nh) = Q_{2K}(\theta_{j_n}+t_nh) \text{ for } n=1,\ldots,N-1. \quad (8.10)$$

The total operation count for computing these approximations is about 4KN. Note that in order for thereto be enough sample points $\theta_j$, the increment $h=\pi/3N$ must be small enough that $\phi_1/h>K$. A sufficient condition for there to be enough of these sample points is that $N>(\pi^2/36)K^2$.

Let us estimate the interpolation errors $$R_{2K}(\theta_{j_n}+t_nh) = v(\phi_n) - Q_{2K}(\theta_{j_n}+t_nh) \quad (8.11)$$

in the approximations (8.10). First, we consider the simple cases in which there is just one non-vanishing term in eq.(8.3). Let $0 \leq k \leq N$ and assume that $v(\theta)=\cos(k\theta)$. It can be shown that $$|R_{2K}(\theta_{j_n}+t_nh)| \leq \frac{1}{2}\left(\frac{\pi}{K}\right)^{1/2}\left(\frac{k}{N}\frac{\pi}{6}\right)^{2K+1}[1+O(K^{-1})] \quad (8.12)$$

if $v(\theta)=\cos(k\theta)$.

For fixed k this bound is an exponentially decreasing function of increasing K because $0 \leq k/N \leq 1$. For fixed K this bound is a rapidly decreasing function of decreasing k. Thus, the bound on the interpolation error is greatest if k=N. If K=25, however, eq.(8.12) implies double-precision accuracy even in this case because $\frac{1}{2}(\pi/25)^{1/2}(\pi/6)^{51} = 0.8 \cdot 10^{-15}$.

In the general case we find that $$|R_{2K}(\theta_{j_n}+t_nh)| \leq \frac{1}{2}\left(\frac{\pi}{K}\right)^{1/2}\sum_{k=1}^{N}|u_k|\left(\frac{k}{N}\frac{\pi}{6}\right)^{2K+1}[1+O(K^{-1})]. \quad (8.13)$$

In practice, the Chebyshev coefficients $u_k$ eventually decrease exponentially in magnitude as the index k increases. Therefore, eq.(8.13) implies that the approximations in eq.(8.10) may have double-precision accuracy if the integer K is slightly less than 25, e.g., K=20.

The total operation count for computing all the values $u(\xi_n)=v(\phi_n)$ with the alternative algorithm is $\mathcal{O}(15N \log N + 10K N)$. This should be compared with the total operation count $\mathcal{O}(3N^2)$ for computing these values directly with Clenshaw's algorithm.

9. The decomposition method for transversely unbounded waveguides.

We describe a newly created numerical method for integrating a system of coupled parabolic equations that models one-way propagation of sound in a transversely unbounded waveguide. Referring now to FIG. 3, we assume that sound in the waveguide propagates mainly in the direction of increasing range 30, which is assigned the coordinate x. The waveguide is unbounded in the direction of cross range 32, which is assigned the coordinate y. This discussion is for slab geometry, but the development for spherical geometry is almost identical.

The horizontal variations in the properties of the fluid in this waveguide are confined between vertical planes at $y=\pm W_p$, which are parallel to the direction of propagation. We assume that the fluid in the waveguide was originally in a horizontally stratified state but has been perturbed between these planes. The unperturbed fluid can have an internal horizontal interface that also has been perturbed between the planes. The perturbations are smooth and vanish at the planes. The waveguide remains horizontally stratified in the two semi-infinite sections where $|y|>W_p$.

To make the transverse extent of our problem finite, we put transparent boundaries in the vertical planes at $y=\pm W$, where $W>W_p$. These boundaries have no physical reality.

Sound in the waveguide must penetrate the transparent boundaries without reflection because they are in the semi-infinite horizontally stratified sections of the waveguide.

For simplicity we assume that the reference wavenumbers $k_m$ are positive constants. Thus, the acoustic pressure field is represented by modal amplitudes $\varphi_m$ for $m=1,\ldots,M$ that satisfy the following system of coupled parabolic equations for $x>0$.

$$2ik_m \frac{\partial \varphi_m}{\partial x} + \frac{\partial^2 \varphi_m}{\partial y^2} = (k_m^2 - \xi_m^2)\varphi_m + \sum_{n=1}^{M}\left\{(\alpha_{mn} + i\beta_{mn}k_n)\varphi_n + \beta_{mn}\frac{\partial \varphi_n}{\partial x} + \gamma_{mn}\frac{\partial \varphi_n}{\partial y}\right\}e^{-i(k_m - k_n)x} \quad (9.1)$$

for $m=1,\ldots,M$. These equations are obtained from eq.(2.8) with $\theta_m = k_m x$ for each $m$.

Each modal wavenumber $\xi_m(x,y)$ is constant in the half-planes 34 where $|y|>W_p$, which correspond to the unperturbed horizontally stratified sections of the waveguide. We denote this constant by $\xi_m^{(0)}$. Note that it is the same for $y<-W_p$ as for $y>W_p$. We expect the reference wavenumber $k_m$ to be close to $\xi_m^{(0)}$. In addition, the coupling coefficients $\alpha_{mn}(x,y)$, $\beta_{mn}(x,y)$ and $\gamma_{mn}(x,y)$ vanish for $|y|>W_p$.

Sound enters the waveguide through an aperture 36 in the vertical plane at $x=0$. The aperture is confined between the lines at $y=\pm W_s$ in this plane, where $W_s < W_p$. The acoustic pressure field in this plane is represented by initial conditions on the modal amplitudes of the following form.

$$\varphi_m(0,y) = \begin{cases} S_m(y) & \text{if } |y| < W_s \\ 0 & \text{if } |y| > W_s \end{cases} \quad (9.2)$$

Now let us formulate transparent boundary conditions for the modal amplitudes $\varphi_m$ at the transparent boundaries 38 where $y=\pm W$. First, the coupled parabolic equations (9.1) decouple in the half-planes $|y|>W_p$ as follows. For $m=1,\ldots,M$, $$2ik_m \frac{\partial \varphi_m}{\partial x} + \frac{\partial^2 \varphi_m}{\partial y^2} = (k_m^2 - (\xi_m^{(0)})^2)\varphi_m \text{ if } |y| > W_p. \quad (9.3)$$

We bring each of these equations into the form of a standard parabolic equation by defining the following phase-shifted modal amplitudes.

$$\tilde{\varphi}_m = \varphi_m e^{-i\kappa_m x} \text{ for } m=1,\ldots,M, \quad (9.4)$$

where each $\kappa_m$ is a constant. If we let $$\kappa_m = ((\xi_m^{(0)})^2 - k_m^2)/2k_m, \quad (9.5)$$

then $\tilde{\varphi}_m$ satisfies the standard parabolic equation $$2ik_m \frac{\partial \tilde{\varphi}_m}{\partial x} + \frac{\partial^2 \tilde{\varphi}_m}{\partial y^2} = 0 \text{ if } |y| > W_p. \quad (9.6)$$

Since $W > W_p$, outgoing transparent boundary conditions can be imposed on the phase-shifted modal amplitudes at the transparent boundaries $y=\pm W$. For example, we get the following form of these conditions from eqs.(6.2,6.3). For $m=1,\ldots,M$, $$\tilde{\varphi}_m(x, \pm W) = \mp e^{i\pi/4}(2\pi k_m)^{-1/2} \int_0^x \frac{\partial}{\partial y}\tilde{\varphi}_m(u, \pm W)(x-u)^{-1/2} du \text{ for } x > 0. \quad (9.7)$$

Let us reformulate eq.(9.1) in terms of the phase-shifted modal amplitudes.

$$2ik_m \frac{\partial \tilde{\varphi}_m}{\partial x} + \frac{\partial^2 \tilde{\varphi}_m}{\partial y^2} = ((\xi_m^{(0)})^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\tilde{k}_m - \tilde{k}_n)x}, \quad (9.8)$$

where the shifted reference wavenumbers $\tilde{k}_m$ are defined as $$\tilde{k}_m = k_m + \kappa_m = k_m^{(0)} + (k_m - \xi_m^{(0)})^2/2k_m \text{ for } m=1,\ldots,M. \quad (9.9)$$

Note that $\tilde{k}_m$ is stationary at $k_m = \xi_m^{(0)}$, where it equals $\xi_m^{(0)}$ as well.

A sufficient condition that the system of coupled parabolic equations (9.1) have a unique solution for a given set of initial conditions (9.2) is that the reference matrix be positive definite and that the transparent boundary conditions (9.7) be satisfied.

Each $\tilde{\varphi}_m$ is the sum of a primary component $\tilde{\varphi}_m^{(1)}$ and a secondary component $\tilde{\varphi}_m^{(2)}$ that are the solutions of the following two problems.

I. Primary component. Let $\tilde{\varphi}_m^{(1)}$ be a solution of the inhomogeneous parabolic equation $$2ik_m \frac{\partial \tilde{\varphi}_m^{(1)}}{\partial x} + \frac{\partial^2 \tilde{\varphi}_m^{(1)}}{\partial y^2} = ((\xi_m^{(0)})^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\tilde{k}_m - \tilde{k}_n)x} \quad (9.10)$$

for $x>0$ and $|y|\leq W$ that satisfies the same initial conditions that $\tilde{\varphi}_m$ satisfies, $$\tilde{\varphi}_m^{(1)}(0,y) = \tilde{\varphi}_m(0,y) = \begin{cases} S_m(y) & \text{if } |y| < W_s \\ 0 & \text{if } |y| > W_s \end{cases} \quad (9.11)$$

and that is subject to the following Neumann boundary conditions.

$$\frac{\partial}{\partial y}\tilde{\varphi}_m^{(1)}(x, \pm W) = 0 \text{ for } x > 0. \quad (9.12)$$

Conditions (9.11, 9.12) are compatible, and the solution $\tilde{\varphi}_m^{(1)}$ of this problem is unique.

II. Secondary component. Let $\tilde{\varphi}_m^{(2)}$ be a solution of the standard parabolic equation $$2ik_m \frac{\partial \tilde{\varphi}_m^{(2)}}{\partial x} + \frac{\partial^2 \tilde{\varphi}_m^{(2)}}{\partial y^2} = 0 \text{ for } x > 0 \text{ and } |y| \leq W \quad (9.13)$$

that satisfies the homogeneous initial condition $$\tilde{\varphi}_m^{(2)}(0,y)=0 \text{ for } |y|\leq W, \quad (9.14)$$

and that is subject to the following inhomogeneous Neumann boundary conditions.

$$\frac{\partial}{\partial y}\tilde{\psi}_m^{(2)}(x,\pm W) = \frac{\partial}{\partial y}\tilde{\psi}_m(x,\pm W) \text{ for } x > 0. \quad (9.15)$$

Conditions (9.14, 9.15) are compatible, and the solution $\tilde{\psi}_m^{(2)}$ of this problem is unique.

It can be shown that $$\tilde{\psi}_m = \tilde{\psi}_m^{(1)} + \tilde{\psi}_m^{(2)} \text{ for } m=1,\ldots,M. \quad (9.16)$$

This identity suggests the following basic decomposition method for finding the phase-shifted modal amplitudes $\tilde{\psi}_m$. We regard each $\tilde{\psi}_m$ as an unknown in problems I and II and solve these problems simultaneously for the triples $\{\tilde{\psi}_m, \tilde{\psi}_m^{(1)}, \tilde{\psi}_m^{(2)}\}$ subject to the constraints that $\tilde{\psi}_m = \tilde{\psi}_m^{(1)} + \tilde{\psi}_m^{(2)}$ and that $\tilde{\psi}_m$ satisfy the transparent boundary conditions (9.7) for $m=1,\ldots,M$. This approach gives us the freedom to use different techniques for solving problems I and II numerically.

In practice, we solve discrete forms of problems I and II numerically. First, we develop a discrete form of problem I from an exact integral of eq.(9.10). Fix a range increment $\Delta x$ and let $x_j = j\Delta x$ for $j=0,1,\ldots$. Define $$\tilde{p}_m^{(1)} = k_m^2 \tilde{\psi}_m^{(1)} + (1/2)\sum_{n=1}^{M} \beta_{mn}\tilde{\psi}_n e^{-i(\xi_m - \xi_0)x}, \quad (9.17)$$

and $$\tilde{q}_m = ((\xi_m^{(0)})^2 - \xi_m^2)\tilde{\psi}_m + \quad (9.18)$$
$$\sum_{n=1}^{M}\left[\left(\alpha_{mn} + i\xi_m\beta_{mn} - \frac{\partial \beta_{mn}}{\partial x}\right)\tilde{\psi}_n + \gamma_{mn}\frac{\partial \tilde{\psi}_n}{\partial y} + \frac{1}{2k_m}\frac{\partial^2}{\partial y^2}(\beta_{mn}\tilde{\psi}_n)\right]e^{-i(\xi_m - \xi_0)x}.$$

We can verify that eq.(9.10) is equivalent to the following equation.

$$2ik_m \frac{\partial \tilde{\psi}_m^{(1)}}{\partial x} + \frac{\partial^2 \tilde{\psi}_m^{(1)}}{\partial y^2} = k_m \tilde{q}_m. \quad (9.19)$$

Note that $$\tilde{\psi}_m^{(1)}(x,y) = k_m \tilde{\psi}_m^{(0)}(x,y) \text{ and } \tilde{q}_m(x,y) = 0 \text{ if } |y| > W_p \quad (9.20)$$

because $\xi_m = \xi_m^{(0)}$ and the coupling coefficients vanish for $|y| > W_p$. Therefore, $\tilde{\psi}_m^{(1)}(x,y)$ satisfies Neumann boundary conditions like eq.(9.12) at $y = \pm W$, and we can use the Fourier cosine transform $\mathcal{F}$ to integrate eq.(9.19) from $y=-W$ to $y=W$. Next, we use the integrating factor $\exp(i\eta^2 x/2k_m)$, where $\eta$ is the spectral parameter, to integrate the transformed equation from $x=x_j$ to $x=x_{j+1}$. Applying $\mathcal{F}^{-1}$ to the result, we get $$\tilde{\psi}_m^{(1)}(x_{j+1}) = \mathcal{F}^{-1}\{\exp(-i\eta^2 \Delta x/2k_m)\mathcal{F}\tilde{\psi}_m^{(1)}(x_j)\} - (i/2)\int_{x_j}^{x_{j+1}} \mathcal{F}^{-1}\{\exp(-i\eta^2(x_{j+1}-x)/2k_m)\mathcal{F}\tilde{q}_m(x)\}dx. \quad (9.21)$$

Now we introduce three numerical approximations in eq.(9.21) that lead to a system of linear equations for the values of $\tilde{\psi}_m$ at discrete mesh points in the $x,y$ plane. First, we use the trapezoidal rule to approximate the integral on the RHS of this equation. Dropping the $O((\Delta x)^3)$ remainder in this approximation, we get $$\tilde{\psi}_m^{(1)}(x_{j+1}) + (i\Delta x/4)\tilde{q}_m(x_{j+1}) = \mathcal{F}^{-1}\{\exp(-i\eta^2 \Delta x/2k_m)\mathcal{F}[\tilde{\psi}_m^{(1)}(x_j) - (i\Delta x/4)\tilde{q}_m(x_j)]\}. \quad (9.22)$$

This equation is inconsistent with eq.(9.19). However, it is consistent with a useful approximation to eq.(9.19), which is to regard $\tilde{\psi}_m^{(1)}$ as a solution of the standard parabolic equation $$2ik_m \frac{\partial \tilde{\psi}_m^{(1)}}{\partial x} + \frac{\partial^2 \tilde{\psi}_m^{(1)}}{\partial y^2} = 0 \quad (9.23)$$

for $|y| \leq W$ over the disjoint open intervals $x_j < x < x_{j+1}$ for $j=0,1,\ldots$ that is subject to the following limit conditions at the range steps $x_j$.

$$\tilde{\psi}_m^{(1)}(x_j \pm 0, y) = \tilde{\psi}_m^{(1)}(x_j, y) \mp (i\Delta x/4)\tilde{q}_m(x_j, y) \text{ for } |y| < W. \quad (9.24)$$

We can use these conditions to write eq.(9.22) as $$\tilde{\psi}_m^{(1)}(x_{j+1} - 0) = \mathcal{F}^{-1}\{\exp(-i\eta^2 \Delta x/2k_m)\mathcal{F}(\tilde{\psi}_m^{(1)}(x_j + 0))\}, \quad (9.25)$$

and we can combine them to get the following identities.

$$\tilde{\psi}_m^{(1)}(x_j, y) = \frac{1}{2}\{\tilde{\psi}_m^{(1)}(x_j + 0, y) + \tilde{\psi}_m^{(1)}(x_j - 0, y)\}, \quad (9.26)$$

$$\tilde{\psi}_m^{(1)}(x_j + 0, y) - \tilde{\psi}_m^{(1)}(x_j - 0, y) = (-i\Delta x/2)\tilde{q}_m(x_j, y). \quad (9.27)$$

Next, we fix a positive integer $N$, let $\Delta y = 2W/N$ and define the points $y_k = k\Delta y - W$ for $k=0,1,\ldots,N$. Our second approximation is to replace the operators $\mathcal{F}$ and $\mathcal{F}^{-1}$ in eq.(9.22) by the operators $\mathcal{F}_N$ and $\mathcal{F}_N^{-1}$. Since these operators transform sequences to sequences, we must replace the functions $\tilde{\psi}_m^{(1)} \pm (i\Delta x/4)\tilde{q}_m$ in this equation with the sequences of their values at the points $y_k$. Let us write these sequences as $\{\tilde{\psi}_m^{(1)}(y_k) \pm (i\Delta x/4)\tilde{q}_m(y_k)\}_{k=0}^N$. Under these approximations, eq.(9.22) becomes $$\{\tilde{\psi}_m^{(1)}(x_{j+1}, y_k) + (i\Delta x/4)\tilde{q}_m(x_{j+1}, y_k)\}_{k=0}^N = \mathcal{F}_N^{-1}\{\exp(-i\eta^2 \Delta x/2k_m)\mathcal{F}_N\{\tilde{\psi}_m^{(1)}(x_j, y_k) - (i\Delta x/4)\tilde{q}_m(x_j, y_k)\}_{k=0}^N\}. \quad (9.28)$$

The spectral parameter $\eta$ in this equation is bounded because $\eta = n\pi/2W$ for $n=0,1,\ldots,N$. Hence, $0 \leq \eta \leq \pi/\Delta y$.

We must approximate the partial derivatives $\partial \tilde{\psi}_n/\partial y$ and $\partial^2(\beta_{mn}\tilde{\psi}_n)/\partial y^2$ that appear in eq.(9.18) for $\tilde{q}_m$ before we can evaluate the sequences in eq.(9.28). Since the variable $y$ in this equation is restricted to the uniformly spaced points $y_k$, our third approximation is to replace the partial derivatives at these points with central differences. At the lowest order of approximation, we use the three-point formulas $$\frac{\partial}{\partial y}\tilde{\psi}_n(y_k) = \frac{1}{2\Delta y}\{\tilde{\psi}_n(y_{k+1}) - \tilde{\psi}_n(y_{k-1})\} + O((\Delta y)^2), \quad (9.29)$$

$$\frac{\partial^2}{\partial y^2}(\beta_{mn}\tilde{\psi}_n)(y_k) = \frac{1}{(\Delta y)^2}\{(\beta_{mn}\tilde{\psi}_n)(y_{k+1}) - 2(\beta_{mn}\tilde{\psi}_n)(y_k) + (\beta_{mn}\tilde{\psi}_n)(y_{k-1})\} + O((\Delta y)^2). \quad (9.30)$$

Now we combine these approximations with eq.(9.18). Rearranging terms in the result, we find that $$\hat{\psi}_m(y_k) \approx [[\xi_m^{(0)}]^2 - \xi_m^2(y_k)]\tilde{\psi}_m(y_k) + \qquad (9.31)$$

$$\sum_{n=1}^{M}\left[\alpha_{mn}(y_k) + \left(ik_m - \frac{i}{k_m(\Delta y)^2}\right)\beta_{mn}(y_k) - \frac{\partial}{\partial x}\beta_{mn}(y_k)\right]$$

$$e^{-i(k_m-k_n)x}\tilde{\varphi}_n(y_k) +$$

$$\sum_{n=1}^{M}\left(\frac{1}{2\Delta y}\gamma_{mn}(y_k) + \frac{i}{2k_m(\Delta y)^2}\beta_{mn}(y_{k+1})\right)e^{-i(k_m-k_n)x}\tilde{\varphi}_n(y_{k+1}) +$$

$$\sum_{n=1}^{M}\left(-\frac{1}{2\Delta y}\gamma_{mn}(y_k) + \frac{i}{2k_m(\Delta y)^2}\beta_{mn}(y_{k-1})\right)e^{-i(k_m-k_n)x}\tilde{\varphi}_n(y_{k-1}) +$$

$$O((\Delta y)^2).$$

Therefore, neglecting terms of $O(\Delta x(\Delta y)^2)$, we find that $$\tilde{\psi}_m^{(1)}(x_{j+1}, y_k) + (i\Delta x/4)\hat{\psi}_m(x_{j+1}, y_k) = \qquad (9.32)$$

$$k_m\tilde{\psi}_m^{(1)}(x_{j+1}, y_k) + (i\Delta x/4)[[\xi_m^{(0)}]^2 - \xi_m^2(x_{j+1}, y_k)]\tilde{\psi}_m(x_{j+1}, y_k) +$$

$$\left(\frac{i}{2} - \frac{k_m\Delta x}{4} + \frac{\Delta x}{4k_m(\Delta y)^2}\right)$$

$$\sum_{n=1}^{M}\beta_{mn}(x_{j+1}, y_k)e^{-i(k_m-k_n)x_{j+1}}\tilde{\varphi}_n(x_{j+1}, y_k) +$$

$$(i\Delta x/4)\sum_{n=1}^{M}\left(\alpha_{mn}(x_{j+1}, y_k) - \frac{\partial}{\partial x}\beta_{mn}(x_{j+1}, y_k)\right)$$

$$e^{-i(k_m-k_n)x_{j+1}}\tilde{\varphi}_n(x_{j+1}, y_k) +$$

$$\sum_{n=1}^{M}\left(\frac{i\Delta x}{8\Delta y}\gamma_{mn}(x_{j+1}, y_k) - \frac{\Delta x}{8k_m(\Delta y)^2}\beta_{mn}(x_{j+1}, y_{k+1})\right)$$

$$e^{-i(k_m-k_n)x_{j+1}}\tilde{\varphi}_n(x_{j+1}, y_{k+1}) +$$

$$\sum_{n=1}^{M}\left(-\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1})\right)$$

$$e^{-i(k_m-k_n)x_{j+1}}\tilde{\varphi}_n(x_{j+1}, y_{k-1}).$$

Next, we use the constraint that $\tilde{\psi}_m = \tilde{\psi}_m^{(1)} + \tilde{\psi}_m^{(2)}$ to replace the term $k_m\tilde{\psi}_m^{(1)}(x_{j+1}, y_k)$ on the RHS of eq.(9.32) with $k_m\tilde{\psi}_m(x_{j+1}, y_k)$ by adding $k_m\tilde{\psi}_m^{(2)}(x_{j+1}, y_k)$ to each side of this equation. Thus, $$\tilde{\psi}_m^{(1)}(x_{j+1}, y_k) + (i\Delta x/4)\hat{\psi}_m(x_{j+1}, y_k) = \Psi_m(x_{j+1}-0, y_k) - k_m\tilde{\psi}_m^{(2)}(x_{j+1}, y_k) \qquad (9.33)$$

where $$\Psi_m(x_{j+1}-0, y_k) = [k_m + (i\Delta x/4)[[\xi_m^{(0)}]^2 - \xi_m^2(x_{j+1}, y_k)]]\tilde{\psi}_m(x_{j+1}, y_k) + \left(\frac{i}{2} - \frac{k_m\Delta x}{4} + \frac{\Delta x}{4k_m(\Delta y)^2}\right) \qquad (9.34)$$

$$\sum_{n=1}^{M}\beta_{mn}(x_{j+1}, y_k)e^{-i(k_m-k_n)x_{j+1}}\tilde{\varphi}_n(x_{j+1}, y_k) +$$

$$(i\Delta x/4)\sum_{n=1}^{M}\left(\alpha_{mn}(x_{j+1}, y_k) - \frac{\partial}{\partial x}\beta_{mn}(x_{j+1}, y_k)\right)$$

$$e^{-i(k_m-k_n)x_{j+1}}\tilde{\varphi}_n(x_{j+1}, y_k) +$$

$$\sum_{n=1}^{M}\left(\frac{i\Delta x}{8\Delta y}\gamma_{mn}(x_{j+1}, y_k) - \frac{\Delta x}{8k_m(\Delta y)^2}\beta_{mn}(x_{j+1}, y_{k+1})\right)$$

$$e^{-i(k_m-k_n)x_{j+1}}\tilde{\varphi}_n(x_{j+1}, y_{k+1}) +$$

$$\sum_{n=1}^{M}\left(-\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1})\right)$$

$$e^{-i(k_m-k_n)x_{j+1}}\tilde{\varphi}_n(x_{j+1}, y_{k-1}).$$

Similarly, and to the same order of approximation, $$\tilde{\psi}_m^{(1)}(x_j, y_k) - (i\Delta x/4)\hat{\psi}_m(x_j, y_k) = \Psi_m(x_j+0, y_k) - k_m\tilde{\psi}_m^{(2)}(x_j, y_k) \qquad (9.35)$$

where $$\Psi_m(x_j+0, y_k) = [k_m - (i\Delta x/4)[[\xi_m^{(0)}]^2 - \xi_m^2(x_j, y_k)]]\tilde{\psi}_m(x_j, y_k) + \qquad (9.36)$$

$$\left(\frac{i}{2} + \frac{k_m\Delta x}{4} - \frac{\Delta x}{4k_m(\Delta y)^2}\right)\sum_{n=1}^{M}\beta_{mn}(x_j, y_k)e^{-i(k_m-k_n)x_j}\tilde{\varphi}_n(x_j, y_k) -$$

$$(i\Delta x/4)$$

$$\sum_{n=1}^{M}\left(\alpha_{mn}(x_j, y_k) - \frac{\partial}{\partial x}\beta_{mn}(x_j, y_k)\right)e^{-i(k_m-k_n)x_j}\tilde{\varphi}_n(x_j, y_k) +$$

$$\sum_{n=1}^{M}\left(-\frac{i\Delta x}{8\Delta y}\gamma_{mn}(x_j, y_k) + \frac{\Delta x}{8k_m(\Delta y)^2}\beta_{mn}(x_j, y_{k+1})\right)$$

$$e^{-i(k_m-k_n)x_j}\tilde{\varphi}_n(x_j, y_{k+1}) +$$

$$\sum_{n=1}^{M}\left(\frac{i\Delta x}{8\Delta y}\gamma_{mn}(x_j, y_k) + \frac{\Delta x}{8k_m(\Delta y)^2}\beta_{mn}(x_j, y_{k-1})\right)$$

$$e^{-i(k_m-k_n)x_j}\tilde{\varphi}_n(x_j, y_{k-1}).$$

We shall assume that $\Delta y < W - W_o$. Under this assumption the coupling coefficients $\alpha_{mn}(x,y_k)$, $\beta_{mn}(x,y_k)$ and $\gamma_{mn}(x,y_k)$ vanish for $x>0$ and $k=1, N-1$. This eliminates the boundary values $\tilde{\psi}_m(x_{j+1}, \pm W)$ from the RHS of eq.(9.34), which makes it possible for us to find the internal values $\tilde{\psi}_m(x_{j+1}, y_k)$ ($k=1, \ldots, N-1$) from this equation. Let us combine eqs.(9.28, 9.33, 9.35) as follows.

$$\{\Psi_m(x_{j+1}-0, y_k) - k_m\tilde{\psi}_m^{(2)}(x_{j+1}, y_k)\}_{m=0}^{N}$$
$$= \mathcal{F}_N^{-1}\{\exp(-i\eta^2\Delta x/2k_m)\mathcal{F}_N\{\Psi_m(x_j+0, y_k) - k_m\tilde{\psi}_m^{(2)}(x_j, y_k)\}_{m=0}^{N}\} \qquad (9.37)$$

If the values $\tilde{\psi}_m^{(2)}(x_{j+1}, y_k)$ ($k=1, \ldots, N-1$) at the range step $x_{j+1}$ are known, then eqs.(9.34, 9.37) determine a system of linear equations for the values $\tilde{\psi}_m(x_{j+1}, y_k)$ ($k=1, \ldots, N-1$) at the range step $x_{j+1}$. Let us put these equations in matrix form. First, define the column vectors $$\tilde{\Psi}_k = [\tilde{\psi}_1(x_{j+1}, y_k), \ldots, \tilde{\psi}_M(x_{j+1}, y_k)]^T \qquad (9.38)$$

$$\Psi_k = [\Psi_1(x_{j+1}-0, y_k), \ldots, \Psi_M(x_{j+1}-0, y_k)]^T, \qquad (9.39)$$

for $k=1, \ldots, N-1$. Next, define the $M \times M$ matrices $A_{kk}$ and $A_{kk\pm1}$ as follows, $$(A_{kk})_{mn} = \begin{cases} k_m + (i\Delta x/4)[[\xi_m^{(0)}]^2 - \xi_m^2(x_{j+1}, y_k)] + \\ \quad \alpha_{mn}(x_{j+1}, y_k)), \quad \text{(if } m=n\text{)} \\ \left[\left(\frac{i}{2} - \frac{k_m\Delta x}{4} + \frac{\Delta x}{4k_m(\Delta y)^2}\right)\beta_{mn}(x_{j+1}, y_k) + \quad \text{(if } m \neq n\text{)} \\ \quad (i\Delta x/4)\left(\alpha_{mn}(x_{j+1}, y_k) - \frac{\partial}{\partial x}\beta_{mn}(x_{j+1}, y_k)\right)\right] \\ \quad e^{-i(k_m-k_n)x_{j+1}} \end{cases} \qquad (9.40)$$

$$(A_{k+1})_{mn} = \qquad (9.41)$$
$$\left\{\pm \frac{i\Delta x}{8\Delta y}\gamma_{mn}(x_{j+1}, y_k) - \frac{\Delta x}{8k_m(\Delta y)^2}\beta_{mn}(x_{j+1}, y_k)\right\}e^{-i(k_m-k_n)x_{j+1}}.$$

The assumption that $\Delta y < W - W_p$ eliminates the boundary values $\Psi_m(x_{j+1}, \pm W)$ from the RHS of eq.(9.34). Thus, it follows from this equation that $$\begin{bmatrix} A_{11} & A_{12} & & & \\ A_{21} & A_{22} & A_{23} & & \\ & \ddots & \ddots & \ddots & \\ & & A_{N-2,N-3} & A_{N-2,N-2} & A_{N-2,N-1} \\ & & & A_{N-1,N-2} & A_{N-1,N-1} \end{bmatrix} \begin{bmatrix} \Phi_1 \\ \Phi_2 \\ \vdots \\ \Phi_{N-2} \\ \Phi_{N-1} \end{bmatrix} = \begin{bmatrix} \Phi'_1 \\ \Phi'_2 \\ \vdots \\ \Phi'_{N-2} \\ \Phi'_{N-1} \end{bmatrix} \quad (9.42)$$

If we use eq.(9.37) and the values $\Psi_m^{(2)}(x_{j+1}, y_k)$ ($k=1, \ldots, N-1$) to evaluate the vectors $\Psi'_k$ on the RHS of this equation, then we can solve it for the internal solution vectors $\Psi_k$.

We can solve eq.(9.42) numerically by Gaussian elimination with partial pivoting (GEPP) followed by one round of iterative refinement. The block tri-diagonal system matrix on the LHS of eq.(9.42) is also a band matrix of order $M(N-1)$ that has $2M-1$ lower diagonals and $2M-1$ upper diagonals. Since $M \ll N$ in practice, it is most efficient to do the GEPP computations with subroutines that take advantage of band storage.

The system matrix on the LHS of eq. (9.42) is nonsingular if it is strictly diagonally dominant by columns. We see from eqs.(9.40,9.41) that this condition requires the following strict inequalities to be satisfied for the block indices $k=1, \ldots, N-1$:

$$\left|k_n + (i\Delta x/4)\{(\xi_n^{(0)})^2 - \xi_n^2(x_{j+1}, y_k) + \alpha_{nn}(x_{j+1}, y_k)\}\right| > \qquad (9.43)$$
$$\sum_{\substack{m=1 \\ (m\neq n)}}^{M} \left|\left(\frac{i}{2} - \frac{\hat{k}_m \Delta x}{4} + \frac{\Delta x}{4k_m(\Delta y)^2}\right)\beta_{mn}(x_{j+1}, y_k)\right| +$$
$$\quad (i\Delta x/4)\left(\alpha_{mn}(x_{j+1}, y_k) - \frac{\partial}{\partial x}\beta_{mn}(x_{j+1}, y_k)\right) +$$
$$\sum_{m=1}^{M} \left|\frac{i\Delta x}{8\Delta y}\gamma_{mn}(x_{j+1}, y_{k-1}) - \frac{\Delta x}{8k_m(\Delta y)^2}\beta_{mn}(x_{j+1}, y_k)\right| +$$
$$\sum_{m=1}^{M} \left|\frac{i\Delta x}{8\Delta y}\gamma_{mn}(x_{j+1}, y_{k+1}) - \frac{\Delta x}{8k_m(\Delta y)^2}\beta_{mn}(x_{j+1}, y_k)\right|$$
$$\text{for } n = 1, \ldots, M.$$

If this condition is satisfied, then Gaussian elimination requires no pivoting and is stable.

Note the factors $\hat{k}_m \Delta x$, $\Delta x/\Delta y$ and $\Delta x/k_m(\Delta y)^2$ that appear in this equation. We recommend choosing the increments $\Delta x$ and $\Delta y$ so that $k_m \Delta x \lesssim \mathcal{O}(1)$ and $k_m \Delta y \gtrsim \mathcal{O}(1)$. These restrictions imply that the ratios $\Delta x/\Delta y$ and $\Delta x/k_m(\Delta y)^2$ are at most $\mathcal{O}(1)$.

If $\Delta y < W - W_p$, then we can find the boundary values $\Psi_m^{(1)}(x_{j+1}, \pm W)$ of the primary component from eq.(9.37) without the values $\Psi_m^{(2)}(x_{j+1}, y_k)$. In this case, it follows from eq.(9.32) that $\Psi_m^{(1)}(x_{j+1}, \pm W) + (i\Delta x/4)\hat{q}_m(x_{j+1}, \pm W) = k_m \Psi_m^{(1)}(x_{j+1}, \pm W)$. Thus, eqs.(9.33,9.37) imply that $$k_m \Phi_m^{(1)}(x_{j+1}, \pm W) = \qquad (9.44)$$
$$\mathcal{F}_N^{-1}\left\{\exp(-\tilde{n}^2 \Delta x/2k_m)\mathcal{F}_N\{\Psi_m(x_j + 0, y)\} - k_m \Phi_m^{(2)}(x_j, y)\right\}_{n=0}^{N}.$$

Note that it is not necessary to compute the whole inverse DFT to evaluate the RHS of this equation because we need only the values from the inverse DFT at the endpoints $y_k = \pm W$.

This completes our development of the discrete form of problem I and the method for solving it. Next, we develop a discrete form of problem II. We begin by integrating eq.(9.13) from $x = x_j$ to $x = x_{j+1}$ with the trapezoidal rule. Dropping the $\mathcal{O}((\Delta x)^3)$ remainder in this approximation, we get the semi-discrete parabolic equation $$\Phi_m^{(2)}(x_{j+1}, y) - \Phi_m^{(2)}(x_j, y) = \qquad (9.45)$$
$$(i\Delta x/4k_m)\left[\frac{\partial^2}{\partial y^2}\Phi_m^{(2)}(x_j, y) + \frac{\partial^2}{\partial y^2}\Phi_m^{(2)}(x_{j+1}, y)\right] \text{ for } |y| \leq W.$$

We adopt conditions (9.14, 9.15) without change. In particular, we require that the inhomogeneous Neumann boundary conditions (9.15) be satisfied at each range step.

$$\frac{\partial}{\partial y}\Phi_m^{(2)}(x_{j+1}, \pm W) = \frac{\partial}{\partial y}\Phi_m(x_{j+1}, \pm W). \qquad (9.46)$$

In order to formulate transparent boundary conditions for the discretized amplitude $\Psi_m$, we assume that it satisfies the semi-discrete parabolic equation that corresponds to eq. (9.6).

$$\Phi_m(x_{j+1}, y) - \Phi_m(x_j, y) = \qquad (9.47)$$
$$(i\Delta x/4k_m)\left[\frac{\partial^2}{\partial y^2}\Phi_m(x_j, y) + \frac{\partial^2}{\partial y^2}\Phi_m(x_{j+1}, y)\right] \text{ for } |y| > W_p.$$

Under this assumption, the discretized amplitude $\Psi_m$ satisfies discrete transparent boundary conditions like eq.(6.31). We can adapt the algorithm described by eqs.(6.26–6.30) to formulate these conditions as follows.

$$\Phi_m(x_{j+1}, \pm W) \pm \frac{1}{\rho_m}\frac{\partial}{\partial y}\Phi_m(x_{j+1}, \pm W) = \qquad (9.48)$$
$$2\rho_m \sum_{k=0}^{j}(-1)^{j-k}a_{k+1,m}^{j-k}(\pm W) \text{ for } j = 0, 1, \ldots,$$

where $$\rho_m = e^{-i\pi/4}(2k_m/\Delta x)^{1/2} \qquad (9.49)$$

and the coefficients $a_{k+1,m}^k(\pm W)$ are computed recursively. First, $a_{1,m}^0(\pm W) = 0$. Second, for $j = 1, 2, \ldots$, $$a_{j,m}^k(\pm W) = -\frac{1}{2}a_{j,m}^{k-1}(\pm W) - \frac{1}{2}a_{j-1,m}^{k-1}(\pm W), \qquad (9.50)$$
$$\text{for } k = 1, \ldots, j-1.$$

-continued $$\alpha_{j,m}^{j}(\pm W) = \pm \frac{1}{2} p_m^{-2} \left[ \frac{\partial}{\partial y} \tilde{\varphi}_m(x_{j-1}, \pm W) \right. \quad (9.51)$$
$$\left. + \frac{\partial}{\partial y} \tilde{\varphi}_m(x_j, \pm W) \right] -$$
$$\alpha_{j,m}^{j-1}(\pm W) - \frac{1}{2} \alpha_{j-1,m}^{j-1}(\pm W),$$

$$\alpha_{j+1,m}^{j}(\pm W) = \mp \frac{1}{2} p_m^{-2} \left[ \frac{\partial}{\partial y} \tilde{\varphi}_m(x_{j-1}, \pm W) + \right. \quad (9.52)$$
$$\left. \frac{\partial}{\partial y} \tilde{\varphi}_m(x_j, \pm W) \right] -$$
$$\frac{1}{2} \alpha_{j-1,m}^{j-1}(\pm W),$$

where $$\alpha_{-1,m}^{j}(\pm W)=0, \alpha_{0,m}^{j}(\pm W)=0 \text{ for } j=0,1,\ldots \quad (9.53)$$

Now we combine the constraints $\tilde{\varphi}_m(x_{j+1}, \pm W) = \tilde{\varphi}_m^{(1)}(x_{j+1}, \pm W) + \tilde{\varphi}_m^{(2)}(x_{j+1}, \pm W)$ and eq.(9.46) with eq. (9.48) to develop new boundary conditions for $\tilde{\varphi}_m^{(2)}$. Note that the boundary values of the primary component $\tilde{\varphi}_m^{(1)}$ appear as source terms in these conditions.

$$\tilde{\varphi}_m^{(2)}(x_{j+1}, \pm W) \pm \frac{1}{p_m} \frac{\partial}{\partial y} \tilde{\varphi}_m^{(2)}(x_{j+1}, \pm W) = \quad (9.54)$$
$$-\tilde{\varphi}_m^{(1)}(x_{j+1}, \pm W) + 2 p_m \sum_{k=0}^{j} (-1)^{j-k} \alpha_{k+1,m}^{j}(\pm W) \text{ for } j = 0, 1, \ldots$$

We also combine condition (9.46) with recursion formulas (9.51,9.52) to reformulate them in terms of $\tilde{\varphi}_m^{(2)}$.

$$\alpha_{j,m}^{j}(\pm W) = \pm \frac{1}{2} p_m^{-2} \left[ \frac{\partial}{\partial y} \tilde{\varphi}_m^{(2)}(x_{j-1}, \pm W) + \right. \quad (9.55)$$
$$\left. \frac{\partial}{\partial y} \tilde{\varphi}_m^{(2)}(x_j, \pm W) \right] -$$
$$\alpha_{j,m}^{j-1}(\pm W) - \frac{1}{2} \alpha_{j-1,m}^{j-1}(\pm W),$$

$$\alpha_{j+1,m}^{j}(\pm W) = \mp \frac{1}{2} p_m^{-2} \left[ \frac{\partial}{\partial y} \tilde{\varphi}_m^{(2)}(x_{j-1}, \pm W) + \right. \quad (9.56)$$
$$\left. \frac{\partial}{\partial y} \tilde{\varphi}_m^{(2)}(x_j, \pm W) \right] -$$
$$\frac{1}{2} \alpha_{j-1,m}^{j-1}(\pm W).$$

Therefore, in principle the discrete form of problem II consists of (1) the semi-discrete parabolic equation (9.45), subject to
(2) the initial condition (9.14), and
(3) the boundary conditions (9.54), with
(4) the recursion formulas (9.50,9.53,9.55,9.56).

However, in practice we would use the fixed-length truncated algorithm described by eqs.(6.72–6.76) to evaluate the boundary conditions for this problem. Let $L_f$ denote the length of the algorithm, which could be chosen according to criterion. (6.82) for calculations in double-precision arithmetic. First, we use eq.(6.78) to modify the boundary conditions (9.54) as follows.

$$\tilde{\varphi}_m^{(2)}(x_{j+1}, \pm W) \pm \frac{1}{p_m} \frac{\partial}{\partial y} \tilde{\varphi}_m^{(2)}(x_{j+1}, \pm W) = \quad (9.57)$$
$$-\tilde{\varphi}_m^{(1)}(x_{j+1}, \pm W) + 2 p_m \sum_{k=0}^{j} (-1)^{j-k} \alpha_{L_f,m}^{k}(\pm W) \text{ for } j = 0, 1, \ldots$$

Second, we use eqs.(6.72–6.76) to replace eqs.(9.50,9.53, 9.55,9.56) with the following recursion equations for the coefficients $\alpha_{L,m}^{k}(\pm W)$.

$$\alpha_{l,m}^{j}(\pm W) = -\frac{1}{2} \alpha_{l+1,m}^{j-1}(\pm W) - \frac{1}{2} \alpha_{l-1,m}^{j-1}(\pm W) \quad (9.58)$$
$$\text{for } l = 1, \ldots, L_f - 2,$$

$$\alpha_{L_f-1,m}^{j}(\pm W) = \pm \frac{1}{2} p_m^{-2} \left[ \frac{\partial}{\partial y} \tilde{\varphi}_m^{(2)}(x_{j-1}, \pm W) + \right. \quad (9.59)$$
$$\left. \frac{\partial}{\partial y} \tilde{\varphi}_m^{(2)}(x_j, \pm W) \right] -$$
$$\alpha_{L_f,m}^{j-1}(\pm W) - \frac{1}{2} \alpha_{L_f-2,m}^{j-1}(\pm W),$$

$$\alpha_{L_f,m}^{j}(\pm W) = \mp \frac{1}{2} p_m^{-2} \left[ \frac{\partial}{\partial y} \tilde{\varphi}_m^{(2)}(x_{j-1}, \pm W) + \right. \quad (9.60)$$
$$\left. \frac{\partial}{\partial y} \tilde{\varphi}_m^{(2)}(x_j, \pm W) \right] -$$
$$\frac{1}{2} \alpha_{L_f-1,m}^{j-1}(\pm W),$$

where $$\alpha_{l,m}^{0}(\pm W)=0 \text{ for } l=1,\ldots,L_f, \alpha_{0,m}^{j}(\pm W)=0 \text{ for } j=0,1,\ldots \quad (9.61)$$

This completes the development of the discrete form of problem II. A sufficient condition for it to be stable is that $$\frac{\Delta x}{k_0 (\Delta y)^2} < \frac{2}{\pi}, \quad (9.62)$$

where $k_0 = \min k_m (m=1, \ldots, M)$. Numerical integration of eq.(9.45) can introduce numerical artifacts in the solutions of the discrete form of problem II. However, these artifacts will be suppressed if the spatial frequency limit of the integration method does not exceed the following bound.

$$\lambda_c = 3^{-1/4} 2 (k_0/\Delta x)^{1/2}. \quad (9.63)$$

This criterion imposes a simple constraint on the N-th order Chebyshev tau integration method. Since the spatial frequency limit of the N-th order Chebyshev tau integration method is $2/\Delta y$, this limit is less than $\lambda_c$ if $$\frac{\Delta x}{k_0 (\Delta y)^2} < 3^{-1/2}. \quad (9.64)$$

This condition is only slightly more restrictive than condition (9.62).

Referring now to FIG. 4, we outline the operation of the preferred embodiment. We begin the process in block 40 by computing the modal wavenumbers and the coupling coefficients at the mesh points $(x_j, y_k)(k=0,1,\ldots,N)$ from environmental data. They can be computed for all $j=0,1,\ldots$ and stored for subsequent use or computed as needed, beginning at $j=0$. In block 42 we select the initial values $\tilde{\Psi}_m(x_0,y_k)$ ($j=0$ and $k=0,1,\ldots,N$) for the source field in the waveguide at the plane $x=x_0$. Now we go to block 44. This block is the start of the general cycle of steps for solving problems I and II simultaneously. We must compute the values $\tilde{\Psi}_m(x_{j+1},y_k)$ and $\tilde{\Psi}_m^{(2)}(x_{j+1},y_k)$ for $m=1,\ldots,M$ and $k=0,1,\ldots,N$ at an arbitrary range step $x_{j+1}$ from the values $\tilde{\Psi}_m(x_j,y_l)$ and $\tilde{\Psi}_m^{(2)}(x_j,y_l)$ for $m=1,\ldots,M$ and $l=0,1,\ldots,N$ at the preceding range step $x_j$.

(1) In block 46, for each $m$ we compute the boundary values $\tilde{\Psi}_m^{(1)}(x_{j+1},\pm W)$ of the primary component from eq. (9.44). These values are used in the next step.

(2) In block 48, for each $m$ we integrate the semi-discrete parabolic equation (9.45) subject to the boundary conditions (9.57), which we evaluate with eqs.(9.58–9.61). We use the Chebyshev tau method to do the integration numerically. This method transforms the integration to an algebraic problem for the Chebyshev coefficients of $\tilde{\Psi}_m^{(2)}(x_{j+1},y)$ that we solve with the BEC algorithm. It is then necessary to compute the values $\tilde{\Psi}_m^{(2)}(x_{j+1},y_k)$ for $k=0,1,\ldots,N$ from these coefficients. Depending on the size of $N$, we use either Clenshaw's algorithm or an alternative algorithm to compute them. We use the internal values $\tilde{\Psi}_m^{(2)}(x_{j+1},y_k)$ ($k=1,\ldots,N-1$) in the next step. We compute the differential boundary values $\partial\tilde{\Psi}_m^{(2)}(x_{j+1},\pm W)/\partial y$ and save them for use by eqs.(9.59,9.60) at the following two range steps, $x_{j+2}$ and $x_{j+3}$. Having found $\tilde{\Psi}_m^{(1)}(x_{j+1},\pm W)$ in the previous step and $\tilde{\Psi}_m^{(2)}(x_{j+1},\pm W)$ in the present step, we compute the boundary values $\tilde{\Psi}_m(x_{j+1},\pm W)$ from the constraints that $\tilde{\Psi}_m(x_{j+1},\pm W)=\tilde{\Psi}_m^{(1)}(x_{j+1},\pm W)+\tilde{\Psi}_m^{(2)}(x_{j+1},\pm W)$.

(3) In block 50, we solve eq.(9.42) numerically by GEPP for the internal values $\tilde{\Psi}_m(x_{j+1},y_k)$ ($k=1,\ldots,N-1$). This completes the general cycle of steps for solving problems I and II.

In block 52 we use the modal amplitudes to evaluate the eigenfunction expansion of the complex pressure at desired depths in the waveguide at range $x_{j+1}$ and cross ranges $y_k$ ($k=0,1,\ldots,N$). We predict the physical acoustic pressure from these computations. Finally, we increase $j$ to $j+1$ in block 54 and return to block 44 for the next cycle of computations. This completes the outline.

The discretized solutions $\tilde{\Psi}_m$ turn out to be inaccurate at very large range from the source due to small inaccuracies in the discretized solutions $\tilde{\Psi}_m^{(2)}$. However, an extrapolation method can be applied to the discretized solutions $\tilde{\Psi}_m^{(2)}$ to compensate for the inaccuracies in them under conditions of practical interest. Before describing this method, let us modify the notation for these solutions to indicate their dependence on the increment $\Delta x$.

$$\tilde{\Psi}_m^{(2)}(x,y) \to \tilde{\Psi}_m^{(2)}(x,y;\Delta x) \qquad (9.65)$$

A simple way to improve the accuracy of these approximations is to reduce the step size $\Delta x$. Since they are even functions of $\Delta x$, it is efficient to combine this approach with Richardson extrapolation.

We shall discuss a procedure that uses Richardson extrapolation to estimate $\tilde{\Psi}_m^{(2)}(x_{j+1},y)$ from the computed values of $\tilde{\Psi}_m^{(2)}(x_{j+1},y;\Delta x/\nu)$ for $\nu=1,2,3,4$ if $\Delta x = O(\pi/k_0)$. First, we introduce some new notation. Define the interpolated range steps $x_\mu^{(\nu)}$ as follows.

$$x_\mu^{(\nu)} = \mu\Delta x/\nu \text{ for } \mu=1,2,\ldots \text{ and } \nu=1,2,\ldots \qquad (9.66)$$

Note that $x_{\nu j}^{(\nu)}=x_j$ for all $j$ and $\nu$.

The procedure requires that the discrete form of problem II be solved four times over each interval $x_j \leq x \leq x_{j+1}$ using fractional steps $\Delta x/\nu$ for $\nu=1,2,3,4$. For each $\nu$ we must replace $\Delta x$ in eqs.(9.45,9.49) with $\Delta x/\nu$ and solve this problem at the interpolated range steps $x_{\nu j+\mu}^{(\nu)}$ for $\mu=1,\ldots,\nu$. If we use the Chebyshev tau method to do the cross range integration in eq.(9.45), then we can do these calculations in terms of the Chebyshev expansion coefficients of the solutions $\tilde{\Psi}_m^{(2)}(x_{\nu j+\mu}^{(\nu)},y;\Delta x/\nu)$ without having to evaluate the solutions at any cross range $y$. These solutions require ten times as much work to compute as $\tilde{\Psi}_m^{(2)}(x_{j+1},y;\Delta x)$ alone, but this computational expense can be justified by the great increase in range over which the extrapolated solutions are accurate.

We denote these estimates by $\mathfrak{R}_{\Delta x}^{(4)} \circ \tilde{\Psi}_m^{(2)}(x_{j+1},y)$. They are computed as follows.

$$\mathfrak{R}_{\Delta x}^{(4)} \circ \tilde{\Psi}_m^{(2)}(x_{j+1},y) = [8192\tilde{\Psi}_m^{(2)}(x_{j+1},y;\Delta x/4) - 6561\tilde{\Psi}_m^{(2)}(x_{j+1},y;\Delta x/3)$$
$$+896\tilde{\Psi}_m^{(2)}(x_{j+1},y;\Delta x/2) - 7\tilde{\Psi}_m^{(2)}(x_{j+1},y;\Delta x)]/2520 \qquad (9.67)$$

In the modified solution method $\tilde{\Psi}_m^{(2)}$ is replaced by $\mathfrak{R}_{\Delta x}^{(4)} \circ \tilde{\Psi}_m^{(2)}$. Thus, we use the modified solution method to find the values $\tilde{\Psi}_m(x_{j+1},y_k)$ and the extrapolates $\mathfrak{R}_{\Delta x}^{(4)} \circ \tilde{\Psi}_m^{(2)}(x_{j+1},y_k)$ for $m=1,\ldots,M$ and $k=0,1,\ldots,N$ from the values $\tilde{\Psi}_m(x_j,y_l)$ and from the extrapolates $\mathfrak{R}_{\Delta x}^{(4)} \circ \tilde{\Psi}_m^{(2)}(x_j,y_l)$ for $m=1,\ldots,M$ and $l=0,1,\ldots,N$. These quantities are related by eq. (9.37) after we have replaced $\tilde{\Psi}_m^{(2)}$ with $\mathfrak{R}_{\Delta x}^{(4)} \circ \tilde{\Psi}_m^{(2)}$ in it.

$$\{\Psi_m(x_{j+1}-0,y_k) - k_m \mathfrak{R}_{\Delta x}^{(4)} \circ \tilde{\Psi}_m^{(2)}(x_{j+1},y_k)\}_{k=0}^N$$
$$= \mathcal{F}_N^{-1}(\exp\{-in^2\Delta x/2k_m\}\mathcal{F}_N\{\Psi_m(x_j+0,y_l) - k_m \mathfrak{R}_{\Delta x}^{(4)} \circ \tilde{\Psi}_m^{(2)}(x_j,y_l)\}_{l=0}^N) \qquad (9.68)$$

We also need the boundary values $\tilde{\Psi}_m^{(1)}(x_{\nu j+\mu}^{(\nu)},\pm W)$ at the interpolated range steps to evaluate the boundary conditions that are satisfied by the solutions $\tilde{\Psi}_m^{(2)}(x_{\nu j+\mu}^{(\nu)},y;\Delta x/\nu)$. We compute them by replacing $\Delta x$ with $\mu\Delta x/\nu$ in eq.(9.44). Thus, for $\mu=1,\ldots,\nu$, $$k_m\tilde{\Psi}_m^{(1)}(x_{\nu j+\mu}^{(\nu)},\pm W) = \mathcal{F}_N^{-1}(\exp\{-in^2\mu\Delta x/\nu 2k_m\}$$
$$\mathcal{F}_N\{\Psi_m(x_j+0,y_l) - $$
$$k_m\mathfrak{R}_{\Delta x}^{(4)} \circ \tilde{\Psi}_m^{(2)}(x_j,y_l)\}_{l=0}^N) \qquad (9.69)$$

Note that it is not necessary to compute the whole inverse DFT to evaluate the RHS of this equation because we need only the values from the inverse DFT at the endpoints $y_k=\pm W$.

In medium range applications, the lower order Richardson extrapolates $$\mathfrak{R}_{\Delta x}^{(2)} \circ \tilde{\Psi}_m^{(2)}(x_{j+1},y) = [4\tilde{\Psi}_m^{(2)}(x_{j+1},y;\Delta x/2) - \tilde{\Psi}_m^{(2)}(x_{j+1},y;\Delta x)]/3, \qquad (9.70)$$

$$\mathfrak{R}_{\Delta x}^{(3)} \circ \tilde{\Psi}_m^{(2)}(x_{j+1},y) = [243\tilde{\Psi}_m^{(2)}(x_{j+1},y;\Delta x/3) - 128\tilde{\Psi}_m^{(2)}(x_{j+1},y;\Delta x/2) + 5\tilde{\Psi}_m^{(2)}(x_{j+1},y;\Delta x)]/120 \qquad (9.71)$$

can be used in place of $\mathfrak{R}_{\Delta x}^{(4)} \circ \tilde{\Psi}_m^{(2)}(x_{j+1},y)$ to reduce the computational cost of the procedure.

10. Ramifications.

Many modifications of the invention are possible in light of the above teachings. For example, it can be adapted to waveguides with multiple internal interfaces. In addition, loss can be incorporated in the model. One way to do this is to modify the modal wavenumbers by a perturbative method that is well-known in the art. Furthermore, a variable step size and variable reference wavenumbers can be used in place of the fixed step size and fixed reference wavenumbers in the preferred embodiment.

Additional variations of the invention also are possible in light of the above teachings. Thus, it can be adapted for predicting propagation of seismic waves in the earth's crust, propagation of radio waves in the earth's atmosphere, and propagation of light waves in dielectric material. Furthermore, computer implementation of the invention is most efficient on parallel computers because many of the operations in the decomposition method can be done in parallel or can be individually vectorized. It is therefore to be understood that the invention may be practiced otherwise than has been specifically described.

What is claimed is:

1. A computer implemented method for predicting propagation of a wave in a medium, said medium bordering a top reflective surface and a bottom reflective surface, said method comprising the steps of:
 (a) selecting a direction in which predictions of said propagation are desired;
 (b) selecting a pair of transparent boundaries that are parallel to said direction;
 (c) selecting a plurality of range steps in said direction;
 (d) calculating a plurality of local modes between said transparent boundaries and at said range steps;
 (e) calculating a plurality of coupling coefficients between said transparent boundaries and at said range steps;
 (f) selecting a plurality of modal amplitudes between said transparent boundaries and at said range steps;
 (g) splitting said modal amplitudes into a plurality of primary components and a plurality of secondary components;
 (h) selecting a plurality of initial values for said modal amplitudes at a first one of said range steps;
 (i) using a decomposition method to predict said modal amplitudes between said transparent boundaries and at said range steps from said initial values, said decomposition method including
  (1) using a coupled-parabolic-equation method with said coupling coefficients to predict boundary values of said primary components at an arbitrary range step from said modal amplitudes and said secondary components at a preceding range step,
  (2) using a parabolic-equation method to predict said secondary components at said arbitrary range step from said boundary values and from said secondary components at said preceding range step,
  (3) using said coupled-parabolic-equation method with said coupling coefficients to predict said modal amplitudes at said arbitrary range step from said secondary components at said arbitrary range step and from said modal amplitudes and said secondary components at said preceding range step.
 j) determining mathematically said propagation of said wave from said local modes and from said modal amplitudes.

2. A method according to claim 1 in which said wave is a sound wave and in which said medium is an ocean.

3. A method according to claim 1 in which said wave is a seismic wave and in which said medium is the earth's crust.

4. A method according to claim 1 in which said wave is a radio wave and in which said medium is the earth's atmosphere.

5. A method according to claim 1 in which said wave is a light wave and in which said medium is a dielectric material.

* * * * *

UNITED STATES PATENT AND TRADEMARK OFFICE
CERTIFICATE OF CORRECTION

| | |
|---|---|
| PATENT NO. | : 6,876,598 B1 |
| APPLICATION NO. | : 10/860905 |
| DATED | : April 5, 2005 |
| INVENTOR(S) | : Ronald Francis Pannatoni |

It is certified that error appears in the above-identified patent and that said Letters Patent is hereby corrected as shown below:

Delete the title page and substitute therefore the attached title page.

Delete Drawing Sheets 1-4 and substitute therefore the attached Drawing Sheets 1-4.

Delete Columns 1-54 and substitute therefore the attached Columns 1-54.

This Certificate of Correction supersedes all previously issued Certificates.

Signed and Sealed this

Second Day of February, 2010

David J. Kappos
*Director of the United States Patent and Trademark Office*

(12) United States Patent
Pannatoni

(10) Patent No.: US 6,876,598 B1
(45) Date of Patent: Apr. 5, 2005

(54) METHOD FOR PREDICTING PROPAGATION OF SOUND IN AN OCEAN

(76) Inventor: Ronald Francis Pannatoni, 540 Mark Dowdle Rd., Franklin, NC (US) 28734

(*) Notice: Subject to any disclaimer, the term of this patent is extended or adjusted under 35 U.S.C. 154(b) by 38 days.

(21) Appl. No.: 10/860,905

(22) Filed: Jun. 4, 2004

Related U.S. Application Data

(60) Provisional application No. 60/478,573, filed on Jun. 12, 2003.

(51) Int. Cl.[7] .............................. H04B 11/00; G01V 1/28
(52) U.S. Cl. ............................ 367/13; 367/131; 702/14; 703/5
(58) Field of Search ...................... 367/13, 131; 702/127, 702/181, 14; 455/423; 703/5

(56) References Cited

U.S. PATENT DOCUMENTS 5,126,978 A * 6/1992 Chaum .................. 367/135
5,642,445 A * 6/1997 Bucaro et al. .............. 367/13
6,640,089 B1 * 10/2003 Kanaan et al. ............ 702/127

OTHER PUBLICATIONS

Ahmad T. Abawi, William A. Kuperman, Michael D. Collins "The Coupled Mode Parabolic Equation", Journal of the Acoustical Society of America, Jul. 1997, pp. 233–238, vol. 102, No. 1, Acoustical Society of America, USA.*

Michael D. Collins, "The Adiabatic Mode Parabolic Equation", Journal of the Acoustical Society of America, Oct. 1993, pp. 2269–2278, vol. 94, No. 4, Acoustical Society of America, USA.

* cited by examiner

Primary Examiner—Ian J. Lobo

(57) ABSTRACT

Propagation of sound in an ocean is accurately predicted at all ranges from a source by a computational method that uses a newly created Decomposition Method to make the predictions at long range from the source. The predictions are done in a limited region of the ocean without the need to predict propagation of sound outside the region. The vertical boundaries of the region are parallel to a given direction of propagation of sound from the source. These boundaries are transparent, and sound penetrates them without reflection. The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region. The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sum. The actual sound field in the region is found from this sum. A modification of the Decomposition Method incorporates an extrapolation procedure to ensure accuracy of the predictions at long range from the source.

5 Claims, 4 Drawing Sheets

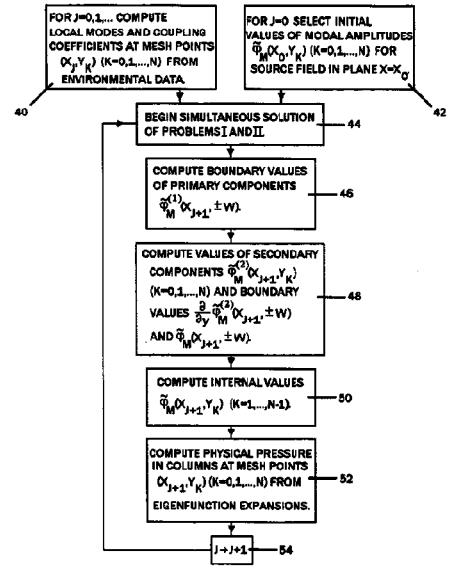

METHOD FOR PREDICTING PROPAGATION OF SOUND IN AN OCEAN

CROSS-REFERENCE TO RELATED APPLICATIONS

This application claims the benefit of PPA Ser. No. 60/478,573, filed Jun. 12, 2003 by the present inventor.

FEDERALLY SPONSORED RESEARCH

Not applicable

SEQUENCE LISTING OR PROGRAM

Not applicable

BACKGROUND OF THE INVENTION

1. Field of the Invention

The invention pertains to a method for predicting propagation of sound in an ocean.

2. Description of the Related Art

For the purpose of predicting propagation of sound in an ocean, the ocean can be modelled as a three-dimensional acoustic waveguide that is spatially irregular. A partial differential wave equation governs propagation of sound in the waveguide. A complex-valued distribution of pressure represents the sound field in this equation. However, the sound field also can be represented in terms of the local modes of the waveguide. This representation is useful because it reduces the dimensionality of the model. The equations that govern this representation are obtained by taking moments of the wave equation with respect to the local modes. These moments produce a system of coupled mode equations in two horizontal dimensions. The solution of these coupled mode equations can be used to reconstruct the sound field at any depth in the waveguide from the local mode representation.

In FIG. 1 there is shown a circular region 10 in the horizontal plane with a source of sound at the center 12. An article by A. T. Abawi, W. A. Kuperman and M. D. Collins ("The coupled mode parabolic equation", Journal of the Acoustical Society of America, Vol. 102, No. 1, pp. 233–238, July 1997) discusses a numerical method for solving coupled mode equations to predict propagation of sound over region 10. This method is an elaboration of an earlier numerical method that was developed by M. D. Collins ignoring coupling among the modes. Propagation of sound is predicted over all of region 10. The preferred direction of propagation is the radially outward direction from the center 12.

An article by M. D. Collins ("The adiabatic mode parabolic equation", Journal of the Acoustical Society of America, Vol. 94, No. 4, pp. 2269–2278, October 1993) points out that it would be very efficient to make predictions just over an angular sector 14 of small angular width. The article notes that transparent boundary conditions would have to be imposed along the radial edges of sector 14 for this purpose, but it does not indicate how to formulate these conditions or how to adopt them in a solution method. The article by A. T. Abawi, W. A. Kuperman and M. D. Collins does not address these issues at all.

SUMMARY OF THE INVENTION

The invention permits propagation of sound in an ocean to be accurately predicted at all ranges from a source. At long ranges this prediction is done by a newly created Decomposition Method. The predictions are done for fully three-dimensional ocean environments.

The invention permits the predictions to be done in a limited region of the ocean without the need to predict propagation of sound outside the region. The vertical boundaries of the region are parallel to a given direction of propagation of sound from the source. These boundaries are transparent, and sound penetrates them without reflection.

The Decomposition Method is based on a special splitting of the sound field into primary and secondary components. The primary components are related to the sound field that would exist in the region if the vertical boundaries of the region were acoustically hard. They are found by integrating a system of coupled parabolic equations that are derived from the coupled mode equations for the sound field in the region. The primary components contain spurious reverberations that originate at the vertical boundaries of the region.

The secondary components identify and cancel the spurious reverberations in the primary components. The secondary components are found by integrating standard parabolic equations subject to transparent boundary conditions at the vertical boundaries of the region. These boundary conditions also include source terms that are obtained from the primary components. When the primary and secondary components are summed, the spurious reverberations are cancelled in the sum. The actual sound field in the region is found from this sum.

A modification of the Decomposition Method incorporates an extrapolation procedure to ensure that the predictions are accurate at long range from the source.

It is an object of the invention to provide an accurate method for predicting propagation of sound in an ocean.

Another object of the invention is to provide an accurate method for predicting propagation of sound from a source in a limited region of an ocean without the need to predict propagation of sound outside the region.

Yet another object of the invention is to provide an accurate method for predicting propagation of sound from a source in a limited region of an ocean without the need to predict propagation of sound outside the region when the length of the region is much greater than the width of the region.

Other objects, advantages and new features of the invention will be apparent from the following detailed description of the invention when considered in conjuction with the accompanying drawings.

DRAWINGS

FIG. 1 shows a circular region where prior art methods predict propagation of sound.

FIG. 2 shows a section of a waveguide that models the ocean environment.

FIG. 3 shows initial and boundary conditions in the horizontal plane of range and cross-range.

FIG. 4 shows a flowchart for the preferred embodiment of the method of the invention.

DETAILED DESCRIPTION OF THE PREFERRED EMBODIMENT

1. Coupled mode equations in slab geometry and in spherical geometry.

The propagation of sound in an irregular three-dimensional waveguide can be described mathematically by a partial differential equation subject to certain conditions at the boundaries of the waveguide. (By "irregular" we mean that the medium in the waveguide is spatially inhomogeneous. We also assume that this medium can be modelled as a lossless fluid.) Let the variables x,y and z denote range, cross-range and depth in the waveguide, respectively. Let the variables $\omega$, c and $\rho$ denote source frequency, local sound speed and local fluid density in the waveguide, respectively. We let the variable p denote the complex acoustic pressure. This quantity is defined by the property that the physical acoustic pressure is the real part of the product p exp($-i\omega t$), where t denotes time. The partial differential equation in three dimensions that governs p is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \frac{\partial}{\partial z}\left(\frac{1}{\rho}\frac{\partial p}{\partial z}\right) + \frac{1}{\rho}\frac{\omega^2}{c^2}p = 0. \quad (1.1)$$

Referring now to FIG. 2, we assume that the pressure vanishes at a reflective top surface 20 of the waveguide, where z=0, and at a reflective bottom surface 22 of the waveguide, where z=$-$L:

$$p=0 \text{ at } z=0 \text{ and at } z=-L. \quad (1.2)$$

We also assume that there is a single interface 24 between the surface and the bottom where the local sound speed and the local fluid density can be discontinuous. The depth of this interface can vary with range and with cross-range. We describe the interface by the equation $$S(x,y,z) = H(x,y) + z = 0, \quad (1.3)$$

where $0 < H(x,y) < L$. The acoustic pressure must be continuous across this interface. The component of acoustic fluid velocity that is normal to the interface must also be continuous across the interface. We can express these continuity conditions as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \frac{\partial p}{\partial z}\right) \quad (1.4)$$

are continuous across $z = -H(x,y)$.

It is possible to convert the acoustic equation (1.1) and the conditions (1.2) and (1.4) on it to an equivalent infinite system of coupled partial differential equations in two dimensions. This system is based on the local modes of the waveguide, which are characterized by the eigenfunctions $f_n(x,y,z)$ and by the squared wavenumbers $\xi_n^2(x,y)$ that satisfy the differential equation $$\frac{\partial}{\partial z}\left(\frac{1}{\rho}\frac{\partial f_n}{\partial z}\right) + \frac{1}{\rho}\left(\frac{\omega^2}{c^2} - \xi_n^2\right)f_n = 0 \quad (1.5)$$

if $-L < z < 0$ and $z \neq -H(x,y)$, subject to the conditions that $$f_n = 0 \text{ at } z = -L \text{ and at } z = 0, \quad (1.6)$$

$$f_n \text{ and } \frac{1}{\rho}\frac{\partial f_n}{\partial z} \text{ are continuous across } z = -H(x,y). \quad (1.7)$$

At each position (x,y) these equations describe a nonsingular selfadjoint characteristic value problem. The squared wavenumbers $\xi_n^2(x,y)$ are real and countably infinite in number. They can be indexed to decrease monotonically to $-\infty$ as the index n increases through the positive integers. The local modes can be computed with numerical methods that are well-known in the art.

At each position (x,y), $\partial f_n(x,y,0)/\partial z = 0$ if and only if $f_n(x,y,z)$ vanishes identically for $-L \leq z \leq 0$. Therefore, we can assume that $\partial f_n(x,y,0)/\partial z \neq 0$ and that $f_n(x,y,z)$ does not vanish identically. Furthermore, we can assume that $f_n(x,y,z)$ is real-valued. Since the density $\rho$ is positive, the eigenfunctions are orthogonal in the following sense:

$$\int_{-L}^{0}\frac{1}{\rho}f_m f_n\, dz = \begin{cases} d_n(x,y) > 0 & \text{if } m = n, \\ 0 & \text{if } m \neq n. \end{cases} \quad (1.8)$$

We also assume that the eigenfunctions are normalized so that the signs of the partial derivatives $\partial f_n(x,y,0)/\partial z$ and the values of the integrals $d_n(x,y)$ are independent of the position (x,y).

The functions p, $\partial p/\partial x$ and $\partial p/\partial y$ have the following eigenfunction expansions:

$$p = \sum_{n=1}^{\infty} a_n\, f_n / d_n \text{ where } a_n = \int_{-L}^{0}\frac{1}{\rho}p\, f_n\, dz, \quad (1.9)$$

$$\frac{\partial p}{\partial x} = \sum_{n=1}^{\infty} b_n\, f_n / d_n \text{ where } b_n = \int_{-L}^{0}\frac{1}{\rho}\frac{\partial p}{\partial x}f_n\, dz, \quad (1.10)$$

$$\frac{\partial p}{\partial y} = \sum_{n=1}^{\infty} c_n\, f_n / d_n \text{ where } c_n = \int_{-L}^{0}\frac{1}{\rho}\frac{\partial p}{\partial y}f_n\, dz. \quad (1.11)$$

The coefficients $a_n$, $b_n$ and $c_n$ in these expansions are functions of the position (x,y). They are governed by the following system of coupled partial differential equations.

$$\frac{\partial b_n}{\partial x} + \frac{\partial c_n}{\partial y} + \xi_n^2 a_n = \sum_{m=1}^{\infty}(b_m B_{mn} + c_m C_{mn})\frac{1}{d_m}, \quad (1.12)$$

$$b_n = \frac{\partial a_n}{\partial x} + \sum_{m=1}^{\infty} a_m B_{nm}\frac{1}{d_m}, \quad (1.13)$$

$$c_n = \frac{\partial a_n}{\partial y} + \sum_{m=1}^{\infty} a_m C_{nm}\frac{1}{d_m}. \quad (1.14)$$

These equations constitute the fundamental first-order formulation of coupled mode theory for an irregular three-dimensional waveguide.

The coupling coefficients $B_{mn}$ and $C_{mn}$ can be computed as follows. Let $$g_n = \frac{1}{\rho}\frac{\partial f_n}{\partial z} \quad (1.15)$$

and define the following matrix elements:

$$D_{mn} = \int_{-L}^{0}\left[\frac{\partial}{\partial x}\left(\frac{1}{\rho}\frac{\omega^2}{c^2}\right)f_m f_n + \frac{\partial \rho}{\partial x}g_m g_n\right]dz, \quad (1.16)$$

$$E_{mn} = \int_{-L}^{0}\frac{\partial}{\partial x}\left(\frac{1}{\rho}\right)f_m f_n\, dz, \quad (1.17)$$

$$F_{mn} = \int_{-L}^{0}\left[\frac{\partial}{\partial y}\left(\frac{1}{\rho}\frac{\omega^2}{c^2}\right)f_m f_n + \frac{\partial \rho}{\partial y}g_m g_n\right]dz, \quad (1.18)$$

$$G_{mn} = \int_{-L}^{0}\frac{\partial}{\partial y}\left(\frac{1}{\rho}\right)f_m f_n\, dz, \quad (1.19)$$

-continued $$J_{mn} = \left[\frac{1}{\rho}\frac{\omega^2}{c^2}\right]_{H_0}^{-H+0} f_m(-H)f_n(-H) + \quad (1.20)$$

$$[\rho]_{-H-0}^{-H+0} g_m(-H)g_n(-H),$$

$$K_{mn} = \left[\frac{1}{\rho}\right]_{-H-0}^{-H+0} f_m(-H)f_n(-H). \quad (1.21)$$

If $m \neq n$ then $$B_{mn} = -(\xi_m^2 - \xi_n^2)^{-1}\left[D_{mn} - E_{mn}\xi_n^2 + \frac{\partial H}{\partial x}(J_{mn} - K_{mn}\xi_n^2)\right], \quad (1.22)$$

$$C_{mn} = -(\xi_m^2 - \xi_n^2)^{-1}\left[F_{mn} - G_{mn}\xi_n^2 + \frac{\partial H}{\partial y}(J_{mn} - K_{mn}\xi_n^2)\right], \quad (1.23)$$

and $$B_{nn} = -\frac{1}{2}\left(E_{nn} + \frac{\partial H}{\partial x}K_{nn}\right), \quad (1.24)$$

$$C_{nn} = -\frac{1}{2}\left(G_{nn} + \frac{\partial H}{\partial y}K_{nn}\right). \quad (1.25)$$

In practice, it is necessary to work with a finite number of coupled mode equations. For this reason, we truncate the coupled mode equations (1.12–1.14) as follows. Fixing a positive integer M, we assume that the expansion coefficients $a_n$, $b_n$ and $c_n$ vanish if $n > M$. Thus, if $n = 1, \ldots, M$ then $$\frac{\partial b_n}{\partial x} + \frac{\partial c_n}{\partial y} + \xi_n^2 a_n = \sum_{m=1}^{M}(b_m B_{mn} + c_m C_{mn})\frac{1}{d_m}, \quad (1.26)$$

$$b_n = \frac{\partial a_n}{\partial x} + \sum_{m=1}^{M} a_m B_{nm}\frac{1}{d_m}, \quad (1.27)$$

$$c_n = \frac{\partial a_n}{\partial y} + \sum_{m=1}^{M} a_m C_{nm}\frac{1}{d_m}. \quad (1.28)$$

We can reduce this system of equations to an equivalent system of second-order partial differential equations for just the coefficients $a_n$. If $n = 1, \ldots, M$ then $$\frac{\partial^2 a_n}{\partial x^2} + \frac{\partial^2 a_n}{\partial y^2} + \xi_n^2 a_n = \sum_{m=1}^{M}\left(\alpha_{nm}a_m + \beta_{nm}\frac{\partial a_m}{\partial x} + \gamma_{nm}\frac{\partial a_m}{\partial y}\right)\frac{1}{d_m}, \quad (1.29)$$

where $$\alpha_{nm} = \sum_{l=1}^{M}(B_{lm}B_{ln} + C_{lm}C_{ln})\frac{1}{d_l} - \frac{\partial B_{nm}}{\partial x} - \frac{\partial C_{nm}}{\partial y}, \quad (1.30)$$

$$\beta_{nm} = B_{mn} - B_{nm}, \quad \gamma_{nm} = C_{mn} - C_{nm}. \quad (1.31)$$

The waveguide considered in the preceding discussion is a slab between two parallel planes. Now let us consider a waveguide that is a shell between two concentric spheres. Let the radius of the outer sphere be $R_0$, and let the radius of the inner sphere be $R_0 - L$. We pick a spherical coordinate system for this problem anticipating that our analysis of sound propagating in the shell will be restricted to a neighborhood of a great circle E on the outer sphere. We identify E as the equator of this sphere. Let M denote another great circle on the outer sphere that intersects E at right angles and near the source of sound in the waveguide. We identify M as the prime meridian of the outer sphere.

Let P denote a point in the shell. We let r be the radial distance of P from the common center of the spheres. We let $\psi$ be the angle of latitude of P relative to the equator E. We let $\phi$ be the angle of longitude of P relative to the prime meridian M. For definiteness let $\phi = 0$ where E intersects M near the source.

It is convenient to introduce a new system of coordinates (x,y,z).

$$x = R_0\phi, \quad y = R_0\ln(\sec\psi + \tan\psi), \quad z = r - R_0. \quad (1.32)$$

Note that $y \approx R_0\psi$ if $|\psi| \ll 1$. In the new coordinate system the partial differential equation that governs the acoustic pressure p in the waveguide is $$\frac{\partial}{\partial x}\left(\frac{1}{\rho}\frac{\partial p}{\partial x}\right) + \frac{\partial}{\partial y}\left(\frac{1}{\rho}\frac{\partial p}{\partial y}\right) + \quad (1.33)$$

$$\cos^2\psi\frac{\partial}{\partial z}\left(\frac{1}{\rho}\frac{r^2}{R_0^2}\frac{\partial p}{\partial z}\right) + \cos^2\psi\frac{1}{\rho}\frac{\omega^2}{c^2}\frac{r^2}{R_0^2}p = 0.$$

We assume that the pressure vanishes on the outer sphere, where $z = 0$, and on the inner sphere, where $z = -L$:

$$p = 0 \text{ at } z = 0 \text{ and at } z = -L. \quad (1.34)$$

We also assume that there is a single interface between these spheres where the local sound speed and the local fluid density in the shell can be discontinuous. The radial coordinate of this interface can vary with latitude and with longitude. We describe the interface in the new coordinate system by the equation $$S(x,y,z) = H(x,y) + z = 0, \quad (1.35)$$

where $0 < H(x,y) < L$. We can express the continuity conditions at the interface as follows.

$$p \text{ and } \frac{1}{\rho}\left(\frac{\partial H}{\partial x}\frac{\partial p}{\partial x} + \frac{\partial H}{\partial y}\frac{\partial p}{\partial y} + \cos^2\psi\frac{r^2}{R_0^2}\frac{\partial p}{\partial z}\right) \quad (1.36)$$

are continuous across $z = -H(x, y)$.

The local modes of the spherical shell waveguide are characterized by the eigenfunctions $f_n(x,y,z)$ and by the squared wavenumbers $\xi_n^2(x,y)$ that satisfy the differential equation $$\frac{\partial}{\partial z}\left(\frac{1}{\rho}\frac{r^2}{R_0^2}\frac{\partial f_n}{\partial z}\right) + \frac{1}{\rho}\left(\frac{\omega^2}{c^2}\frac{r^2}{R_0^2} - \xi_n^2\right)f_n = 0 \quad (1.37)$$

if $-L < z < 0$ and $z \neq -H(x, y)$, subject to the conditions that $$f_n = 0 \text{ at } z = -L \text{ and at } z = 0, \quad (1.38)$$

$$f_n \text{ and } \frac{1}{\rho}\frac{\partial f_n}{\partial z} \text{ are continuous across } z = -H(x, y). \quad (1.39)$$

At each position (x,y) these equations describe a nonsingular selfadjoint characteristic value problem. The squared wavenumbers $\xi_n^2(x,y)$ are real and countably infinite in number. We can assume that they are indexed to decrease monotonically to $-\infty$ as the index n increases through the positive integers. We can also assume that $\partial f_n(x,y,0)/\partial z \neq 0$ and that $f_n(x,y,z)$ does not vanish identically. Furthermore, we can assume that $f_n(x,y,z)$ is real-valued. Since the density $\rho$ is positive, the eigenfunctions are orthogonal in the following sense:

$$\int_{-L}^{0} \frac{1}{\rho} f_m f_n \, dz = \begin{cases} d_n(x,y) > 0 & \text{if } m = n, \\ 0 & \text{if } m \neq n. \end{cases} \quad (1.40)$$

We assume that the eigenfunctions are normalized so that the signs of the partial derivatives $\partial f_n(x,y,0)/\partial z$ and the values of the integrals $d_n(x,y)$ are independent of the position $(x,y)$.

The functions $p$, $\partial p/\partial x$ and $\partial p/\partial y$ have the following eigenfunction expansions:

$$p = \sum_{n=1}^{\infty} a_n f_n / d_n \text{ where } a_n = \int_{-L}^{0} \frac{1}{\rho} p f_n \, dz, \quad (1.41)$$

$$\frac{\partial p}{\partial x} = \sum_{n=1}^{\infty} b_n f_n / d_n \text{ where } b_n = \int_{-L}^{0} \frac{1}{\rho} \frac{\partial p}{\partial x} f_n \, dz, \quad (1.42)$$

$$\frac{\partial p}{\partial y} = \sum_{n=1}^{\infty} c_n f_n / d_n \text{ where } c_n = \int_{-L}^{0} \frac{1}{\rho} \frac{\partial p}{\partial y} f_n \, dz. \quad (1.43)$$

The coefficients $a_n$, $b_n$ and $c_n$ in these expansions are functions of the position $(x,y)$. They are governed by the following system of partial differential equations.

$$\frac{\partial b_n}{\partial x} + \frac{\partial c_n}{\partial y} + \xi_n^2 \cos^2 \psi \, a_n = \sum_{m=1}^{\infty} (b_m B_{mn} + c_m C_{mn}) \frac{1}{d_m}, \quad (1.44)$$

$$b_n = \frac{\partial a_n}{\partial x} + \sum_{m=1}^{\infty} a_m B_{nm} \frac{1}{d_m}, \quad (1.45)$$

$$c_n = \frac{\partial a_n}{\partial y} + \sum_{m=1}^{\infty} a_m C_{nm} \frac{1}{d_m}. \quad (1.46)$$

These equations constitute the fundamental first-order formulation of coupled mode theory for an irregular three-dimensional waveguide in spherical geometry.

The coupling coefficients $B_{mn}$ and $C_{mn}$ can be computed as follows. Let $$g_n = \frac{1}{\rho} \frac{\partial f_n}{\partial z} \quad (1.47)$$

and define the following matrix elements:

$$D_{mn} = \int_{-L}^{0} \left[ \frac{\partial}{\partial x} \left( \frac{1}{\rho} \frac{\omega^2}{c^2} \right) f_m f_n + \frac{\partial \rho}{\partial x} g_m g_n \right] \frac{r^2}{R_0^2} \, dz, \quad (1.48)$$

$$E_{mn} = \int_{-L}^{0} \frac{\partial}{\partial x} \left( \frac{1}{\rho} \right) f_m f_n \, dz, \quad (1.49)$$

$$F_{mn} = \int_{-L}^{0} \left[ \frac{\partial}{\partial y} \left( \frac{1}{\rho} \frac{\omega^2}{c^2} \right) f_m f_n + \frac{\partial \rho}{\partial y} g_m g_n \right] \frac{r^2}{R_0^2} \, dz, \quad (1.50)$$

$$G_{mn} = \int_{-L}^{0} \frac{\partial}{\partial y} \left( \frac{1}{\rho} \right) f_m f_n \, dz, \quad (1.51)$$

-continued $$J_{mn} = \left\{ \left[ \frac{1}{\rho} \frac{\omega^2}{c^2} \right]_{-H-0}^{-H+0} f_m(-H) f_n(-H) + \right. \quad (1.52)$$
$$\left. [\rho]_{-H-0}^{-H+0} g_m(-H) g_n(-H) \right\} (1 - H/R_0)^2,$$

$$K_{mn} = \left[ \frac{1}{\rho} \right]_{-H-0}^{-H+0} f_m(-H) f_n(-H). \quad (1.53)$$

These definitions differ in form from the corresponding definitions for the slab waveguide only by the radial factors in the formulas for the matrix elements $D_{mn}$, $F_{mn}$ and $J_{mn}$.

If $m \neq n$ then $$B_{mn} = -(\xi_m^2 - \xi_n^2)^{-1} \left[ D_{mn} - E_{mn} \xi_n^2 + \frac{\partial H}{\partial x} (J_{mn} - K_{mn} \xi_n^2) \right], \quad (1.54)$$

$$C_{mn} = -(\xi_m^2 - \xi_n^2)^{-1} \left[ F_{mn} - G_{mn} \xi_n^2 + \frac{\partial H}{\partial y} (J_{mn} - K_{mn} \xi_n^2) \right], \quad (1.55)$$

and $$B_{nn} = -\frac{1}{2} \left( E_{nn} + \frac{\partial H}{\partial x} K_{nn} \right), \quad (1.56)$$

$$C_{nn} = -\frac{1}{2} \left( G_{nn} + \frac{\partial H}{\partial y} K_{nn} \right). \quad (1.57)$$

These equations are formally identical to the corresponding equations for the slab waveguide.

Let us truncate eqs.(1.44–1.46) by fixing a positive integer M and assuming that the expansion coefficients $a_n$, $b_n$ and $c_n$ vanish if $n > M$. Thus, if $n = 1, \ldots, M$ then $$\frac{\partial b_n}{\partial x} + \frac{\partial c_n}{\partial y} + \xi_n^2 \cos^2 \psi \, a_n = \sum_{m=1}^{M} (b_m B_{mn} + c_m C_{mn}) \frac{1}{d_m}, \quad (1.58)$$

$$b_n = \frac{\partial a_n}{\partial x} + \sum_{m=1}^{M} a_m B_{nm} \frac{1}{d_m}, \quad (1.59)$$

$$c_n = \frac{\partial a_n}{\partial y} + \sum_{m=1}^{M} a_m C_{nm} \frac{1}{d_m}. \quad (1.60)$$

We can reduce this system of equations to an equivalent system of second-order partial differential equations for just the coefficients $a_n$. If $n = 1, \ldots, M$ then $$\frac{\partial^2 a_n}{\partial x^2} + \frac{\partial^2 a_n}{\partial y^2} + \xi_n^2 \cos^2 \psi a_n = \quad (1.61)$$

$$\sum_{m=1}^{M} \left( \alpha_{nm} a_m + \beta_{nm} \frac{\partial a_m}{\partial x} + \gamma_{nm} \frac{\partial a_m}{\partial y} \right) \frac{1}{d_m},$$

where $$\alpha_{nm} = \sum_{l=1}^{M} (B_{lm} B_{ln} + C_{lm} C_{ln}) \frac{1}{d_l} - \frac{\partial B_{nm}}{\partial x} - \frac{\partial C_{nm}}{\partial y}, \quad (1.62)$$

$$\beta_{nm} = B_{mn} - B_{nm}, \quad \gamma_{nm} = C_{mn} - C_{nm}. \quad (1.63)$$

2. Paraxial approximations for coupled mode equations.

Since the coupled mode equations (1.29, 1.61) are elliptic partial differential equations, they can model propagation in all directions at the same time. In many problems of practical interest, however, it is sufficient to consider a single direction of propagation at a time. In slab geometry we can take this direction to be the direction of increasing range, and in spherical geometry we can take it to be the direction of increasing longitude along the equator. In each case, we can formulate parabolic equations from the coupled mode equations to model propagation of sound in the given direction. We shall describe how to formulate these parabolic equations from the coupled mode equations in slab geometry. The approach is identical for the coupled mode equations in spherical geometry.

We let the normalization integral $d_m=1$ for every index m. Hence, the coupled mode equations take the form $$\frac{\partial^2 a_m}{\partial x^2} + \frac{\partial^2 a_m}{\partial y^2} + \xi_m^2 a_m = \sum_{n=1}^{M}\left(\alpha_{mn}a_n + \beta_{mn}\frac{\partial a_n}{\partial x} + \gamma_{mn}\frac{\partial a_n}{\partial y}\right) \quad (2.1)$$

$(m = 1, \ldots, M)$.

We introduce a positive reference wavenumber $k_m(x)$ for each index m at every range x. We define the corresponding reference phase $\vartheta_m(x)$ by $$\vartheta_m(x) = \int_0^x k_m(u)du. \quad (2.2)$$

We define the complex amplitude $\varphi_m(x,y)$ of the expansion coefficient $a_m(x,y)$ as follows.

$$\varphi_m(x,y)=a_m(x,y)\exp\{-i\vartheta_m(x)\}. \quad (2.3)$$

Noting that $d\vartheta_m(x)/dx=k_m(x)$ and letting $\dot{k}_m(x)=dk_m(x)/dx$, we see that $$\frac{\partial a_m}{\partial x} = \left(\frac{\partial \varphi_m}{\partial x} + ik_m\varphi_m\right)e^{i\vartheta_m}, \quad (2.4)$$

$$\frac{\partial^2 a_m}{\partial x^2} = \left(\frac{\partial^2 \varphi_m}{\partial x^2} + 2ik_m\frac{\partial \varphi_m}{\partial x} + i\dot{k}_m\varphi_m - k_m^2\varphi_m\right)e^{i\vartheta_m}. \quad (2.5)$$

Now we assume that the following paraxial approximations are valid:

$$\left|\frac{\partial^2 \varphi_m}{\partial x^2}\right| \ll 2k_m\left|\frac{\partial \varphi_m}{\partial x}\right| \quad (m=1,\ldots,M). \quad (2.6)$$

These assumptions allow us to approximate eq.(2.5) by deleting the first term on its right-hand side (RHS).

$$\frac{\partial^2 a_m}{\partial x^2} = \left(2ik_m\frac{\partial \varphi_m}{\partial x} + i\dot{k}_m\varphi_m - k_m^2\varphi_m\right)e^{i\vartheta_m}. \quad (2.7)$$

Combining eqs.(2.3,2.4,2.7) with eq.(2.1), we get the following coupled parabolic equations.

$$2ik_m\frac{\partial \varphi_m}{\partial x} + i\dot{k}_m\varphi_m + \frac{\partial^2 \varphi_m}{\partial y^2} = (k_m^2 - \xi_m^2)\varphi_m + \quad (2.8)$$
$$\sum_{n=1}^{M}\left[(\alpha_{mn} + i\beta_{mn}k_n)\varphi_n + \beta_{mn}\frac{\partial \varphi_n}{\partial x} + \gamma_{mn}\frac{\partial \varphi_n}{\partial y}\right]e^{-i(\vartheta_m-\vartheta_n)}$$

for m=1, ..., M.

Note the appearance of the partial derivatives $\partial\varphi_n/\partial x$ on the RHS of eq.(2.8). Let us rewrite the coupled parabolic equations as follows.

$$2i\left[k_m\frac{\partial \varphi_m}{\partial x} + \frac{i}{2}\sum_{n=1}^{M}\beta_{mn}e^{-i(\vartheta_m-\vartheta_n)}\frac{\partial \varphi_n}{\partial x}\right] = -i\dot{k}_m\varphi_m - \frac{\partial^2 \varphi_m}{\partial y^2} + \quad (2.9)$$
$$(k_m^2 - \xi_m^2)\varphi_m + \sum_{n=1}^{M}\left[(\alpha_{mn} + i\beta_{mn}k_n)\varphi_n + \gamma_{mn}\frac{\partial \varphi_n}{\partial y}\right]e^{-i(\vartheta_m-\vartheta_n)}$$

for m=1, ..., M. This system of equations can be solved uniquely for the partial derivatives $\partial\varphi_n/\partial x$ if and only if the matrix $$\mathbf{M} = \begin{bmatrix} k_1 & (i/2)\beta_{12}e^{-i(\vartheta_1-\vartheta_2)} & \ldots & (i/2)\beta_{1M}e^{-i(\vartheta_1-\vartheta_M)} \\ (i/2)\beta_{21}e^{-i(\vartheta_2-\vartheta_1)} & k_2 & \ldots & (i/2)\beta_{2M}e^{-i(\vartheta_2-\vartheta_M)} \\ \ldots & \ldots & \ldots & \ldots \\ (i/2)\beta_{M1}e^{-i(\vartheta_M-\vartheta_1)} & (i/2)\beta_{M2}e^{-i(\vartheta_M-\vartheta_2)} & \ldots & k_M \end{bmatrix} \quad (2.10)$$

is nonsingular. (Note that $\beta_{mm}=0$ for every m.)

We call M the reference matrix. Since the coupling coefficients $\beta_{mn}$ are real-valued and skew-symmetric (that is, $\beta_{nm}=-\beta_{mn}$ for every m and n), this matrix is Hermitian. Note that M is a function of position (x,y). We shall assume that M is positive definite at every position (x,y). A sufficient condition for M to be positive definite is that this matrix be strictly diagonally dominant.

$$k_n > (1/2)\sum_{m \neq n}|\beta_{mn}| \quad \text{for } n=1,\ldots,M. \quad (2.11)$$

There is a useful alternative formulation of the coupled parabolic equations. First, define $$\psi_m = k_m\varphi_m + (i/2)\sum_{n=1}^{M}\beta_{mn}\varphi_n e^{-i(\vartheta_m-\vartheta_n)}, \quad (2.12)$$

$$q_m = (k_m^2 - \xi_m^2)\varphi_m + \quad (2.13)$$
$$\sum_{n=1}^{M}\left[\left(\alpha_{mn} + \frac{\dot{k}_m}{2k_m}\beta_{mn} + i\dot{k}_m\beta_{mn} - \frac{\partial \beta_{mn}}{\partial x}\right)\varphi_n + \gamma_{mn}\frac{\partial \varphi_n}{\partial y} + \frac{i}{2k_m}\frac{\partial^2}{\partial y^2}(\beta_{mn}\varphi_n)\right]e^{-i(\vartheta_m-\vartheta_n)}.$$

Now the following equation is equivalent to eq.(2.8).

$$2ik_m \frac{\partial \psi_m}{\partial x} - ik_m \psi_m + \frac{\partial^2 \psi_m}{\partial y^2} = k_m q_m. \quad (2.14)$$

Although eqs.(2.8,2.14) are similar, they differ in one important way: no partial derivative with respect to x of any dependent variable appears on the RHS of eq.(2.14).

Note that we can solve the system of equations (2.12) (m=1, ..., M) for the complex amplitudes $\varphi_m$ because the reference matrix M is nonsingular. Define the complex column vectors $$\varphi = [\varphi_1, \varphi_2, \ldots, \varphi_M]^T, \quad (2.15)$$

$$\psi = [\psi_1, \psi_2, \ldots, \psi_M]^T, \quad (2.16)$$

where the superscript T indicates transpose. Then, $\psi = \mathbf{M}\varphi$, so $\varphi = \mathbf{M}^{-1}\psi$.

Solutions of the coupled parabolic equations (2.8) obey a conservation law involving two quantities that are closely related to power flow in the waveguide. These quantities are $$J_P = \sum_{m=1}^{M} k_m |\varphi_m|^2 + (i/2) \sum_{m,n=1}^{M} \beta_{mn} \bar{\varphi}_m \varphi_n e^{-i(\vartheta_m - \vartheta_n)}, \quad (2.17)$$

$$K_P = \frac{i}{2}\left[ \sum_{m=1}^{M} \left( \varphi_m \frac{\partial \bar{\varphi}_m}{\partial y} - \frac{\partial \varphi_m}{\partial y} \bar{\varphi}_m \right) + \sum_{m,n=1}^{M} \gamma_{mn} \bar{\varphi}_m \varphi_n e^{-i(\vartheta_m - \vartheta_n)} \right], \quad (2.18)$$

where $\bar{\varphi}$ is the complex conjugate of $\varphi$. The conservation law states that $$\frac{\partial J_P}{\partial x} + \frac{\partial K_P}{\partial y} = 0. \quad (2.19)$$

Note that $J_P = \varphi^H \mathbf{M} \varphi$, where $\varphi^H = [\bar{\varphi}_1, \bar{\varphi}_2, \ldots, \bar{\varphi}_M]$ is the Hermitian transpose of $\varphi$. If $\varphi \neq 0$, then $J_P > 0$ because M is positive definite.

Now let us discuss power flow in the waveguide and show how the quantities $J_P$ and $K_P$ are related to it. First, consider a vertical strip of infinitesimal width $\Delta y$ that extends from the bottom of the waveguide at z=−L to the surface of the waveguide at z=0 and that is perpendicular to the x direction. The time-averaged power through the strip is $(2\omega)^{-1} J \Delta y$, where $$J = \frac{1}{2i} \int_{-L}^{0} \frac{1}{\rho}\left( \bar{p}\frac{\partial p}{\partial x} - p\frac{\partial \bar{p}}{\partial x} \right) dz. \quad (2.20)$$

Second, consider a vertical strip of infinitesimal width $\Delta x$ that extends from the bottom of the waveguide to the surface of the waveguide and that is perpendicular to the y direction. The time-averaged power through this strip is $(2\omega)^{-1} K \Delta x$, where $$K = \frac{1}{2i} \int_{-L}^{0} \frac{1}{\rho}\left( \bar{p}\frac{\partial p}{\partial y} - p\frac{\partial \bar{p}}{\partial y} \right) dz. \quad (2.21)$$

Finally, consider a vertical cylinder that extends from the bottom of the waveguide to the surface of the waveguide and that has a simply-connected cross-section A. Using Green's theorem, we find that the time-averaged power out of this cylinder is $$\frac{1}{2\omega}\oint_{\partial A}(Jdy - Kdx) = \frac{1}{2\omega}\int\int_A \left( \frac{\partial J}{\partial x} + \frac{\partial K}{\partial y} \right) dx \cdot dy, \quad (2.22)$$

where the boundary curve $\partial A$ has the usual counter-clockwise orientation. Note that the partial derivatives $\partial J/\partial x$ and $\partial K/\partial y$ have the physical dimensions of power flux, that is, power/area×time. For this reason, we call J and K power flux integrals.

Suppose that we evaluate these power flux integrals for a solution of the acoustic equation (1.1) that satisfies eq.(1.2) at the boundaries and eq.(1.4) at the interface. We can use these equations and the divergence theorem to show that the integral on the left-hand side (LHS) of eq.(2.22) vanishes. Clearly, the integral on the RHS of this equation vanishes as well. Since the cross-section A is arbitrary, it follows that the integrand of this integral must vanish. Thus, $$\frac{\partial J}{\partial x} + \frac{\partial K}{\partial y} = 0 \quad (2.23)$$

for exact solutions of eqs.(1.1,1.2,1.4).

If, however, we evaluate the power flux integrals J and K for an approximate solution of these equations that is constructed from complex amplitude solutions $\phi_m$ of the coupled parabolic equations (2.8), then we find that $$J = \frac{1}{2i}\sum_{m=1}^{M}\left( \bar{\varphi}_m \frac{\partial \varphi_m}{\partial x} - \varphi_m \frac{\partial \bar{\varphi}_m}{\partial x} \right) + J_P, \quad (2.24)$$

$$K = K_P. \quad (2.25)$$

In this case, eq.(2.19) implies that eq.(2.23) is not valid. Instead, we find that $$\frac{\partial J}{\partial x} + \frac{\partial K}{\partial y} = \frac{1}{2i}\sum_{m=1}^{M}\left( \bar{\varphi}_m \frac{\partial^2 \varphi_m}{\partial x^2} - \varphi_m \frac{\partial^2 \bar{\varphi}_m}{\partial x^2} \right). \quad (2.26)$$

This equation agrees with eq.(2.23) only to the extent that the paraxial approximations (2.6) are satisfied.

3. Adaptive selection of reference wavenumbers to conserve power.

There may be a cross-range W such that we can neglect the acoustic pressure in sections of the waveguide where $|y| > W$. For example, this can happen if the source produces a beam. In this case, we can assume that a pair of hard vertical walls in the planes through $y = \pm W$ transversely bound the waveguide. This assumption makes the waveguide a duct, and it imposes the following Neumann boundary conditions on the complex amplitudes $\varphi_m$.

$$\frac{\partial}{\partial y}\varphi_m(x,\pm W)=0 \quad \text{for } m=1,\ldots,M. \tag{3.1}$$

In this case we also can assume that the coupling coefficients $\gamma_{mn}$ vanish at the walls.

$$\gamma_{mn}(x,\pm W)=0 \text{ for } m,n=1,\ldots,M. \tag{3.2}$$

Under these assumptions, eqs.(2.18,2.25) imply that the power flux integrals $K=K_p$ vanish at the walls.

$$K(x,\pm W)=K_p(x,\pm W)=0. \tag{3.3}$$

Thus, if we integrate the conservation law (2.19) from $y=-W$ to $y=W$, then we find that $$\frac{\partial}{\partial x}\int_{-W}^{W} J_P dy = 0. \tag{3.4}$$

This equation implies that the integral $$\int_{-W}^{W} J_P dy$$

is independent of the range.

If eq.(2.23) were valid, then the longitudinal power $$(2\omega)^{-1}\int_{-W}^{W} J dy$$

through the duct would be independent of the range as well. Although eq.(2.23) is not valid for the coupled parabolic equations, we can adaptively select the reference wavenumbers to make the longitudinal power through the duct be independent of the range. If we integrate eq. (2.24) from $y=-W$ to $y=W$, then we get $$\int_{-W}^{W} J dy = \sum_{m=1}^{M}\frac{1}{2i}\int_{-W}^{W}\left(\overline{\varphi}_m\frac{\partial \varphi_m}{\partial x}-\varphi_m\frac{\partial \overline{\varphi}_m}{\partial x}\right)dy + \int_{-W}^{W} J_P dy. \tag{3.5}$$

Since the integral $$\int_{-W}^{W} J_P dy$$

is independent of the range, this equation implies that the longitudinal power through the duct also will be independent of the range if the sum on the RHS is constant. The best way to accomplish this is to require that each summand vanish, which yields the integral constraints $$\int_{-W}^{W}\left(\overline{\varphi}_m\frac{\partial \varphi_m}{\partial x}-\varphi_m\frac{\partial \overline{\varphi}_m}{\partial x}\right)dy = 0 \quad \text{for } m=1,\ldots,M. \tag{3.6}$$

These constraints are equivalent to a system of coupled quadratic equations in the reference wavenumbers $k_m$. Let $\mathbf{k}=[k_1,k_2,\ldots,k_M]^T$. For $m=1,\ldots,M$ define the following functions $g_m(\mathbf{k})$.

$$g_m(k) = k_m^2\int_{-W}^{W}|\varphi_m|^2 dy + \sum_{n=1}^{M} k_n \mathrm{Re}\int_{-W}^{W}\overline{\varphi}_m i\beta_{mn}\varphi_n e^{-i(\vartheta_m-\vartheta_n)}dy + \tag{3.7}$$

$$\int_{-W}^{W}\left(\left|\frac{\partial \varphi_m}{\partial y}\right|^2 - \xi_m^2|\varphi_m|^2\right)dy +$$

$$\sum_{n=1}^{M}\mathrm{Re}\int_{-W}^{W}\overline{\varphi}_m\left(\alpha_{mn}\varphi_n+\beta_{mn}\frac{\partial \varphi_n}{\partial x}+\gamma_{mn}\frac{\partial \varphi_n}{\partial y}\right)e^{i(\vartheta_m-\vartheta_n)}dy.$$

Then the constraints (3.6) are satisfied if and only if $$g_m(\mathbf{k})=0 \text{ for } m=1,\ldots,M. \tag{3.8}$$

It is convenient to write this equation in vector form. Let $\mathbf{g}(\mathbf{k})=[g_1(\mathbf{k}),\ldots,g_M(\mathbf{k})]^T$. Then eq.(3.8) is equivalent to the equation $\mathbf{g}(\mathbf{k})=0$. In practice we can use Newton's method to solve this equation iteratively. The Jacobian matrix $\partial \mathbf{g}/\partial \mathbf{k}$ that is associated with $\mathbf{g}(\mathbf{k})$ has the elements $$\frac{\partial g_m}{\partial k_n} = \begin{cases} 2k_m\int_{-W}^{W}|\varphi_m|^2 dy & \text{if } m=n, \text{ (since } \beta_{mm}=0) \\ \mathrm{Re}\int_{-W}^{W}\overline{\varphi}_m i\beta_{mn}\varphi_n e^{-i(\vartheta_m-\vartheta_n)}dy & \text{if } m\neq n. \end{cases} \tag{3.9}$$

Given an estimate $\mathbf{k}_0$ of the solution vector $\mathbf{k}$, we can compute a correction $\Delta\mathbf{k}$ to it as the solution of the linear equation $$\left.\frac{\partial g}{\partial k}\right|_{k_0}\cdot \Delta k = -g(k_0). \tag{3.10}$$

Then we replace $\mathbf{k}_0$ with $\mathbf{k}_0+\Delta\mathbf{k}$. This completes one iteration of Newton's method. The Jacobian matrix $\partial \mathbf{g}/\partial \mathbf{k}$ is real symmetric. If no amplitude $\varphi_m$ vanishes identically and if the reference matrix $\mathbf{M}$ is positive definite at every position, then the Jacobian matrix $\partial \mathbf{g}/\partial \mathbf{k}$ also is positive definite.

The solutions of eq.(3.8) are optimal, but they are expensive to compute. There are suboptimal ways to estimate these reference wavenumbers cheaply that can be useful. For example, if we neglect the coupling coefficients in eq.(3.7), then we get the following approximate solution of eq.(3.8).

$$k_m^2 = \int_{-W}^{W}\left(\xi_m^2|\varphi_m|^2 - \left|\frac{\partial \varphi_m}{\partial y}\right|^2\right)dy \Big/ \int_{-W}^{W}|\varphi_m|^2 dy \tag{3.11}$$

for $m=1,\ldots,M$.

4. Exact integrals of the coupled parabolic equations.

We can use Fourier cosine expansions to integrate the alternative coupled parabolic equations (2.14) subject to Neumann boundary conditions at the boundaries $y=\pm W$, $$\frac{\partial}{\partial y}\psi_m(x,\pm W)=0 \quad \text{for } m=1,\ldots,M. \tag{4.1}$$

It is convenient to introduce the following operator notation. Let $g(y)$ be a continuously differentiable function over the interval $-W\leq y\leq W$ such that $dg(\pm W)/dy=0$. The Fourier cosine coefficients $\hat{g}_n$ of $g$ are defined by the integrals $$\hat{g}_n = \hat{\epsilon}_n \int_0^{2W} g(s-W)\cos\{(n\pi/2W)s\}ds/W \qquad (4.2)$$

for $n = 0, 1, 2, \ldots$, where $\hat{\epsilon}_0 = \frac{1}{2}$ and $\hat{\epsilon}_n = 1$ for $n=1,2,\ldots$. Then the Fourier cosine expansion $$g(s-W) = \sum_{n=0}^{\infty} \hat{g}_n \cos\{(n\pi/2W)s\} \quad (0 \le s \le 2W) \qquad (4.3)$$

is uniformly convergent. Let $\hat{g}$ denote the sequence $\{\hat{g}_0, \hat{g}_1, \ldots, \hat{g}_n, \ldots\}$. The function g and the sequence $\hat{g}$ uniquely determine each other. We define the operators $\mathcal{F}$ and $\mathcal{F}^{-1}$ by the relations $$\mathcal{F}g = \hat{g}, \quad \mathcal{F}^{-1}\hat{g} = g. \qquad (4.4)$$

Next, we introduce the spectral parameter $\eta$. This parameter takes on the discrete values $$\eta = n\pi/2W \text{ for } n=0,1,2,\ldots \qquad (4.5)$$

Given a function $h(\eta)$ and a sequence $\mathcal{F}g$, we define the new sequence $h(\eta)\mathcal{F}g$ as follows.

$$h(\eta)\mathcal{F}g = \{h(0)\hat{g}_0, h(\pi/2W)\hat{g}_1, \ldots, h(n\pi/2W)\hat{g}_n, \ldots\}. \qquad (4.6)$$

The integral form of eq.(2.14) is $$\psi_m(x_{j+1}) = \qquad (4.7)$$

$$\left(\frac{k_m(x_{j+1})}{k_m(x_j)}\right)^{1/2} \mathcal{F}^{-1}\left(\exp\left\{-(i\eta^2/2)\int_{x_j}^{x_{j+1}} \frac{du}{k_m(u)}\right\}\mathcal{F}\psi_m(x_j)\right) -$$

$$(i/2)\int_{x_j}^{x_{j+1}}\left(\frac{k_m(x_{j-1})}{k_m(x)}\right)^{1/2} \mathcal{F}^{-1}$$

$$\left(\exp\left\{-(i\eta^2/2)\int_x^{x_{j+1}} \frac{du}{k_m(u)}\right\}\mathcal{F}q_m(x)\right)dx.$$

This equation, which holds for $m=1, \ldots, M$, is the basis of our method for integrating the coupled parabolic equations numerically.

5. Discrete approximation of the exact integrals.

We shall introduce three numerical approximations in eq.(4.7) that lead to a system of linear equations for the values of the complex amplitudes $\varphi_m$ at discrete mesh points in the x,y plane. First, we use the trapezoidal rule to approximate the integral from $x=x_j$ to $x=x_{j+1}$ on the RHS of this equation. Letting $\Delta x = x_{j+1} - x_j$ and neglecting terms of $\mathcal{O}((\Delta x)^3)$, we get $$\psi_m(x_{j+1}) + (i\Delta x/4)q_m(x_{j+1}) = \left(\frac{k_m(x_{j+1})}{k_m(x_j)}\right)^{1/2} \times \mathcal{F}^{-1} \qquad (5.1)$$

$$\left(\exp\left\{-(i\eta^2/2)\int_{x_j}^{x_{j+1}} \frac{du}{k_m(u)}\right\}\mathcal{F}[\psi_m(x_j) - (i\Delta x/4)q_m(x_j)]\right).$$

We also can use the trapezoidal rule to approximate the argument of the exponential function in eq.(5.1). Neglecting terms of $\mathcal{O}(\Delta x)^3$, we get $$\int_{x_j}^{x_{j+1}} \frac{du}{k_m(u)} = (k_m^{-1}(x_j) + k_m^{-1}(x_{j+1}))\Delta x/2. \qquad (5.2)$$

We can approximate the phases $\vartheta_m(x_{j+1})$ the same way. Neglecting terms of $\mathcal{O}(\Delta x)^3$, we get $$\vartheta_m(x_{j+1}) = \vartheta_m(x_j) + \int_{x_j}^{x_{j+1}} k_m(u)du \qquad (5.3)$$

$$= \vartheta_m(x_j) + (k_m(x_j) + k_m(x_{j+1}))\Delta x/2.$$

The second numerical approximation that we introduce is to discretize the operators $\mathcal{F}$ and $\mathcal{F}^{-1}$ using discrete cosine transforms. Fix a positive integer N, and let $g=\{g_0, g_1, \ldots, g_N\}$ be a sequence of N+1 complex numbers. Define the discrete Fourier cosine coefficients $\tilde{g}_n$ as follows.

$$\tilde{g}_n = \tilde{\epsilon}_n(2/N)\sum_{k=0}^{N} \tilde{\epsilon}_k g_k \cos(\pi kn/N) \text{ for } n = 0, 1, \ldots, N, \qquad (5.4)$$

where $\tilde{\epsilon}_0 = \tilde{\epsilon}_N = \frac{1}{2}$ and $\tilde{\epsilon}_n = 1$ for $n=1, \ldots, N-1$. Now $$g_k = \sum_{n=0}^{N} \tilde{g}_n \cos(\pi kn/N) \text{ for } k = 0, 1, \ldots, N \qquad (5.5)$$

if and only if the coefficients $\tilde{g}_n$ are given by eq.(5.4). Let $\tilde{g} = \{\tilde{g}_0, \tilde{g}_1, \ldots, \tilde{g}_N\}$ denote the sequence of these coefficients. We define the operators $\mathcal{F}_N$ and $\mathcal{F}_N^{-1}$ by the relations $$\mathcal{F}_N g = \tilde{g}, \quad \mathcal{F}_N^{-1}\tilde{g} = g \qquad (5.6)$$

We replace the operators $\mathcal{F}$ and $\mathcal{F}^{-1}$ in eq.(5.1) by the operators $\mathcal{F}_N$ and $\mathcal{F}_N^{-1}$. Since these operators transform sequences to sequences, however, we must also replace the functions $\psi_m \pm (i\Delta x/4)q_m$ in this equation with the sequences of their values at the points $y_k$, which we write as $\{\psi_m(y_k) \pm (i\Delta x/4)q_m(y_k)\}_{k=0}^N$. Under these approximations, eq.(5.1) becomes $$\{\psi_m(x_{j+1}, y_k) + (i\Delta x/4)q_m(x_{j+1}, y_k)\}_{k=0}^N = \qquad (5.7)$$

$$\left(\frac{k_m(x_{j+1})}{k_m(x_j)}\right)^{1/2} \times \mathcal{F}_N^{-1}\left(\exp\left\{-(i\eta^2/2)\int_{x_j}^{x_{j+1}} \frac{du}{k_m(u)}\right\}\right.$$

$$\left.\mathcal{F}_N\{\psi_m(x_j, y_l) - (i\Delta x/4)q_m(x_j, y_l)\}_{l=0}^N\right).$$

Note that the spectral parameter $\eta$ in this equation is bounded because $\eta = n\pi/2W$ for $n=0,1,\ldots,N$. Hence, $0 \le \eta \le \pi/\Delta y$.

We must approximate the partial derivatives $\partial\varphi_n/\partial y$ and $\partial^2(\beta_{mn}\varphi_n)/\partial y^2$ that appear in eq.(2.13) for $q_m$ before we can evaluate the sequences in eq.(5.7). Since the variable y in this equation is restricted to the uniformly spaced points $y_k$, our third approximation is to replace the partial derivatives at these points with central differences. At the lowest order of approximation, we use the three-point formulas $$\frac{\partial}{\partial y}\varphi_n(y_k) = \frac{1}{2\Delta y}[\varphi_n(y_{k+1}) - \varphi_n(y_{k-1})] + \mathcal{O}((\Delta y)^2), \quad (5.8)$$

$$\frac{\partial^2}{\partial y^2}(\beta_{mn}\varphi_n)(y_k) = \quad (5.9)$$
$$\frac{1}{(\Delta y)^2}[(\beta_{mn}\varphi_n)(y_{k+1}) - 2(\beta_{mn}\varphi_n)(y_k) + (\beta_{mn}\varphi_n)(y_{k-1})] + \mathcal{O}((\Delta y)^2).$$

Now we combine eqs.(5.8,5.9) with eq.(2.13). Rearranging terms in the result, we find that $$q_m(y_k) = (k_m^2 - \xi_m^2(y_k))\varphi_m(y_k) + \quad (5.10)$$
$$\sum_{n=1}^{M}\left[\alpha_{mn}(y_k) + \left(\frac{k_m}{2k_m} + ik_m - \frac{i}{k_m(\Delta y)^2}\right)\beta_{mn}(y_k) - \frac{\partial}{\partial x}\beta_{mn}(y_k)\right]e^{-i(\vartheta_m-\vartheta_n)}\varphi_n(y_k) + \sum_{n=1}^{M}\left(\frac{1}{2\Delta y}\gamma_{mn}(y_k) + \frac{i}{2k_m(\Delta y)^2}\beta_{mn}(y_{k+1})\right)e^{-i(\vartheta_m-\vartheta_n)}\varphi_n(y_{k+1}) +$$
$$\sum_{n=1}^{M}\left(-\frac{1}{2\Delta y}\gamma_{mn}(y_k) + \frac{i}{2k_m(\Delta y)^2}\beta_{mn}(y_{k-1})\right)e^{-i(\vartheta_m-\vartheta_n)}\varphi_n(y_{k-1}) + O((\Delta y)^2).$$

Therefore, neglecting terms of $\mathcal{O}(\Delta x(\Delta y)^2)$, we find that $$\psi_m(x_{j+1},y_k) + (i\Delta x/4)q_m(x_{j+1},y_k) = \quad (5.11)$$
$$[k_m + (i\Delta x/4)(k_m^2 - \xi_m^2(x_{j+1},y_k))]\varphi_m(x_{j+1},y_k) +$$
$$\left(\frac{i}{2} + \frac{ik_m\Delta x}{8k_m} - \frac{k_m\Delta x}{4} + \frac{\Delta x}{4k_m(\Delta y)^2}\right)$$
$$\sum_{n=1}^{M}\beta_{mn}(x_{j+1},y_k)e^{-i(\vartheta_m-\vartheta_n)}\varphi_n(x_{j+1},y_k) + (i\Delta x/4)$$
$$\sum_{n=1}^{M}\left(\alpha_{mn}(x_{j+1},y_k) - \frac{\partial}{\partial x}\beta_{mn}(x_{j+1},y_k)\right)e^{-i(\vartheta_m-\vartheta_n)}\varphi_n(x_{j+1},y_k) +$$
$$\sum_{n=1}^{M}\left(\frac{i\Delta x}{8\Delta y}\gamma_{mn}(x_{j+1},y_k) - \frac{\Delta x}{8k_m(\Delta y)^2}\beta_{mn}(x_{j+1},y_{k+1})\right)e^{-i(\vartheta_m-\vartheta_n)}\varphi_n(x_{j+1},y_{k+1}) +$$
$$\sum_{n=1}^{M}\left(-\frac{i\Delta x}{8\Delta y}\gamma_{mn}(x_{j+1},y_k) - \frac{\Delta x}{8k_m(\Delta y)^2}\beta_{mn}(x_{j+1},y_{k-1})\right)e^{-i(\vartheta_m-\vartheta_n)}\varphi_n(x_{j+1},y_{k-1}),$$

where $k_n=k_n(x_{j+1})$ and $\vartheta_n=\vartheta_n(x_{j+1})$ for $n=1,\ldots,M$.

Similarly, neglecting terms of $\mathcal{O}(\Delta x(\Delta y)^2)$, we find that $$\psi_m(x_j,y_l) - \quad (5.12)$$
$$(i\Delta x/4)q_m(x_j,y_l) = [k_m - (i\Delta x/4)(k_m^2 - \xi_m^2(x_j,y_l))]\varphi_m(x_j,y_l) +$$
$$\left(\frac{i}{2} - \frac{ik_m\Delta x}{8k_m} + \frac{k_m\Delta x}{4} - \frac{\Delta x}{4k_m(\Delta y)^2}\right)$$

-continued
$$\sum_{n=1}^{M}\beta_{mn}(x_j,y_l)e^{-i(\vartheta_m-\vartheta_n)}\varphi_n(x_j,y_l) -$$
$$(i\Delta x/4)\sum_{n=1}^{M}\left(\alpha_{mn}(x_j,y_l) - \frac{\partial}{\partial x}\beta_{mn}(x_j,y_l)\right)e^{-i(\vartheta_m-\vartheta_n)}\varphi_n(x_j,y_l) +$$
$$\sum_{n=1}^{M}\left(-\frac{i\Delta x}{8\Delta y}\gamma_{mn}(x_j,y_l) + \frac{\Delta x}{8k_m(\Delta y)^2}\beta_{mn}(x_j,y_{l+1})\right)$$
$$e^{-i(\vartheta_m-\vartheta_n)}\varphi_n(x_j,y_{l+1}) +$$
$$\sum_{n=1}^{M}\left(\frac{i\Delta x}{8\Delta y}\gamma_{mn}(x_j,y_l) + \frac{\Delta x}{8k_m(\Delta y)^2}\beta_{mn}(x_j,y_{l-1})\right)$$
$$e^{-i(\vartheta_m-\vartheta_n)}\varphi_n(x_j,y_{l-1}),$$

where $k_n=k_n(x_j)$ and $\vartheta_n=\vartheta_n(x_j)$ for $n=1,\ldots,M$.

We need additional information to interpret these equations at the boundaries $y=\pm W$. Let us require that eq.(4.1) be consistent with eq (3.1). It follows that for $k=0, N$ and for all $x_j$, $$\varphi_n(x_j,y_{k-1}) = \varphi_n(x_j,y_{k+1}) \text{ for } n=1,\ldots,M, \quad (5.13)$$

$$\beta_{mn}(x_j,y_{k-1}) = \beta_{mn}(x_j,y_{k+1}) \text{ for } m,n=1,\ldots,M. \quad (5.14)$$

Equations (5.7,5.11), subject to eqs (5.13,5.14), determine a system of linear equations for the values $\varphi_m(x_{j+1},y_k)$ at a range step $x_{j+1}$, which in turn depend linearly on the values $\varphi_m(x_j,y_l)$ at the previous range step $x_j$ through eq.(5.12). In order to solve these equations numerically, it is helpful to put them in matrix form. First, we write eq.(5.7) as follows.

$$\{\Psi_m(x_{j+1}-0,y_k)\}_{k=0}^{N} = \left(\frac{k_m(x_{j+1})}{k_m(x_j)}\right)^{1/2} \times \mathcal{F}_N^{-1} \quad (5.15)$$
$$\left(\exp\left\{-(i\eta^2/2)\int_{x_j}^{x_{j+1}}\frac{du}{k_m(u)}\right\}\mathcal{F}_N\{\Psi_m(x_j+0,y_l)\}_{l=0}^{N}\right),$$

where $$\Psi_m(x_{j+1}-0,y_k) = \psi_m(x_{j+1},y_k) + (i\Delta x/4)q_m(x_{j+1},y_k), \quad (5.16)$$

$$\Psi_m(x_j+0,y_l) = \psi_m(x_j,y_l) - (i\Delta x/4)q_m(x_j,y_l). \quad (5.17)$$

Second, for $k=0,1,\ldots,N$ we define the column vectors $$\varphi_k = [\varphi_1(x_{j+1},y_k),\ldots,\varphi_M(x_{j+1},y_k)]^T, \quad (5.18)$$

$$\Psi_k^- = [\Psi_1(x_{j+1}-0,y_k),\ldots,\Psi_M(x_{j+1}-0,y_k)]^T. \quad (5.19)$$

Third, for $k=0,1,\ldots,N$ we define the $M\times M$ matrices $\mathbf{A}_{kk}$, $\mathbf{A}_{kk+1}$ and $\mathbf{A}_{kk-1}$ as follows. If $k_n=k_n(x_{j+1})$ and $\vartheta_n=\vartheta_n(x_{j+1})$ for $n=1,\ldots,M$, then $$(A_{k\,k})_{mn} = \quad (5.20)$$
$$\begin{cases} k_n + (i\Delta x/4)(k_n^2 - \xi_n^2(x_{j+1},y_k) + \alpha_{nn}(x_{j+1},y_k)), & (\text{if } m=n) \\ \left[\left(\frac{i}{2} + \frac{ik_m\Delta x}{8k_m} - \frac{k_m\Delta x}{4} + \frac{\Delta x}{4k_m(\Delta y)^2}\right)\beta_{mn}(x_{j+1},y_k) + \right. \\ \left. (i\Delta x/4)\left(\alpha_{mn}(x_{j+1},y_k) - \frac{\partial}{\partial x}\beta_{mn}(x_{j+1},y_k)\right)\right]e^{-i(\vartheta_m-\vartheta_n)}, & (\text{if } m\neq n) \end{cases}$$

$$(A_{k\,k\pm1})_{mn} = \qquad (5.21)$$
$$\left(\pm \frac{i\Delta x}{8\Delta y}\gamma_{mn}(x_{j+1}, y_k) - \frac{\Delta x}{8k_m(\Delta y)^2}\beta_{mn}(x_{j+1}, y_{k\pm1})\right)e^{-i(\theta_m-\theta_n)}.$$

Finally, we define the M×M matrices $\mathbf{B}_1$ and $\mathbf{B}_{N-1}$ as follows. For k=1, N–1, $$(B_k)_{mn} = -\frac{\Delta x}{4k_m(\Delta y)^2}\beta_{mn}(x_{j+1}, y_k)e^{-i(\theta_m-\theta_n)}. \qquad (5.22)$$

Note that $\mathbf{B}_1 = \mathbf{A}_{0-1} + \mathbf{A}_{0\,1}$ and $\mathbf{B}_{N-1} = \mathbf{A}_{NN-1} + \mathbf{A}_{NN+1}$. Now eqs.(5.11,5.16), subject to eqs.(5.13,5.14), are equivalent to the following matrix equation.

$$\begin{bmatrix} A_{00} & B_1 & & & & \\ A_{10} & A_{11} & A_{12} & & & \\ & \ddots & \ddots & \ddots & & \\ & & A_{N-1\,N-2} & A_{N-1\,N-1} & A_{N-1\,N} \\ & & & B_{N-1} & A_{N\,N} \end{bmatrix} \cdot \begin{bmatrix} \varphi_0 \\ \varphi_1 \\ \vdots \\ \varphi_{N-1} \\ \varphi_N \end{bmatrix} = \begin{bmatrix} \Psi_0^- \\ \Psi_1^- \\ \vdots \\ \Psi_{N-1}^- \\ \Psi_N^- \end{bmatrix}. \qquad (5.23)$$

We recommend solving this equation numerically by Gaussian elimination with partial pivoting (GEPP) followed by one round of iterative refinement. The block tri-diagonal system matrix on the LHS of eq.(5.23) is also a band matrix of order M(N+1) that has 2M–1 lower diagonals and 2M–1 upper diagonals. Since M<<N in practice, it is most efficient to do the GEPP computations with subroutines that take advantage of band storage.

Let us write eq.(5.23) as $\mathbf{A} \cdot \Phi = \Psi^-$, and let $\Phi_0$ be the numerical solution of this equation computed in finite precision arithmetic by GEPP. Iterative refinement is a technique to improve the accuracy of this solution. One round of this technique has three steps.

(1) Compute the residual $r_0 = \Psi^- - \mathbf{A} \cdot \Phi_0$.

(2) Using the LU decomposition of $\mathbf{A}$ from the original solution of eq. (5.23) by GEPP, solve the equation $\mathbf{A} \cdot \delta_0 = r_0$ for the correction $\delta_0$.

(3) Refine the solution: $\Phi_1 = \Phi_0 + \delta_0$.

The computations in these steps are done at the same arithmetic precision as the original solution.

The system matrix on the LHS of eq.(5.23) is nonsingular if it is strictly diagonally dominant by columns. We see from eqs.(5.20,5.21) that this condition requires the following strict inequalities to be satisfied for the block indices k=2, . . . , N–2:

$$|k_n + (i\Delta x/4)(k_n^2 - \xi_n^2(x_{j+1}, y_k) + \alpha_{nn}(x_{j+1}, y_k))| > \qquad (5.24)$$

$$\sum_{m=1}^{M}\left|\left(\frac{i}{2} + \frac{ik_m\Delta x}{8k_m} - \frac{k_m\Delta x}{4} + \frac{\Delta x}{4k_m(\Delta y)^2}\right)\beta_{mn}(x_{j+1}, y_k) + \right.$$
$$(m \neq n)$$
$$\left. (i\Delta x/4)\left(\alpha_{mn}(x_{j+1}, y_k) - \frac{\partial}{\partial x}\beta_{mn}(x_{j+1}, y_k)\right)\right| +$$

$$\sum_{m=1}^{M}\left|\frac{i\Delta x}{8\Delta y}\gamma_{mn}(x_{j+1}, y_{k-1}) - \frac{\Delta x}{8k_m(\Delta y)^2}\beta_{mn}(x_{j+1}, y_k)\right| +$$

$$\sum_{m=1}^{M}\left|-\frac{i\Delta x}{8\Delta y}\gamma_{mn}(x_{j+1}, y_{k+1}) - \frac{\Delta x}{8k_m(\Delta y)^2}\beta_{mn}(x_{j+1}, y_k)\right| \text{ for } n = 1, \ldots, M.$$

These inequalities are modified slightly for the remaining indices k=0, 1, N–1, N. This condition is more restrictive than the similar condition (2.11) for the reference matrix M to be positive definite at the points $y_k$. If this condition is satisfied, then Gaussian elimination requires no pivoting and is stable.

Note the factors $k_m\Delta x$, $\Delta x/\Delta y$ and $\Delta x/k_m(\Delta y)^2$ that appear in this equation. We recommend choosing the increments $\Delta x$ and $\Delta y$ so that $k_m\Delta x \leq \mathcal{O}(1)$ and $k_m\Delta y \geq \mathcal{O}(1)$. These restrictions imply that the ratios $\Delta x/\Delta y$ and $\Delta x/k_m(\Delta y)^2$ are at most $\mathcal{O}(1)$. These restrictions also limit the errors that we make by applying the trapezoidal rule to eq.(4.7) to obtain eq.(5.1).

Finally, we note that higher order central difference formulas can be used in place of eqs.(5.8,5.9). For example, at the next order of approximation, we would use five-point formulas. They lead to a matrix formulation like eq.(5.23) in which the system matrix is block penta-diagonal.

6. Discrete transparent boundary conditions.

The most simple standard parabolic equation is $$2ik_0\frac{\partial \varphi}{\partial x} + \frac{\partial^2 \varphi}{\partial y^2} = 0, \qquad (6.1)$$

where the wavenumber $k_0$ is a positive constant. Let us assume (1) the solution $\varphi(x,y)$ is defined in a region of the x,y plane that includes the upper right quadrant where $x \geq 0$ and $y \geq 0$, (2) the solution $\varphi(x,y)$ and its partial derivatives are bounded in this quadrant, (3) $\varphi(0, y)=0$ for $y \geq 0$.

We can translate these assumptions into a transparent boundary condition that the solution $\varphi(x,y)$ satisfies on the right-half x-axis (x>0, y=0). This condition makes the half-axis transparent in the sense that the wavefield described by the solution $\varphi(x,y)$ propagates across this half-axis into the upper right quadrant without reflection.

$$\varphi(x, 0) = -e^{i\pi/4}(2\pi k_0)^{-1/2}\int_0^x \frac{\partial}{\partial y}\varphi(u, 0)(x-u)^{-1/2}\,du. \qquad (6.2)$$

If we change the sign of the partial derivative $\partial/\partial y$ in this equation, then we get a new condition that makes the right-half x-axis transparent in the opposite sense. Now the wavefield described by the solution $\varphi(x,y)$ propagates across this half-axis into the lower right quadrant without reflection.

$$\varphi(x, 0) = e^{i\pi/4}(2\pi k_0)^{-1/2}\int_0^x \frac{\partial}{\partial y}\varphi(u, 0)(x-u)^{-1/2}\,du. \qquad (6.3)$$

Let us replace the reference wavenumber $k_0$ in eq.(6.1) with a function $k(x)>0$, $$2ik(x)\frac{\partial \varphi}{\partial x} + \frac{\partial^2 \varphi}{\partial y^2} = 0. \quad (6.4)$$

The change of variable $$\tau(x) = \int_0^x \frac{du}{k(u)} \quad (6.5)$$

transforms this equation into a standard parabolic equation, $$2i\frac{\partial \varphi}{\partial \tau} + \frac{\partial^2 \varphi}{\partial y^2} = 0. \quad (6.6)$$

Let $\{x_0, x_1, \ldots, x_j, \ldots\}$ be an increasing sequence of discrete range steps, with $x_0=0$. Define $\psi_j(y) = \varphi(x_j, y)$ and $\tau_j = \tau(x_j)$ for $j=0,1,\ldots$. Using the trapezoidal rule to integrate eq.(6.6) from $\tau_j$ to $\tau_{j+1}$ and neglecting the $\mathcal{O}((\tau_{j+1}-\tau_j)^3)$ remainder, we find that $$2i[\psi_{j+1}(y) - \psi_j(y)] + \frac{1}{2}(\tau_{j+1}-\tau_j)\left[\frac{\partial^2}{\partial y^2}\psi_j(y) + \frac{\partial^2}{\partial y^2}\psi_{j+1}(y)\right] = 0. \quad (6.7)$$

Similarly, $$\tau_{j+1} - \tau_j = \int_{x_j}^{x_{j+1}} \frac{du}{k(u)} = \frac{1}{2}(x_{j+1}-x_j)[k^{-1}(x_j) + k^{-1}(x_{j+1})], \quad (6.8)$$

where we evaluated the integral by the trapezoidal rule and dropped the $\mathcal{O}((x_{j+1}-x_j)^3)$ remainder. We get a semi-discrete parabolic equation from eqs.(6.7, 6.8).

$$\frac{\partial^2}{\partial y^2}\psi_j(y) + \frac{\partial^2}{\partial y^2}\psi_{j+1}(y) + i\frac{8}{(x_{j+1}-x_j)[k^{-1}(x_j)+k^{-1}(x_{j+1})]}[\psi_{j+1}(y) - \psi_j(y)] = 0. \quad (6.9)$$

Let us assume (1) the functions $\psi_j(y)$ and their derivatives are uniformly bounded for $y \geq 0$, (2) $\psi_0(y) = 0$ for $y \geq 0$.

We can translate these assumptions into discrete transparent boundary conditions that the functions $\psi_{j+1}(y)$ $(j=0,1,\ldots)$ satisfy at $y=0$. A newly created algorithm computes these conditions recursively. First, define $$p_{j+1} = e^{-i\pi/4}\left(\frac{8}{(x_{j+1}-x_j)[k^{-1}(x_j)+k^{-1}(x_{j+1})]}\right)^{1/2} \text{ for } j=0,1,\ldots. \quad (6.10)$$

Second, define $$g_k^j = \frac{p_k - p_j}{p_k + p_j} \text{ for } j, k = 1, 2, \ldots. \quad (6.11)$$

Note that $g_k^j$ is real and $|g_k^j| < 1$ for all $j, k$.

If $j=1$, then we let $$a_1^1 = \frac{1}{2}p_1^{-2}\frac{\partial}{\partial y}\psi_1(0) \text{ and } a_2^1 = -\frac{1}{2}p_1^{-2}\frac{\partial}{\partial y}\psi_1(0). \quad (6.12)$$

If $j>1$, then we compute the coefficients $a_1^j, \ldots, a_{j+1}^j$ from the coefficients $a_1^{j-1}, \ldots, a_j^{j-1}$ and from the derivatives $\partial \psi_{j-1}(0)/\partial y$ and $\partial \psi_j(0)/\partial y$ in two steps.

(1) Compute $\tilde{a}_1^{j-1}, \ldots, \tilde{a}_j^{j-1}$ and $\tilde{b}_1^{j-1}, \ldots, \tilde{b}_j^{j-1}$ from the following recurrence formulas.

$$\tilde{a}_1^{j-1} = a_1^{j-1}, \quad (6.13)$$

$$\tilde{a}_k^{j-1} = a_k^{j-1} - g_k^j \tilde{a}_{k-1}^{j-1} \text{ for } k=2, \ldots, j, \quad (6.14)$$

$$\tilde{b}_1^{j-1} = g_1^j a_1^{j-1}, \quad (6.15)$$

$$\tilde{b}_k^{j-1} = g_k^j a_k^{j-1} + \tilde{a}_{k-1}^{j-1} - g_{k-1}^j \tilde{b}_{k-1}^{j-1} \text{ for } k=2, \ldots, j. \quad (6.16)$$

(2) Compute the coefficients $a_1^j, \ldots, a_{j+1}^j$ as follows.

$$a_1^j = -\frac{1}{2}a_1^{j-1} - \frac{1}{2}g_1^j \tilde{b}_1^{j-1}, \quad (6.17)$$

$$a_k^j = -\frac{1}{2}a_k^{j-1} - \frac{1}{2}g_k^j \tilde{b}_k^{j-1} - \frac{1}{2}\tilde{b}_{k-1}^{j-1} \text{ for } k=2, \ldots, j-1, \quad (6.18)$$

(Note: omit the preceding equation if $j=2$.)

$$a_j^j = \frac{1}{2}p_j^{-2}\left[\frac{\partial}{\partial y}\psi_{j-1}(0) + \frac{\partial}{\partial y}\psi_j(0)\right] - \frac{1}{2}a_j^{j-1} - \frac{1}{2}\tilde{a}_j^{j-1} - \frac{1}{2}\tilde{b}_{j-1}^{j-1}, \quad (6.19)$$

$$a_{j+1}^j = -\frac{1}{2}p_j^{-2}\left[\frac{\partial}{\partial y}\psi_{j-1}(0) + \frac{\partial}{\partial y}\psi_j(0)\right] - \frac{1}{2}\tilde{b}_j^{j-1}. \quad (6.20)$$

The coefficients $\tilde{a}_{j+1}^j$ are used to compute the discrete transparent boundary conditions as follows.

$$\frac{\partial}{\partial y}\psi_1(0) + p_1\psi_1(0) = 0, \quad (6.21)$$

$$\frac{\partial}{\partial y}\psi_{j+1}(0) + p_{j+1}\psi_{j+1}(0) = -\frac{\partial}{\partial y}\psi_j(0) - p_{j+1}\psi_j(0) + 2p_{j+1}^2 \tilde{a}_{j+1}^j \quad (6.22)$$

for $j = 1, 2, \ldots$

This algorithm can be greatly simplified if the quantities $p_j$ are independent of the index $j$. This happens when the range increments $x_{j+1}-x_j$ and the reference wavenumber values $k(x_j)$ are independent of the index $j$. Let us assume that $x_j = j\Delta x$ and $k(x_j) = k_0$ for $j=0,1,\ldots$, where the increment $\Delta x$ and the wavenumber $k_0$ are fixed. Then it follows from eq. (6.10) that $p_j = p_0$ for every $j$, where $$p_0 = e^{-i\pi/4} 2(k_0/\Delta x)^{1/2}. \quad (6.23)$$

In addition, eq.(6.11) implies that $g_k^j = 0$ for all $j, k$. Thus, eqs.(6.13, 6.14) become $$\tilde{a}_k^{j-1} = a_k^{j-1} \text{ for } k=1, \ldots, j, \quad (6.24)$$

eq.(6.15) becomes $\tilde{b}_1^{j-1} = 0$ and eq.(6.16) becomes $$\tilde{b}_k^{j-1} = \tilde{a}_{k-1}^{j-1} \text{ for } k=2, \ldots, j. \quad (6.25)$$

We can use these equations to eliminate the coefficients $\tilde{a}_k^{j-1}$ and $\tilde{b}_k^{j-1}$ from eqs.(6.17–6.20) if we extend the definition of the coefficients $a_k^j$ as follows. Let $$a_{-1}^j = 0 \text{ for } j = 0, 1, \ldots, \quad (6.26)$$

$$a_0^j = 0 \text{ for } j = 0, 1, \ldots \quad (6.27)$$

Using these extensions, we get the following simplified forms of eqs.(6.17–6.20). For $j > 1$, $$a_k^j = -\frac{1}{2}a_k^{j-1} - \frac{1}{2}a_{k-2}^{j-1}, \quad \text{for } k = 1, \ldots, j-1, \quad (6.28)$$

$$a_j^j = \frac{1}{2}p_0^{-2}\left[\frac{\partial}{\partial y}\psi_{j-1}(0) + \frac{\partial}{\partial y}\psi_j(0)\right] - a_j^{j-1} - \frac{1}{2}a_{j-2}^{j-1}, \quad (6.29)$$

$$a_{j+1}^j = -\frac{1}{2}p_0^{-2}\left[\frac{\partial}{\partial y}\psi_{j-1}(0) + \frac{\partial}{\partial y}\psi_j(0)\right] - \frac{1}{2}a_{j-1}^{j-1}. \quad (6.30)$$

We also define $a_1^0 = 0$. This extension has the following useful consequences.

(1) We can let $j=1$ in eqs.(6.29, 6.30), which become eq.(6.12) because $\partial\psi_0(0)/\partial y = 0$.

(2) Because of eq.(6.24), we can get eq.(6.21) from eq.(6.22) by letting $j=0$. Therefore, we can write these discrete transparent boundary conditions as follows.

$$\frac{\partial}{\partial y}\psi_{j+1}(0) + p_0\psi_{j+1}(0) = -\frac{\partial}{\partial y}\psi_j(0) - p_0\psi_j(0) + 2p_0^2 a_{j+1}^j \quad (6.31)$$

for $j = 0, 1, \ldots$ (3) An alternative form of these conditions is obtained by iterating eq.(6.31) backwards. The initial conditions $\psi_0(0) = 0$ and $\partial\psi_0(0)/\partial y = 0$ are used to stop the iteration.

$$\frac{\partial}{\partial y}\psi_{j+1}(0) + p_0\psi_{j+1}(0) = 2p_0^2 \sum_{k=0}^{j}(-1)^{j-k}a_{k+1}^k \quad (6.32)$$

for $j = 0, 1, \ldots$

When eqs. (6.28–6.30) are evaluated in finite-precision computer arithmetic, roundoff errors in the additions tend to accumulate. However, we can use compensated summation to identify these errors and to cancel them to working precision. Let us describe how this is done in a simple case.

Consider the following sequence of differential boundary values $\partial\psi_j(0)/\partial y$.

$$\frac{\partial}{\partial y}\psi_j(0) = \begin{cases} 2p_0^2 & \text{if } j = 1, \\ 0 & \text{if } j \neq 1. \end{cases} \quad (6.33)$$

Since $a_1^0 = 0$, it follows from eq. (6.32) that $\psi_1(0) = -2p_0$ and $$\psi_{j+1}(0) = 2p_0 \sum_{k=1}^{j}(-1)^{j-k}a_{k+1}^k \quad \text{for } j = 1, 2, \ldots \quad (6.34)$$

Thus, $\psi_{j+1}(0) = -2p_0\sigma_j$ where $$\sigma_j = -\sum_{k=1}^{j}(-1)^{j-k}a_{k-1}^k \quad \text{for } j = 1, 2, \ldots, \quad (6.35)$$

which can be calculated recursively as follows.

$$\sigma_j = -a_{j+1}^j - \sigma_{j-1} \text{ for } j = 2, 3, \ldots \quad (6.36)$$

We can compute the coefficients $a_k^j$ for $j = 1, 2, 3$ exactly from eqs.(6.28–6.30). Using the input values (6.33), we find that $$\begin{aligned} a_1^1 &= 1 \quad a_2^1 = -1, \\ a_1^2 &= -\frac{1}{2} \quad a_2^2 = 2 \quad a_3^2 = -\frac{3}{2}, \\ a_1^3 &= \frac{1}{4} \quad a_2^3 = -1 \quad a_3^3 = \frac{7}{4} \quad a_4^3 = -1. \end{aligned} \quad (6.37)$$

Next, using the input values (6.33), we write eqs.(6.28–6.30) for $j \geq 4$ as follows.

$$a_1^j = -\frac{1}{2}a_1^{j-1}, \quad (6.38)$$

$$a_2^j = -\frac{1}{2}a_2^{j-1}, \quad (6.39)$$

$$a_k^j = -\frac{1}{2}a_k^{j-1} - \frac{1}{2}a_{k-2}^{j-1} \quad \text{for } k = 3, \ldots, j-1, \quad (6.40)$$

$$a_j^j = -a_j^{j-1} - \frac{1}{2}a_{j-2}^{j-1}, \quad (6.41)$$

$$a_{j+1}^j = -\frac{1}{2}a_{j-1}^{j-1}. \quad (6.42)$$

We use the values of $a_1^3$, $a_2^3$, $a_3^3$, $a_4^3$ from eq.(6.37) to start these equations when $j=4$. We use eq.(6.36) to compute $\sigma_j$. We start this equation with $\sigma_3 = \frac{1}{2}$, which follows from eqs.(6.35, 6.37).

Compensated summation is based on the following principle. Let $\hat{u}$ and $\hat{v}$ denote real floating-point numbers, and let $\text{fl}(\hat{u} \pm \hat{v})$ denote the floating-point sum and difference of $\hat{u}$ and $\hat{v}$. Define the following floating-point numbers:

$$\hat{s} = \text{fl}(\hat{u} + \hat{v}), \quad (6.43)$$

$$\hat{u}' = \text{fl}(\hat{s} - \hat{v}), \quad (6.44)$$

$$\hat{v}'' = \text{fl}(\hat{s} - \hat{u}'), \quad (6.45)$$

$$\hat{\delta}'(\hat{u}) = \text{fl}(\hat{u} - \hat{u}'), \quad (6.46)$$

$$\hat{\delta}''(\hat{v}) = \text{fl}(\hat{v} - \hat{v}''), \quad (6.47)$$

$$\hat{\Delta}(\hat{u}, \hat{v}) = \text{fl}(\hat{\delta}'(\hat{u}) + \hat{\delta}''(\hat{v})). \quad (6.48)$$

The quantity $\hat{\Delta}(\hat{u}, \hat{v})$ is a very good estimate of the roundoff error $(\hat{u} + \hat{v}) - \hat{s}$. Note that the arithmetic operations in eqs. (6.43–6.48) carry over directly to complex floating-point arithmetic because the operations on the real parts of the complex numbers and the operations on the imaginary parts of these numbers are identical but independent.

First, let us apply compensated summation to eq.(6.40). We want to compute $$a_k^j = -\left(\frac{1}{2}a_k^{j-1} + \frac{1}{2}a_{k-2}^{j-1}\right) \quad \text{for } k = 3, \ldots, j-1, \quad (6.49)$$

but we actually compute $$\hat{a}_k^j = -fl\left(\frac{1}{2}\hat{a}_k^{j-1} + \frac{1}{2}\hat{a}_{k-2}^{j-1}\right) \text{ for } k = 3, \ldots, j-1. \quad (6.50)$$

Let $$\delta_k^j = \left(\frac{1}{2}\hat{a}_k^{j-1} + \frac{1}{2}\hat{a}_{k-2}^{j-1}\right) - fl\left(\frac{1}{2}\hat{a}_k^{j-1} + \frac{1}{2}\hat{a}_{k-2}^{j-1}\right) \quad (6.51)$$

for $k = 3, \ldots, j-1$, and $$\epsilon_k^j = a_k^j - \hat{a}_k^j \text{ for } k=1, \ldots, j+1. \quad (6.52)$$

Now, eqs.(6.49–6.52) imply that $$\hat{a}_k^j = -\left(\frac{1}{2}\hat{a}_k^{j-1} + \frac{1}{2}\hat{a}_{k-2}^{j-1}\right) + \delta_k^j \quad (6.53)$$

$$= -\left(\frac{1}{2}a_k^{j-1} - \frac{1}{2}\epsilon_k^{j-1} + \frac{1}{2}a_{k-2}^{j-1} - \frac{1}{2}\epsilon_{k-2}^{j-1}\right) + \delta_k^j$$

$$= -\left(\frac{1}{2}a_k^{j-1} + \frac{1}{2}a_{k-2}^{j-1}\right) + \frac{1}{2}\epsilon_k^{j-1} + \frac{1}{2}\epsilon_{k-2}^{j-1} + \delta_k^j$$

$$= a_k^j + \frac{1}{2}\epsilon_k^{j-1} + \frac{1}{2}\epsilon_{k-2}^{j-1} + \delta_k^j \quad \text{for } k = 3, \ldots, j-1.$$

Hence, $$\epsilon_k^j = -\left(\frac{1}{2}\epsilon_k^{j-1} + \frac{1}{2}\epsilon_{k-2}^{j-1} + \delta_k^j\right) \text{ for } k = 3, \ldots, j-1. \quad (6.54)$$

In practice we compute an approximation to $\epsilon_k^j$ that we call $\hat{\epsilon}_k^j$:

$$\hat{\epsilon}_k^j = -fl\left(\frac{1}{2}\hat{\epsilon}_k^{j-1} + \frac{1}{2}\hat{\epsilon}_{k-2}^{j-1} + \hat{\Delta}_k^j\right) \text{ for } k = 3, \ldots, j-1, \quad (6.55)$$

where $\hat{\Delta}_k^j$ is the estimate for $\delta_k^j$ that we get with $$\hat{u} = \frac{1}{2}\hat{a}_k^{j-1}$$

and $$\hat{v} = \frac{1}{2}\hat{a}_{k-2}^{j-1}$$

in eq. (6.48). Note that the RHS of eq.(6.55) is ambiguous because the associative law does not hold for floating-point addition. However, we shall ignore the small influence that the order of these additions may have on the numerical value of the total sum.

Next, we apply compensated summation to eq.(6.41). We want to compute $$a_j^j = -\left(a_j^{j-1} + \frac{1}{2}a_{j-2}^{j-1}\right), \quad (6.56)$$

but we actually compute $$\hat{a}_j^j = -fl\left(\hat{a}_j^{j-1} + \frac{1}{2}\hat{a}_{j-2}^{j-1}\right). \quad (6.57)$$

Let $$\delta_j^j = \left(\hat{a}_j^{j-1} + \frac{1}{2}\hat{a}_{j-2}^{j-1}\right) - fl\left(\hat{a}_j^{j-1} + \frac{1}{2}\hat{a}_{j-2}^{j-1}\right). \quad (6.58)$$

Now, eqs.(6.52,6.56–6.58) imply that $$\hat{a}_j^j = -\left(\hat{a}_j^{j-1} + \frac{1}{2}\hat{a}_{j-2}^{j-1}\right) + \delta_j^j \quad (6.59)$$

$$= -\left(a_j^{j-1} - \epsilon_j^{j-1} + \frac{1}{2}a_{j-2}^{j-1} - \frac{1}{2}\epsilon_{j-2}^{j-1}\right) + \delta_j^j$$

$$= -\left(a_j^{j-1} + \frac{1}{2}a_{j-2}^{j-1}\right) + \epsilon_j^{j-1} + \frac{1}{2}\epsilon_{j-2}^{j-1} + \delta_j^j$$

$$= a_j^j + \epsilon_j^{j-1} + \frac{1}{2}\epsilon_{j-2}^{j-1} + \delta_j^j.$$

Hence, $$\epsilon_j^j = -\left(\epsilon_j^{j-1} + \frac{1}{2}\epsilon_{j-2}^{j-1} + \delta_j^j\right). \quad (6.60)$$

In practice we compute an approximation to $\epsilon_j^j$ that we call $\hat{\epsilon}_j^j$:

$$\hat{\epsilon}_j^j = -fl\left(\hat{\epsilon}_j^{j-1} + \frac{1}{2}\hat{\epsilon}_{j-2}^{j-1} + \hat{\Delta}_j^j\right), \quad (6.61)$$

where $\hat{\Delta}_j^j$ is the estimate for $\delta_j^j$ that we get with $\hat{u}=\hat{a}_j^{j-1}$ and $$\hat{v} = \frac{1}{2}\hat{a}_{j-2}^{j-1}$$

in eq.(6.48). The remarks that follow eq.(6.55) apply to eq. (6.61) as well.

The treatment of eqs.(6.38,6.39,6.42) is simple because they involve no summations. Since we want to compute $$a_1^j = -\frac{1}{2}a_1^{j-1}, \; a_2^j = -\frac{1}{2}a_2^{j-1}, \; a_{j+1}^j = -\frac{1}{2}a_{j-1}^{j-1},$$

the computed values of these coefficients satisfy the same equations:

$$\hat{a}_1^j = -\frac{1}{2}\hat{a}_1^{j-1}, \; \hat{a}_2^j = -\frac{1}{2}\hat{a}_2^{j-1}, \; \hat{a}_{j+1}^j = -\frac{1}{2}\hat{a}_{j-1}^{j-1}. \quad (6.62)$$

Now the errors $\epsilon_1^j$, $\epsilon_2^j$, $\epsilon_{j+1}^j$ also satisfy these equations:

$$\epsilon_1^j = -\frac{1}{2}\epsilon_1^{j-1}, \; \epsilon_2^j = -\frac{1}{2}\epsilon_2^{j-1}, \; \epsilon_{j+1}^j = -\frac{1}{2}\epsilon_{j-1}^{j-1}. \quad (6.63)$$

Hence, we use the same equations to compute the approximations $\hat{\epsilon}_1^j, \hat{\epsilon}_2^j, \hat{\epsilon}_{j+1}^j$ to these errors:

$$\hat{\epsilon}_1^j = -\frac{1}{2}\hat{\epsilon}_1^{j-1}, \hat{\epsilon}_2^j = -\frac{1}{2}\hat{\epsilon}_2^{j-1}, \hat{\epsilon}_{j+1}^j = -\frac{1}{2}\hat{\epsilon}_{j-1}^{j-1}. \tag{6.64}$$

The approximate corrections $\hat{\epsilon}_k^3$ vanish because the computed coefficients $\hat{a}_k^3$ are exact. We use the values $\hat{\epsilon}_1^3=0$, $\hat{\epsilon}_2^3=0, \hat{\epsilon}_3^3=0, \hat{\epsilon}_4^3=0$ to start eqs.(6.55,6.61,6.64) when j=4. Since $\hat{\epsilon}_1^3=0$ and $\hat{\epsilon}_2^3=0$, the first two parts of eq.(6.64) imply that $\hat{\epsilon}_1^j=0$ and $\hat{\epsilon}_2^j=0$ for all j≧4. Therefore, we need only the last part of eq.(6.64).

Finally, we consider $\hat{\sigma}_j$ and develop an approximate correction to it. We want to compute $$\sigma_j = -(a_{j+1}^j + \sigma_{j-1}) \text{ for } j \geq 4, \tag{6.65}$$

with $\sigma_3 = 1/2$. In practice, we compute $$\hat{\sigma}_j = -fl(\hat{a}_{j+1}^j + \hat{\sigma}_{j-1}) \text{ for } j \geq 4, \tag{6.66}$$

with $\hat{\sigma}_3 = 1/2$. Define $$e_j = \sigma_j - \hat{\sigma}_j \text{ for } j \geq 3. \tag{6.67}$$

By the same approach that lead to eqs.(6.54,6.60) we find that $$e_j = -(\epsilon_{j+1}^j + e_{j-1} + \delta_j) \text{ for } j \geq 4, \tag{6.68}$$

where $$\delta_j = \hat{a}_{j+1}^j + \hat{\sigma}_{j-1} - fl(\hat{a}_{j+1}^j + \hat{\sigma}_{j-1}). \tag{6.69}$$

Although we could use eq.(6.48) to estimate $\delta_j$, we shall neglect it against $\epsilon_{j+1}^j$. Therefore, we compute an approximate correction $\hat{e}_j$ to $\sigma_j$ by the following recurrence formula.

$$\hat{e}_j = -fl(\hat{\epsilon}_{j+1}^j + \hat{e}_{j-1}) \text{ for } j \geq 4, \tag{6.70}$$

where $\hat{e}_3 = 0$.

Let us summarize the computational forms of eqs.(6.36, 6.38–6.42) for j≧4 that use compensated summation to identify roundoff errors and to cancel them to working precision.

$$\begin{aligned}
&\hat{a}_1^j = -\frac{1}{2}\hat{a}_1^{j-1}, \\
&\hat{a}_2^j = -\frac{1}{2}\hat{a}_2^{j-1}, \\
&\text{for } k = 3, \ldots, j-1: \\
&\hat{a}_k^j = -fl\left(\frac{1}{2}\hat{a}_k^{j-1} + \frac{1}{2}\hat{a}_{k-2}^{j-1}\right) \text{ and} \\
&\hat{\epsilon}_k^j = -fl\left(\frac{1}{2}\hat{\epsilon}_k^{j-1} + \frac{1}{2}\hat{\epsilon}_{k-2}^{j-1} + \hat{\Delta}_k^j\right), \\
&\hat{a}_j^j = -fl\left(\hat{a}_j^{j-1} + \frac{1}{2}\hat{a}_{j-2}^{j-1}\right) \text{ and} \\
&\hat{\epsilon}_j^j = -fl\left(\hat{\epsilon}_j^{j-1} + \frac{1}{2}\hat{\epsilon}_{j-2}^{j-1} + \hat{\Delta}_j^j\right), \\
&\hat{a}_{j+1}^j = -\frac{1}{2}\hat{a}_{j-1}^{j-1} \text{ and } \hat{\epsilon}_{j+1}^j = -\frac{1}{2}\hat{\epsilon}_{j-1}^{j-1}, \\
&\hat{\sigma}_j = -fl(\hat{a}_{j+1}^j + \hat{\sigma}_{j-1}) \text{ and } \hat{e}_j = -fl(\hat{\epsilon}_{j+1}^j + \hat{e}_{j-1}).
\end{aligned} \tag{6.71}$$

We approximate $\sigma_j$ by the sum $\hat{\sigma}_j + \hat{e}_j$.

The number of arithmetic operations in eq. (6.28) of the simple algorithm is proportional to j−1, which increases with range. We can limit the size of this operation count by truncating the algorithm. First, we choose an integer L≧3, which will be called the length of the truncated algorithm. If j≧L, then we discard all the coefficients $a_k^{j-1}$ such that k≦j−L. We effectively equate these coefficients to 0, which lets us start the recursion in eq.(6.28) for the truncated algorithm at k=j−L+1. Since the coefficient $a_{j-L+1}^j$ is not used in subsequent steps, however, there is no need to evaluate it. For this reason, if j≧L, then we can start the recursion in eq.(6.28) for the truncated algorithm at k=j−L+2. Now the operation count is proportional to L−2, which is fixed.

We shall state the truncated algorithm in terms of new coefficients $\alpha_l^{j-1}$ that are defined for j=1,2, . . . and l=1, . . . ,L as follows.

(1) Let $$\alpha_l^0 = 0 \text{ for } l=1,\ldots,L. \tag{6.72}$$

(2) Let $$\alpha_0^j = 0 \text{ for } j=0,1,\ldots \tag{6.73}$$

(3) For j=1,2, . . . , $$\alpha_l^j = -\frac{1}{2}\alpha_{l+1}^{j-1} - \frac{1}{2}\alpha_{l-1}^{j-1}, \text{ for } l = 1, \ldots, L-2, \tag{6.74}$$

$$\alpha_{L-1}^j = \frac{1}{2}p_0^{-2}\left[\frac{\partial}{\partial y}\psi_{j-1}(0) + \frac{\partial}{\partial y}\psi_j(0)\right] - \alpha_L^{j-1} - \frac{1}{2}\alpha_{L-2}^{j-1}, \tag{6.75}$$

$$\alpha_L^j = -\frac{1}{2}p_0^{-2}\left[\frac{\partial}{\partial y}\psi_{j-1}(0) + \frac{\partial}{\partial y}\psi_j(0)\right] - \frac{1}{2}\alpha_{L-1}^{j-1}. \tag{6.76}$$

The transparent boundary conditions associated with this algorithm are $$\frac{\partial}{\partial y}\psi_{j+1}(0) + p_0\psi_{j+1}^{(L)}(0) = -\frac{\partial}{\partial y}\psi_j(0) - p_0\psi_j^{(L)}(0) + 2p_0^2\alpha_L^j \tag{6.77}$$

for j = 0, 1, ... .

The superscript "L" indicates that the sequence of boundary values $\{\psi_j^{(L)}(0)\}_{j=0}^\infty$ is produced from the sequence of boundary derivatives $\{\partial\psi_j(0)/\partial y\}_{j=0}^\infty$ by the truncated algorithm of length L. These boundary values are only approximate.

An alternative form of these conditions is obtained by iterating eq.(6.77) backwards. The initial conditions $\psi_0^{(L)}(0)=0$ and $\partial\psi_0(0)/\partial y=0$ are used to stop the iteration. The result is like eq.(6.32).

$$\frac{\partial}{\partial y}\psi_{j+1}(0) + p_0\psi_{j+1}^{(L)}(0) = 2p_0^2\sum_{k=0}^j (-1)^{j-k}\alpha_L^k \tag{6.78}$$

for j = 0, 1, ... .

Suppose the sequence of differential boundary values $\partial\psi_j(0)/\partial y$ in eq.(6.33) is used as input to the truncated algorithm. The errors in the approximate boundary values $\psi_j^{(L)}(0)$ relative to the exact boundary values $\psi_j(0)$ can be characterized as follows. Fix ξ>0, and let $\{j_1, j_2, \ldots j_l, \ldots\}$ be a sequence of integers such that $j_l \sim \xi l^2$ as l→∞. Then the relative error in $\psi_{j_l}^{(L)}(0)$ converges to a finite limit as L→∞ that is exponentially small if ξ is small.

$$0 < \lim_{L\to\infty}(1 - \psi_{j_L}^{(L)}(0)/\psi_{j_L}(0)) < 2e^{-2/\xi}. \tag{6.79}$$

Suppose the index j and the length L are given, and let $\xi = jL^{-2}$. A practical way to interpret eq.(6.79) is that $1-\psi_j^{(L)}(0)/\psi_j(0) \approx 2\exp(-2/\xi)$ if L >> 1.

Let u denote the unit roundoff in a finite-precision floating-point computer arithmetic. Two real numbers a and b are represented by the same floating-point number if $|1-a/b|<u$. These numbers are equivalent in this computer arithmetic. If $L>[\ln(2/u)j/2]^{1/2}$, then $2\exp(-2/\xi)<u$. Hence, $\psi_j^{(L)}(0)$ and $\psi_j(0)$ are equivalent in the computer arithmetic if $L>>1$.

Now let $J$ be an integer, and let $L_J$ be the smallest integer greater than $[\ln(2/u)J/2]^{1/2}$.

$$L_J = [[\ln(2/u)J/2]^{1/2}] = \mathcal{O}(J^{1/2}). \quad (6.80)$$

If $L_J>>1$, then $\psi_j^{(L_J)}(0)$ and $\psi_j(0)$ are equivalent in the computer arithmetic for all $j \leq J$. The number of arithmetic operations to compute each $\psi_j^{(L_J)}(0)$ is proportional to $L_J$, but the number of arithmetic operations to compute each $\psi_j(0)$ is proportional to $j$. The ratio $\rho(J)$ of the total operation count for computing the subsequence $\{\psi_j^{(L_J)}(0)\}_{j=1}^J$ to the total operation count for computing the subsequence $\{\psi_j(0)\}_{j=1}^J$ is approximately $$\rho(J) \approx JL_J \Big/ \frac{1}{2}J^2 = 2L_J/J = \mathcal{O}(J^{-1/2}). \quad (6.81)$$

Therefore, if $L_J>>1$, then the truncated algorithm of length $L_J$ is more efficient for computing the first $J$ boundary values to working precision than the complete algorithm. As an example of practical importance, consider IEEE double-precision floating-point arithmetic. Since $u=2^{-53}$ in this arithmetic, $$L_J \approx 4.326 J^{1/2} \text{ for IEEE double-precision floating-point arithmetic.} \quad (6.82)$$

These criteria are valid for all sequences of differential boundary values $\partial\psi_j(0)/\partial y$. However, let us continue to use the sequence in eq.(6.33) to explain how to program the truncated algorithm with compensated summation.

Assume that $L>4$. We can calculate the coefficients $\alpha_l^j$ for $j=1,2,3$ exactly.

$$\left.\begin{array}{l} \alpha_l^1 = 0 \text{ for } l \leq L-2 \quad \alpha_{L-1}^1 = 1 \quad \alpha_L^1 = -1, \\[4pt] \alpha_l^2 = 0 \text{ for } l \leq L-3 \quad \alpha_{L-2}^2 = -\frac{1}{2} \quad \alpha_{L-1}^2 = 2 \quad \alpha_L^2 = -\frac{3}{2}, \\[4pt] \alpha_l^3 = 0 \text{ for } l \leq L-4 \quad \alpha_{L-3}^3 = \frac{1}{4} \quad \alpha_{L-2}^3 = -1 \quad \alpha_{L-1}^3 = \frac{7}{4} \quad \alpha_L^3 = -1. \end{array}\right\} \quad (6.83)$$

Next, we use eqs.(6.33,6.73) to write eqs.(6.74–6.76) for $j \geq 4$ as follows.

$$\alpha_1^j = -\frac{1}{2}\alpha_2^{j-1}, \quad (6.84)$$

$$\alpha_l^j = -\frac{1}{2}\alpha_{l+1}^{j-1} - \frac{1}{2}\alpha_{l-1}^{j-1} \text{ for } l=2,\ldots,L-2, \quad (6.85)$$

$$\alpha_{L-1}^j = -\alpha_L^{j-1} - \frac{1}{2}\alpha_{L-2}^{j-1}, \quad (6.86)$$

$$\alpha_L^j = -\frac{1}{2}\alpha_{L-1}^{j-1}. \quad (6.87)$$

Since $\alpha_L^0 = 0$, it follows from eq.(6.78) that $\psi_1^{(L)}(0) = -2p_0$ and $$\psi_{j+1}^{(L)}(0) = 2p_0 \sum_{k=1}^{j}(-1)^{j-k}\alpha_L^k \text{ for } j=1,2,\ldots. \quad (6.88)$$

Thus, $\psi_{j+1}^{(L)}(0) = -2p_0\sigma_j^{(L)}$ where $$\sigma_j^{(L)} = -\sum_{k=1}^{j}(-1)^{j-k}\alpha_L^k \text{ for } j=1,2,\ldots, \quad (6.89)$$

which can be calculated recursively as follows.

$$\sigma_j^{(L)} = -\alpha_L^j - \sigma_{j-1}^{(L)} \text{ for } j=2,3,\ldots \quad (6.90)$$

We use the values of $\alpha_l^3$ for $l=1,\ldots,L$ from eq.(6.83) to start eqs.(6.84–6.87) when $j=4$. We compute $\sigma_j^{(L)}$ from eq.(6.90). We start this equation with $\sigma_3^{(L)} = \frac{1}{2}$, which follows from eqs.(6.83,6.89).

If eqs.(6.84–6.87,6.90) are programmed directly, then roundoff errors tend to accumulate. We can use compensated summation to counteract these roundoff errors in the same way that we use it to counteract roundoff errors for the complete algorithm. Let us denote the computed values of $\alpha_k^j$ and $\sigma_j^{(L)}$ by $\hat{\alpha}_k^j$ and $\hat{\sigma}_j^{(L)}$, respectively. We list the corrected computational forms of eqs.(6.84–6.87,6.90) next. If $j \geq 4$, then $$\left.\begin{array}{l} \hat{\alpha}_1^j = -\frac{1}{2}\hat{\alpha}_2^{j-1} \text{ and } \hat{e}_1^j = -\frac{1}{2}\hat{e}_2^{j-1}, \\[4pt] \text{for } l=2,\ldots,L-2: \\[4pt] \hat{\alpha}_l^j = -fl\left(\frac{1}{2}\hat{\alpha}_{l+1}^{j-1} + \frac{1}{2}\hat{\alpha}_{l-1}^{j-1}\right) \text{ and} \\[4pt] \hat{e}_l^j = -fl\left(\frac{1}{2}\hat{e}_{l+1}^{j-1} + \frac{1}{2}\hat{e}_{l-1}^{j-1} + \hat{\Delta}_l^j\right), \\[4pt] \hat{\alpha}_{L-1}^j = -fl\left(\hat{\alpha}_L^{j-1} + \frac{1}{2}\hat{\alpha}_{L-2}^{j-1}\right) \text{ and} \\[4pt] \hat{e}_{L-1}^j = -fl\left(\hat{e}_L^{j-1} + \frac{1}{2}\hat{e}_{L-2}^{j-1} + \hat{\Delta}_{L-1}^j\right), \\[4pt] \hat{\alpha}_L^j = -\frac{1}{2}\hat{\alpha}_{L-1}^{j-1} \text{ and } \hat{e}_L^j = -\frac{1}{2}\hat{e}_{L-1}^{j-1}, \\[4pt] \hat{\sigma}_j^{(L)} = -fl(\hat{\alpha}_L^j + \hat{\sigma}_{j-1}^{(L)}) \text{ and } \hat{e}_j^{(L)} = -fl(\hat{e}_L^j + \hat{e}_{j-1}^{(L)}). \end{array}\right\} \quad (6.91)$$

Using eqs.(6.43–6.48), we compute $\hat{\Delta}_l^j$ for $l=2,\ldots,L-2$ as $\hat{\Delta}(\hat{u},\hat{v})$ with $$\hat{u} = \frac{1}{2}\hat{\alpha}_{l+1}^{j-1}$$

and $$\hat{v} = \frac{1}{2}\hat{\alpha}_{l-1}^{j-1},$$

and we compute $\hat{\Delta}_{L-1}^{j}$ as $\hat{\Delta}(\hat{u},\hat{v})$ with $\hat{u}=\hat{\alpha}_{L}^{j-1}$ and $$\hat{v} = \frac{1}{2}\hat{\alpha}_{L-2}^{j-1}.$$

These equations are developed like the ones that are collected as eq.(6.71). We start them when j=4 with the following initial values:

$$\hat{\alpha}_l^3 = 0 \text{ for } l \le L-4 \quad \hat{\alpha}_{L-3}^3 = \frac{1}{4} \quad \hat{\alpha}_{L-2}^3 = -1 \quad \hat{\alpha}_{L-1}^3 = \frac{7}{4} \quad (6.92)$$

$$\hat{\alpha}_L^3 = -1 \quad \hat{\sigma}_3^{(L)} = \frac{1}{2},$$

$$\hat{\epsilon}_l^3 = 0 \text{ for } l \le L \quad \hat{e}_3^{(L)} = 0.$$

We approximate $\sigma_j^{(L)}$ by the sum $\hat{\sigma}_j^{(L)}+\hat{e}_j^{(L)}$, which we denote by $\tilde{\sigma}_j^{(L)}$.

7. A Chebyshev tau method for semi-discrete parabolic equations.

If $x_j=j\Delta x$ and $k(x_j)=k_0$ for $j=0,1,\ldots$, where the increment $\Delta x$ and the wavenumber $k_0$ are fixed, then eq.(6.9) takes the following simple form.

$$\psi_{j+1}(y) - \psi_j(y) = (i\Delta x/4k_0)\left[\frac{\partial^2}{\partial y^2}\psi_j(y) + \frac{\partial^2}{\partial y^2}\psi_{j+1}(y)\right] \quad (7.1)$$

for $j = 0, 1, \ldots,$

We can use Chebyshev interpolation polynomials to integrate this equation numerically over an interval $-W \le y \le W$. Let $T_k(\xi)$ denote the k-th Chebyshev polynomial (of the first kind). For $k=0,1,\ldots$ these polynomials are defined by the identity $$T_k(\xi)=\cos(k\theta), \text{ where } \xi=\cos\theta. \quad (7.2)$$

Let N be a positive integer. A Chebyshev interpolation polynomial of degree N over the interval $-W \le y \le W$ is a sum of the form $$f(y) = \sum_{k=0}^{N} f_k T_k(y/W). \quad (7.3)$$

We shall approximate each function $\psi_j(y)$ by a polynomial $f_j(y)$ of degree N, which we represent uniquely as a Chebyshev interpolation polynomial.

$$f_j(y) = \sum_{k=0}^{N} f_{j,k} T_k(y/W) \text{ for } -W \le y \le W. \quad (7.4)$$

The first and second derivatives of $f_j(y)$ with respect to y are polynomials of degrees N-1 and N-2. We also represent these polynomials uniquely as Chebyshev interpolation polynomials.

$$\frac{\partial}{\partial y}f_j(y) = \frac{1}{W}\sum_{k=0}^{N-1} f_{j,k}^{(1)} T_k(y/W) \text{ for } -W \le y \le W, \quad (7.5)$$

$$\frac{\partial^2}{\partial y^2}f_j(y) = \frac{1}{W^2}\sum_{k=0}^{N-2} f_{j,k}^{(2)} T_k(y/W) \text{ for } -W \le y \le W. \quad (7.6)$$

Assume that the coefficients in these equations satisfy the following Chebyshev tau equations.

$$f_{j+1,k} - f_{j,k} = (i\Delta x/4k_0W^2)(f_{j+1,k}^{(2)} + f_{j,k}^{(2)}) \text{ for } \quad (7.7)$$

$$\begin{cases} j = 0, 1, \ldots \text{ and} \\ k = 0, 1, \ldots, N-2. \end{cases}$$

Under this assumption, the polynomials $f_j(y)$ satisfy equations that are similar to eq.(7.1). For $j=0,1,\ldots$ and $-W \le y \le W$, $$f_{j+1}(y) - f_j(y) = (i\Delta x/4k_0)\left[\frac{\partial^2}{\partial y^2}f_{j+1}(y) + \frac{\partial^2}{\partial y^2}f_j(y)\right] + \quad (7.8)$$

$$e_{j+1,N-1}T_{N-1}(y/W) + e_{j+1,N}T_N(y/W),$$

where $$e_{j+1,N-1}=f_{j+1,N-1}-f_{j,N-1} \text{ and } e_{j+1,N}=f_{j+1,N}-f_{j,N}. \quad (7.9)$$

We also define the following dimensionless and real-valued parameter.

$$q=4k_0W^2/\Delta x. \quad (7.10)$$

Now the Chebyshev tau equations can be written in the following equivalent form.

$$f_{j+1,k}^{(2)} + iqf_{j-1,k} = g_{j,k} \text{ for } \begin{cases} j = 0, 1, \ldots \text{ and} \\ k = 0, 1, \ldots, N-2, \end{cases} \quad (7.11)$$

where $$g_{j,k}=-f_{j,k}^{(2)}+iq\,f_{j,k}. \quad (7.12)$$

The quantities $g_{j,k}$ can be computed recursively without the coefficients $f_{j+1,k}^{(2)}$.

$$g_{j+1,k} = -f_{j+1,k}^{(2)} + iqf_{j+1,k} \quad (7.13)$$

$$= -(f_{j+1,k}^{(2)} + iqf_{j+1,k}) + 2iqf_{j+1,k}$$

$$= -g_{j,k} + 2iqf_{j+1,k}.$$

It is possible also to eliminate the coefficients $f_{j+1,k}^{(2)}$ from the Chebyshev tau equations. This leads to an alternative formulation of these equations in terms of the coefficients $f_{j+1,k}$ alone. The coefficients $f_{j+1,k}$ and $f_{j+1,k}^{(2)}$ in eqs.(7.4,7.6) satisfy eq.(7.7) if and only if.

$$f_{j+1,N} + \frac{1}{4}\frac{1}{N(N-1)}iqf_{j+1,N-2} = h_{j,N}, \quad (7.14)$$

$$f_{j+1,N-1} + \frac{1}{4}\frac{1}{(N-1)(N-2)}iqf_{j+1,N-3} = h_{j,N-1}, \quad (7.15)$$

$$\left(1 - \frac{1}{2}\frac{1}{(N-1)(N-3)}iq\right)f_{j+1,N-2} + \quad (7.16)$$
$$\frac{1}{4}\frac{1}{(N-2)(N-3)}iqf_{j+1,N-4} = h_{j,N-2},$$

$$\left(1 - \frac{1}{2}\frac{1}{(N-2)(N-4)}iq\right)f_{j+1,N-3} + \quad (7.17)$$
$$\frac{1}{4}\frac{1}{(N-3)(N-4)}iqf_{j+1,N-5} = h_{j,N-3},$$

$$\frac{1}{4}\frac{1}{(k+1)k}iqf_{j+1,k+2} + \left(1 - \frac{1}{2}\frac{1}{k^2-1}iq\right)f_{j+1,k} + \frac{1}{4}\frac{1}{k(k-1)}iqf_{j+1,k-2} = \quad (7.18)$$
$$h_{j,k} \quad \text{for } k = N-4, \ldots, 3,$$

$$\frac{1}{24}iqf_{j+1,4} + \left(1 - \frac{1}{6}iq\right)f_{j+1,2} + \frac{1}{4}iqf_{j+1,0} = h_{j,2}, \quad (7.19)$$
$$\text{for } j = 0, 1, \ldots,$$

where $$h_{j,N} = \frac{1}{4}\frac{1}{N(N-1)}g_{j,N-2}, \quad (7.20)$$

$$h_{j,N-1} = \frac{1}{4}\frac{1}{(N-1)(N-2)}g_{j,N-3}, \quad (7.21)$$

$$h_{j,N-2} = -\frac{1}{2}\frac{1}{(N-1)(N-3)}g_{j,N-2} + \frac{1}{4}\frac{1}{(N-2)(N-3)}g_{j,N-4}, \quad (7.22)$$

$$h_{j,N-3} = -\frac{1}{2}\frac{1}{(N-2)(N-4)}g_{j,N-3} + \frac{1}{4}\frac{1}{(N-3)(N-4)}g_{j,N-5}, \quad (7.23)$$

$$h_{j,k} = \frac{1}{4}\frac{1}{(k+1)k}g_{j,k+2} - \frac{1}{2}\frac{1}{k^2-1}g_{j,k} + \frac{1}{4}\frac{1}{k(k-1)}g_{j,k-2} \quad \text{for } k = N-4,\ldots,3, \quad (7.24)$$

$$h_{j,2} = \frac{1}{24}g_{j,4} - \frac{1}{6}g_{j,2} + \frac{1}{4}g_{j,0}. \quad (7.25)$$

From this point on we assume that N is even. Note that (1) there are N−1 equations in eqs.(7.14–7.19);
(2) the even-indexed coefficients $f_{j+1,N}, f_{j+1,N-2}, \ldots f_{j+1,2}, f_{j+1,0}$ are uncoupled from the odd-indexed coefficients $f_{j+1,N-1}, f_{j+1,N-3}, \ldots, f_{j+1,1}$ in eqs.(7.14–7.19);
(3) the coefficient $f_{j+1,N}$ appears only in eq.(7.14), and the coefficient $f_{j+1,N-1}$ appears only in eq.(7.15).

We adopt conditions at the boundaries y=±W that combine the discrete transparent boundary conditions (6.32) with source terms $-f_{j+1}^{(S)}(\pm W)$ that are independent of the solutions $f_k(y)$ for $k \leq j+1$. Thus, $$f_{j+1}(\pm W) \pm \frac{1}{p_0}\frac{\partial}{\partial y}f_{j+1}(\pm W) = g_j(\pm W) \text{ for } j = 0, 1, \ldots, \quad (7.26)$$

where $$g_j(\pm W) = -f_{j+1}^{(S)}(\pm W) + 2p_0\sum_{k=0}^{j}(-1)^{j-k}a_{k+1}^k(\pm W). \quad (7.27)$$

The coefficients $a_{k+1}{}^k(\pm W)$ in this equation are computed recursively. First, $a_1^0(\pm W)=0$. Second, for j=1,2, ..., $$a_k^j(\pm W) = -\frac{1}{2}a_k^{j-1}(\pm W) - \frac{1}{2}a_{k-2}^{j-1}(\pm W), \quad (7.28)$$
$$\text{for } k = 1, \ldots, j-1,$$
$$\text{Skip this when } j=1.$$

$$a_j^j(\pm W) = \pm\frac{1}{2}p_0^{-2}\left[\frac{\partial}{\partial y}f_{j-1}(\pm W) + \frac{\partial}{\partial y}f_j(\pm W)\right] - \quad (7.29)$$
$$a_j^{j-1}(\pm W) - \frac{1}{2}a_{j-2}^{j-1}(\pm W),$$

$$a_{j+1}^j(\pm W) = \mp\frac{1}{2}p_0^{-2}\left[\frac{\partial}{\partial y}f_{j-1}(\pm W) + \frac{\partial}{\partial y}f_j(\pm W)\right] - \quad (7.30)$$
$$\frac{1}{2}a_{j-1}^{j-1}(\pm W),$$

where $$a_{-1}^j(\pm W)=0 \text{ for } j=0,1,\ldots, \quad (7.31)$$

$$a_0^j(\pm W)=0 \text{ for } j=0,1,\ldots \quad (7.32)$$

If $f_0(y)$ is specified, then the N+1 equations in eqs. (7.14–7.19,7.26)) determine the polynomials $f_{j+1}(y)$ for $j=0,1,\ldots$ uniquely.

It is easy to evaluate $f_{j+1}(\pm W)$ from eq.(7.4) because $T_k(\pm 1)=(\pm 1)^k$.

$$f_{j+1}(\pm W) = \sum_{k=0}^{N}(\pm 1)^k f_{j+1,k}. \quad (7.33)$$

It is more convenient to evaluate $\partial f_{j+1}(\pm W)/\partial y$ by differentiating eq.(7.4) directly than by using eq.(7.5) because $T_k'(\pm 1)=(\pm 1)^{k+1}k^2$. Thus, $$\pm\frac{\partial}{\partial y}f_{j+1}(\pm W) = \frac{1}{W}\sum_{k=0}^{N}(\pm 1)^k k^2 f_{j+1,k}. \quad (7.34)$$

Now $$p_0 W = e^{-i\pi/4}2W(k_0\Delta x)^{1/2} = e^{-i\pi/4}q^{1/2}. \quad (7.35)$$

Therefore, it follows from eqs.(7.26,7.33–7.35) that $$\sum_{k=0}^{N}f_{j+1,k} + e^{i\pi/4}q^{-1/2}\sum_{k=0}^{N}k^2 f_{j+1,k} = g_j(W), \quad (7.36)$$

$$\sum_{k=0}^{N}(-1)^k f_{j+1,k} + e^{i\pi/4}q^{-1/2}\sum_{k=0}^{N}(-1)^k k^2 f_{j+1,k} = g_j(-W). \quad (7.37)$$

It is easy to decouple the even-indexed Chebyshev coefficients from the odd-indexed Chebyshev coefficients in these equations. If we add eqs.(7.36,7.37), then we get an equation that involves only the even-indexed Chebyshev coefficients.

$$\sum_{l=0}^{N/2}[1+e^{i\pi/4}q^{-1/2}(2l)^2]f_{j+1,2l} = \frac{1}{2}[g_j(W)+g_j(-W)]. \quad (7.38)$$

If we subtract eq.(7.37) from eq.(7.36), then we get an equation that involves only the odd-indexed Chebyshev coefficients.

$$\sum_{l=1}^{N/2}[1+e^{i\pi/4}q^{-1/2}(2l-1)^2]f_{j+1,2l-1} = \frac{1}{2}[g_j(W)-g_j(-W)]. \quad (7.39)$$

It is useful to express eqs.(7.14–7.19) and eqs.(7.38,7.39) as a pair of independent matrix equations of the form $$\begin{bmatrix} A & u \\ v^T & \gamma \end{bmatrix}\begin{bmatrix} x \\ \alpha \end{bmatrix} = \begin{bmatrix} y \\ \beta \end{bmatrix}. \quad (7.40)$$

First, define $$r_k = \begin{cases} 0 & \text{for } k = N-2, N-3, \\ \frac{1}{4}\frac{1}{(k+1)k}iq & \text{for } k = N-4, \ldots, 2. \end{cases} \quad (7.41)$$

$$s_k = \begin{cases} 1 & \text{for } k = N, N-1, \\ 1 - \frac{1}{2}\frac{1}{k^2-1}iq & \text{for } k = N-2, \ldots, 2. \end{cases} \quad (7.42)$$

$$t_k = \begin{cases} \frac{1}{4}\frac{1}{k(k-1)}iq & \text{for } k = N, \ldots, 3, \\ \frac{1}{4}iq & \text{for } k = 2. \end{cases} \quad (7.43)$$

$$b_k = 1 + e^{i\pi/4}q^{-1/2}k^2 \text{ for } k = N, \ldots, 0. \quad (7.44)$$

The even-indexed Chebyshev coefficients $f_{j+1,2l}$ are determined by the matrix equation $$\begin{bmatrix} A_0 & u_0 \\ v_0^T & \gamma_0 \end{bmatrix}\begin{bmatrix} x_0 \\ \alpha_0 \end{bmatrix} = \begin{bmatrix} y_0 \\ \beta_0 \end{bmatrix}, \quad (7.45)$$

where $$A_0 = \begin{bmatrix} s_N & t_N & & & & \\ r_{N-2} & s_{N-2} & t_{N-2} & & & \\ & r_{N-4} & s_{N-4} & t_{N-4} & & \\ & & \ddots & \ddots & \ddots & \\ & & & \ddots & \ddots & \ddots \\ & & & & r_4 & s_4 & t_4 \\ & & & & & r_2 & s_2 \end{bmatrix}, u_0 = \begin{bmatrix} 0 \\ 0 \\ 0 \\ \vdots \\ \vdots \\ 0 \\ t_2 \end{bmatrix}, \quad (7.46)$$

$$v_0 = \begin{bmatrix} b_N \\ b_{N-2} \\ b_{N-4} \\ \vdots \\ \vdots \\ b_4 \\ b_2 \end{bmatrix}, x_0 = \begin{bmatrix} f_{j+1,N} \\ f_{j+1,N-2} \\ f_{j+1,N-4} \\ \vdots \\ \vdots \\ f_{j+1,4} \\ f_{j+1,2} \end{bmatrix}, y_0 = \begin{bmatrix} h_{j,N} \\ h_{j,N-2} \\ h_{j,N-4} \\ \vdots \\ \vdots \\ h_{j,4} \\ h_{j,2} \end{bmatrix}, \quad (7.47)$$

-continued $$\gamma_0 = b_0, \alpha_0 = f_{j+1,0}, \beta_0 = \frac{1}{2}[g_j(W)+g_j(-W)]. \quad (7.48)$$

The rows of eq.(7.45) are eqs.(7.14,7.16), eq.(7.18) for k=2l (l=N/2−2,…,2), eq.(7.19) and eq.(7.38).

The odd-indexed Chebyshev coefficients $f_{j+1,2l-1}$ are determined by the matrix equation $$\begin{bmatrix} A_1 & u_1 \\ v_1^T & \gamma_1 \end{bmatrix}\begin{bmatrix} x_1 \\ \alpha_1 \end{bmatrix} = \begin{bmatrix} y_1 \\ \beta_1 \end{bmatrix}, \quad (7.49)$$

where $$A_1 = \begin{bmatrix} s_{N-1} & t_{N-1} & & & & \\ r_{N-3} & s_{N-3} & t_{N-3} & & & \\ & r_{N-5} & s_{N-5} & t_{N-5} & & \\ & & \ddots & \ddots & \ddots & \\ & & & \ddots & \ddots & \ddots \\ & & & & r_5 & s_5 & t_5 \\ & & & & & r_3 & s_3 \end{bmatrix}, u_1 = \begin{bmatrix} 0 \\ 0 \\ 0 \\ \vdots \\ \vdots \\ 0 \\ t_3 \end{bmatrix}, \quad (7.50)$$

$$v_1 = \begin{bmatrix} b_{N-1} \\ b_{N-3} \\ b_{N-5} \\ \vdots \\ \vdots \\ b_5 \\ b_3 \end{bmatrix}, x_1 = \begin{bmatrix} f_{j-1,N-1} \\ f_{j-1,N-3} \\ f_{j-1,N-5} \\ \vdots \\ \vdots \\ f_{j+1,5} \\ f_{j+1,3} \end{bmatrix}, y_1 = \begin{bmatrix} h_{j,N-1} \\ h_{j,N-3} \\ h_{j,N-5} \\ \vdots \\ \vdots \\ h_{j,5} \\ h_{j,3} \end{bmatrix}, \quad (7.51)$$

$$\gamma_1 = b_1, \alpha_1 = f_{j+1,1}, \beta_1 = \frac{1}{2}[g_j(W)-g_j(-W)]. \quad (7.52)$$

The rows of eq.(7.49) are eqs.(7.15,7.17), eq. (7.18) for k=2l−1(l=N/2−2,…,2) and eq.(7.39).

We can solve eqs.(7.45,7.49) numerically by the Crout form of the block elimination method. The BEC algorithm to carry out this method has five steps. We outline them for eq.(7.40), which includes eqs.(7.45,7.49) as particular cases. Given y and β, we want to solve that equation for x and α.

(1) Solve the equation $$\mathbf{A}\xi = u. \quad (7.53)$$

(2) Use the solution vector $\xi$ to compute the divisor $$\delta = \gamma - v^T \xi. \quad (7.54)$$

(3) Solve the equation $$\mathbf{A}\eta = y. \quad (7.55)$$

(4) Use the solution vector η to compute the scalar $$\alpha = (\beta - v^T \eta)/\delta. \quad (7.56)$$

(5) Compute the vector $$x = \eta - \alpha\xi. \quad (7.57)$$

We can solve eqs.(7.53,7.55) with a method that uses an LU factorization of the matrix A. If A=A$_0$ or A=A$_1$, then the Crout LU factorization can be done numerically without pivoting and is stable.

Since $s_N=1$, we find that
$$A_0=L_0U_0, \quad (7.58)$$

where $$L_0 = \begin{bmatrix} 1 & & & & & \\ & \sigma_{N-2} & & & & \\ & r_{N-4} & \sigma_{N-4} & & & \\ & & \ddots & \ddots & & \\ & & & r_4 & \sigma_4 & \\ & & & & r_2 & \sigma_2 \end{bmatrix}, \quad (7.59)$$

$$U_0 = \begin{bmatrix} 1 & t_N & & & & \\ & 1 & \tau_{N-2} & & & \\ & & 1 & \tau_{N-4} & & \\ & & & \ddots & \ddots & \\ & & & & 1 & \tau_4 \\ & & & & & 1 \end{bmatrix},$$

and $$\left.\begin{array}{l} \sigma_{N-2}=s_{N-2}, \tau_{N-2}=t_{N-2}/\sigma_{N-2}, \\ \sigma_k = s_k - r_k\tau_{k+2}, \tau_k = t_k/\sigma_k \text{ for } k=2l \ (l=N/2-2,\ldots,2), \\ \sigma_2 = s_2 - r_2\tau_4. \end{array}\right\} \quad (7.60)$$

Since $s_{N-1}=1$, we find that
$$A_1=L_1U_1, \quad (7.61)$$

where $$L_1 = \begin{bmatrix} 1 & & & & & \\ & \sigma_{N-3} & & & & \\ & r_{N-5} & \sigma_{N-5} & & & \\ & & \ddots & \ddots & & \\ & & & r_5 & \sigma_5 & \\ & & & & r_3 & \sigma_3 \end{bmatrix}, \quad (7.62)$$

$$U_1 = \begin{bmatrix} 1 & t_{N-1} & & & & \\ & 1 & \tau_{N-3} & & & \\ & & 1 & \tau_{N-5} & & \\ & & & \ddots & \ddots & \\ & & & & 1 & \tau_5 \\ & & & & & 1 \end{bmatrix},$$

and $$\left.\begin{array}{l} \sigma_{N-3}=s_{N-3}, \tau_{N-3}=t_{N-3}/\sigma_{N-3}, \\ \sigma_k = s_k - r_k\tau_{k+2}, \tau_k = t_k/\sigma_k \text{ for } k=2l-1 \ (l=N/2-2,\ldots,3), \\ \sigma_3 = s_3 - r_3\tau_5. \end{array}\right\} \quad (7.63)$$

If $A=A_0$, then eqs.(7.53,7.55) are of the form $A_0z_0=w_0$. To solve this equation we introduce a vector $p_0$ and solve the first intermediate equation $L_0p_0=w_0$ for $p_0$ by forward substitution. Then we solve the second intermediate equation $U_0z_0=p_0$ for $z_0$ by backward substitution.

If $A=A_1$, then eqs.(7.53,7.55) are of the form $A_1z_1=w_1$. This equation is solved the same way. We introduce a vector $p_1$ and solve the intermediate equation $L_1p_1=w_1$ for $p_1$ by forward substitution. Then we solve the intermediate equation $U_1z_1=p_1$ for $z_1$ by backward substitution.

Since the LU solution method for eqs.(7.53,7.55) is stable if $A=A_0$ or $A=A_1$, the BEC algorithm can be numerically unstable in finite-precision arithmetic only if the divisor $\delta$ is too small. However, if $q=\mathcal{O}(N^2)$, then $\delta=\mathcal{O}(N^{1/2})$ in each case.

$$\delta_0 \sim (2\pi)^{1/2} e^{-i\pi/8} q^{1/4}, \quad (7.64)$$

$$\delta_1 \sim (\pi/2)^{1/2} e^{-i\pi/8} q^{1/4}. \quad (7.65)$$

Hence, if $q=\mathcal{O}(N^2)$, then the BEC algorithm is stable. Each computer solution with the BEC algorithm should be followed by one round of iterative refinement. Solutions of eqs.(7.45,7.49) that are computed this way are accurate to machine precision.

8. Efficient evaluation of Chebyshev interpolation polynomials.

Clenshaw's algorithm is a stable and accurate method to evaluate the Chebyshev interpolation polynomial $$u(\xi) = \sum_{k=0}^{N} u_k T_k(\xi) \quad (8.1)$$

at a single argument $\xi$: $u(\xi)=v_0$ where
 (1) Start: $v_N=u_N$ and $v_{N-1}=u_{N-1}+2\xi u_N$.
 (2) For $k=N-2,\ldots,1$: $v_k=u_k+2\xi v_{k+1}-v_{k+2}$.
 (3) End: $v_0=u_0+\xi v_1-v_2$.

The arithmetic operation count for Clenshaw's algorithm is about 3N per evaluation. If we use this algorithm to evaluate $u(\xi)$ at the N+1 points $$\xi_n = 1-2n/N \text{ for } n=0,\ldots,N, \quad (8.2)$$

then the total operation count for these evaluations is $\mathcal{O}(3N^2)$. There are several alternative algorithms that also perform these evaluations but have total operation counts like $\mathcal{O}(AN \log N)$, where A is a constant. We shall describe an alternative algorithm that is based on Lagrange polynomial interpolation. If N is moderately large, say N>100, then it is more efficient to evaluate $u(\xi)$ at all N+1 points $\xi_n$ with this algorithm than with Clenshaw's algorithm.

If $v(\theta)=u(\cos\theta)$, then N $$v(\theta) = \sum_{k=0}^{N} u_k \cos(k\theta) \text{ for } 0 \le \theta \le \pi. \quad (8.3)$$

Since $\xi_n=\cos\phi_n$ where $$\phi_n = 2\arcsin\{(n/N)^{1/2}\} \text{ for } n=0,\ldots,N, \quad (8.4)$$

evaluating the polynomial $u(\xi)$ at the regularly spaced points $\xi_n$ is equivalent to evaluating $v(\theta)$ at the irregularly spaced points $\phi_n$, which is what the alternative algorithm really does.

The first step of this algorithm is to compute the values of $v(\theta)$ at the regularly spaced points $\theta_j=j\pi/3N$ for $j=0,\ldots,3N$. A very efficient way to do these computations is to pad the spectral coefficients $u_n$ in eq.(8.3) with 2N trailing zeros and then to take a cosine FFT of length 3N. The total operation count in this approach is $\mathcal{O}(15N \log N)$.

Next, let K be a positive integer. We shall discuss some choices for K after the algorithm has been described. The second step of the algorithm is to compute the forward differences of orders up to 2K that are associated with the points $\theta_j$. Let $$\Delta^0 v(\theta_j) = v(\theta_j) \text{ for } j=0,\ldots,3N. \tag{8.5}$$

For $k=1,\ldots,2K$ the forward differences of order k are defined as follows.

$$\Delta^k v(\theta_j) = \Delta^{k-1} v(\theta_{j+1}) - \Delta^{k-1} v(\theta_j) \text{ for } j=0,\ldots,3N-k. \tag{8.6}$$

The operation count for computing all of these differences is $\mathcal{O}(6KN)$. Note, however, that the subtractions in eq.(8.6) can be done in parallel for each k. Therefore, this step could be expedited on an array processor or on a computer that has a hardware implementation of vector arithmetic.

The third step of the algorithm is based on the Gaussian (forward) form of the Lagrange interpolation polynomials of even order. Let $h=\pi/3N$, and let $Q_{2K}(\theta_j+th)$ be the following polynomial in t of degree 2K.

$$Q_{2K}(\theta_j + th) = \tag{8.7}$$
$$v(\theta_j) + t\Delta v(\theta_j) + \frac{1}{2}t(t-1)\Delta^2 v(\theta_{j-1}) + \frac{1}{6}t(t^2-1)\Delta^3 v(\theta_{j-1}) +$$
$$\sum_{k=2}^{K-1} \prod_{l=1}^{k-1}(t^2-l^2)\left[\frac{t(t-k)}{(2k)!}\Delta^{2k} v(\theta_{j-k}) + \frac{t(t^2-k^2)}{(2k+1)!}\Delta^{2k+1} v(\theta_{j-k})\right] +$$
$$\prod_{l=1}^{K-1}(t^2-l^2)\frac{t(t-K)}{(2K)!}\Delta^{2K} v(\theta_{j-K}).$$

Then $$v(\theta_j+th) = Q_{2K}(\theta_j+th) + R_{2K}(\theta_j+th), \tag{8.8}$$

where the remainder $R_{2K}(\theta_j+th)$ can written in the form $$R_{2K}(\theta_j + th) = t\prod_{l=1}^{K}(t^2-l^2)\frac{h^{2K+1}}{(2K+1)!}\frac{\partial^{2K+1}}{\partial \theta^{2K+1}}v(\vartheta) \tag{8.9}$$

for some $\vartheta$ depending on t such that $\theta_{j-K} < \vartheta < \theta_{j+K}$. The polynomial $Q_{2K}(\theta_j+th)$ can be evaluated with about 4K operations as follows.

(1) Start: $q_K = \frac{t-K}{2K}\Delta^{2K} v(\theta_{j-K})$.

(2) For $k = K-1,\ldots,$ $$1: q_k = \frac{t-k}{2k}\left[\Delta^{2k} v(\theta_{j-k}) + \frac{t+k}{2k+1}(\Delta^{2k+1} v(\theta_{j-k}) + q_{k+1})\right].$$

(3) End: $Q_{2K}(\theta_j+th) = v(\theta_j) + t(\Delta v(\theta_j) + q_1)$.

Now for $n=0,\ldots,N$ let $j_n$ be the index j for which the absolute difference $|\phi_n - \theta_j|$ is smallest, and let $t_n = (\phi_n - \theta_{j_n})/h$. Clearly, $$|t_n| \leq \frac{1}{2}.$$

Since $\phi_0 = 0 = \theta_0$ and $\phi_N = \pi = \theta_{3N}$, $v(\phi_0) = v(\theta_0)$ and $v(\phi_N) = v(\theta_{3N})$. If $0 < n < N$, then we use eq.(8.8) to approximate $v(\phi_n)$ as follows.

$$v(\phi_n) = v(\theta_{j_n} + t_n h) \approx Q_{2K}(\theta_{j_n} + t_n h) \text{ for } n=1,\ldots,N-1. \tag{8.10}$$

The total operation count for computing these approximations is about 4KN. Note that in order for thereto be enough sample points $\theta_j$, the increment $h=\pi/3N$ must be small enough that $\phi_1/h > K$. A sufficient condition for there to be enough of these sample points is that $N > (\pi^2/36)K^2$.

Let us estimate the interpolation errors $$R_{2K}(\theta_{j_n}+t_n h) = v(\phi_n) - Q_{2K}(\theta_{j_n}+t_n h) \tag{8.11}$$

in the approximations (8.10). First, we consider the simple cases in which there is just one non-vanishing term in eq.(8.3). Let $0 \leq k \leq N$ and assume that $v(\theta) = \cos(k\theta)$. It can be shown that $$|R_{2K}(\theta_{j_n}+t_n h)| \leq \frac{1}{2}\left(\frac{\pi}{K}\right)^{1/2}\left(\frac{k}{N}\frac{\pi}{6}\right)^{2K+1}[1+O(K^{-1})] \tag{8.12}$$

if $v(\theta) = \cos(k\theta)$.

For fixed k this bound is an exponentially decreasing function of increasing K because $0 \leq k/N \leq 1$. For fixed K this bound is a rapidly decreasing function of decreasing k. Thus, the bound on the interpolation error is greatest if $k=N$. If $K=25$, however, eq.(8.12) implies double-precision accuracy even in this case because $\frac{1}{2}(\pi/25)^{1/2}(\pi/6)^{51} = 0.8 \cdot 10^{-15}$.

In the general case we find that $$|R_{2K}(\theta_{j_n}+t_n h)| \leq \frac{1}{2}\left(\frac{\pi}{K}\right)^{1/2}\sum_{k=1}^{N}|u_k|\left(\frac{k}{N}\frac{\pi}{6}\right)^{2K+1}[1+O(K^{-1})]. \tag{8.13}$$

In practice, the Chebyshev coefficients $u_k$ eventually decrease exponentially in magnitude as the index k increases. Therefore, eq.(8.13) implies that the approximations in eq.(8.10) may have double-precision accuracy if the integer K is slightly less than 25, e.g., $K \approx 20$.

The total operation count for computing all the values $u(\xi_n) = v(\phi_n)$ with the alternative algorithm is $\mathcal{O}(15N \log N + 10K N)$. This should be compared with the total operation count $\mathcal{O}(3N^2)$ for computing these values directly with Clenshaw's algorithm.

9. The decomposition method for transversely unbounded waveguides.

We describe a newly created numerical method for integrating a system of coupled parabolic equations that models one-way propagation of sound in a transversely unbounded waveguide. Referring now to FIG. 3, we assume that sound in the waveguide propagates mainly in the direction of increasing range 30, which is assigned the coordinate x. The waveguide is unbounded in the direction of cross range 32, which is assigned the coordinate y. This discussion is for slab geometry, but the development for spherical geometry is almost identical.

The horizontal variations in the properties of the fluid in this waveguide are confined between vertical planes at $y = \pm W_p$, which are parallel to the direction of propagation. We assume that the fluid in the waveguide was originally in a horizontally stratified state but has been perturbed between these planes. The unperturbed fluid can have an internal horizontal interface that also has been perturbed between the planes. The perturbations are smooth and vanish at the planes. The waveguide remains horizontally stratified in the two semi-infinite sections where $|y| > W_p$.

To make the transverse extent of our problem finite, we put transparent boundaries in the vertical planes at $y = \pm W$, where $W > W_p$. These boundaries have no physical reality.

Sound in the waveguide must penetrate the transparent boundaries without reflection because they are in the semi-infinite horizontally stratified sections of the waveguide.

For simplicity we assume that the reference wavenumbers $k_m$ are positive constants. Thus, the acoustic pressure field is represented by modal amplitudes $\varphi_m$ for $m=1,\ldots,M$ that satisfy the following system of coupled parabolic equations for $x>0$.

$$2ik_m \frac{\partial \varphi_m}{\partial x} + \frac{\partial^2 \varphi_m}{\partial y^2} = (k_m^2 - \xi_m^2)\varphi_m + \sum_{n=1}^{M}\left[(\alpha_{mn} + i\beta_{mn}k_n)\varphi_n + \beta_{mn}\frac{\partial \varphi_n}{\partial x} + \gamma_{mn}\frac{\partial \varphi_n}{\partial y}\right]e^{-i(k_m-k_n)x} \quad (9.1)$$

for $m=1,\ldots,M$. These equations are obtained from eq.(2.8) with $\vartheta_m = k_m x$ for each $m$.

Each modal wavenumber $\xi_m(x,y)$ is constant in the half-planes 34 where $|y|>W_p$, which correspond to the unperturbed horizontally stratified sections of the waveguide. We denote this constant by $\xi_m^{(0)}$. Note that it is the same for $y<-W_p$ as for $y>W_p$. We expect the reference wavenumber $k_m$ to be close to $\xi_m^{(0)}$. In addition, the coupling coefficients $\alpha_{mn}(x,y)$, $\beta_{mn}(x,y)$ and $\gamma_{mn}(x,y)$ vanish for $|y|>W_p$.

Sound enters the waveguide through an aperture 36 in the vertical plane at $x=0$. The aperture is confined between the lines at $y=\pm W_s$ in this plane, where $W_s<W_p$. The acoustic pressure field in this plane is represented by initial conditions on the modal amplitudes of the following form.

$$\varphi_m(0, y) = \begin{cases} S_m(y) & \text{if } |y| < W_s, \\ 0 & \text{if } |y| > W_s. \end{cases} \quad (9.2)$$

Now let us formulate transparent boundary conditions for the modal amplitudes $\varphi_m$ at the transparent boundaries 38 where $y=\pm W$. First, the coupled parabolic equations (9.1) decouple in the half-planes $|y|>W_p$ as follows. For $m=1,\ldots,M$, $$2ik_m \frac{\partial \varphi_m}{\partial x} + \frac{\partial^2 \varphi_m}{\partial y^2} = (k_m^2 - \{\xi_m^{(0)}\}^2)\varphi_m \text{ if } |y| > W_p. \quad (9.3)$$

We bring each of these equations into the form of a standard parabolic equation by defining the following phase-shifted modal amplitudes.

$$\tilde{\varphi}_m = \varphi_m e^{-i\kappa_m x} \text{ for } m=1,\ldots,M, \quad (9.4)$$

where each $\kappa_m$ is a constant. If we let $$\kappa_m = (\{\xi_m^{(0)}\}^2 - k_m^2)/2k_m, \quad (9.5)$$

then $\tilde{\varphi}_m$ satisfies the standard parabolic equation $$2ik_m \frac{\partial \tilde{\varphi}_m}{\partial x} + \frac{\partial^2 \tilde{\varphi}_m}{\partial y^2} = 0 \text{ if } |y| > W_p. \quad (9.6)$$

Since $W>W_p$, outgoing transparent boundary conditions can be imposed on the phase-shifted modal amplitudes at the transparent boundaries $y=\pm W$. For example, we get the following form of these conditions from eqs.(6.2,6.3). For $m=1,\ldots,M$, $$\tilde{\varphi}_m(x, \pm W) = \mp e^{i\pi/4}(2\pi k_m)^{-1/2} \int_0^x \frac{\partial}{\partial y}\tilde{\varphi}_m(u, \pm W)(x-u)^{-1/2} du \text{ for } x > 0. \quad (9.7)$$

Let us reformulate eq.(9.1) in terms of the phase-shifted modal amplitudes.

$$2ik_m \frac{\partial \tilde{\varphi}_m}{\partial x} + \frac{\partial^2 \tilde{\varphi}_m}{\partial y^2} = (\{\xi_m^{(0)}\}^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\tilde{k}_m-\tilde{k}_n)x}, \quad (9.8)$$

where the shifted reference wavenumbers $\tilde{k}_m$ are defined as $$\tilde{k}_m = k_m + \kappa_m = \xi_m^{(0)} + (k_m - \xi_m^{(0)})^2/2k_m \text{ for } m=1,\ldots,M. \quad (9.9)$$

Note that $\tilde{k}_m$ is stationary at $k_m = \xi_m^{(0)}$, where it equals $\xi_m^{(0)}$ as well.

A sufficient condition that the system of coupled parabolic equations (9.1) have a unique solution for a given set of initial conditions (9.2) is that the reference matrix be positive definite and that the transparent boundary conditions (9.7) be satisfied.

Each $\tilde{\varphi}_m$ is the sum of a primary component $\tilde{\varphi}_m^{(1)}$ and a secondary component $\tilde{\varphi}_m^{(2)}$ that are the solutions of the following two problems.

I. Primary component. Let $\tilde{\varphi}_m^{(1)}$ be a solution of the inhomogeneous parabolic equation $$2ik_m \frac{\partial \tilde{\varphi}_m^{(1)}}{\partial x} + \frac{\partial^2 \tilde{\varphi}_m^{(1)}}{\partial y^2} = (\{\xi_m^{(0)}\}^2 - \xi_m^2)\tilde{\varphi}_m + \sum_{n=1}^{M}\left[(\alpha_{mn} + i\beta_{mn}\tilde{k}_n)\tilde{\varphi}_n + \beta_{mn}\frac{\partial \tilde{\varphi}_n}{\partial x} + \gamma_{mn}\frac{\partial \tilde{\varphi}_n}{\partial y}\right]e^{-i(\tilde{k}_m-\tilde{k}_n)x} \quad (9.10)$$

for $x>0$ and $|y|\leq W$ that satisfies the same initial conditions that $\tilde{\varphi}_m$ satisfies, $$\tilde{\varphi}_m^{(1)}(0, y) = \tilde{\varphi}_m(0, y) = \begin{cases} S_m(y) & \text{if } |y| < W_s, \\ 0 & \text{if } |y| > W_s, \end{cases} \quad (9.11)$$

and that is subject to the following Neumann boundary conditions.

$$\frac{\partial}{\partial y}\tilde{\varphi}_m^{(1)}(x, \pm W) = 0 \text{ for } x > 0. \quad (9.12)$$

Conditions (9.11,9.12) are compatible, and the solution $\tilde{\varphi}_m^{(1)}$ of this problem is unique.

II. Secondary component. Let $\tilde{\varphi}_m^{(2)}$ be a solution of the standard parabolic equation $$2ik_m \frac{\partial \tilde{\varphi}_m^{(2)}}{\partial x} + \frac{\partial^2 \tilde{\varphi}_m^{(2)}}{\partial y^2} = 0 \text{ for } x > 0 \text{ and } |y| \leq W \quad (9.13)$$

that satisfies the homogeneous initial condition $$\tilde{\varphi}_m^{(2)}(0,y) = 0 \text{ for } |y| \leq W, \quad (9.14)$$

and that is subject to the following inhomogeneous Neumann boundary conditions.

$$\frac{\partial}{\partial y}\tilde{\varphi}_m^{(2)}(x,\pm W) = \frac{\partial}{\partial y}\tilde{\varphi}_m(x,\pm W) \quad \text{for } x > 0. \tag{9.15}$$

Conditions (9.14, 9.15) are compatible, and the solution $\tilde{\varphi}_m^{(2)}$ of this problem is unique.

It can be shown that $$\tilde{\varphi}_m = \tilde{\varphi}_m^{(1)} + \tilde{\varphi}_m^{(2)} \text{ for m=1, \ldots, M}. \tag{9.16}$$

This identity suggests the following basic decomposition method for finding the phase-shifted modal amplitudes $\tilde{\varphi}_m$. We regard each $\tilde{\varphi}_m$ as an unknown in problems I and II and solve these problems simultaneously for the triples $\{\tilde{\varphi}_m, \tilde{\varphi}_m^{(1)}, \tilde{\varphi}_m^{(2)}\}$ subject to the constraints that $\tilde{\varphi}_m = \tilde{\varphi}_m^{(1)} + \tilde{\varphi}_m^{(2)}$ and that $\tilde{\varphi}_m$ satisfy the transparent boundary conditions (9.7) for m=1, \ldots, M. This approach gives us the freedom to use different techniques for solving problems I and II numerically.

In practice, we solve discrete forms of problems I and II numerically. First, we develop a discrete form of problem I from an exact integral of eq.(9.10). Fix a range increment $\Delta x$ and let $x_j = j\Delta x$ for $j=0,1,\ldots$. Define $$\tilde{\psi}_m^{(1)} = k_m \tilde{\varphi}_m^{(1)} + (i/2) \sum_{n=1}^M \beta_{mn} \tilde{\varphi}_n e^{-i(\bar{\xi}_m - \bar{\xi}_n)x}, \tag{9.17}$$

and $$\tilde{q}_m = \{(\xi_m^{(0)})^2 - \xi_m^2\}\tilde{\varphi}_m + \tag{9.18}$$

$$\sum_{n=1}^M \left[\left(\alpha_{mn} + i\bar{k}_m \beta_{mn} - \frac{\partial \beta_{mn}}{\partial x}\right)\tilde{\varphi}_n + \gamma_{mn}\frac{\partial \tilde{\varphi}_n}{\partial y} + \frac{i}{2k_m}\frac{\partial^2}{\partial y^2}(\beta_{mn}\tilde{\varphi}_n)\right]e^{-i(\bar{\xi}_m - \bar{\xi}_n)x}.$$

We can verify that eq.(9.10) is equivalent to the following equation.

$$2ik_m \frac{\partial \tilde{\psi}_m^{(1)}}{\partial x} + \frac{\partial^2 \tilde{\psi}_m^{(1)}}{\partial y^2} = k_m \tilde{q}_m. \tag{9.19}$$

Note that $$\tilde{\psi}_m^{(1)}(x,y) = k_m \tilde{\varphi}_m^{(1)}(x,y) \text{ and } \tilde{q}_m(x,y) = 0 \text{ if } |y| > W_p \tag{9.20}$$

because $\xi_m = \xi_m^{(0)}$ and the coupling coefficients vanish for $|y| > W_p$. Therefore, $\tilde{\psi}_m^{(1)}(x,y)$ satisfies Neumann boundary conditions like eq.(9.12) at $y = \pm W$, and we can use the Fourier cosine transform $\mathcal{F}$ to integrate eq.(9.19) from $y = -W$ to $y = W$. Next, we use the integrating factor $\exp(i\eta^2 x/2k_m)$, where $\eta$ is the spectral parameter, to integrate the transformed equation from $x = x_j$ to $x = x_{j+1}$. Applying $\mathcal{F}^{-1}$ to the result, we get $$\tilde{\psi}_m^{(1)}(x_{j+1}) = \mathcal{F}^{-1}\{\exp\{-i\eta^2 \Delta x/2k_m\}\mathcal{F} \tilde{\psi}_m^{(1)}(x_j)\} - \tag{9.21}$$

$$(i/2)\int_{x_j}^{x_{j+1}} \mathcal{F}^{-1}(\exp\{-i\eta^2(x_{j+1}-x)/2k_m\}\mathcal{F} \tilde{q}_m(x))\,dx.$$

Now we introduce three numerical approximations in eq.(9.21) that lead to a system of linear equations for the values of $\tilde{\varphi}_m$ at discrete mesh points in the x,y plane. First, we use the trapezoidal rule to approximate the integral on the RHS of this equation. Dropping the $\mathcal{O}((\Delta x)^3)$ remainder in this approximation, we get $$\tilde{\psi}_m^{(1)}(x_{j+1}) + (i\Delta x/4)\tilde{q}_m(x_{j+1}) = \mathcal{F}^{-1}(\exp\{-i\eta^2 \Delta x/2k_m\}\mathcal{F}$$
$$[\tilde{\psi}_m^{(1)}(x_j) - (i\Delta x/4)\tilde{q}_m(x_j)]). \tag{9.22}$$

This equation is inconsistent with eq.(9.19). However, it is consistent with a useful approximation to eq. (9.19), which is to regard $\tilde{\psi}_m^{(1)}$ as a solution of the standard parabolic equation $$2ik_m \frac{\partial \tilde{\psi}_m^{(1)}}{\partial x} + \frac{\partial^2 \tilde{\psi}_m^{(1)}}{\partial y^2} = 0 \tag{9.23}$$

for $|y| \leq W$ over the disjoint open intervals $x_j < x < x_{j+1}$ for $j=0,1,\ldots$ that is subject to the following limit conditions at the range steps $x_j$.

$$\tilde{\psi}_m^{(1)}(x_j \pm 0, y) = \tilde{\psi}_m^{(1)}(x_j, y) \mp (i\Delta x/4)\tilde{q}_m(x_j, y) \text{ for } |y| < W. \tag{9.24}$$

We can use these conditions to write eq.(9.22) as $$\tilde{\psi}_m^{(1)}(x_{j+1} - 0) = \mathcal{F}^{-1}(\exp\{-i\eta^2 \Delta x/2k_m\}\mathcal{F}[\tilde{\psi}_m^{(1)}(x_j + 0)]), \tag{9.25}$$

and we can combine them to get the following identities.

$$\tilde{\psi}_m^{(1)}(x_j, y) = \frac{1}{2}[\tilde{\psi}_m^{(1)}(x_j + 0, y) + \tilde{\psi}_m^{(1)}(x_j - 0, y)], \tag{9.26}$$

$$\tilde{\psi}_m^{(1)}(x_j + 0, y) - \tilde{\psi}_m^{(1)}(x_j - 0, y) = (-i\Delta x/2)\tilde{q}_m(x_j, y). \tag{9.27}$$

Next, we fix a positive integer N, let $\Delta y = 2W/N$ and define the points $y_k = k\Delta y - W$ for $k=0,1,\ldots,N$. Our second approximation is to replace the operators $\mathcal{F}$ and $\mathcal{F}^{-1}$ in eq.(9.22) by the operators $\mathcal{F}_N$ and $\mathcal{F}_N^{-1}$. Since these operators transform sequences to sequences, we must replace the functions $\tilde{\psi}_m^{(1)} \pm (i\Delta x/4)\tilde{q}_m$ in this equation with the sequences of their values at the points $y_k$. Let us write these sequences as $\{\tilde{\psi}_m^{(1)}(y_k) \pm (i\Delta x/4)\tilde{q}_m(y_k)\}_{k=0}^N$. Under these approximations, eq.(9.22) becomes $$\{\tilde{\psi}_m^{(1)}(x_{j+1}, y_k) + (i\Delta x/4)\tilde{q}_m(x_{j+1}, y_k)\}_{k=0}^N$$
$$= \mathcal{F}_N^{-1}(\exp\{-i\eta^2 \Delta x/2k_m\}\mathcal{F}_N\{\tilde{\psi}_m^{(1)}(x_j, y_l) - (i\Delta x/4)\tilde{q}_m$$
$$(x_j, y_l)\}_{l=0}^N \tag{9.28}$$

The spectral parameter $\eta$ in this equation is bounded because $\eta = n\pi/2W$ for $n=0,1,\ldots,N$. Hence, $0 \leq \eta \leq \pi/\Delta y$.

We must approximate the partial derivatives $\partial \tilde{\varphi}_n/\partial y$ and $\partial^2(\beta_{mn}\tilde{\varphi}_n)/\partial y^2$ that appear in eq.(9.18) for $\tilde{q}_m$ before we can evaluate the sequences in eq.(9.28). Since the variable y in this equation is restricted to the uniformly spaced points $y_k$, our third approximation is to replace the partial derivatives at these points with central differences. At the lowest order of approximation, we use the three-point formulas $$\frac{\partial}{\partial y}\tilde{\varphi}_n(y_k) = \frac{1}{2\Delta y}[\tilde{\varphi}_n(y_{k+1}) - \tilde{\varphi}_n(y_{k-1})] + \mathcal{O}((\Delta y)^2), \tag{9.29}$$

$$\frac{\partial^2}{\partial y^2}(\beta_{mn}\tilde{\varphi}_n)(y_k) = \frac{1}{(\Delta y)^2}[(\beta_{mn}\tilde{\varphi}_n)(y_{k+1}) - \tag{9.30}$$
$$2(\beta_{mn}\tilde{\varphi}_n)(y_k) + (\beta_{mn}\tilde{\varphi}_n)(y_{k-1})] + \mathcal{O}((\Delta y)^2).$$

Now we combine these approximations with eq.(9.18). Rearranging terms in the result, we find that $$\tilde{q}_m(y_k) = (\{\xi_m^{(0)}\}^2 - \xi_m^2(y_k))\tilde{\varphi}_m(y_k) + \quad (9.31)$$

$$\sum_{n=1}^{M} \left[ \alpha_{mn}(y_k) + \left( i\tilde{k}_m - \frac{i}{k_m(\Delta y)^2} \right) \beta_{mn}(y_k) - \frac{\partial}{\partial x}\beta_{mn}(y_k) \right]$$

$$e^{-i(\tilde{k}_m - \tilde{k}_n)x} \tilde{\varphi}_n(y_k) +$$

$$\sum_{n=1}^{M} \left( \frac{1}{2\Delta y}\gamma_{mn}(y_k) + \frac{i}{2k_m(\Delta y)^2}\beta_{mn}(y_{k+1}) \right) e^{-i(\tilde{k}_m - \tilde{k}_n)x}\tilde{\varphi}_n(y_{k+1}) +$$

$$\sum_{n=1}^{M} \left( -\frac{1}{2\Delta y}\gamma_{mn}(y_k) + \frac{i}{2k_m(\Delta y)^2}\beta_{mn}(y_{k-1}) \right) e^{-i(\tilde{k}_m - \tilde{k}_n)x}\tilde{\varphi}_n(y_{k-1}) +$$

$$\mathcal{O}((\Delta y)^2).$$

Therefore, neglecting terms of $\mathcal{O}(\Delta x(\Delta y)^2)$, we find that $$\tilde{\psi}_m^{(1)}(x_{j+1}, y_k) + (i\Delta x/4)\tilde{q}_m(x_{j+1}, y_k) = \quad (9.32)$$

$$k_m\tilde{\varphi}_m^{(1)}(x_{j+1}, y_k) + (i\Delta x/4)(\{\xi_m^{(0)}\}^2 - \xi_m^2(x_{j+1}, y_k))\tilde{\varphi}_m(x_{j+1}, y_k) +$$

$$\left( \frac{i}{2} - \frac{\tilde{k}_m \Delta x}{4} + \frac{\Delta x}{4k_m(\Delta y)^2} \right)$$

$$\sum_{n=1}^{M} \beta_{mn}(x_{j+1}, y_k) e^{-i(\tilde{k}_m - \tilde{k}_n)x_{j+1}}\tilde{\varphi}_n(x_{j+1}, y_k) +$$

$$(i\Delta x/4)\sum_{n=1}^{M} \left( \alpha_{mn}(x_{j+1}, y_k) - \frac{\partial}{\partial x}\beta_{mn}(x_{j+1}, y_k) \right)$$

$$e^{-i(\tilde{k}_m - \tilde{k}_n)x_{j+1}}\tilde{\varphi}_n(x_{j+1}, y_k) +$$

$$\sum_{n=1}^{M} \left( \frac{i\Delta x}{8\Delta y}\gamma_{mn}(x_{j+1}, y_k) - \frac{\Delta x}{8k_m(\Delta y)^2}\beta_{mn}(x_{j+1}, y_{k+1}) \right)$$

$$e^{-i(\tilde{k}_m - \tilde{k}_n)x_{j+1}}\tilde{\varphi}_n(x_{j+1}, y_{k+1}) +$$

$$\sum_{n=1}^{M} \left( -\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1}) \right)$$

$$e^{-i(\tilde{k}_m - \tilde{k}_n)x_{j+1}}\tilde{\varphi}_n(x_{j+1}, y_{k-1}).$$

Next, we use the constraint that $\tilde{\varphi}_m = \tilde{\varphi}_m^{(1)} + \tilde{\varphi}_m^{(2)}$ to replace the term $k_m\tilde{\varphi}_m^{(1)}(x_{j+1},y_k)$ on the RHS of eq.(9.32) with $k_m\tilde{\varphi}_m(x_{j+1},y_k)$ by adding $k_m\tilde{\varphi}_m^{(2)}(x_{j+1},y_k)$ to each side of this equation. Thus, $$\tilde{\psi}_m^{(1)}(x_{j+1},y_k)+(i\Delta x/4)\tilde{q}_m(x_{j+1},y_k)=\tilde{\Psi}_m(x_{j+1}-0,y_k)-k_m\tilde{\varphi}_m^{(2)}(x_{j+1},y_k) \quad (9.33)$$

where $$\Psi_m(x_{j+1}-0, y_k) = \left[ k_m + (i\Delta x/4)(\{\xi_m^{(0)}\}^2 - \xi_m^2(x_{j+1}, y_k)) \right] \quad (9.34)$$

$$\tilde{\varphi}_m(x_{j+1}, y_k) + \left( \frac{i}{2} - \frac{\tilde{k}_m\Delta x}{4} + \frac{\Delta x}{4k_m(\Delta y)^2} \right)$$

$$\sum_{n=1}^{M} \beta_{mn}(x_{j+1}, y_k) e^{-i(\tilde{k}_m - \tilde{k}_n)x_{j+1}}\tilde{\varphi}_n(x_{j+1}, y_k) +$$

$$(i\Delta x/4)\sum_{n=1}^{M} \left( \alpha_{mn}(x_{j+1}, y_k) - \frac{\partial}{\partial x}\beta_{mn}(x_{j+1}, y_k) \right)$$

$$e^{-i(\tilde{k}_m - \tilde{k}_n)x_{j+1}}\tilde{\varphi}_n(x_{j+1}, y_k) +$$

$$\sum_{n=1}^{M} \left( \frac{i\Delta x}{8\Delta y}\gamma_{mn}(x_{j+1}, y_k) - \frac{\Delta x}{8k_m(\Delta y)^2}\beta_{mn}(x_{j+1}, y_{k+1}) \right)$$

$$e^{-i(\tilde{k}_m - \tilde{k}_n)x_{j+1}}\tilde{\varphi}_n(x_{j+1}, y_{k+1}) +$$

$$\sum_{n=1}^{M} \left( -\frac{i\Delta x}{8\Delta y}\gamma_{mn}(x_{j+1}, y_k) - \frac{\Delta x}{8k_m(\Delta y)^2}\beta_{mn}(x_{j+1}, y_{k-1}) \right)$$

$$e^{-i(\tilde{k}_m - \tilde{k}_n)x_{j+1}}\tilde{\varphi}_n(x_{j+1}, y_{k-1}).$$

Similarly, and to the same order of approximation, $$\tilde{\psi}_m^{(1)}(x_j, y_l) - (i\Delta x/4)\tilde{q}_m(x_j, y_l) = \tilde{\Psi}_m(x_j+0, y_l) - k_m\tilde{\varphi}_m^{(2)}(x_j, y_l) \quad (9.35)$$

where $$\Psi_m(x_j + 0, y_l) = \left[ k_m - (i\Delta x/4)(\{\xi_m^{(0)}\}^2 - \xi_m^2(x_j, y_l)) \right]\tilde{\varphi}_m(x_j, y_l) + \quad (9.36)$$

$$\left( \frac{i}{2} + \frac{\tilde{k}_m\Delta x}{4} - \frac{\Delta x}{4k_m(\Delta y)^2} \right)\sum_{n=1}^{M} \beta_{mn}(x_j, y_l)e^{-i(\tilde{k}_m - \tilde{k}_n)x_j}\tilde{\varphi}_n(x_j, y_l) -$$

$$(i\Delta x/4)$$

$$\sum_{n=1}^{M} \left( \alpha_{mn}(x_j, y_l) - \frac{\partial}{\partial x}\beta_{mn}(x_j, y_l) \right)e^{-i(\tilde{k}_m - \tilde{k}_n)x_j}\tilde{\varphi}_n(x_j, y_l) +$$

$$\sum_{n=1}^{M} \left( -\frac{i\Delta x}{8\Delta y}\gamma_{mn}(x_j, y_l) + \frac{\Delta x}{8k_m(\Delta y)^2}\beta_{mn}(x_j, y_{l+1}) \right)$$

$$e^{-i(\tilde{k}_m - \tilde{k}_n)x_j}\tilde{\varphi}_n(x_j, y_{l+1}) +$$

$$\sum_{n=1}^{M} \left( \frac{i\Delta x}{8\Delta y}\gamma_{mn}(x_j, y_l) + \frac{\Delta x}{8k_m(\Delta y)^2}\beta_{mn}(x_j, y_{l-1}) \right)$$

$$e^{-i(\tilde{k}_m - \tilde{k}_n)x_j}\tilde{\varphi}_n(x_j, y_{l-1}).$$

We shall assume that $\Delta y < W - W_p$. Under this assumption the coupling coefficients $\alpha_{mn}(x,y_k)$, $\beta_{mn}(x,y_k)$ and $\gamma_{mn}(x,y_k)$ vanish for $x>0$ and $k=1, N-1$. This eliminates the boundary values $\tilde{\varphi}_m(x_{j+1},\pm W)$ from the RHS of eq.(9.34), which makes it possible for us to find the internal values $\tilde{\varphi}_m(x_{j+1}, y_k)$ $(k=1, \ldots, N-1)$ from this equation. Let us combine eqs.(9.28, 9.33, 9.35) as follows.

$$\{\tilde{\Psi}_m(x_{j+1}-0,y_k)-k_m\tilde{\varphi}_m^{(2)}(x_{j+1},y_k)\}_{k=0}^{N}$$

$$=\mathcal{F}_N^{-1}(\exp\{-i\eta^2\Delta x/2k_m\}\mathcal{F}_N\{\tilde{\Psi}_m(x_j+0,y_l)-k_m\tilde{\varphi}_m^{(2)}(x_j,y_l)\}_{l=0}^{N}). \quad (9.37)$$

If the values $\tilde{\varphi}_m^{(2)}(x_{j+1},y_k)(k=1,\ldots,N-1)$ at the range step $x_{j+1}$ are known, then eqs.(9.34, 9.37) determine a system of linear equations for the values $\tilde{\varphi}_m(x_{j+1},y_k)(k=1,\ldots,N-1)$ at the range step $x_{j+1}$. Let us put these equations in matrix form. First, define the column vectors $$\tilde{\varphi}_k = [\tilde{\varphi}_1(x_{j+1},y_k),\ldots,\tilde{\varphi}_M(x_{j+1},y_k)]^T \quad (9.38)$$

$$\tilde{\Psi}_k^- = [\tilde{\Psi}_1(x_{j+1}-0,y_k),\ldots,\tilde{\Psi}_M(x_{j+1}-0,y_k)]^T, \quad (9.39)$$

for $k=1,\ldots,N-1$. Next, define the M×M matrices $\mathbf{A}_{kk}$ and $\mathbf{A}_{kk\pm1}$ as follows.

$$(A_{kk})_{mn} = \begin{cases} k_n + (i\Delta x/4)(\{\xi_n^{(0)}\}^2 - \xi_n^2(x_{j+1}, y_k)) + & \text{(if } m=n\text{)} \\ \quad \alpha_{mn}(x_{j+1}, y_k)), & \\ \left[ \left( \frac{i}{2} - \frac{\tilde{k}_m\Delta x}{4} + \frac{\Delta x}{4k_m(\Delta y)^2} \right)\beta_{mn}(x_{j+1}, y_k) + & \text{(if } m \neq n\text{)} \\ (i\Delta x/4)\left( \alpha_{mn}(x_{j+1}, y_k) - \frac{\partial}{\partial x}\beta_{mn}(x_{j+1}, y_k) \right) \right] & \\ e^{-i(\tilde{k}_m - \tilde{k}_n)x_{j+1}}, & \end{cases} \quad (9.40)$$

$$(A_{kk\pm 1})_{mn} = \qquad (9.41)$$

$$\left(\pm \frac{i\Delta x}{8\Delta y}\gamma_{mn}(x_{j+1}, y_k) - \frac{\Delta x}{8k_m(\Delta y)^2}\beta_{mn}(x_{j+1}, y_{k\pm 1})\right)e^{-i(\tilde{k}_m - \tilde{k}_n)x_{j+1}}.$$

The assumption that $\Delta y < W - W_p$ eliminates the boundary values $\tilde{\varphi}_m(x_{j+1}, \pm W)$ from the RHS of eq.(9.34). Thus, it follows from this equation that $$\begin{bmatrix} A_{11} & A_{12} & & & \\ A_{21} & A_{22} & A_{23} & & \\ & \ddots & \ddots & \ddots & \\ & & A_{N-2\,N-3} & A_{N-2\,N-2} & A_{N-2\,N-1} \\ & & & A_{N-1\,N-2} & A_{N-1\,N-1} \end{bmatrix} \cdot \begin{bmatrix} \tilde{\varphi}_1 \\ \tilde{\varphi}_2 \\ \vdots \\ \tilde{\varphi}_{N-2} \\ \tilde{\varphi}_{N-1} \end{bmatrix} = \begin{bmatrix} \tilde{\Psi}_1^- \\ \tilde{\Psi}_2^- \\ \vdots \\ \tilde{\Psi}_{N-2}^- \\ \tilde{\Psi}_{N-1}^- \end{bmatrix}. \qquad (9.42)$$

If we use eq.(9.37) and the values $\tilde{\varphi}_m^{(2)}(x_{j+1}, y_k)$ ($k=1, \ldots, N-1$) to evaluate the vectors $\tilde{\Psi}_k^-$ on the RHS of this equation, then we can solve it for the internal solution vectors $\tilde{\varphi}_k$.

We can solve eq.(9.42) numerically by Gaussian elimination with partial pivoting (GEPP) followed by one round of iterative refinement. The block tri-diagonal system matrix on the LHS of eq.(9.42) is also a band matrix of order $M(N-1)$ that has $2M-1$ lower diagonals and $2M-1$ upper diagonals. Since $M \ll N$ in practice, it is most efficient to do the GEPP computations with subroutines that take advantage of band storage.

The system matrix on the LHS of eq. (9.42) is nonsingular if it is strictly diagonally dominant by columns. We see from eqs.(9.40, 9.41) that this condition requires the following strict inequalities to be satisfied for the block indices $k = 1, \ldots, N-1$:

$$\left|k_n + (i\Delta x/4)\left(\{\xi_n^{(0)}\}^2 - \xi_n^2(x_{j+1}, y_k) + \alpha_{nn}(x_{j+1}, y_k)\right)\right| > \qquad (9.43)$$

$$\sum_{\substack{m=1 \\ (m\neq n)}}^M \left|\left(\frac{i}{2} - \frac{\tilde{k}_m\Delta x}{4} + \frac{\Delta x}{4k_m(\Delta y)^2}\right)\beta_{mn}(x_{j+1}, y_k) + \right.$$

$$\left. (i\Delta x/4)\left(\alpha_{mn}(x_{j+1}, y_k) - \frac{\partial}{\partial x}\beta_{mn}(x_{j+1}, y_k)\right)\right| +$$

$$\sum_{m=1}^M \left|\frac{i\Delta x}{8\Delta y}\gamma_{mn}(x_{j-1}, y_{k-1}) - \frac{\Delta x}{8k_m(\Delta y)^2}\beta_{mn}(x_{j+1}, y_k)\right| +$$

$$\sum_{m=1}^M \left|-\frac{i\Delta x}{8\Delta y}\gamma_{mn}(x_{j+1}, y_{k+1}) - \frac{\Delta x}{8k_m(\Delta y)^2}\beta_{mn}(x_{j+1}, y_k)\right|$$

$$\text{for } n = 1, \ldots, M.$$

If this condition is satisfied, then Gaussian elimination requires no pivoting and is stable.

Note the factors $\tilde{k}_m\Delta x$, $\Delta x/\Delta y$ and $\Delta x/k_m(\Delta y)^2$ that appear in this equation. We recommend choosing the increments $\Delta x$ and $\Delta y$ so that $k_m\Delta x \leq \mathcal{O}(1)$ and $k_m\Delta y \geq \mathcal{O}(1)$. These restrictions imply that the ratios $\Delta x/\Delta y$ and $\Delta x/k_m(\Delta y)^2$ are at most $\mathcal{O}(1)$.

If $\Delta y < W - W_p$, then we can find the boundary values $\tilde{\varphi}_m^{(1)}(x_{j+1}, \pm W)$ of the primary component from eq.(9.37) without the values $\tilde{\varphi}_m^{(2)}(x_{j+1}, y_k)$. In this case, it follows from eq.(9.32) that $\tilde{\psi}_m^{(1)}(x_{j+1}, \pm W) + (i\Delta x/4)\tilde{q}_m(x_{j+1}, \pm W) = k_m\tilde{\varphi}_m^{(1)}(x_{j+1}, \pm W)$. Thus, eqs.(9.33, 9.37) imply that $$k_m\tilde{\varphi}_m^{(1)}(x_{j+1}, \pm W) = \qquad (9.44)$$

$$\mathcal{F}_N^{-1}\left(\exp\{-i\eta^2\Delta x/2k_m\}\mathcal{F}_N\{\Psi_m(x_j + 0, y_l) - k_m\tilde{\varphi}_m^{(2)}(x_j, y_l)\}_{l=0}^N\right)\bigg|_{(y_k=\pm W)}.$$

Note that it is not necessary to compute the whole inverse DFT to evaluate the RHS of this equation because we need only the values from the inverse DFT at the endpoints $y_k = \pm W$.

This completes our development of the discrete form of problem I and the method for solving it. Next, we develop a discrete form of problem II. We begin by integrating eq.(9.13) from $x=x_j$ to $x=x_{j+1}$ with the trapezoidal rule. Dropping the $\mathcal{O}((\Delta x)^3)$ remainder in this approximation, we get the semi-discrete parabolic equation $$\tilde{\varphi}_m^{(2)}(x_{j+1}, y) - \tilde{\varphi}_m^{(2)}(x_j, y) = \qquad (9.45)$$

$$(i\Delta x/4k_m)\left[\frac{\partial^2}{\partial y^2}\tilde{\varphi}_m^{(2)}(x_j, y) + \frac{\partial^2}{\partial y^2}\tilde{\varphi}_m^{(2)}(x_{j+1}, y)\right] \text{ for } |y| \leq W.$$

We adopt conditions (9.14, 9.15) without change. In particular, we require that the inhomogeneous Neumann boundary conditions (9.15) be satisfied at each range step.

$$\frac{\partial}{\partial y}\tilde{\varphi}_m^{(2)}(x_{j+1}, \pm W) = \frac{\partial}{\partial y}\tilde{\varphi}_m(x_{j+1}, \pm W). \qquad (9.46)$$

In order to formulate transparent boundary conditions for the discretized amplitude $\tilde{\varphi}_m$, we assume that it satisfies the semi-discrete parabolic equation that corresponds to eq. (9.6).

$$\tilde{\varphi}_m(x_{j+1}, y) - \tilde{\varphi}_m(x_j, y) = \qquad (9.47)$$

$$(i\Delta x/4k_m)\left[\frac{\partial^2}{\partial y^2}\tilde{\varphi}_m(x_j, y) + \frac{\partial^2}{\partial y^2}\tilde{\varphi}_m(x_{j+1}, y)\right] \text{ for } |y| > W_p.$$

Under this assumption, the discretized amplitude $\tilde{\varphi}_m$ satisfies discrete transparent boundary conditions like eq.(6.31). We can adapt the algorithm described by eqs.(6.26–6.30) to formulate these conditions as follows.

$$\tilde{\varphi}_m(x_{j+1}, \pm W) \pm \frac{1}{p_m}\frac{\partial}{\partial y}\tilde{\varphi}_m(x_{j+1}, \pm W) = \qquad (9.48)$$

$$2p_m\sum_{k=0}^j (-1)^{j-k}a_{k+1,m}^k(\pm W) \text{ for } j = 0, 1, \ldots,$$

where $$p_m = e^{-i\pi/4}2(k_m/\Delta x)^{1/2} \qquad (9.49)$$

and the coefficients $a_{k+1,m}^k(\pm W)$ are computed recursively. First, $a_{1,m}^0(\pm W) = 0$. Second, for $j = 1, 2, \ldots,$ $$a_{k,m}^j(\pm W) = -\frac{1}{2}a_{k,m}^{j-1}(\pm W) - \frac{1}{2}a_{k-2,m}^{j-1}(\pm W), \qquad (9.50)$$

$$\text{for } k = 1, \ldots, j-1,$$
$$\text{\small Skip this when } j=1.$$

-continued $$a_{j,m}^j(\pm W) = \pm \frac{1}{2} p_m^{-2} \left[ \frac{\partial}{\partial y} \tilde{\varphi}_m(x_{j-1}, \pm W) \right. \tag{9.51}$$
$$\left. + \frac{\partial}{\partial y} \tilde{\varphi}_m(x_j, \pm W) \right] -$$
$$a_{j,m}^{j-1}(\pm W) - \frac{1}{2} a_{j-2,m}^{j-1}(\pm W),$$

$$a_{j-1,m}^j(\pm W) = \mp \frac{1}{2} p_m^{-2} \left[ \frac{\partial}{\partial y} \tilde{\varphi}_m(x_{j-1}, \pm W) + \right. \tag{9.52}$$
$$\left. \frac{\partial}{\partial y} \tilde{\varphi}_m(x_j, \pm W) \right] -$$
$$\frac{1}{2} a_{j-1,m}^{j-1}(\pm W),$$

where $$a_{-1,m}^j(\pm W) = 0, \; a_{0,m}^j(\pm W) = 0 \text{ for } j = 0, 1, \ldots \tag{9.53}$$

Now we combine the constraints $\tilde{\varphi}_m(x_{j+1}, \pm W) = \tilde{\varphi}_m^{(1)}(x_{j+1}, \pm W) + \tilde{\varphi}_m^{(2)}(x_{j+1}, \pm W)$ and eq.(9.46) with eq. (9.48) to develop new boundary conditions for $\tilde{\varphi}_m^{(2)}$. Note that the boundary values of the primary component $\tilde{\varphi}_m^{(1)}$ appear as source terms in these conditions.

$$\tilde{\varphi}_m^{(2)}(x_{j+1}, \pm W) \pm \frac{1}{p_m} \frac{\partial}{\partial y} \tilde{\varphi}_m^{(2)}(x_{j+1}, \pm W) = \tag{9.54}$$
$$-\tilde{\varphi}_m^{(1)}(x_{j+1}, \pm W) + 2p_m \sum_{k=0}^{j} (-1)^{j-k} \alpha_{k+1,m}^k(\pm W) \text{ for } j = 0, 1, \ldots.$$

We also combine condition (9.46) with recursion formulas (9.51, 9.52) to reformulate them in terms of $\tilde{\varphi}_m^{(2)}$.

$$a_{j,m}^j(\pm W) = \pm \frac{1}{2} p_m^{-2} \left[ \frac{\partial}{\partial y} \tilde{\varphi}_m^{(2)}(x_{j-1}, \pm W) + \right. \tag{9.55}$$
$$\left. \frac{\partial}{\partial y} \tilde{\varphi}_m^{(2)}(x_j, \pm W) \right] -$$
$$a_{j,m}^{j-1}(\pm W) - \frac{1}{2} a_{j-2,m}^{j-1}(\pm W),$$

$$a_{j+1,m}^j(\pm W) = \mp \frac{1}{2} p_m^{-2} \left[ \frac{\partial}{\partial y} \tilde{\varphi}_m^{(2)}(x_{j-1}, \pm W) + \right. \tag{9.56}$$
$$\left. \frac{\partial}{\partial y} \tilde{\varphi}_m^{(2)}(x_j, \pm W) \right] -$$
$$\frac{1}{2} a_{j-1,m}^{j-1}(\pm W).$$

Therefore, in principle the discrete form of problem II consists of (1) the semi-discrete parabolic equation (9.45), subject to
(2) the initial condition (9.14), and
(3) the boundary conditions (9.54), with
(4) the recursion formulas (9.50, 9.53, 9.55, 9.56).

However, in practice we would use the fixed-length truncated algorithm described by eqs.(6.72–6.76) to evaluate the boundary conditions for this problem. Let $L_J$ denote the length of the algorithm, which could be chosen according to criterion. (6.82) for calculations in double-precision arithmetic. First, we use eq.(6.78) to modify the boundary conditions (9.54) as follows.

$$\tilde{\varphi}_m^{(2)}(x_{j+1}, \pm W) \pm \frac{1}{p_m} \frac{\partial}{\partial y} \tilde{\varphi}_m^{(2)}(x_{j+1}, \pm W) = \tag{9.57}$$
$$-\tilde{\varphi}_m^{(1)}(x_{j+1}, \pm W) + 2p_m \sum_{k=0}^{j} (-1)^{j-k} \alpha_{L_j,m}^k(\pm W) \text{ for } j = 0, 1, \ldots.$$

Second, we use eqs.(6.72–6.76) to replace eqs.(9.50, 9.53, 9.55, 9.56) with the following recursion equations for the coefficients $\alpha_{L,m}^k(\pm W)$.

$$\alpha_{l,m}^j(\pm W) = -\frac{1}{2} \alpha_{l+1,m}^{j-1}(\pm W) - \frac{1}{2} \alpha_{l-1,m}^{j-1}(\pm W) \tag{9.58}$$
$$\text{for } l = 1, \ldots, L_j - 2,$$

$$\alpha_{L_j-1,m}^j(\pm W) = \pm \frac{1}{2} p_m^{-2} \left[ \frac{\partial}{\partial y} \tilde{\varphi}_m^{(2)}(x_{j-1}, \pm W) + \right. \tag{9.59}$$
$$\left. \frac{\partial}{\partial y} \tilde{\varphi}_m^{(2)}(x_j, \pm W) \right] -$$
$$\alpha_{L_j,m}^{j-1}(\pm W) - \frac{1}{2} \alpha_{L_j-2,m}^{j-1}(\pm W),$$

$$\alpha_{L_j,m}^j(\pm W) = \mp \frac{1}{2} p_m^{-2} \left[ \frac{\partial}{\partial y} \tilde{\varphi}_m^{(2)}(x_{j-1}, \pm W) + \right. \tag{9.60}$$
$$\left. \frac{\partial}{\partial y} \tilde{\varphi}_m^{(2)}(x_j, \pm W) \right] -$$
$$\frac{1}{2} \alpha_{L_j-1,m}^{j-1}(\pm W),$$

where $$\alpha_{l,m}^0(\pm W) = 0 \text{ for } l = 1, \ldots, L_J, \; \alpha_{0,m}^j(\pm W) = 0 \text{ for } j = 0, 1, \ldots \tag{9.61}$$

This completes the development of the discrete form of problem II. A sufficient condition for it to be stable is that $$\frac{\Delta x}{k_0 (\Delta y)^2} < \frac{2}{\pi}, \tag{9.62}$$

where $k_0 = \min k_m (m=1, \ldots, M)$. Numerical integration of eq.(9.45) can introduce numerical artifacts in the solutions of the discrete form of problem II. However, these artifacts will be suppressed if the spatial frequency limit of the integration method does not exceed the following bound.

$$\lambda_c = 3^{-1/4} 2 (k_0/\Delta x)^{1/2}. \tag{9.63}$$

This criterion imposes a simple constraint on the N-th order Chebyshev tau integration method. Since the spatial frequency limit of the N-th order Chebyshev tau integration method is $2/\Delta y$, this limit is less than $\lambda_c$ if $$\frac{\Delta x}{k_0 (\Delta y)^2} < 3^{-1/2}. \tag{9.64}$$

This condition is only slightly more restrictive than condition (9.62).

Referring now to FIG. 4, we outline the operation of the preferred embodiment. We begin the process in block 40 by computing the modal wavenumbers and the coupling coefficients at the mesh points $(x_j, y_k)(k=0, 1, \ldots, N)$ from environmental data. They can be computed for all $j = 0, 1, \ldots$ and stored for subsequent use or computed as needed, beginning at $j=0$. In block 42 we select the initial values $\tilde{\varphi}_m(x_0,y_k)$ (j=0 and k=0,1, ... ,N) for the source field in the waveguide at the plane $x=x_0$. Now we go to block 44. This block is the start of the general cycle of steps for solving problems I and II simultaneously. We must compute the values $\tilde{\varphi}_m(x_{j+1},y_k)$ and $\tilde{\varphi}_m^{(2)}(x_{j+1},y_k)$ for m=1, ... ,M and k=0,1, ... ,N at an arbitrary range step $x_{j+1}$ from the values $\tilde{\varphi}_m(x_j,y_l)$ and $\tilde{\varphi}_m^{(2)}(x_j,y_l)$ for m=1, ... ,M and l=0,1, ... ,N at the preceding range step $x_j$.

(1) In block 46, for each m we compute the boundary values $\tilde{\varphi}_m^{(1)}(x_{j+1},\pm W)$ of the primary component from eq. (9.44). These values are used in the next step.

(2) In block 48, for each m we integrate the semi-discrete parabolic equation (9.45) subject to the boundary conditions (9.57), which we evaluate with eqs.(9.58–9.61). We use the Chebyshev tau method to do the integration numerically. This method transforms the integration to an algebraic problem for the Chebyshev coefficients of $\tilde{\varphi}_m^{(2)}(x_{j+1},y)$ that we solve with the BEC algorithm. It is then necessary to compute the values $\tilde{\varphi}_m^{(2)}(x_{j+1},y_k)$ for k=0,1, ... ,N from these coefficients. Depending on the size of N, we use either Clenshaw's algorithm or an alternative algorithm to compute them. We use the internal values $\tilde{\varphi}_m^{(2)}(x_{j+1},y_k)$ (k=1,...,N−1) in the next step. We compute the differential boundary values $\partial \tilde{\varphi}_m^{(2)}(x_{j+1},\pm W)/\partial y$ and save them for use by eqs.(9.59,9.60) at the following two range steps, $x_{j+2}$ and $x_{j+3}$. Having found $\tilde{\varphi}_m^{(1)}(x_{j+1},\pm W)$ in the previous step and $\tilde{\varphi}_m^{(2)}(x_{j+1},\pm W)$ in the present step, we compute the boundary values $\tilde{\varphi}_m(x_{j+1},\pm W)$ from the constraints that $\tilde{\varphi}_m(x_{j+1},\pm W)=\tilde{\varphi}_m^{(1)}(x_{j+1},\pm W)+\tilde{\varphi}_m^{(2)}(x_{j+1},\pm W)$.

(3) In block 50, we solve eq.(9.42) numerically by GEPP for the internal values $\tilde{\varphi}_m(x_{j+1},y_k)$ (k=1, ... ,N−1). This completes the general cycle of steps for solving problems I and II.

In block 52 we use the modal amplitudes to evaluate the eigenfunction expansion of the complex pressure at desired depths in the waveguide at range $x_{j+1}$ and cross ranges $y_k$ (k=0,1, ... ,N). We predict the physical acoustic pressure from these computations. Finally, we increase j to j+1 in block 54 and return to block 44 for the next cycle of computations. This completes the outline.

The discretized solutions $\tilde{\varphi}_m$ turn out to be inaccurate at very large range from the source due to small inaccuracies in the discretized solutions $\tilde{\varphi}_m^{(2)}$. However, an extrapolation method can be applied to the discretized solutions $\tilde{\varphi}_m^{(2)}$ to compensate for the inaccuracies in them under conditions of practical interest. Before describing this method, let us modify the notation for these solutions to indicate their dependence on the increment $\Delta x$.

$$\tilde{\varphi}_m^{(2)}(x_j,y) \to \tilde{\varphi}_m^{(2)}(x_j,y;\Delta x) \quad (9.65)$$

A simple way to improve the accuracy of these approximations is to reduce the step size $\Delta x$. Since they are even functions of $\Delta x$, it is efficient to combine this approach with Richardson extrapolation.

We shall discuss a procedure that uses Richardson extrapolation to estimate $\tilde{\varphi}_m^{(2)}(x_{j+1},y)$ from the computed values of $\tilde{\varphi}_m^{(2)}(x_{j+1},y;\Delta x/\nu)$ for $\nu=1,2,3,4$ if $\Delta x=\mathcal{O}(\pi/k_0)$. First, we introduce some new notation. Define the interpolated range steps $x_\mu^{(\nu)}$ as follows.

$$x_\mu^{(\nu)}=\mu \Delta x/\nu \text{ for } \mu=1,2,\ldots \text{ and } \nu=1,2,\ldots \quad (9.66)$$

Note that $x_{\nu j}^{(\nu)}=x_j$ for all j and $\nu$.

The procedure requires that the discrete form of problem II be solved four times over each interval $x_j \le x \le x_{j+1}$ using fractional steps $\Delta x/\nu$ for $\nu=1,2,3,4$. For each $\nu$ we must replace $\Delta x$ in eqs.(9.45,9.49) with $\Delta x/\nu$ and solve this problem at the interpolated range steps $x_{\nu j+\mu}^{(\nu)}$ for $\mu=1,\ldots,\nu$. If we use the Chebyshev tau method to do the cross range integration in eq.(9.45), then we can do these calculations in terms of the Chebyshev expansion coefficients of the solutions $\tilde{\varphi}_m^{(2)}(x_{\nu j+\mu}^{(\nu)},y;\Delta x/\nu)$ without having to evaluate the solutions at any cross range y. These solutions require ten times as much work to compute as $\tilde{\varphi}_m^{(2)}(x_{j+1},y;\Delta x)$ alone, but this computational expense can be justified by the great increase in range over which the extrapolated solutions are accurate.

We denote these estimates by $\mathfrak{R}_{\Delta x}^{(4)} \circ \tilde{\varphi}_m^{(2)}(x_{j+1},y)$. They are computed as follows.

$$\mathfrak{R}_{\Delta x}^{(4)} \circ \tilde{\varphi}_m^{(2)}(x_{j+1},y)=[8192\tilde{\varphi}_m^{(2)}(x_{j+1},y;\Delta x/4)-6561\tilde{\varphi}_m^{(2)}(x_{j+1},y;\Delta x/3)$$
$$+896\tilde{\varphi}_m^{(2)}(x_{j+1},y;\Delta x/2)-7\tilde{\varphi}_m^{(2)}(x_{j+1},y;\Delta x)]/2520 \quad (9.67)$$

In the modified solution method $\tilde{\varphi}_m^{(2)}$ is replaced by $\mathfrak{R}_{\Delta x}^{(4)} \circ \tilde{\varphi}_m^{(2)}$. Thus, we use the modified solution method to find the values $\tilde{\varphi}_m(x_{j+1},y_k)$ and the extrapolates $\mathfrak{R}_{\Delta x}^{(4)} \circ \tilde{\varphi}_m^{(2)}(x_{j+1},y_k)$ for m=1, ... ,M and k=0,1, ... ,N from the values $\tilde{\varphi}_m(x_j,y_l)$ and from the extrapolates $\mathfrak{R}_{\Delta x}^{(4)} \circ \tilde{\varphi}_m^{(2)}(x_j,y_l)$ for m=1, ... ,M and l=0,1, ... ,N. These quantities are related by eq. (9.37) after we have replaced $\tilde{\varphi}_m^{(2)}$ with $\mathfrak{R}_{\Delta x}^{(4)} \circ \tilde{\varphi}_m^{(2)}$ in it.

$$\{\tilde{\Psi}_m(x_{j+1}-0,y_k)-k_m \mathfrak{R}_{\Delta x}^{(4)} \circ \tilde{\varphi}_m^{(2)}(x_{j+1},y_k)\}_{k=0}^N$$
$$=\mathfrak{F}_N^{-1}(\exp\{-i\eta^2 \Delta x/2k_m\}\mathfrak{F}_N\{\tilde{\Psi}_m(x_j+0,y_l)-k_m \mathfrak{R}_{\Delta x}^{(4)} \circ \tilde{\varphi}_m^{(2)}(x_j,y_l)\}_{l=0}^N). \quad (9.68)$$

We also need the boundary values $\tilde{\varphi}_m^{(1)}(x_{\nu j+\mu}^{(\nu)},\pm W)$ at the interpolated range steps to evaluate the boundary conditions that are satisfied by the solutions $\tilde{\varphi}_m^{(2)}(x_{\nu j+\mu}^{(\nu)},y;\Delta x/\nu)$. We compute them by replacing $\Delta x$ with $\mu \Delta x/\nu$ in eq.(9.44). Thus, for $\mu=1,\ldots,\nu$, $$k_m \tilde{\varphi}_m^{(1)}(x_{\nu j+\mu}^{(\nu)},\pm W)\Big|_{(y_k=\pm W)} = \mathfrak{F}_N^{-1}(\exp\{-i\eta^2 \mu \Delta x/\nu 2k_m\} \quad (9.69)$$
$$\mathfrak{F}_N\{\Psi_m(x_j+0,y_l)-$$
$$k_m \mathfrak{R}_{\Delta x}^{(4)} \circ \tilde{\varphi}_m^{(2)}(x_j,y_l)\}_{l=0}^N).$$

Note that it is not necessary to compute the whole inverse DFT to evaluate the RHS of this equation because we need only the values from the inverse DFT at the endpoints $y_k=\pm W$.

In medium range applications. the lower order Richardson extrapolates $$\mathfrak{R}_{\Delta x}^{(2)} \circ \tilde{\varphi}_m^{(2)}(x_{j+1},y)=[4\tilde{\varphi}_m^{(2)}(x_{j+1},y;\Delta x/2)-\tilde{\varphi}_m^{(2)}(x_{j+1},y;\Delta x)]/3, \quad (9.70)$$

$$\mathfrak{R}_{\Delta x}^{(3)} \circ \tilde{\varphi}_m^{(2)}(x_{j+1},y)=[243\tilde{\varphi}_m^{(2)}(x_{j+1},y;\Delta x/3)-128\tilde{\varphi}_m^{(2)}(x_{j+1},y;\Delta x/2)+5\tilde{\varphi}_m^{(2)}(x_{j+1},y;\Delta x)]/120 \quad (9.71)$$

can be used in place of $\mathfrak{R}_{\Delta x}^{(4)} \circ \tilde{\varphi}_m^{(2)}(x_{j+1},y)$ to reduce the computational cost of the procedure.

10. Ramifications.

Many modifications of the invention are possible in light of the above teachings. For example, it can be adapted to waveguides with multiple internal interfaces. In addition, loss can be incorporated in the model. One way to do this is to modify the modal wavenumbers by a perturbative method that is well-known in the art. Furthermore, a variable step size and variable reference wavenumbers can be used in place of the fixed step size and fixed reference wavenumbers in the preferred embodiment.

Additional variations of the invention also are possible in light of the above teachings. Thus, it can be adapted for predicting propagation of seismic waves in the earth's crust, propagation of radio waves in the earth's atmosphere, and propagation of light waves in dielectric material. Furthermore, computer implementation of the invention is most efficient on parallel computers because many of the operations in the decomposition method can be done in parallel or can be individually vectorized. It is therefore to be understood that the invention may be practiced otherwise than has been specifically described.

What is claimed is:

1. A computer implemented method for predicting propagation of a wave in a medium, said medium bordering a top reflective surface and a bottom reflective surface, said method comprising the steps of:
   (a) selecting a direction in which predictions of said propagation are desired;
   (b) selecting a pair of transparent boundaries that are parallel to said direction;
   (c) selecting a plurality of range steps in said direction;
   (d) calculating a plurality of local modes between said transparent boundaries and at said range steps;
   (e) calculating a plurality of coupling coefficients between said transparent boundaries and at said range steps;
   (f) selecting a plurality of modal amplitudes between said transparent boundaries and at said range steps;
   (g) splitting said modal amplitudes into a plurality of primary components and a plurality of secondary components;
   (h) selecting a plurality of initial values for said modal amplitudes at a first one of said range steps;
   (i) using a decomposition method to predict said modal amplitudes between said transparent boundaries and at said range steps from said initial values, said decomposition method including
   (1) using a coupled-parabolic-equation method with said coupling coefficients to predict boundary values of said primary components at an arbitrary range step from said modal amplitudes and said secondary components at a preceding range step,
   (2) using a parabolic-equation method to predict said secondary components at said arbitrary range step from said boundary values and from said secondary components at said preceding range step,
   (3) using said coupled-parabolic-equation method with said coupling coefficients to predict said modal amplitudes at said arbitrary range step from said secondary components at said arbitrary range step and from said modal amplitudes and said secondary components at said preceding range step,
   j) determining mathematically said propagation of said wave from said local modes and from said modal amplitudes.

2. A method according to claim 1 in which said wave is a sound wave and in which said medium is an ocean.

3. A method according to claim 1 in which said wave is a seismic wave and in which said medium is the earth's crust.

4. A method according to claim 1 in which said wave is a radio wave and in which said medium is the earth's atmosphere.

5. A method according to claim 1 in which said wave is a light wave and in which said medium is a dielectric material.

* * * * *